US012286222B2

(12) United States Patent
Grip et al.

(10) Patent No.: US 12,286,222 B2
(45) Date of Patent: Apr. 29, 2025

(54) EXPANDABLE STRUT ASSEMBLY FOR A WING OF AN AIRCRAFT AND METHOD OF USING THE SAME

(71) Applicant: The Boeing Company, Arlington, VA (US)

(72) Inventors: Robert E. Grip, Rancho Palos Verdes, CA (US); Christopher K. Droney, Long Beach, CA (US); John C. Vassberg, Long Beach, CA (US); Dino L. Roman, Lake Forest, CA (US); John J. Brown, Costa Mesa, CA (US); Nathaniel J. Noel, North Charleston, SC (US); Charles Daniel Peyton, Summerville, SC (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/171,345

(22) Filed: Feb. 18, 2023

(65) Prior Publication Data

US 2024/0278902 A1 Aug. 22, 2024

(51) Int. Cl.
*B64C 3/48* (2006.01)
*B64C 3/18* (2006.01)

(52) U.S. Cl.
CPC . *B64C 3/48* (2013.01); *B64C 3/18* (2013.01)

(58) Field of Classification Search
CPC ........ B64C 3/18; B64C 3/48; B64C 2003/445
See application file for complete search history.

(56) References Cited

U.S. PATENT DOCUMENTS 904,966 A * 11/1908 Knoch ...................... F41A 9/43 89/47
1,365,346 A * 1/1921 Schenkel .................. B64C 3/48 244/219

(Continued)

FOREIGN PATENT DOCUMENTS

CN 106827991 A * 6/2017 ................ B60F 5/00

OTHER PUBLICATIONS

Wikipedia contributors.(Aug. 21, 2022).Rigid chain actuator. Wikipedia. https://en.wikipedia.orgAw/index.php?title=Rigid_chain_actuator&oldid=1105696720.*

*Primary Examiner* — Joseph W Sanderson

(57) ABSTRACT

There is provided an expandable strut assembly for a wing of an aircraft, having a strut with a strut cross section with an airfoil shape, and the strut having an outboard end coupled to the wing, an inboard end coupled to a fuselage, and an elongate body, and having at least one shape transition assembly connected to the strut. Each shape transition assembly is configured to transition the strut between a contracted position and an expanded position, and is configured to transition the strut cross section between a contracted airfoil shape and an expanded airfoil shape. Each shape transition assembly has a shape transition mechanism attached to an interior of the strut. The shape transition mechanism includes fixed length structural members, and a drive mechanism of variable length structural member(s), includes an actuation mechanism connected to the shape transition mechanism, and an activation mechanism coupled to the actuation mechanism.

50 Claims, 65 Drawing Sheets

(56) References Cited

U.S. PATENT DOCUMENTS

| | | | | | |
|---|---|---|---|---|---|
| 1,747,637 | A * | 2/1930 | Larsen | B64C 3/48 244/219 |
| 1,828,981 | A * | 10/1931 | Parker | B64C 3/48 244/219 |
| 1,856,578 | A * | 5/1932 | Miquel | B64C 3/48 244/219 |
| 3,645,146 | A * | 2/1972 | Nagin | F16G 13/06 254/133 R |
| 3,986,688 | A * | 10/1976 | Giragosian | B64C 3/48 244/113 |
| 5,186,420 | A * | 2/1993 | Beauchamp | F03G 7/065 114/144 RE |
| 6,045,096 | A * | 4/2000 | Rinn | B64C 3/48 244/219 |
| 6,138,956 | A * | 10/2000 | Monner | B64C 13/24 244/215 |
| 7,530,533 | B2 * | 5/2009 | Perez-Sanchez | B64C 3/48 244/219 |
| 9,481,450 | B2 * | 11/2016 | Pitt | B64C 3/52 |
| 9,598,167 | B2 | 3/2017 | Grip et al. | |
| 9,944,356 | B1 * | 4/2018 | Wigley | B64C 3/48 |
| 10,577,076 | B1 * | 3/2020 | Wylonis | B64C 3/185 |
| 10,773,786 | B2 | 9/2020 | Sclafani et al. | |
| 11,377,196 | B2 * | 7/2022 | Shields | B64C 3/52 |
| 11,787,524 | B2 * | 10/2023 | Grip | B64C 3/16 244/129.1 |
| 12,122,509 | B2 * | 10/2024 | Grip | B64C 3/18 |
| 12,195,179 | B2 * | 1/2025 | Grip | B64C 1/26 |
| 12,202,601 | B2 * | 1/2025 | Grip | B64C 3/48 |
| 2006/0237596 | A1 * | 10/2006 | Perez-Sanchez | B64C 3/48 244/219 |
| 2007/0152106 | A9 * | 7/2007 | Perez-Sanchez | B64C 3/48 244/219 |
| 2015/0023797 | A1 * | 1/2015 | Egbert | B64C 1/34 416/223 R |
| 2016/0001874 | A1 * | 1/2016 | Pitt | B64C 3/16 244/99.11 |
| 2021/0245862 | A1 * | 8/2021 | Shields | B64C 3/44 |
| 2023/0089911 | A1 * | 3/2023 | Berry | B64C 3/48 |
| 2023/0140102 | A1 * | 5/2023 | Grip | B64C 39/068 244/129.1 |
| 2024/0002035 | A1 * | 1/2024 | Li | B64C 3/44 |
| 2024/0017816 | A1 * | 1/2024 | Li | B64C 33/02 |
| 2024/0092474 | A1 * | 3/2024 | Luo | B64C 3/48 |
| 2024/0150007 | A1 * | 5/2024 | Grip | B64C 3/16 |
| 2024/0278901 | A1 * | 8/2024 | Grip | B64C 3/48 |
| 2024/0278903 | A1 * | 8/2024 | Grip | F16G 13/20 |

* cited by examiner 12
302
302c
40
146
202
316
66
66a
21
54
16
166
314a
314b
312a
312b
26
310a
310b
308
306
304
318

EXPANDABLE STRUT ASSEMBLY FOR A WING OF AN AIRCRAFT AND METHOD OF USING THE SAME

CROSS-REFERENCE TO RELATED APPLICATIONS

This nonprovisional patent application is related to contemporaneously filed U.S. nonprovisional patent application Ser. No. 18/171,346, titled VARIABLE RADIUS ASSEMBLY AND METHOD OF USING THE SAME, filed on Feb. 18, 2023, the contents of which are hereby incorporated by reference in their entirety. By mention in this CROSS-REFERENCE TO RELATED APPLICATIONS section, the application having Ser. No. 18/171,346 is not admitted to be prior art with respect to this application having Ser. No. 18/171,345.

This nonprovisional patent application is also related to contemporaneously filed U.S. nonprovisional patent application Ser. No. 18/171,347, titled EXTENDABLE COMPRESSION CHAIN SYSTEM AND METHOD OF USING THE SAME, filed on Feb. 18, 2023, the contents of which are hereby incorporated by reference in their entirety. By mention in this CROSS-REFERENCE TO RELATED APPLICATIONS section, the application having Ser. No. 18/171,347 is not admitted to be prior art with respect to this application having Ser. No. 18/171,345.

FIELD

The disclosure relates generally to a strut for a wing of an aircraft, and more particularly, to an expandable strut assembly for a wing of an aircraft having a shape transition mechanism in the strut to expand and contract a thickness of a strut cross section.

BACKGROUND

Wings of an aircraft having strut support, i.e., strut-braced wings, reduce the overall weight of the wing and reduce the bending moment in the inboard wing, where the wing attaches to the fuselage, as compared to wings that do not have strut support, i.e., cantilever wings. With the aircraft in flight, a strut connected to the fuselage of the aircraft and connected to the underside of the wing generally experiences a load condition, such as a tension load, and with the aircraft on the ground the strut experiences a load condition, such as compression load under 1 g (gravitational force) conditions. A strut must also be designed for a −1 g (minus one g) pushover flight condition for the aircraft, which places the strut in axial compression. The amount of axial material in the strut is sized by the tension condition, while the thickness of the strut is sized by Euler buckling under the −1 g pushover flight condition.

Known designs of struts exist to address the −1 g pushover flight condition. One known strut design includes a full-span strut that spans and connects between the fuselage of the aircraft and the underside of the wing. However, such full-span struts may be thick and heavy because the buckling length is longer.

Another known strut design includes the addition of one or more jury struts, or auxiliary struts, fastened along a length of a primary strut and substantially normal to an axis of the primary strut, where the primary strut is typically thinner than a full-span strut. Jury struts, or auxiliary struts, break up the buckling length of the primary strut into smaller segments along the length of the primary strut, and save weight because the buckling length is shorter. However, the addition of one or more jury struts, or auxiliary struts, may increase aerodynamic drag of the aircraft.

Yet another known strut member design includes a cable strut that is very thin and light and is connected between the fuselage of the aircraft and the underside of the wing. Although the aerodynamic drag is low with this design, the wing must be sized for the −1 g pushover flight condition as a cantilever wing, and the wing may be heavier to take the −1 g pushover flight condition as a cantilever wing. Under 1 g gravity conditions sitting on the ground, a downward deflection of the wing may cause the cable to droop. In an intermediate loading range, i.e., from 1 g on the ground to 1 g in flight, drooping cables on the wings may vibrate in an uncontrolled manner. Pre-stressing the cables to reduce or eliminate droop under the −1 g pushover flight condition may require larger connection hardware, increased bending in the wing, and increased compression in the wing box, which may result in unwanted weight.

Another challenge is configuring a structure that is able to fit within a thin strut and is able to expand and contract, or morph, within the strut during flight. An issue with morphing structures that morph from a thin cross section to a thick cross section is a “scissor jack phenomenon”, which when collapsed may have a poor mechanical advantage, and when expanded may require large diagonal linkages to take a load substantially perpendicular to those linkages in the collapsed position.

Accordingly, there is a need in the art for an improved expandable strut for a wing of an aircraft that enables a more efficient thin or small cross section for cruise portions of a flight, that allows for a light strut to carry compressive loads for wing down bending conditions and a minus 1 g pushover flight condition, while preserving a weight-savings aspect for the wing, that eliminates cable drooping without adding unwanted weight, that avoids excessive tension to the wing to prevent bending stresses, that has a low aerodynamic drag, and that provides advantages over known strut members and strut assemblies.

SUMMARY

Example implementations of the present disclosure provide an expandable strut assembly for a wing of an aircraft and method of using the same. As discussed in the below detailed description, versions of the expandable strut assembly and method may provide significant advantages over known assemblies and methods.

In a version of the disclosure, there is provided an expandable strut assembly for a wing of an aircraft. The expandable strut assembly comprises a strut having a strut cross section with an airfoil shape, and the strut having an outboard end coupled to the wing of the aircraft, an inboard end coupled to a fuselage of the aircraft, and an elongate body defined between the outboard end and the inboard end.

The expandable strut assembly further comprises at least one shape transition assembly connected to an interior of the strut. Each shape transition assembly is configured to transition the strut between a contracted position and an expanded position, and is configured to transition the strut cross section between a contracted airfoil shape and an expanded airfoil shape.

Each shape transition assembly comprises a shape transition mechanism attached to one or more interior portions in the interior of the strut. The shape transition mechanism comprises a plurality of fixed length structural members. The shape transition mechanism further comprises a drive mechanism connected to the plurality of fixed length structural members. The drive mechanism comprises one or more variable length structural members.

Each shape transition assembly further comprises an actuation mechanism connected to the shape transition mechanism, the actuation mechanism configured to actuate the drive mechanism of the shape transition mechanism. Each shape transition assembly further comprises an activation mechanism coupled to the actuation mechanism. The activation mechanism is configured to activate the actuation mechanism, to initiate a position transition of the strut between the contracted position and the expanded position, and to initiate a shape transition of the strut cross section between the contracted airfoil shape and the expanded airfoil shape.

In another version of the disclosure, there is provided an aircraft. The aircraft comprises a fuselage, and two wings coupled to the fuselage and extending from the fuselage opposite each other. The aircraft further comprises an expandable strut assembly coupled to each wing.

The expandable strut assembly comprises a strut having a strut cross section with an airfoil shape, and the strut having an outboard end coupled to each wing, an inboard end coupled to the fuselage, and an elongate body defined between the outboard end and the inboard end. The expandable strut assembly further comprises at least one shape transition assembly connected to an interior of the strut. Each shape transition assembly is configured to transition the strut between a contracted position and an expanded position, and is configured to transition the strut cross section between a contracted airfoil shape and an expanded airfoil shape.

Each shape transition assembly comprises a shape transition mechanism attached to one or more interior portions in the interior of the strut. The shape transition mechanism comprises a plurality of fixed length structural members, and a drive mechanism connected to the plurality of fixed length structural members, the drive mechanism comprising one or more variable length structural members.

Each shape transition assembly further comprises an actuation mechanism connected to the shape transition mechanism. The actuation mechanism is configured to actuate the drive mechanism of the shape transition mechanism.

Each shape transition assembly further comprises an activation mechanism coupled to the actuation mechanism. The activation mechanism is configured to activate the actuation mechanism, and to initiate a position transition of the strut between the contracted position and the expanded position, and to initiate a shape transition of the strut cross section between the contracted airfoil shape and the expanded airfoil shape.

In another version of the disclosure, there is provided an expandable strut assembly for an aircraft. The expandable strut assembly comprises a strut having a strut cross section with an airfoil shape, and the strut having an outboard end coupled to a wing of the aircraft, an inboard end coupled to a fuselage of the aircraft, and an elongate body defined between the outboard end and the inboard end. The expandable strut assembly further comprises at least one shape transition assembly connected to an interior of the strut. Each shape transition assembly is configured to transition the strut between a contracted position and an expanded position, and is configured to transition the strut cross section between a contracted airfoil shape and an expanded airfoil shape.

Each shape transition assembly comprises a shape transition mechanism attached to one or more interior portions in the interior of the strut. The shape transition mechanism comprises a plurality of fixed length structural members forming an expandable structure having a cross section profile comprising a rhombus shape. The shape transition mechanism further comprises a drive mechanism connected to the plurality of fixed length structural members. The drive mechanism comprises one or more variable length structural members comprising one or more compression chains coupled to a reduction gear system.

Each shape transition assembly further comprises an actuation mechanism connected to the shape transition mechanism. The actuation mechanism is configured to actuate the drive mechanism of the shape transition mechanism. The actuation mechanism comprises a first spine member having a restrained end attached to the outboard end of the strut and having an unrestrained end, and extending along a length of the strut. The actuation mechanism further comprises a second spine member having a restrained end attached to a fuselage structure in an interior of the fuselage, and having an unrestrained end, and extending along the length of the strut, parallel to the first spine member. The actuation mechanism further comprises one or more compression chain attachment points connecting the first spine member and connecting the second spine member to the drive mechanism.

Each shape transition assembly further comprises an activation mechanism coupled to the actuation mechanism. The activation mechanism comprises a strut axial load driven activation mechanism, and is configured to activate the actuation mechanism, to initiate a position transition of the strut between the contracted position and the expanded position, and to initiate a shape transition of the strut cross section between the contracted airfoil shape and the expanded airfoil shape.

In another version of the disclosure, there is provided a method of using an expandable strut assembly to expand a strut of a wing of an aircraft. The method comprises the step of coupling the expandable strut assembly to the wing of the aircraft.

The expandable strut assembly comprises the strut having a strut cross section with an airfoil shape, and the strut having an outboard end coupled to the wing of the aircraft, an inboard end coupled to a fuselage of the aircraft, and an elongate body defined between the outboard end and the inboard end. The expandable strut assembly further comprises at least one shape transition assembly connected to an interior of the strut.

Each shape transition assembly comprises a shape transition mechanism attached to one or more interior portions in the interior of the strut. The shape transition mechanism comprises a plurality of fixed length structural members, and a drive mechanism connected to the plurality of fixed length structural members, the drive mechanism comprising one or more variable length structural members.

Each shape transition assembly further comprises an actuation mechanism connected to the shape transition mechanism. Each shape transition assembly further comprises an activation mechanism coupled to the actuation mechanism.

The method further comprises the step of using the at least one shape transition assembly of the expandable strut assembly, to transition the strut between a contracted position and an expanded position, and to transition the strut cross section between a contracted airfoil shape and an expanded airfoil shape.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

Figure 1:
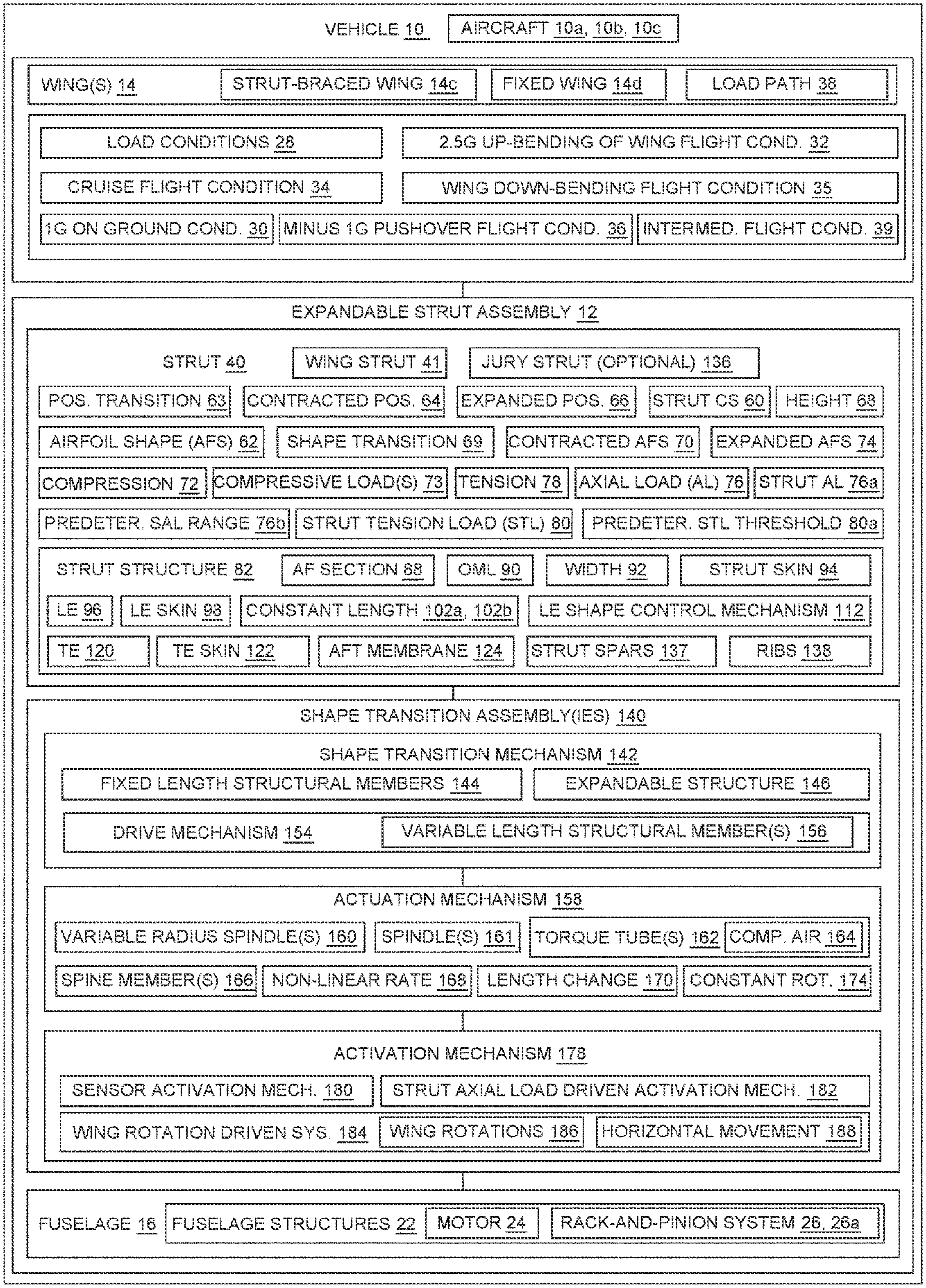
FIG. 1 is an illustration of a block diagram of an exemplary vehicle having exemplary versions of an expandable strut assembly of the disclosure.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Now referring to FIG. 1, FIG. 1 is an illustration of a block diagram of an exemplary vehicle 10, such as an aircraft 10*a* (see also FIGS. 2A-2B), aircraft 10*b* (see also FIG. 2C), or aircraft 10*c* (see also FIG. 18A) having exemplary versions of an expandable strut assembly 12 of the disclosure. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the expandable strut assembly 12 in FIG. 1 are not meant to imply physical or architectural limitations to the manner in which an illustrative example may be implemented. Other components in addition to, or in place of, the ones illustrated may be used. Some components may be unnecessary.

As shown in FIG. 1, the expandable strut assembly 12 is configured for coupling, and is coupled, to a wing 14, of the vehicle 10, such as the aircraft 10*a*, 10*b*, 10*c*, and is configured for coupling, and is coupled, to a fuselage 16, of the vehicle 10, such as the aircraft 10*a*, 10*b*, 10*c*. The vehicle 10, such as the aircraft 10*a*, 10*b*, 10*c*, preferably has two wings 14 (see FIGS. 2A-2C, 18A), including a first wing 14*a* (see FIGS. 2A-2C), or left wing, and a second wing 14*b* (see FIGS. 2A-2C), or right wing. At least one expandable strut assembly 12 is coupled to each wing 14 (see FIGS. 2A-2C, 18A). In one version, the expandable strut assemblies 12 comprise a first expandable strut assembly 12*a* (see FIG. 2A), or left expandable strut assembly, coupled, or attached, to the first wing 14*a* (see FIG. 2A), and a second expandable strut assembly 12*b* (see FIG. 2A), or right expandable strut assembly, coupled, or attached to the second wing 14*b* (see FIG. 2A). As shown in FIG. 1, each wing 14 comprises a strut-braced wing 14*c* and is in the form of a fixed wing 14*d*. Each wing 14 has a topside 17 (see FIGS. 2A-2C) and an underside 18 (see FIGS. 2A-2C).

The expandable strut assembly 12 may be used with any aircraft, such as aircraft 10*a* (see FIGS. 2A-2B), aircraft 10*b* (see FIG. 2C), and aircraft 10*c* (see FIG. 18A), having strut-braced wings 14*c*, including small jet aircraft, large jet aircraft, commercial aircraft, military aircraft, cargo aircraft, and other types of aircraft. The expandable strut assembly 12 is particularly suitable for large jet aircraft with high Mach numbers in a subsonic range, since low aerodynamic drag in the subsonic range is desirable.

As further shown in FIG. 1, the vehicle 10, such as aircraft 10*a*, aircraft 10*b*, and aircraft 10*c*, comprises the fuselage 16, also referred to as the body. The fuselage 16 has an interior 20*a* (see FIGS. 2A-2C) and an exterior 20*b* (see FIGS. 2A-2C), and sides 21 (see FIGS. 2A-2C, 18A) with side portions 21*a* (see FIG. 2A), or side-of-body portions. The fuselage 16 includes fuselage structures 22 (see FIGS. 1, 2C) in the interior 20*a* of the fuselage 16. The fuselage structures 22 may include one or more of, a motor 24 (see FIG. 1), a rack-and-pinion system 26 (see FIGS. 1, 2C, 6C), a lever assembly 408 (see FIG. 18A), or other suitable fuselage structures within the interior 20*a* of the fuselage 16, or coupled to the fuselage 16.

The vehicle 10, such as the aircraft 10*a*, 10*b*, 10*c*, experiences load conditions 28 (see FIG. 1) when on the ground and when in flight. When the aircraft 10*a*, 10*b*, 10*c*, is on the ground, the aircraft 10*a*, 10*b*, 10*c*, is in, or at, a 1 g on ground condition (COND.) 30 (see FIG. 1). As used herein "g" means gravitational force. The gravitational force is attractive and a downward force toward the center of the earth, and forces on the landing gear of the aircraft 10*a*, 10*b*, 10*c*, are upward forces and are a reaction against the downward force. The 1 g on ground condition 30 results in compression in a strut 40 (see FIG. 1) because the dead weight of the wing 14 from the downward force of gravity makes the wing 14 tend to sag or deflect downward, and thus the length of the strut 40 tends to shorten. The downward load is reacted upward by the landing gear. An intermediate loading condition or range may be from 1 g on the ground to 1 g in flight, or another suitable intermediate loading condition.

When the aircraft 10*a*, 10*b*, 10*c*, is in flight, the aircraft 10*a*, 10*b*, 10*c*, is in a cruise flight condition 34 (see FIG. 1). The cruise flight condition 34 is typically a steady 1.0 g condition 35 (see FIG. 15) flight with a moderate amount of turbulence. Further, when the aircraft 10*a*, 10*b*, 10*c*, is in flight, the aircraft 10*a*, 10*b*, 10*c*, may be in an intermediate flight condition 39 (see FIG. 1). The intermediate flight condition 39 may be a 0.5 g condition, where a lower load threshold is a 0.3 g condition 31 (see FIG. 15) and an upper load threshold is a 0.7 g condition 33 (see FIG. 15). In the intermediate flight condition 39, the aircraft 10*a*, 10*b*, 10*c*, may be on its way to a minus 1 g (−1 g) pushover flight condition (COND.) 36 (see FIG. 1), discussed below, or any other compression load condition.

During the cruise flight condition 34, for example, in a load condition range of greater than 0.7 g condition 33 to 1.3 g condition, a strut 40 (see FIG. 1) for the wing 14 is in tension 78 (see FIG. 1). The thickness of the strut 40 and a strut cross section 60 (see FIG. 1) of the expandable strut assembly 12 disclosed herein are preferably expanded, or extended, between the 0.7 g condition 33 and the 0.3 g condition 31, so that the strut 40 is prepared to take compressive load 73 (see FIG. 1) by the time the compressive load 73 is applied, when the strut 40 is in compression 72 (see FIG. 1). The expandable strut assembly 12 disclosed herein avoids a strut 40 that is thick during the cruise flight condition 34.

Further, when the aircraft 10*a*, 10*b*, is in flight, the aircraft 10*a*, 10*b*, may be in, or at, for example, a 2.5 g up-bending of wing flight condition (COND.) 32 (see FIG. 1), when the wing 14 is bending up. For up-bending of the wing flight conditions, a vertical acceleration of the aircraft 10*a*, 10*b*, 10*c*, is a factor. In the 2.5 g up-bending of wing flight condition 32, the air load on the wing 14 is in the upward direction. It is balanced by the weight of the aircraft 10*a* in the downward direction. The 2.5 g up-bending of wing flight condition 32 is a flight maneuver that imparts 2.5 times the force of gravity as a downward acceleration on the vehicle 10, which is reacted by the upward force on the wing 14. This tends to lengthen the strut 40, which puts it in tension 78 (see FIG. 1).

Further, when the aircraft 10*a*, 10*b*, 10*c*, is in flight, the aircraft 10*a*, 10*b*, 10*c*, may be in a wing down-bending flight condition 35 (see FIG. 1), for example, at or in the minus 1 g (−1 g) pushover flight condition 36 (see FIG. 1), when the wing 14 is bending down. In the minus 1 g pushover flight condition 36, the direction of weight-force is opposite to the direction of g-force acceleration. The strut 40 (see FIG. 1) is designed for the minus 1 g pushover flight condition 36, as the minus 1 g pushover flight condition 36 puts the strut 40 into compression 72 (see FIG. 1), such as axial compression. The minus 1 g pushover flight condition 36 is the opposite of the 2.5 g up-bending of wing flight condition 32. In the minus 1 g pushover flight condition 36, an upward acceleration on the vehicle 10 is balanced by a downward force on the wing 14 from the air load pressures on the wing 14. This tends to bend the wing 14 downward and shorten a length 57 (see FIG. 3A) of the strut 40. The expandable strut assembly 12 has a load path 38 (see FIG. 1) that is in axial tension 78 (see FIG. 1) or compression 72 (see FIG. 1) in the strut 40.

As shown in FIG. 1, the expandable strut assembly 12 comprises the strut 40, such as a wing strut 41. The strut 40 (see FIGS. 2A-2C) has an outboard end 42 (see FIGS. 2A-2C), an inboard end 44 (see FIGS. 2A-2C) opposite the outboard end 42, and an elongate body 46 (see FIGS. 2A-2C) defined between, or formed between, the outboard end 42 and the inboard end 44. The outboard end 42 of each strut 40 is coupled, or attached, to each wing 14 of the vehicle 10, such as the aircraft 10*a*, 10*b*, 10*c*. Preferably, the outboard end 42 of the strut 40 is coupled, or attached, to a first underside portion 18*a* (see FIGS. 2A-2C) on the underside 18 of the wing 14. A wing strut fairing 48 (see FIG. 2A) is positioned at the outboard end 42 of the strut 40, at the junction of the first underside portion 18*a* of the wing 14 and the outboard end 42 of the strut 40. The fuselage 16 of the vehicle 10, such as the aircraft 10*a*, 10*b*, 10*c*, has an opening 50 (see FIGS. 2A, 2C) through the exterior 20*b* (see FIGS. 2A, 2C) of the side portion 21*a* (see FIGS. 2A, 2C), or side-of-body portion. The vehicle 10, such as the aircraft 10*a*, 10*b*, 10*c*, further has a fuselage strut fairing 52 (see FIGS. 2A, 18B). The strut 40 has a strut root 54 (see FIGS. 1, 2A, 18A) at the inboard end 44 of the strut 40.

Figure 2A:
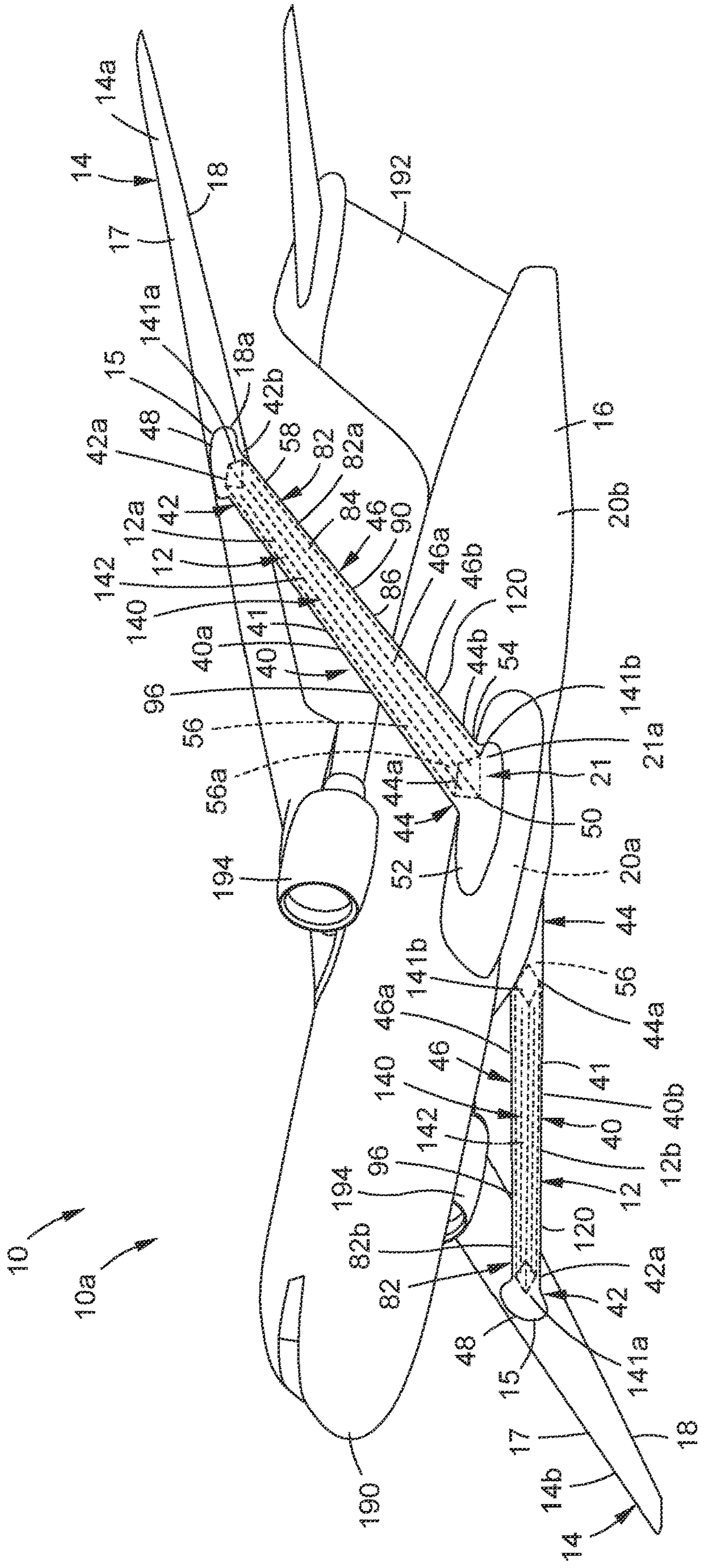
FIG. 2A is an illustration of a front perspective view of an exemplary aircraft having wings each with an exemplary expandable strut assembly of the disclosure.

The strut 40 has an interior 56 (see FIG. 2A) and an exterior 58 (see FIG. 2A). The strut 40 further has a strut cross section (CS) 60 (see FIGS. 1, 3C, 4A) with an airfoil shape (AFS) 62 (see FIGS. 1, 3C, 4A). The strut 40 is configured to transition in a position (POS.) transition 63 (see FIG. 1) between a contracted position (POS.) 64 (see FIGS. 1, 4A), such as a fully contracted position 64*a* (see FIG. 4A) (also referred to as a retracted position, such as a fully retracted position), and an expanded position (POS.) 66 (see FIGS. 1, 4E), such as a fully expanded position 66*a* (see FIG. 4E) (also referred to as an extended position, such as a fully extended position). As used herein, “contract” or “retract” means to cause the height 68 (see FIG. 1) or thickness of the strut cross section 60 with the airfoil shape 62 and the thickness of the strut 40 to become thinner or smaller. The fully contracted position 64*a* (see FIG. 4A), or fully retracted position, is the strut cross section 60 (see FIG. 4A) and the thickness of the strut 40 (see FIG. 4A) at the thinnest or smallest height 68 (see FIG. 1) or thickness. As used herein, “expand” or “extend” means to cause the height 68 (see FIGS. 1, 4E) or thickness of the strut cross section 60 with the airfoil shape 62 and the thickness of the strut 40 to become thicker or larger. The fully expanded position 66*a* (see FIG. 4E), or fully extended position, is the strut cross section 60 (see FIG. 4E) and the thickness of the strut 40 at the thickest or largest height 68 (see FIG. 4E) or thickness.

Figure 10A:
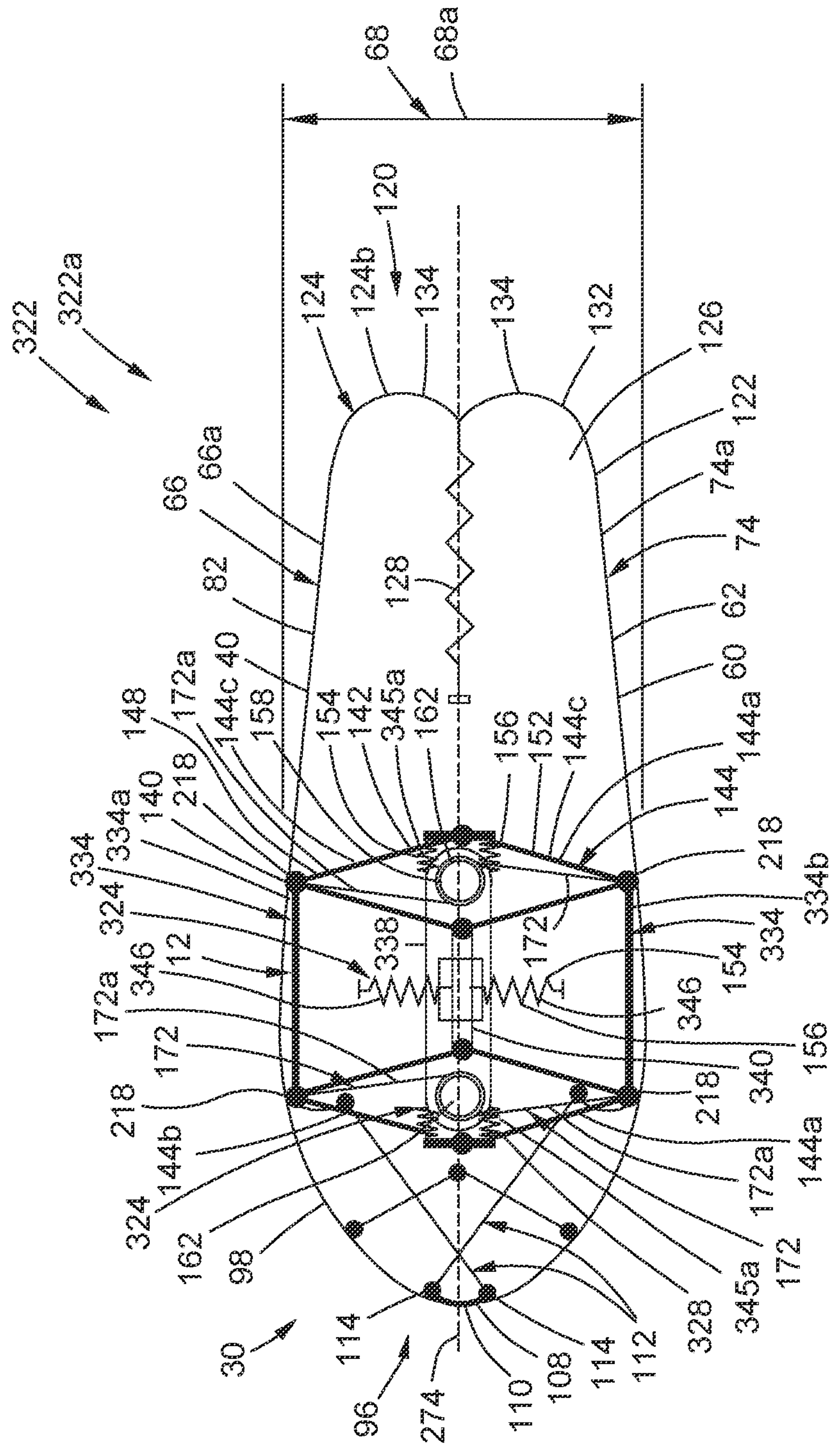
FIG. 10A is an illustration of a left outboard side view of a schematic diagram of another exemplary expandable strut assembly with a spring assembly and cables, in a fully expanded position.
Figure 11A:
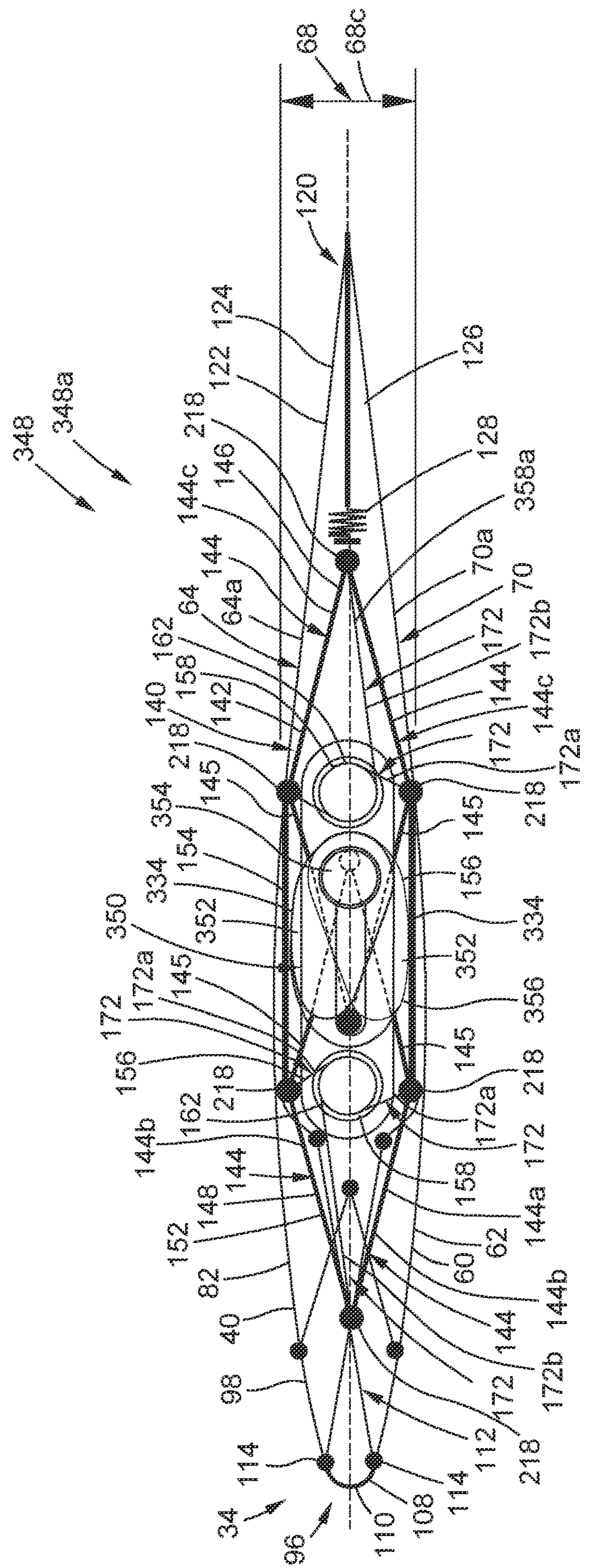
FIG. 11A is an illustration of a left outboard side view of a schematic diagram of another exemplary expandable strut assembly with a cam assembly and horizontal cables, in a fully contracted position.
Figure 11B:
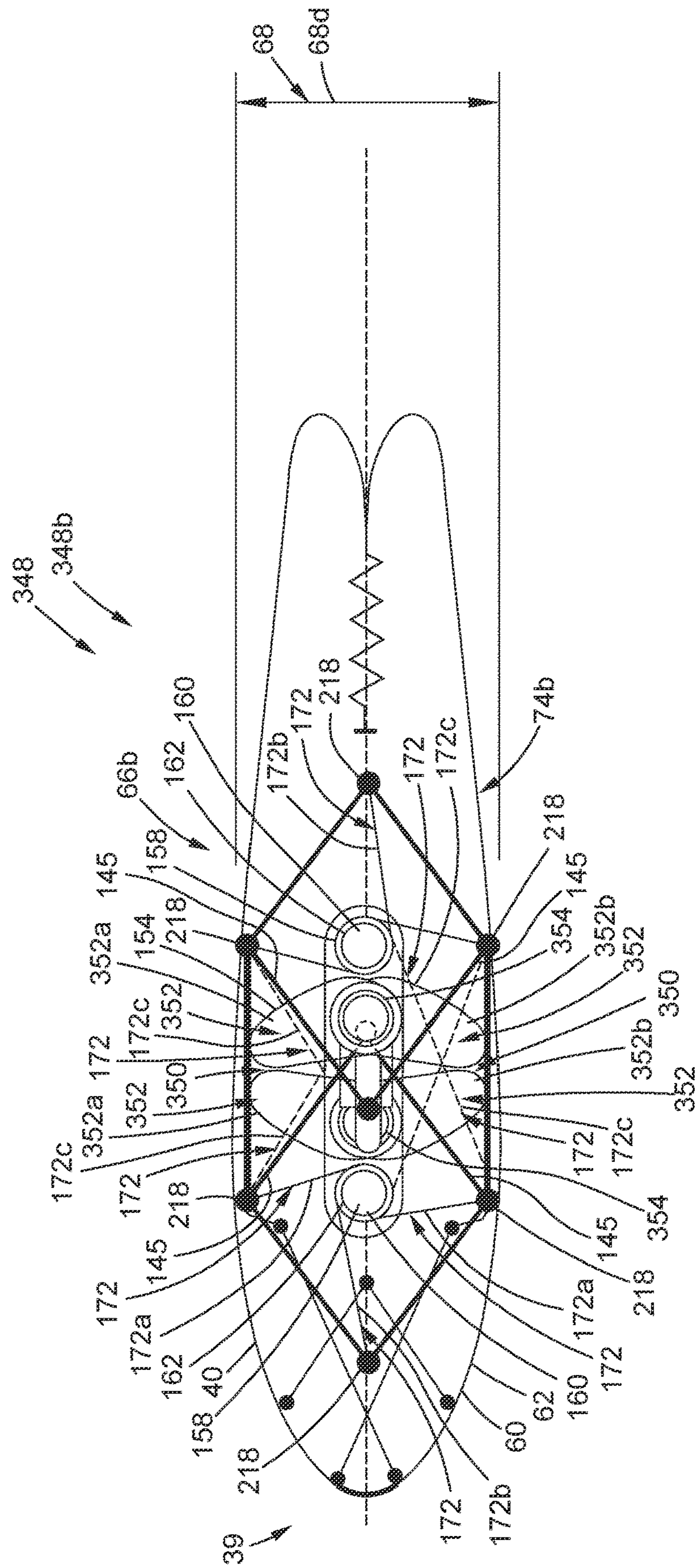
FIG. 11B is an illustration of a left outboard side view of a schematic diagram of the expandable strut assembly of FIG. 11A, in an intermediate expanded position.
Figure 11C:
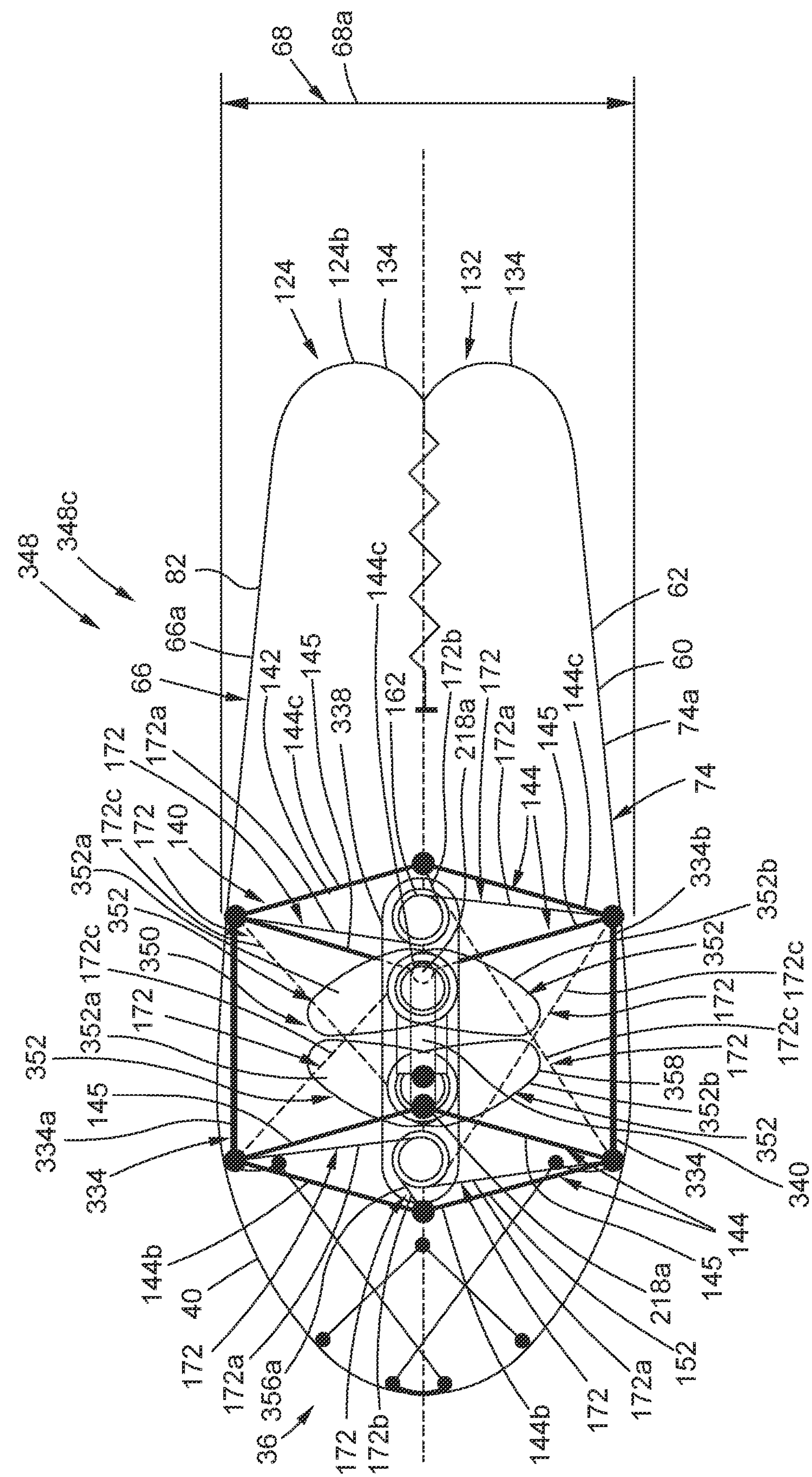
FIG. 11C is an illustration of a left outboard side view of a schematic diagram of the expandable strut assembly of FIG. 11A, in a fully expanded position.
Figure 14A:
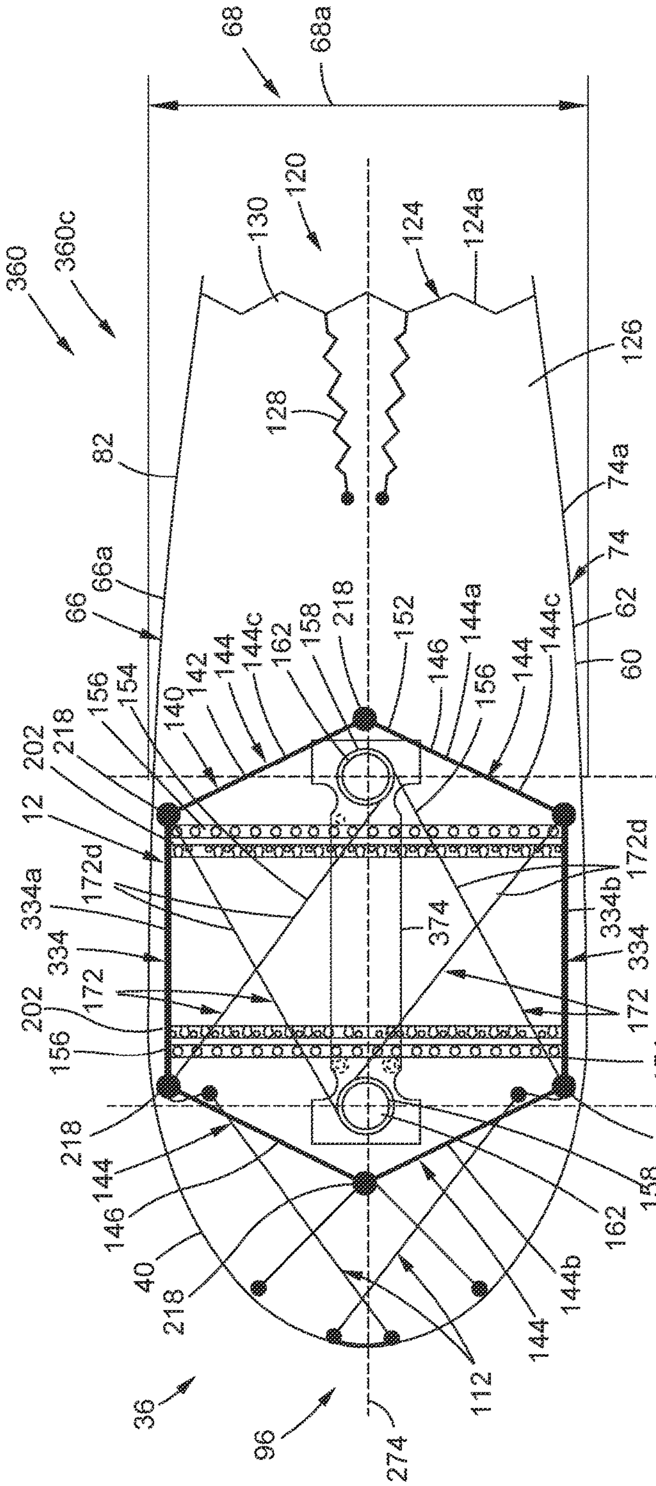
FIG. 14A is an illustration of a left outboard side view of a schematic diagram of the expandable strut assembly of FIG. 12A, in a fully expanded position.

The strut cross section 60 of the strut 40 becomes thick or large, when the strut 40 is in compression 72 (see FIG. 1), when the aircraft 10*a*, 10*b*, 10*c*, is in the 1 g on ground condition 30 (see FIG. 10A), or in the minus 1 g pushover flight condition 36 (see FIGS. 11C, 14A). The strut cross section 60 (see FIGS. 1, 11C) has a height 68 (see FIGS. 1, 10A, 11C, 14A), such as a fully expanded height 68*a* (see FIGS. 10A, 11C, 14A), when the strut cross section 60 (see FIGS. 1, 10A, 11C, 14A) has an expanded airfoil shape (AFS) 74 (see FIGS. 1, 10A, 11C, 14A), such as a fully expanded airfoil shape 74*a* (see FIGS. 10A, 11C, 14A) (also referred to as an extended airfoil shape, such as a fully extended airfoil shape). The strut 40 having the strut cross section 60 that becomes thick or large has a larger buckling load, which is sufficient to withstand the compressive load 73 (see FIG. 1) from the minus 1 g pushover flight condition 36 (see FIG. 1).

Figure 10B:
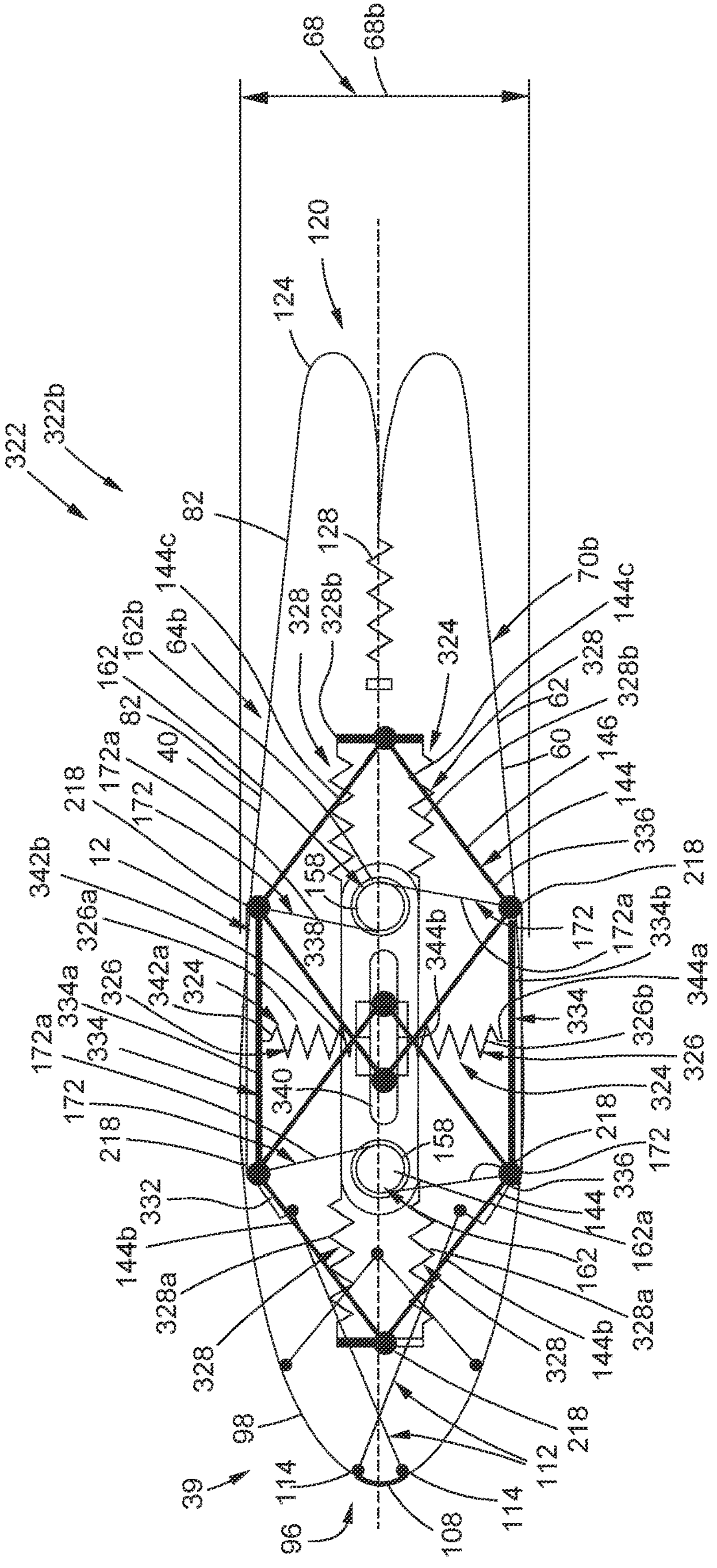
FIG. 10B is an illustration of a left outboard side view of a schematic diagram of the expandable strut assembly of FIG. 10A, in an intermediate contracted position.
Figure 10C:
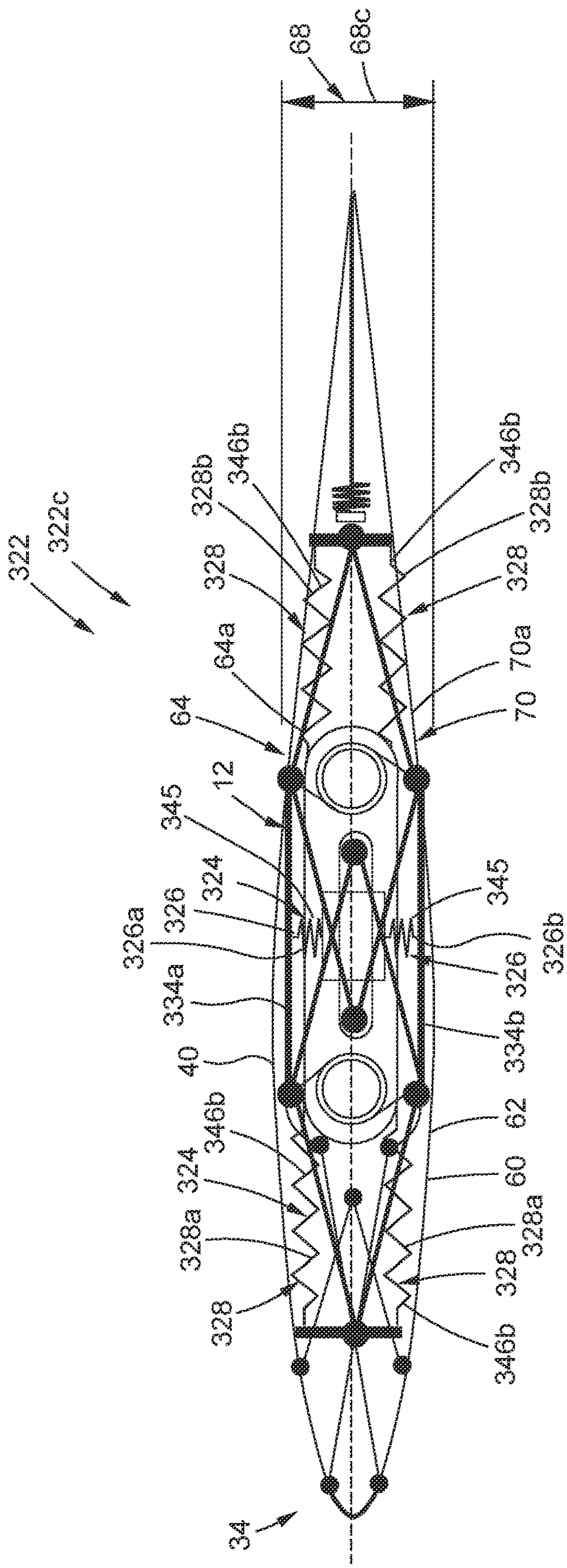
FIG. 10C is an illustration of a left outboard side view of a schematic diagram of the expandable strut assembly of FIG. 10A, in a fully contracted position.
Figure 12A:
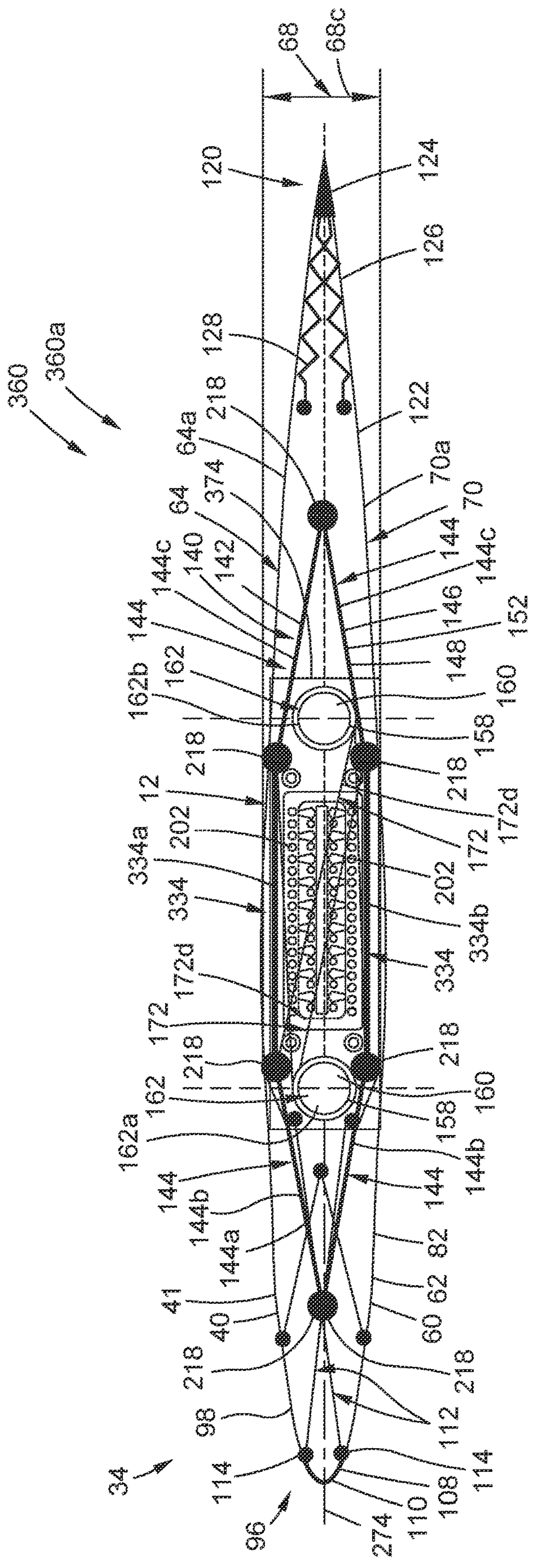
FIG. 12A is an illustration of a left outboard side view of a schematic diagram of another exemplary expandable strut assembly with compression chains, brace cables, and torque tubes, in a fully contracted position.

The strut cross section 60 of the strut 40 becomes thin or small, when the aircraft 10*a*, 10*b*, 10*c*, is in the cruise flight condition 34 (see FIGS. 10C, 11A, 12A). The strut cross section 60 (see FIGS. 1, 10C, 11A, 12A) has the height 68 (see FIGS. 1, 10C, 11A, 12A), such as a fully contracted height 68*c* (see FIGS. 10C, 11A, 12A), when the strut cross section 60 has a contracted airfoil shape (AFS) 70 (see FIGS. 1, 10C, 11A, 12A), such as a fully contracted airfoil shape 70*a* (see FIGS. 10C, 11A, 12A) (also referred to as a retracted airfoil shape, such as a fully retracted airfoil shape). The strut 40 that is thin or small enables lower drag.

The fully expanded height 68*a* (see FIG. 10A) of the strut cross section 60 is greater than the fully contracted height 68*c* (see FIG. 10C) of the strut cross section 60. The strut cross section 60 is configured to transition in shape between the contracted airfoil shape 70, such as the fully contracted airfoil shape 70*a*, and the expanded airfoil shape 74, such as the fully expanded airfoil shape 74*a*. Thus, the strut cross section 60 expands from the strut cross section 60 (see FIG. 1) that is thin or small to the strut cross section 60 that is thick or large, and contracts from the strut cross section 60 that is thick or large to the strut cross section 60 that is thin or small. The expansion of the strut cross section 60 is driven by axial load (AL) 76 (see FIG. 1) in the strut 40, such as strut axial load (AL) 76*a* (see FIG. 1), in tension 78 (see FIG. 1) and compression 72 (see FIG. 1). This allows for a light wing strut to carry the required compressive loads 73 (see FIG. 1) for wing down-bending flight conditions 35 (see FIG. 1), but enables a more efficient small strut cross section for the cruise flight condition 34 (see FIG. 1) portions of the flight. The strut 40 is able to carry compression 72, and the strut 40, such as the thin or small strut, has the capability to become thick or large to withstand compressive loads 73. The strut cross section 60 has the height 68 (see FIGS. 10B, 11D), such as an intermediate contracted height 68*b* (see FIGS. 10B, 11D), when the strut cross section 60 has an intermediate contracted airfoil shape 70*b* (see FIGS. 10B, 11D). The strut cross section 60 has the height 68 (see FIGS. 10D, 11B), such as an intermediate expanded height 68*d* (see FIGS. 10D, 11B), when the strut cross section 60 has an intermediate expanded airfoil shape 74*b* (see FIGS. 10D, 11B) (also referred to as an intermediate extended airfoil shape). The intermediate contracted height 68*b* (see FIG. 11D) is less than the intermediate expanded height 68*d* (see FIG. 11B).

The strut 40 is in the contracted position 64, and the strut cross section 60 is in the contracted airfoil shape 70, during the cruise flight condition 34 of the aircraft 10*a*, 10*b*, 10*c*. The strut 40 is in the expanded position 66, and the strut cross section 60 is in the expanded airfoil shape 74, for example, when the strut 40 is in compression 72, or under a strut compression load, during the wing down-bending flight condition 35 of the aircraft 10*a*, 10*b*, 10*c*. Further, the strut 40 may be in the expanded position 66, and the strut cross section 60 may be in the expanded airfoil shape 74, in a range of tension 78, so that they are expanded by the time the strut 40 goes into compression 72. The strut 40 further has a strut tension load (STL) 80 (see FIG. 1), including a predetermined (PREDETER.) strut tension load (STL) threshold 80*a* (see FIG. 1).

As shown in FIGS. 1, 2A, the strut 40 comprises a strut structure 82. As shown in FIG. 2A, the vehicle 10, such as the aircraft 10*a*, comprises two strut structures 82, such as a first strut structure 82*a* and a second strut structure 82*b*. Each strut structure 82 has an interior 84 (see FIG. 2A) and an exterior 86 (see FIG. 2A). The strut structure 82 has an outboard end 42*b* (see FIG. 2A), an inboard end 44*b* (see FIG. 2A) opposite the outboard end 42*b*, and an elongate body 46*b* (see FIG. 2A) formed between the inboard end 44*b* and the outboard end 42*b*. The outboard end 42*b* of the strut structure 82 is coupled, or attached, to the wing 14, such as the underside 18 (see FIG. 2A) of the wing 14, of the vehicle 10, such as the aircraft 10*a* (see FIG. 2A). The inboard end 44*b* of the strut structure 82 is coupled, or attached, to the fuselage 16.

Figure 3A:
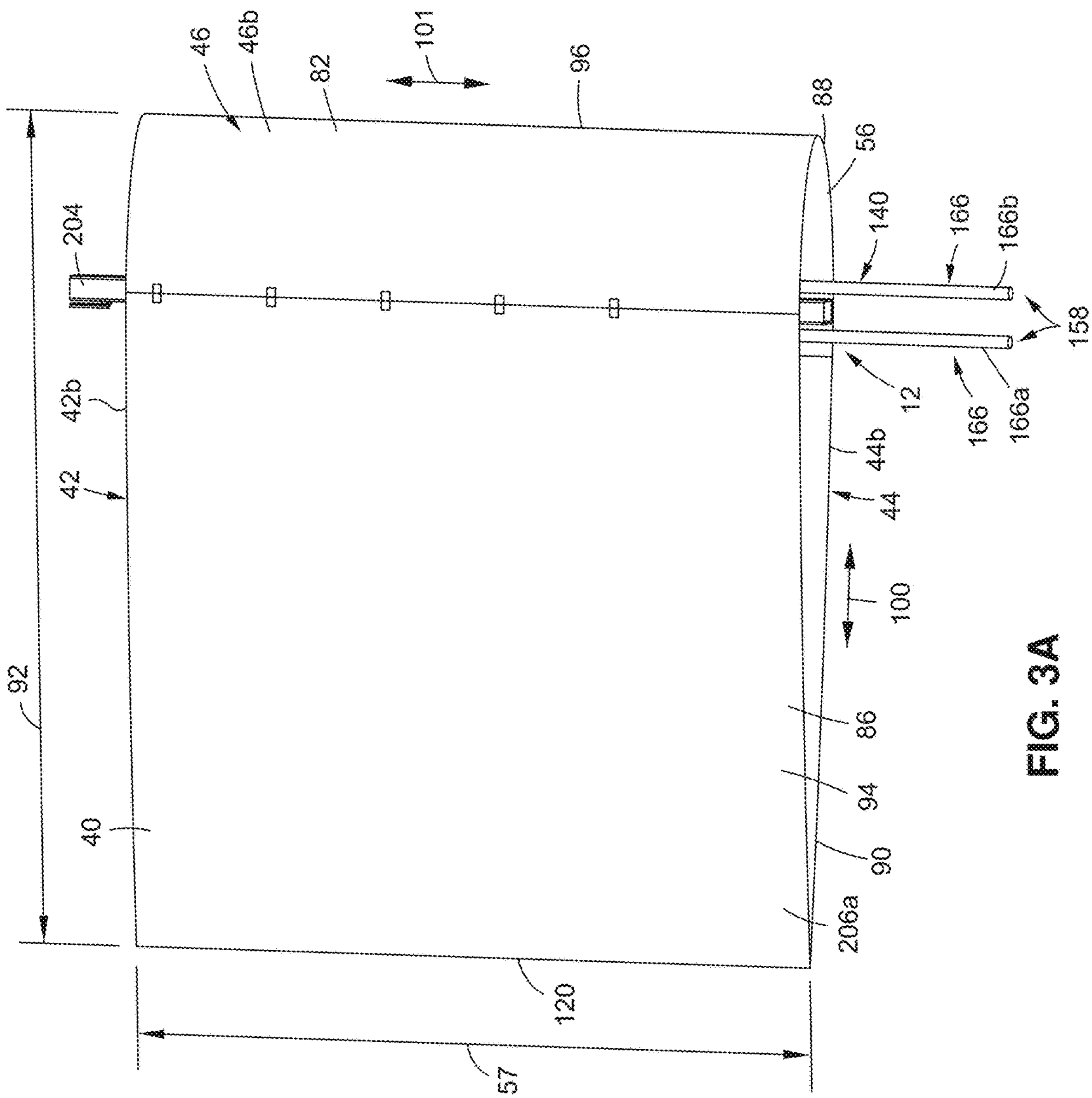
FIG. 3A is an illustration of a top view of an exemplary expandable strut assembly of the disclosure, having two spine members.

The strut structure 82 comprises an airfoil (AF) section 88 (see FIGS. 1, 3A-3B, 4A), an outer mold line (OML) 90 (see FIGS. 1, 3A-3B), and a width 92 (see FIGS. 1, 3A). The strut structure 82 further comprises a strut skin 94 (see also FIGS. 1, 3A-3B), such as panels, on the exterior 86 (see FIGS. 3A-3B) of the strut structure 82. The strut structure 82 may comprise one or more of, a composite material, including a carbon composite material, or a metal material, including an aluminum material, a steel material, a titanium material, a combination of the composite material and the metal material, or another suitable material.

As shown in FIG. 1, the strut structure 82 further comprises a leading edge (LE) 96 (see FIGS. 1, 3A-3B, 4A) with a leading edge (LE) skin 98 (see FIGS. 1, 4A) that is flexible in a chord-wise direction 100 (see FIG. 3A) of the strut 40 and that has a constant length 102*a* (see FIG. 1). The leading edge skin 98 further has a first end 104*a* (see FIG. 4A), a second end 104*b* (see FIG. 4A), and an arc length 106 (see FIG. 4A) defined therebetween. The leading edge 96 further comprises a flexible skin portion 108 (see FIG. 4A) at a forward-most end 110 (see FIG. 4A) of the leading edge 96.

As shown in FIG. 1, the leading edge 96 further comprises a leading edge (LE) shape control mechanism 112. The leading edge shape control mechanism 112 (see FIG. 4A) is attached to the leading edge skin 98 at a plurality of discrete, fixed support locations 114 (see FIG. 4A), and configured to transition the leading edge skin 98 from a first shape 116*a* (see FIG. 4A) having a first curvature profile 118*a* (see FIG. 4A) to a second shape 116*b* (see FIG. 4E) having a second curvature profile 118*b* (see FIG. 4E) different than the first curvature profile 118*a*, without a change in the arc length 106.

As shown in FIG. 1, the strut structure 82 further comprises a trailing edge (TE) 120 (see also FIGS. 4A, 4E) comprising a trailing edge (TE) skin 122 having a constant length 120*b*. The trailing edge 120 further comprises an aft membrane 124 (see FIGS. 1, 4A, 4E) configured to close off a strut enclosure 126 (see FIGS. 4A, 4E) of the strut 40. The trailing edge 120 may optionally comprise an aft membrane spring 128 (see FIGS. 4A, 4E) attached to the aft membrane 124, and configured to pull the aft membrane 124 back into the strut enclosure 126, as the strut 40 contracts to the contracted position 64. As shown in FIG. 4E, in one version, the aft membrane 124 comprises an accordion aft membrane 124*a* having an accordion shape profile 130, when the strut 40 is in the expanded position 66. As shown in FIG. 10A, in another version, the aft membrane 124 comprises a curved aft membrane 124*b* having a curved shape profile 132 with two curves 134, when the strut 40 is in the expanded position 66, such as the fully expanded position 66*a*.

As shown in FIG. 1, in one version, a jury strut 136 (see also FIG. 2B) may be optionally connected, or attached, to the strut 40, such as between the wing 14 and the strut 40. The strut structure 82 may further comprise structures such as strut spars 137 (see FIG. 1), ribs 138 (see FIG. 1), strut fittings, or other suitable structures or parts, in the interior 56 of the strut 40.

As shown in FIG. 1, the expandable strut assembly 12 further comprises at least one shape transition assembly 140, or one or more shape transition assemblies 140, connected to the interior 56 of the strut 40. Each shape transition assembly 140 is configured to transition the strut 40 between the contracted position 64 and the expanded position 66, and is configured to transition the strut cross section 60 between the contracted airfoil shape 70 and the expanded airfoil shape 74. Each shape transition assembly 140 has an outboard end 141*a* (see FIGS. 2A-2B) and an inboard end 141*b* (see FIGS. 2A-2B).

As shown in FIG. 1, each shape transition assembly 140 comprises a shape transition mechanism 142. The shape transition mechanism 142 (see FIG. 2A) is attached to one or more interior portions 56*a* (see FIG. 2A) in the interior 56 (see FIG. 2A) of the strut 40 (see FIG. 2A). The shape transition mechanism 142 comprises a plurality of fixed length structural members 144 (see FIG. 1). The types of fixed length structural members 144 that may be used in various versions of the expandable strut assembly 12 are discussed in further detail below. As shown in FIG. 1, the plurality of fixed length structural members 144 form an expandable structure 146. In one version, as shown in FIG. 3C, the expandable structure 146 has a cross section profile 148 comprising a rhombus shape 150, or diamond shape. In another version, as shown in FIG. 10A, the expandable structure 146 has a cross section profile 148 comprising a hexagon shape 152.

As shown in FIG. 1, the shape transition mechanism 142 further comprises a drive mechanism 154 connected to the plurality of fixed length structural members 144. The drive mechanism 154 comprises one or more variable length structural members 156 (see FIG. 1). The types of variable length structural members 156 that may be used in various versions of the expandable strut assembly 12 are discussed in further detail below.

As shown in FIG. 1, each shape transition assembly 140 further comprises an actuation mechanism 158 connected to the shape transition mechanism 142. The actuation mechanism 158 is configured to actuate the drive mechanism 154 of the shape transition mechanism 142. As shown in FIG. 1, the actuation mechanism 158 may comprise one or more variable radius spindles 160, one or more spindles 161, or one or more torque tubes 162, where the one or more torque tubes 162 may contain compressed (COMP.) air 164 in the interior. As further shown in FIG. 1, the actuation mechanism 158 may comprise one or more spine members 166. These, and other types, of actuation mechanisms 158 that may be used in various versions of the expandable strut assembly 12 are discussed in further detail below.

The variable radius spindles 160 enable a non-linear rate 168 (see FIG. 1) of length change 170 (see FIG. 1) of the variable length structural members 156, for example, one or more cables 172 (see FIG. 10A), or a plurality of cables 172, for a constant rotation (ROT.) 174 (see FIG. 1) of each of the variable radius spindles 160.

As shown in FIG. 1, each shape transition assembly 140 further comprises an activation mechanism 178 coupled to the actuation mechanism 158. The activation mechanism 178 is configured to activate the actuation mechanism 158, to initiate a position transition 63 of the strut 40 between the contracted position 64 and the expanded position 66, and to initiate a shape transition 69 of the strut cross section 60 between the contracted airfoil shape 70 and the expanded airfoil shape 74. As shown in FIG. 1, the activation mechanism 178 may comprise one of, a sensor activation mechanism (MECH.) 180, a strut axial load driven activation mechanism (MECH.) 182, or a wing rotation driven system (SYS.) 184. The wing rotation driven system 184 converts wing rotations 186 (see FIG. 1) of the wing 14 to horizontal movement 188 (see FIG. 1) at the strut root 54 (see FIG. 18A) of the strut 40, to activate the actuation mechanism 158, to actuate the drive mechanism 154.

Figure 2B:
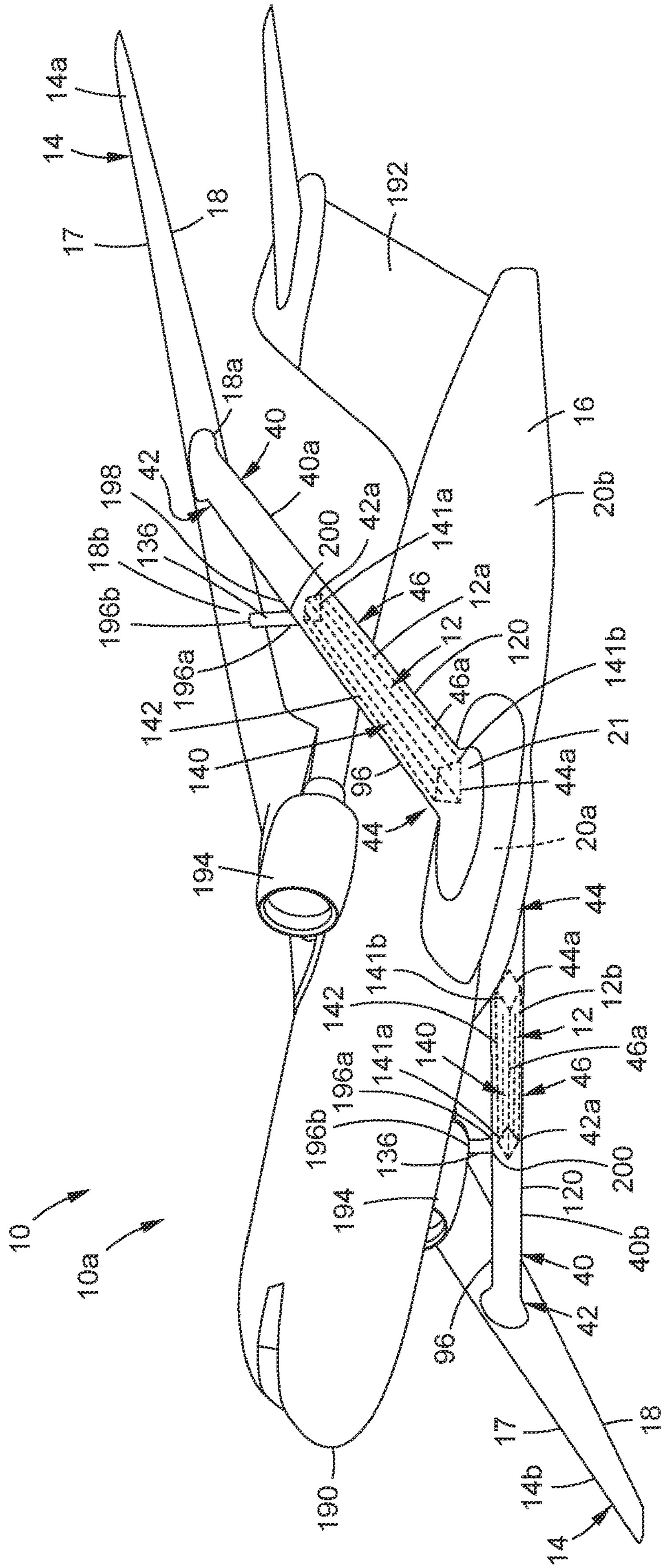
FIG. 2B is an illustration of a front perspective view of the aircraft and expandable strut assembly of FIG. 2A, and further including jury struts.
Figure 2C:
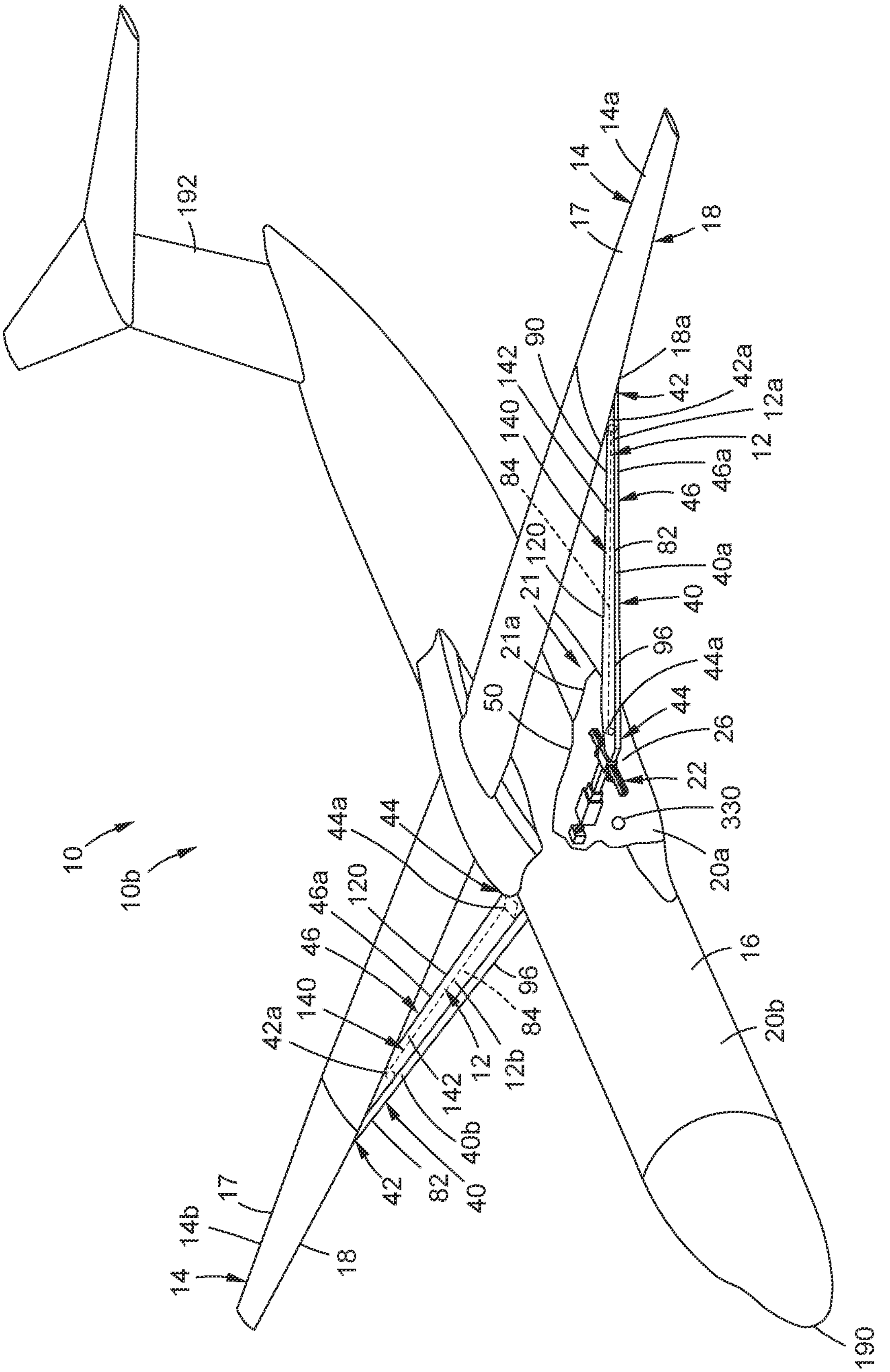
FIG. 2C is an illustration of a front perspective view of an exemplary aircraft having wings each with a version of an expandable strut assembly of the disclosure, and showing a cut-away portion of a fuselage with a fuselage structure of the expandable strut assembly.

Now referring to FIGS. 2A-2C, FIG. 2A is an illustration of a front perspective view of an exemplary vehicle 10, such as exemplary aircraft 10*a*, having wings 14 each with an exemplary expandable strut assembly 12 of the disclosure. FIG. 2B is an illustration of a front perspective view of the vehicle 10, such as aircraft 10*a*, and the expandable strut assemblies 12 of FIG. 2A, and further including jury struts 136. FIG. 2C is an illustration of a front perspective view of an exemplary vehicle 10, such as exemplary aircraft 10*b*, having wings 14, each with a version of an expandable strut assembly 12 of the disclosure, and showing a cut-away portion of a fuselage 16 with one or more fuselage structures 22 of the expandable strut assembly 12.

As shown in FIGS. 2A-2C, the vehicle 10, such as the aircraft 10*a*, and aircraft 10*b*, comprise two wings 14, such as the first wing 14*a* and the second wing 14*b*, attached to the fuselage 16, and extending in opposite directions away from each other. A strut-wing joint 15 (see FIG. 2A) is formed between each wing 14 and each strut 40. Each wing 14 has the topside 17 (see FIGS. 2A-2C) and the underside 18 (see FIGS. 2A-2C). As shown in FIGS. 2A-2C, the vehicle 10, such as the aircraft 10*a*, and aircraft 10*b*, further comprise a nose 190, a tail 192, and engines 194 (see FIGS. 2A-2B).

As further shown in FIGS. 2A-2C, the struts 40 include a first strut 40*a* and a second strut 40*b*. The strut 40 is also referred to as a wing strut 41 (see FIG. 2A). As further shown in FIGS. 2A-2C, each strut 40 has the outboard end 42, the inboard end 44 opposite the outboard end 42, and the elongate body 46 formed between the outboard end 42 and the inboard end 44. The outboard end 42 of each strut 40 is coupled, or attached, to each wing 14 of the vehicle 10, such as the aircraft 10*a*, and aircraft 10*b*. As shown in FIGS. 2A-2C, the shape transition mechanism 142 of the expandable strut assembly 12 has the outboard end 42*a*, the inboard end 44*a* opposite the outboard end 42*a*, and the elongate body 46*a* formed between the inboard end 44*a* and the outboard end 42*a*.

Preferably, the outboard end 42 of the strut 40 is coupled, or attached, to the first underside portion 18*a* (see FIGS. 2A-2C) on the underside 18 of the wing 14. The wing strut fairing 48 (see FIG. 2A) is positioned at the outboard end 42 of the strut 40, at the junction of the first underside portion 18*a* of the wing 14 and the outboard end 42 of the strut 40. The fuselage 16 of the vehicle 10, such as the aircraft 10*a*, and aircraft 10*b*, has the opening 50 (see FIGS. 2A, 2C) through the exterior 20*b* (see FIGS. 2A, 2C) of the side portion 21*a* (see FIGS. 2A, 2C), or side-of-body portion. FIG. 2A further shows the fuselage strut fairing 52, the strut root 54, and the interior 56 and the exterior 58 of the strut 40.

As shown in FIGS. 2A, 2C, the shape transition mechanism 142 of the shape transition assembly 140 of the expandable strut assembly 12 is axially positioned within the interior 84 of the strut structure 82. As shown in FIG. 2A, the strut structure 82 has the interior 84 and the exterior 86, and further has the outboard end 42*b* and the inboard end 44*b*, where the inboard end 44*b* is opposite the outboard end 42*b*, and the elongate body 46*b* formed between the inboard end 44*b* and the outboard end 42*b*. As shown in FIG. 2A, the outboard end 42*b* of the strut structure 82 is coupled, or attached, to the wing 14, such as the underside 18 of the wing 14, of the vehicle 10, such as the aircraft 10*a*. As further shown in FIG. 2A, the inboard end 44*b* of the strut structure 82 is coupled, or attached, at the opening 50 of the fuselage 16, of the vehicle 10, such as the aircraft 10*a*.

As shown in FIGS. 2A-2C, the strut structure 82 comprises the leading edge 96, the trailing edge 120, and the outer mold line 90 (see FIGS. 2A, 2C). The strut structure 82 further has a width 92 (see FIG. 3A) spanning between the leading edge 96 and the trailing edge 120, and has a length 57 (see FIG. 3A) extending from the outboard end 42*b* at the wing 14 to the inboard end 44*b* at the fuselage 16 side-of-body. As further shown in FIG. 2C, the aircraft 10*b* includes a sensor 330 that is part of the sensor activation mechanism 180 (see FIG. 1), which is one of the versions of the activation mechanism 178 (see FIG. 1) of the shape transition assembly 140.

As shown in FIG. 2B, the vehicle 10, such as the aircraft 10*a*, includes a jury strut 136 attached to each strut 40. The jury strut 136 is a small auxiliary strut that joins the wing 14 to the strut 40, or main strut, and is attached between the underside 18 of the wing 14 and a top portion 198 (see FIG. 2B) of the strut 40, or primary or main strut. The jury strut 136 may be used to provide additional support to the strut 40, or primary or main strut.

As shown in FIG. 2B, the jury strut 136 has a first end 196*a* and a second end 196*b*. The first end 196*a* is attached to the top portion 198 of the strut 40 and the second end 196*b* is attached to a second underside portion 18*b* of the underside 18 of the wing 14. Thus, the jury strut 136 is attached between the top portion 198 of the strut 40 and the second underside portion 18*b* of the wing 14, and forms a jury strut joint location 200, wherein the first end 196*a* of the jury strut 136 joins to the top portion 196 of the strut 40. As further shown in FIG. 2B, in this version with the jury strut 136, the shape transition mechanism 142 of the shape transition assembly 140 has a shorter length within the strut 40 than the shape transition mechanism 142 of FIG. 2A. As shown in FIG. 2B, the shape transition mechanism 142 has an outboard end 141*a* attached to the interior 56 of the strut 40 at the jury strut joint location 200, rather than at the outboard end 42 of the strut 40.

Figure 3B:
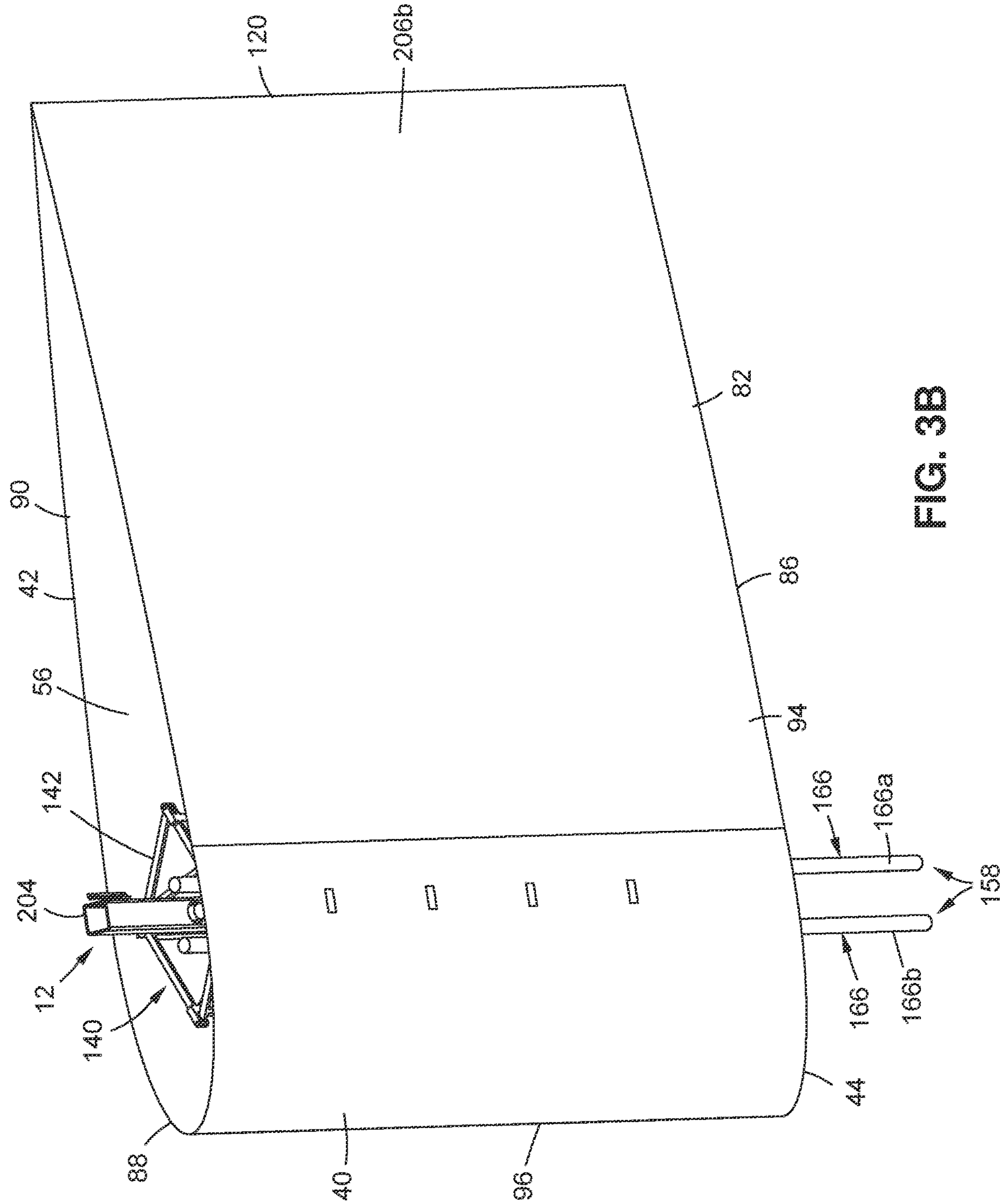
FIG. 3B is an illustration of a bottom perspective view of the expandable strut assembly of FIG. 3A.
Figure 3C:
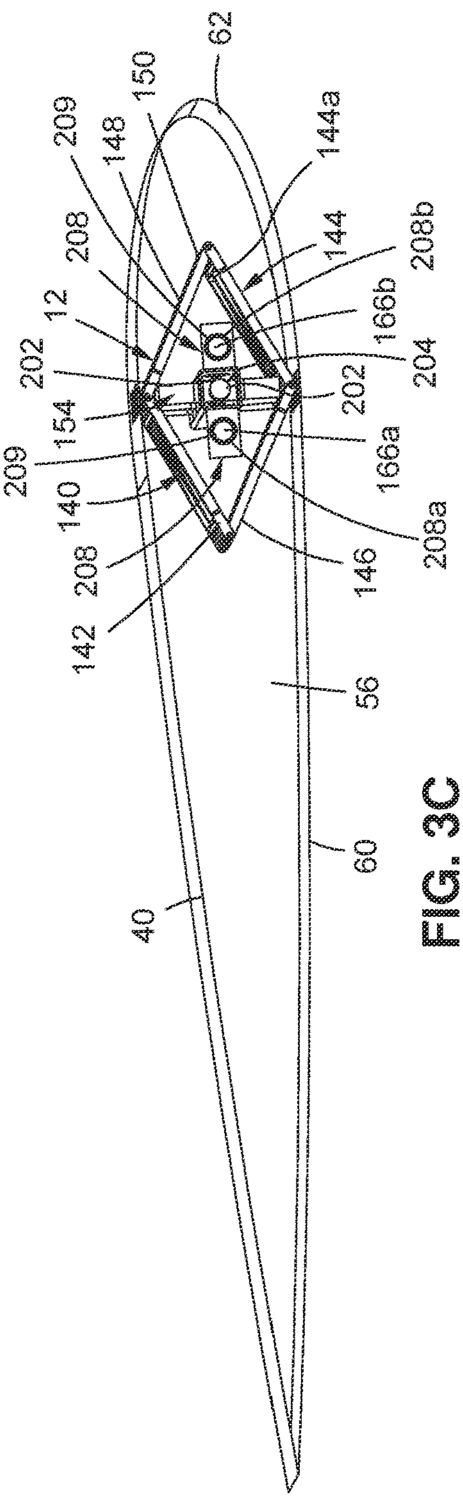
FIG. 3C is an illustration of a right inboard side view of the expandable strut assembly of FIG. 3A.
Figure 3D:
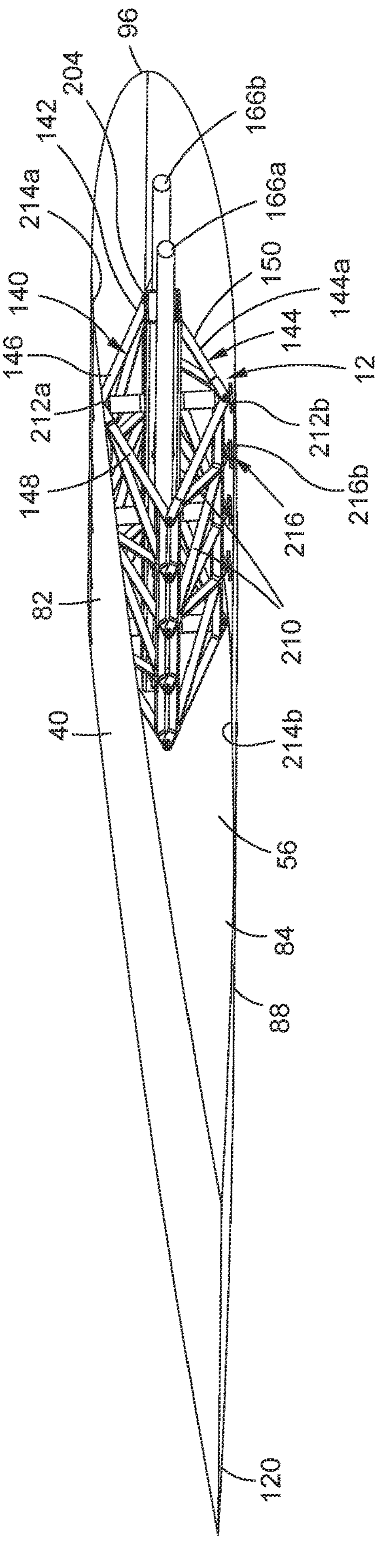
FIG. 3D is an illustration of a right inboard side perspective view of the expandable strut assembly of FIG. 3A.
Figure 3E:
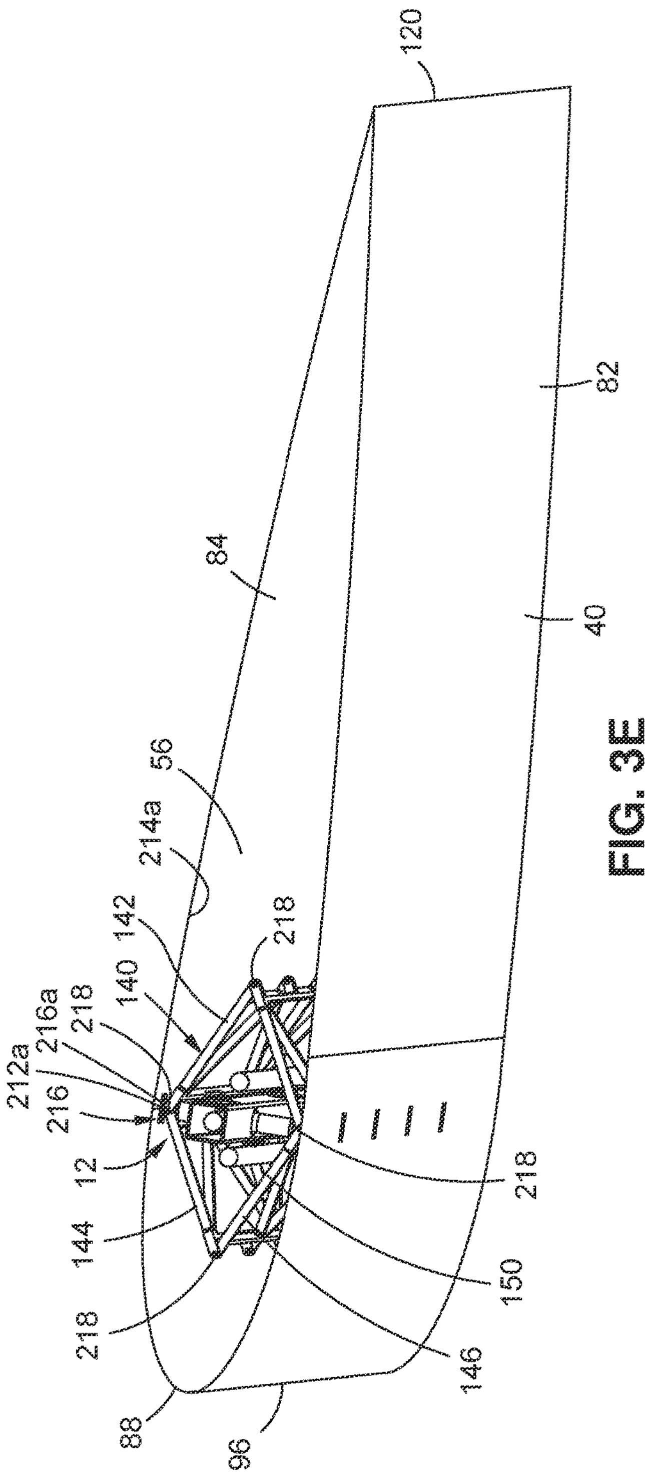
FIG. 3E is an illustration of a left outboard bottom side perspective view of the expandable strut assembly of FIG. 3A.
Figure 3F:
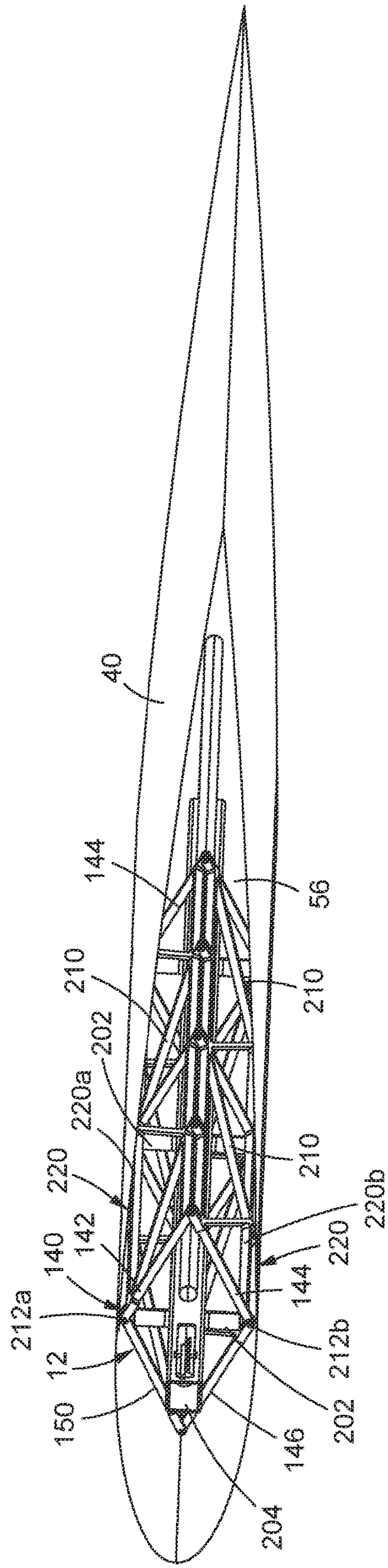
FIG. 3F is an illustration of a left outboard side perspective view of the expandable strut assembly of FIG. 3A.
Figure 3G:
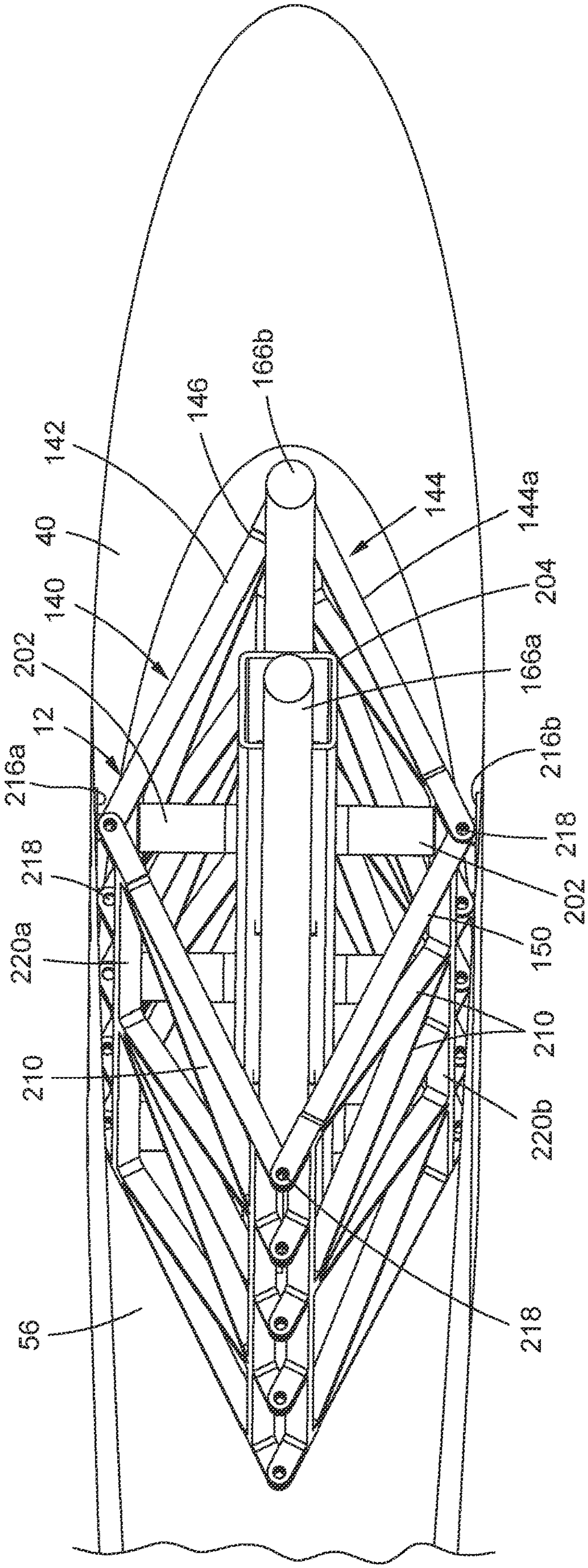
FIG. 3G is an illustration of an enlarged right inboard side perspective view of the expandable strut assembly of FIG. 3A.
Figure 3H:
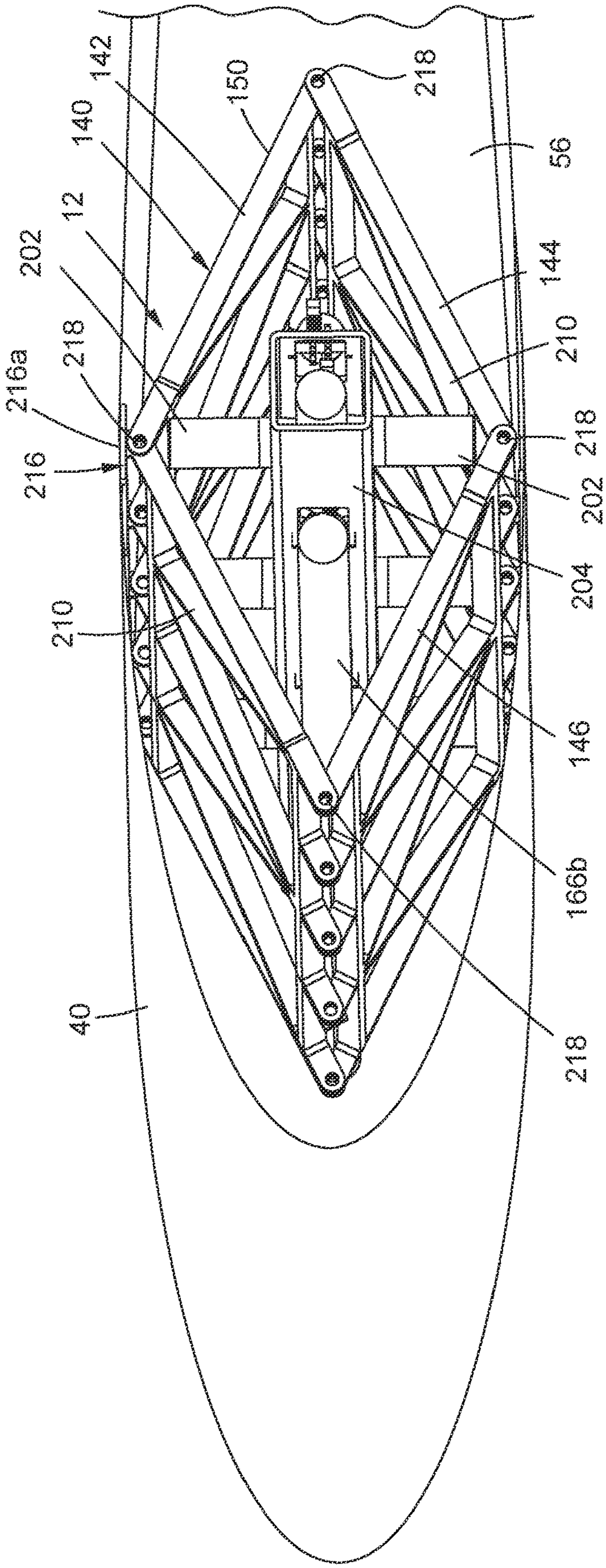
FIG. 3H is an illustration of an enlarged left outboard side perspective of the expandable strut assembly of FIG. 3A.
Figure 3I:
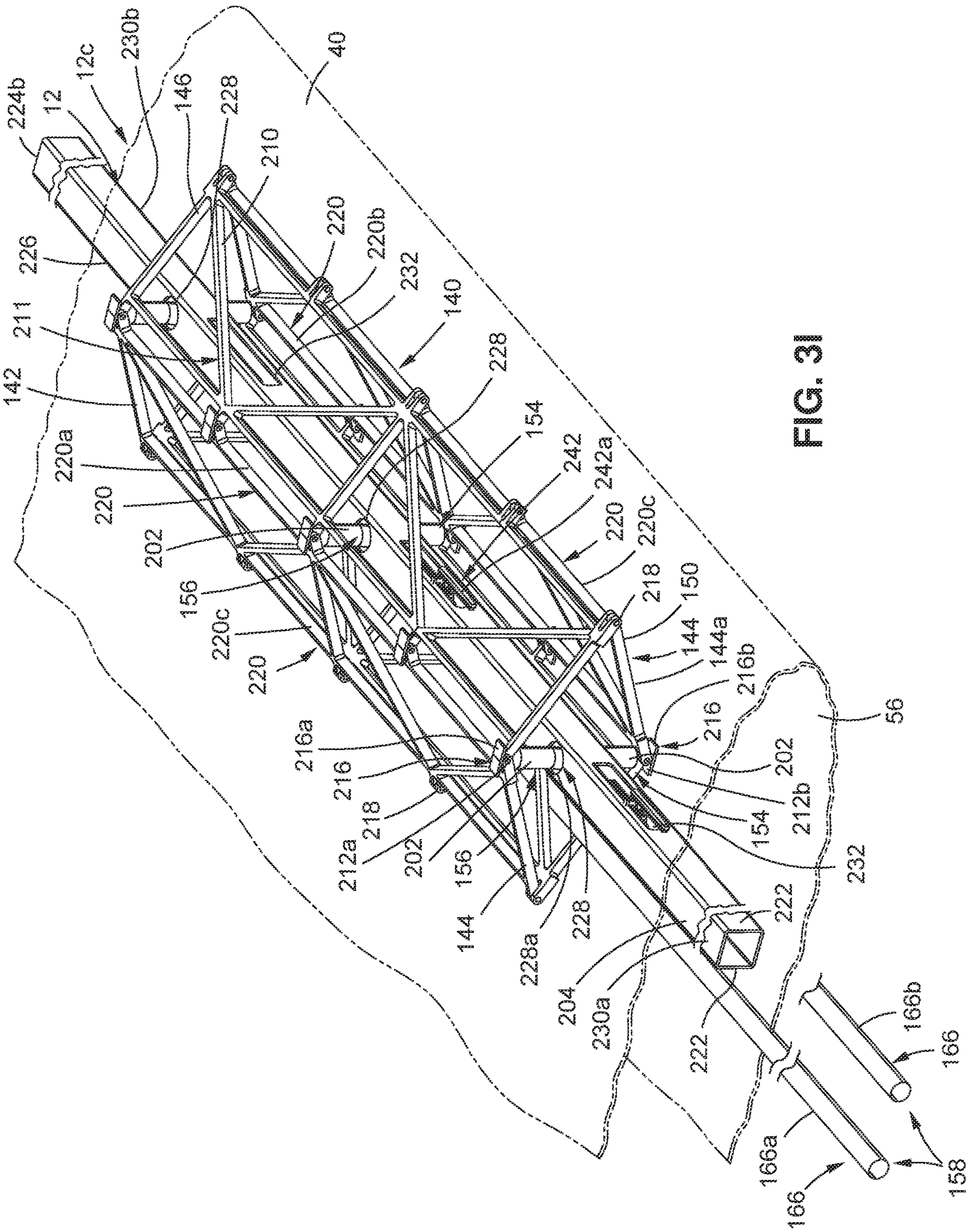
FIG. 3I is an illustration of a top perspective view of the expandable strut assembly of FIG. 3A, showing a shape transition mechanism and an actuation mechanism of a shape transition assembly in a strut.
Figure 3J:
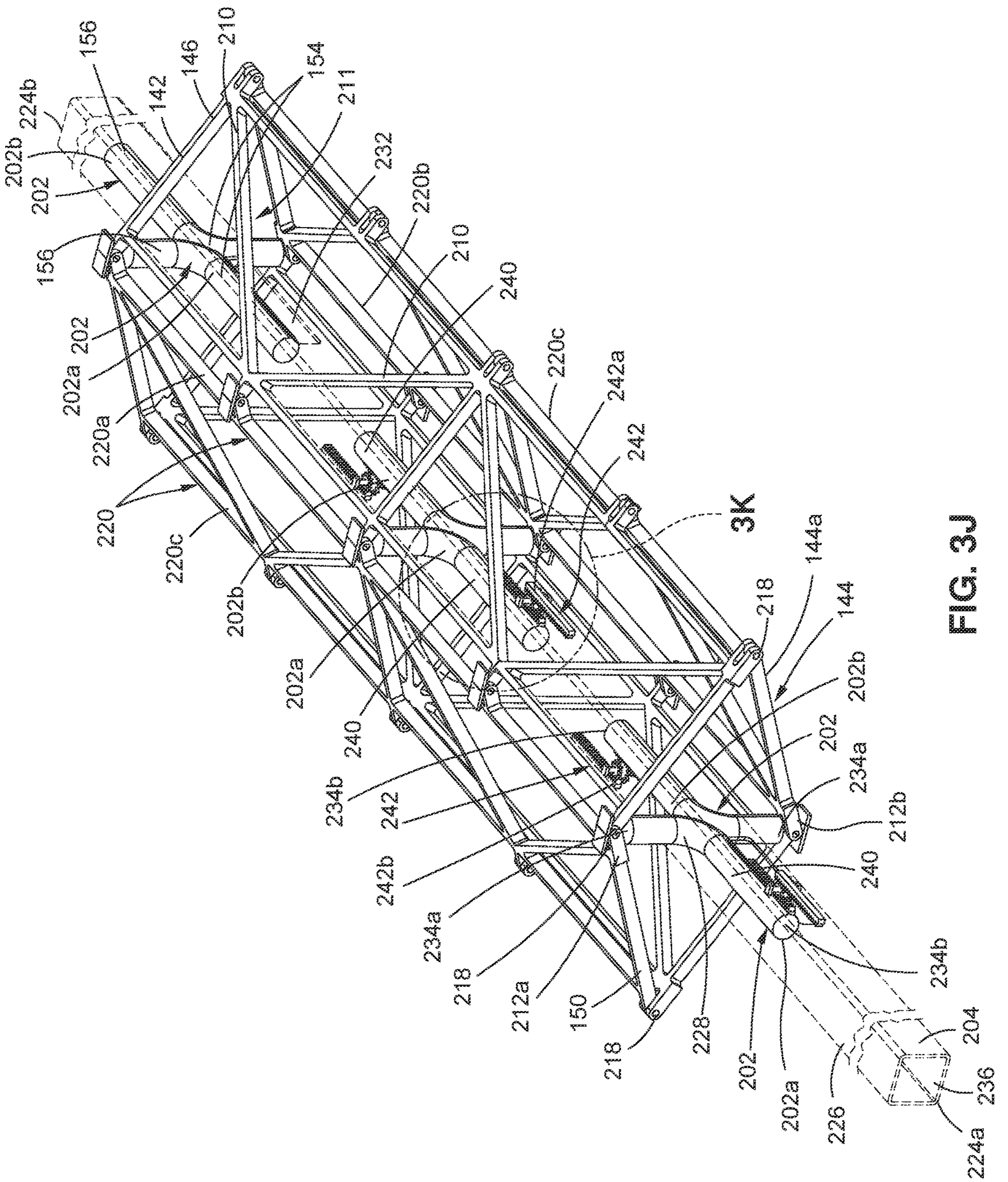
FIG. 3J is an illustration of a top perspective view of the shape transition mechanism of FIG. 3I, showing a cut-away view of compression chains and reduction gear systems.
Figure 3K:
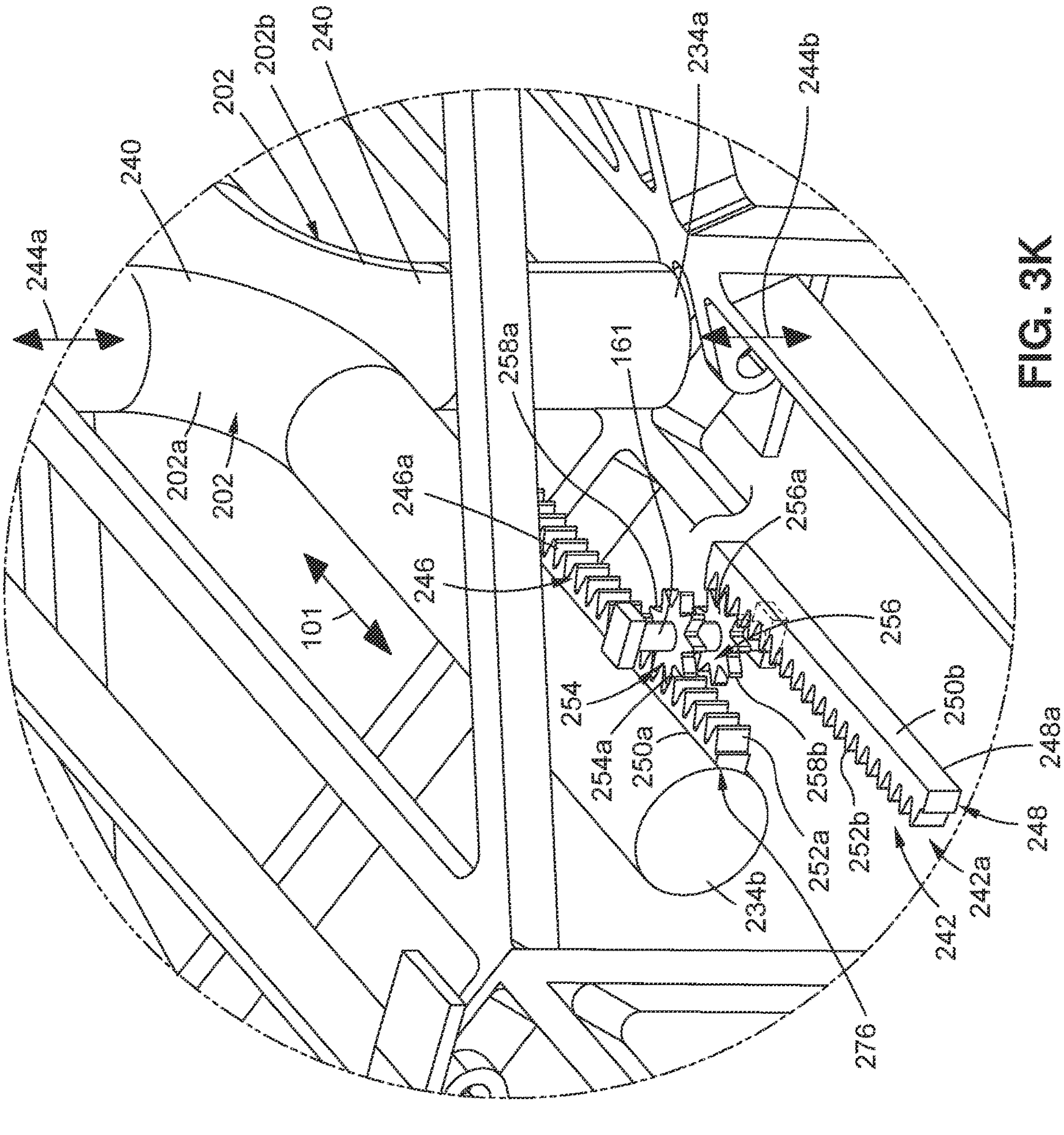
FIG. 3K is an illustration of an enlarged top perspective view of circle 3K of FIG. 3J, showing compression chains and a reduction gear system.
Figure 3L:
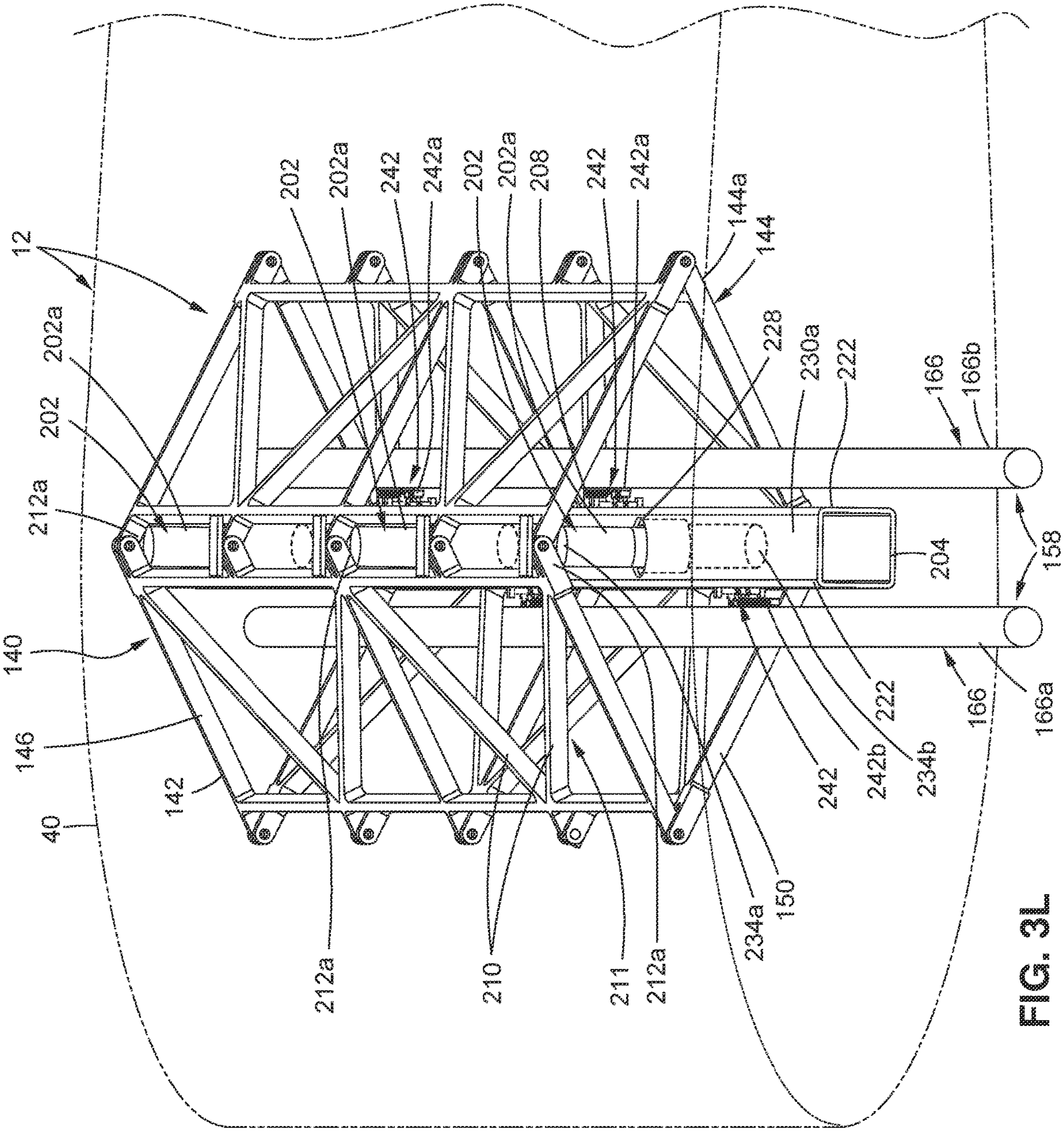
FIG. 3L is an illustration of an enlarged right inboard perspective view of the shape transition mechanism and the actuation mechanism of FIG. 3I.
Figure 3M:
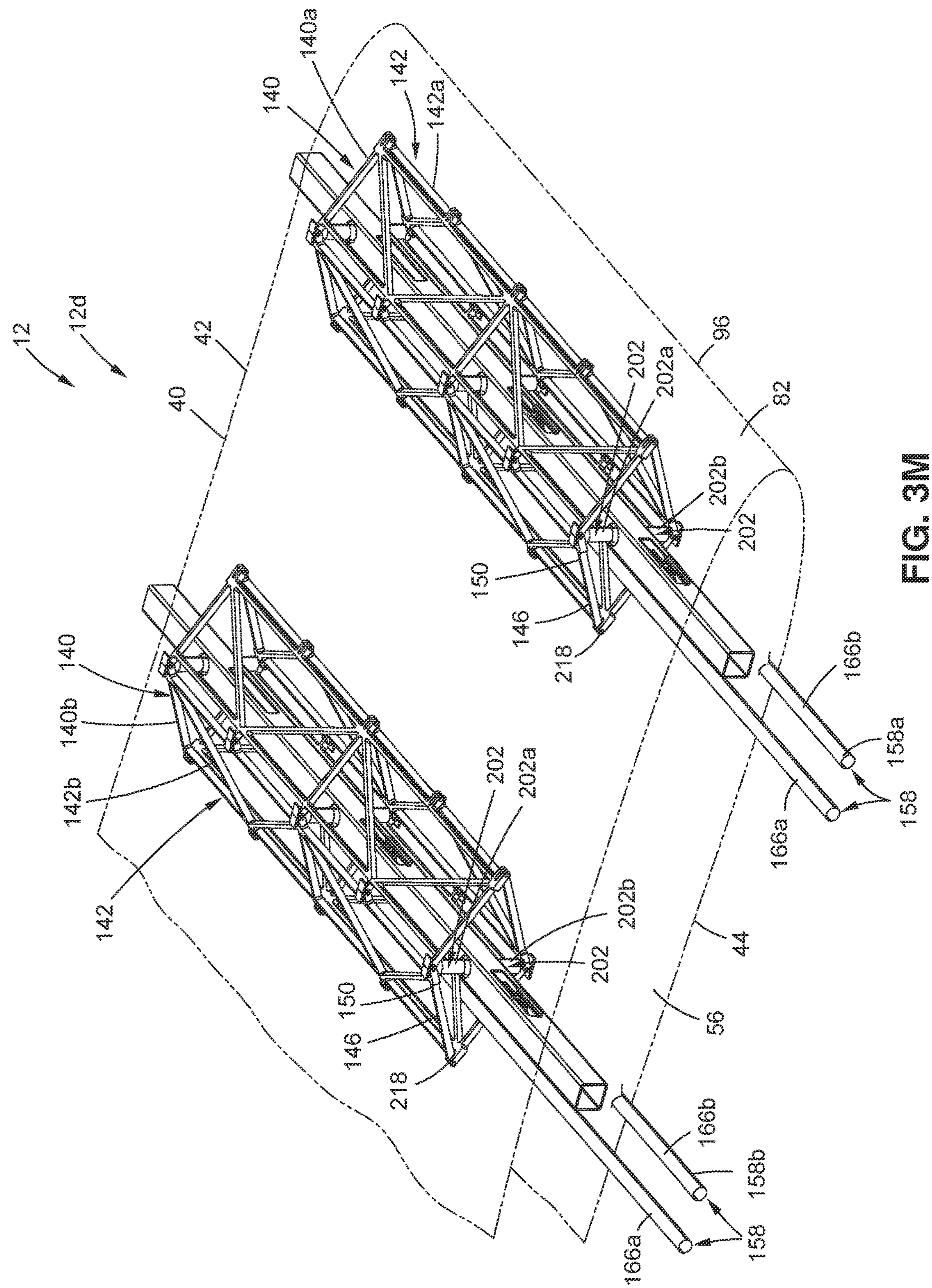
FIG. 3M is an illustration of a top perspective view of another version of an expandable strut assembly of the disclosure, having two shape transition assemblies in a strut.
Figure 3N:
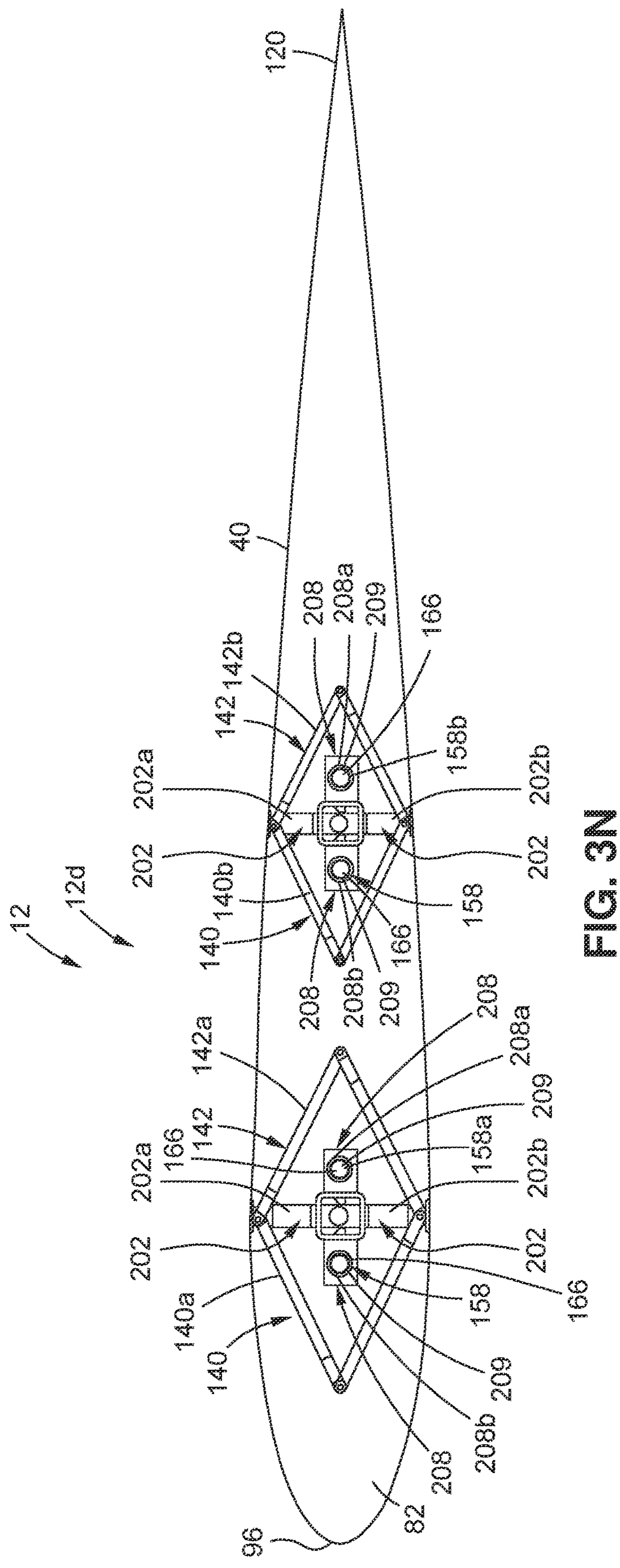
FIG. 3N is an illustration of a cross section view of a version of an expandable strut assembly having two shape transition assemblies in a strut.
Figure 3O:
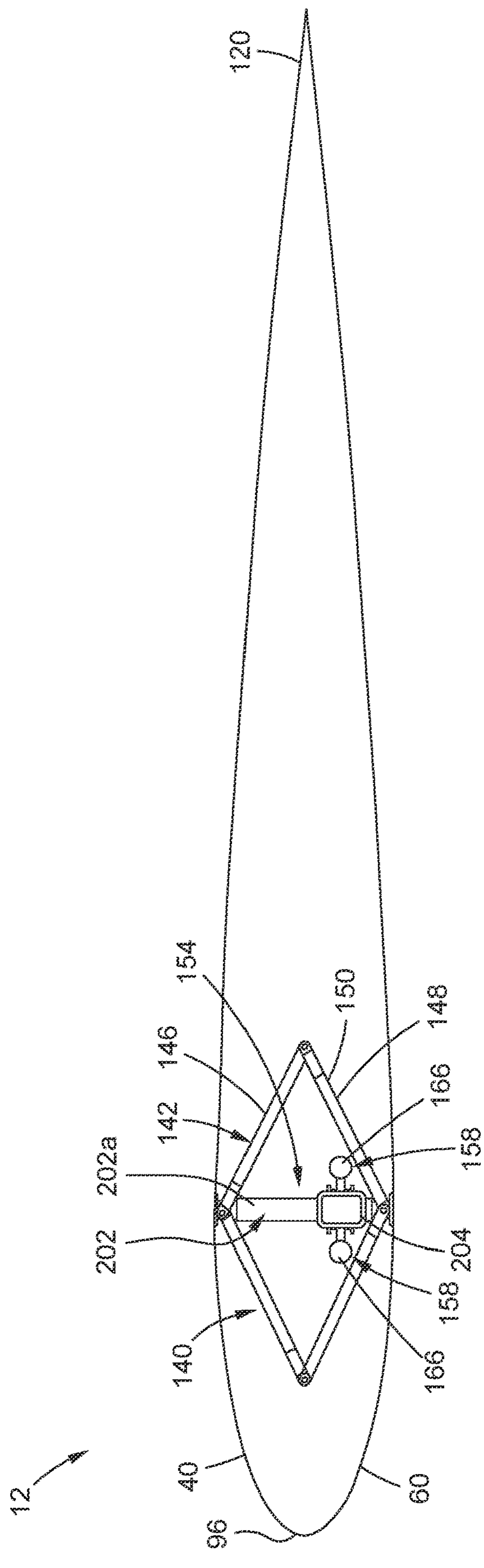
FIG. 3O is an illustration of a cross section view of a version of an expandable strut assembly having a shape transition assembly with one compression chain.
Figure 3P:
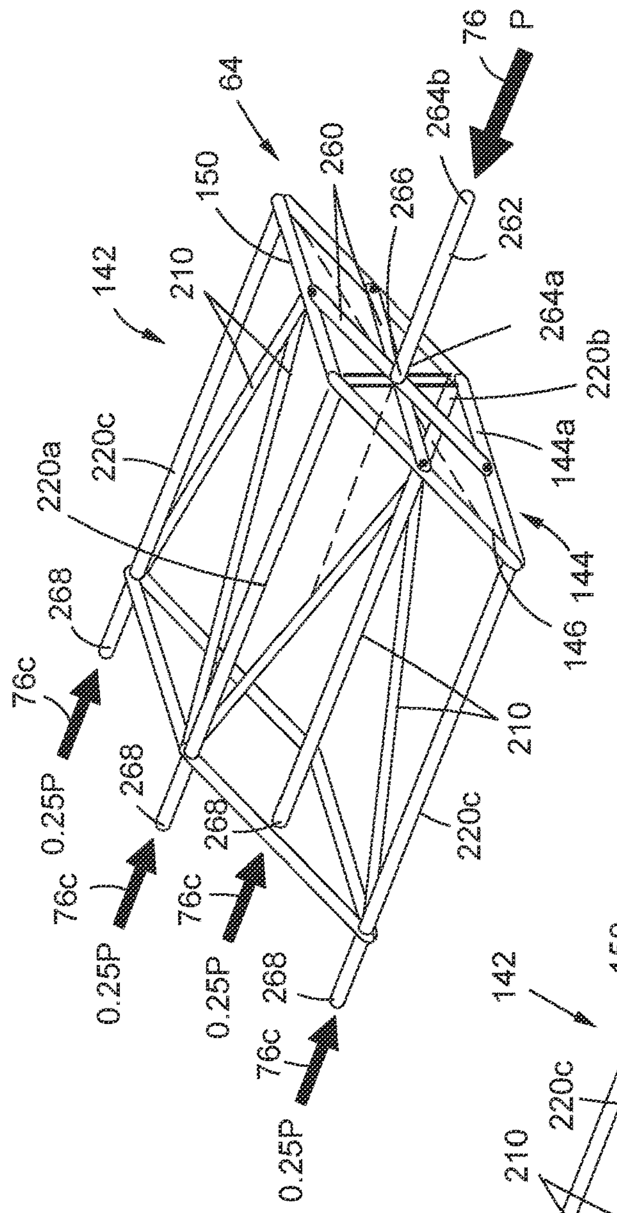
FIG. 3P is an illustration of a top perspective view of a schematic diagram of a shape transition mechanism in a contracted position, showing axial loads, and further including cross-beam members.

Now referring to FIGS. 3A-3P, FIGS. 3A-3P show an exemplary version of the expandable strut assembly 12 having the shape transition mechanism 142 (see FIG. 3I) comprising the plurality of fixed length structural members 144 (see FIG. 3I) forming the expandable structure 146 (see FIG. 3I) having the cross section profile 148 (see FIG. 3C) in a rhombus shape 150 (see FIG. 3C), and further having and the drive mechanism 154 (see FIG. 3I) comprising one or more of the variable length structural members 156 (see FIG. 3I) in the form of one or more compression chains 202 (see FIG. 3I), and further having the actuation mechanism 158 (see FIG. 3A) comprising spine members 166 (see FIGS. 3A, 3I), such as a first spine member 166*a* (see FIGS. 3A, 3I) and a second spine member (see FIGS. 3A, 3I). This version also has the activation mechanism 178 (see FIG. 1) comprising the strut axial load driven activation mechanism 182 (see FIG. 1).

The shape transition mechanism 142 (see FIG. 1) to expand or extend, and contract or retract, the strut 40 is directly driven by the actuation mechanism 158 (see FIG. 1) comprising two spine members 166 in the strut 40. Using two spine members 166 eliminates the need for an additional spring to increase the strut movement, so that the movements are large enough to be useful to drive a mechanism.

FIG. 3A is an illustration of a top view of an exemplary expandable strut assembly 12 of the disclosure, showing the shape transition assembly 140 attached, in part, in the interior 56 of the strut 40. FIG. 3A shows the actuation mechanism 158 comprising spine members 166, such as two spine members 166, including the first spine member 166*a* and the second spine member 166*b*, extending out of the inboard end 44 of the strut 40. FIG. 3A further shows a center tube 204 extending out of the inboard end 44 and out of the outboard end 42 of the strut 40 through the interior 56 of the strut 40 along a length 57 of the strut 40. As shown in FIG. 3A, the strut 40 has the chord-wise direction 100 and a span-wise direction 101.

As shown in FIG. 3A, the strut 40 has a top side 206*a*, the outboard end 42, the inboard end 44 opposite the outboard end 42, and the elongate body 46 formed between the inboard end 44 and the outboard end 42. As further shown in FIG. 3A, the strut structure 82 has the outboard end 42*b*, the inboard end 44*b* opposite the outboard end 42*b*, and the elongate body 46*b* formed between the inboard end 44*b* and the outboard end 42*b*. As shown in FIG. 3A, the strut structure 82 of the strut 40 has the outer mold line 90, a width 92, and the strut skin 94, such as panels, on the exterior 86 of the strut structure 82. As further shown in FIG. 3A, the strut structure 82 comprises the airfoil section 88 having the leading edge 96 and the trailing edge 120.

FIG. 3B is an illustration of a bottom perspective view of the expandable strut assembly 12 of FIG. 3A. FIG. 3B shows the shape transition assembly 140 attached, in part, in the interior 56 of the strut 40. FIG. 3B shows the shape transition mechanism 142 attached to the center tube 204 extending out of the outboard end 42 of the strut 40. FIG. 3B further shows the actuation mechanism 158 comprising the spine members 166, such as the first spine member 166*a* and the second spine member, extending out of the inboard end 44 of the strut 40. As shown in FIG. 3B, the strut 40 has a bottom side 206*b*, and the strut structure 82 has the strut skin 94, such as panels, on the exterior 86 of the strut structure 82, and the outer mold line 90. FIG. 3B further shows the airfoil section 88 having the leading edge 96 and the trailing edge 120.

FIG. 3C is an illustration of a right inboard side view of the expandable strut assembly 12 of FIG. 3A. FIG. 3C shows the shape transition mechanism 142 of the shape transition assembly 140 attached, in part, in the interior 56 of the strut 40. As shown in FIG. 3C, the shape transition mechanism 142 has fixed length structural members 144, such as fixed length spars 144*a*. The fixed length structural members 144 may further comprise truss members 210 (see FIG. 3J), bars 220 (see FIG. 3I), cross-beam members 260 (see FIG. 3P), or other suitable fixed length structural members. As further shown in FIG. 3C, the fixed length structural members 144 of the shape transition mechanism 142 for an expandable structure 146 have a cross section profile 148 in the form of a rhombus shape 150. FIG. 3C further shows the first spine member 166*a* and the second spine member 166*b* and a plate member 208, such as a flat plate member, connected to the center tube 204. As shown in FIG. 3C, the plate member 208 has a plate member first opening 208*a* and a plate member second opening 208*b*. As further shown in FIG. 3C, a bushing 209 is coupled to each of the plate member first opening 208*a* and the plate member second opening 208*b* and each bushing 209 is adjacent an exterior portion of the first spine member 166*a* and an exterior portion of the second spine member 166*b* to protect the first spine member 166*a* and the second spine member 166*b*. As further shown in FIG. 3C, the first spine member 166*a* is inserted through the plate member first opening 208*a* and bushing 209 and is positioned and held in place by the plate member 208. As further shown in FIG. 3C, the second spine member 166*b* is inserted through the plate member second opening 208*b* and bushing 209 and is positioned and held in place by the plate member 208. The plate member 208 positions or locates the spine members 166 relative to the center tube 204 and positions the spine members 166 so that they do not buckle. The plate member 208, plate member first opening 208*a*, plate member second opening 208*b*, and bushings 209 are also shown in FIG. 3N, but are not shown in FIGS. 3D-3J, FIG. 3L, and FIG. 3M, and have been removed for clarity purposes.

FIG. 3D is an illustration of a right inboard side perspective view of the expandable strut assembly 12 of FIG. 3A. FIG. 3D shows the shape transition mechanism 142 of the shape transition assembly 140 attached, in part, in the interior 56 of the strut 40. FIG. 3D shows the fixed length structural members 144, such as the fixed length spars 144*a*, forming the expandable structure 146 having the cross section profile 148 in the form of the rhombus shape 150. FIG. 3D further shows the first spine member 166*a*, the second spine member 166*b*, and the center tube 204. FIG. 3D further shows truss members 210, or bracing members, attached in between the expandable structures 146 having the rhombus shape 150, to provide further support or bracing. As shown in FIG. 3D, each expandable structure 146 having the rhombus shape 150 has a top end 212*a* attached to an interior top side 214*a* of the interior 84 of the strut structure 82, via attachment elements 216 (see FIGS. 3E, 3H), such as top attachment fittings 216*a* (see FIGS. 3E, 3H). As further shown in FIG. 3D, each expandable structure 146 having the rhombus shape 150 has a bottom end 212*b* attached to an interior bottom side 214*b* of the interior 84 of the strut structure 82, via attachment elements 216, such as bottom attachment fittings 216*b*. FIG. 3D further shows the airfoil section 88 having the leading edge 96 and the trailing edge 120.

FIG. 3E is an illustration of a left outboard bottom side perspective view of the expandable strut assembly 12 of FIG. 3A. FIG. 3E shows the shape transition mechanism 142 of the shape transition assembly 140 attached, in part, in the interior 56 of the strut 40. FIG. 3E shows the fixed length structural members 144 forming the expandable structure 146 with the rhombus shape 150. FIG. 3E further shows the fixed length structural members 144, such as four fixed length structural members 144, comprising four fixed length spars 144*a*, forming the expandable structure 146 with the rhombus shape 150 connected together via hinge connectors 218, such as four hinge connectors 218 on each rhombus shape 150. FIG. 3E further shows the top end 212*a* attached to the interior top side 214*a* of the interior 84 of the strut structure 82, via the attachment element 216, such as the top attachment fitting 216*a*. FIG. 3E further shows the airfoil section 88 having the leading edge 96 and the trailing edge 120.

FIG. 3F is an illustration of a left outboard side perspective view of the expandable strut assembly 12 of FIG. 3A. FIG. 3F shows the shape transition mechanism 142 of the shape transition assembly 140 attached, in part, in the interior 56 of the strut 40. FIG. 3F shows the fixed length structural members 144 forming the expandable structures 146 with the rhombus shape 150. FIG. 3F further shows the truss members 210, or bracing members, attached in between the expandable structures 146 having the rhombus shape 150. FIG. 3F further shows a bar 220, such as a top bar 220*a*, connecting the top ends 212*a* of the expandable structures 146 together, and further shows a bar 220, such as a bottom bar 220*b*, connecting the bottom ends 212*b* of the expandable structures 146 together. FIG. 3F further shows the center tube 204 and the compression chains 202.

FIG. 3G is an illustration of an enlarged right inboard side perspective view of the expandable strut assembly 12 of FIG. 3A. FIG. 3G shows the shape transition mechanism 142 of the shape transition assembly 140 attached, in part, in the interior 56 of the strut 40. FIG. 3G shows the fixed length structural members 144, such as the fixed length spars 144*a*, forming the expandable structures 146 with the rhombus shape 150, and attached together with the hinge connectors 218. FIG. 3G further shows the truss members 210, or bracing members, attached in between the expandable structures 146. FIG. 3G further shows the top bar 220*a*, the bottom bar 220*b*, the top attachment fittings 216*a*, the bottom attachment fittings 216*b*, and the center tube 204. FIG. 3G further shows the first spine member 166*a*, the second spine member 166*b*, and the compression chains 202.

FIG. 3H is an illustration of an enlarged left outboard side perspective of the expandable strut assembly 12 of FIG. 3A. FIG. 3H shows the shape transition mechanism 142 of the shape transition assembly 140 attached, in part, in the interior 56 of the strut 40. FIG. 3H shows the fixed length structural members 144 forming the expandable structures 146 with the rhombus shape 150, and attached together with the hinge connectors 218. FIG. 3H further shows the truss members 210, or bracing members, attached in between the expandable structures 146. FIG. 3H further shows the center tube 204, the first spine member 166*a*, the second spine member 166*b*, and the compression chains 202.

FIG. 3I is an illustration of a top perspective view of a center portion of the expandable strut assembly 12 of FIG. 3A, showing the shape transition mechanism 142 and the actuation mechanism 158 of the shape transition assembly 140 in the strut 40. As shown in FIG. 3I, the expandable strut assembly 12 comprises a single structure expandable strut assembly 12*c*. FIG. 3I shows the spine members 166, such as the first spine member 166*a* and the second spine member 166*b*, adjacent to, and parallel to, the sides 222 of the center tube 204. As shown in FIG. 3I, the center tube 204 has a first inboard end 224*a* that is open, a second outboard end 224*b* that is open, and an elongate body 226 with openings 228, such as circular openings 228*a*, formed in a top side 230*a* and a bottom side 230*b* of the center tube 204. The openings 228 are configured to receive, and receive, the compression chains 202 (see FIG. 3I). As further shown in FIG. 3I, the center tube 204 has slot openings 232 formed in one or both sides 222 of the center tube 204. The first inboard end 224*a* of the center tube 204 is attached to the fuselage 16 (see FIGS. 1, 2A), and the second outboard end 224*b* of the center tube 204 is attached to the wing 14 (see FIGS. 1, 2A). As shown in FIG. 3I, the center tube 204 has a square shape profile. However, the center tube 204 may have a profile of another suitable shape.

FIG. 3I further shows the fixed length structural members 144, such as the fixed length spars 144*a*, forming the expandable structure 146 with the rhombus shape 150 connected together via the hinge connectors 218. FIG. 3I further shows the top end 212*a* attached to the attachment element 216, such as the top attachment fitting 216*a*, and shows the bottom end 212*b* attached to the attachment element 216, such as the bottom attachment fitting 216*b*. FIG. 3I further shows bars 220, such as the top bar 220*a*, the bottom bar 220*b*, and side bars 220*c*, attaching the expandable structures 146 together. FIG. 3I further shows the truss members 210, or bracing members, forming a K-truss structure 211 in between the expandable structures 146.

FIG. 3J is an illustration of a top perspective view of a center portion of the shape transition mechanism 142 of FIG. 3I. FIG. 3J shows the fixed length structural members 144, such as the fixed length spars 144*a*, forming the expandable structure 146 with the rhombus shape 150 connected together via the hinge connectors 218. FIG. 3J further shows the top bar 220*a*, the bottom bar 220*b*, and the side bars 220*c*, and the truss members 210, or bracing members, forming the K-truss structure 211 in between the expandable structures 146.

FIG. 3J further shows the center tube 204 with the first inboard end 224*a* that is open, the second outboard end 224*b* that is open, and the elongate body 226 with the openings 228 and the slot openings 232. FIG. 3J shows the drive mechanism 154 comprising the variable length structural members 156 in the form of compression chains 202, such as a first compression chain 202*a*, and a second compression chain 202*b*. Each of the first compression chain 202*a* and the second compression chain 202*b* have a first end 234*a* (see FIG. 3J) designed to contact the top end 212*a* and the bottom end 212*b*, respectively, of the expandable structure 146 of the shape transition mechanism 142. For example, in the center portion of the shape transition mechanism 142 and center portion of the expandable strut assembly 12 (see FIG. 3I), the first end 234*a* of the first compression chain 202*a* is designed to contact the top end 212*a* of the expandable structure 146, to push the top end 212*a* upwardly, when the first compression chain 202*a* moves upwardly, via actuation by the second spine member 166*b* (see FIG. 3I). Further, in the center portion of the shape transition mechanism 142 and center portion of the expandable strut assembly 12 (see FIG. 3I), the first end 234*a* of the second compression chain 202*b* is designed to contact the bottom end 212*b* of the expandable structure 146, to push the bottom end 212*b* downwardly, when the second compression chain 202*b* moves downwardly, via actuation by the first spine member 166*a*. Each of the first compression chain 202*a* and the second compression chain 202*b* further have a body 240 (see FIG. 3J). FIG. 3J further shows reduction gear systems 242 (see also FIG. 3I), such as first reduction gear systems 242*a* (see also FIG. 3I) configured for attachment to the second spine member 166*b* (see FIG. 3I), and second reduction gear systems 242*b* configured for attachment to the first spine member 166*a* (see FIG. 3I).

In the center portion of the shape transition mechanism 142 and center portion of the expandable strut assembly 12 (see FIG. 3I), the compression chains 202, such as the first compression chain 202*a* and the second compression chain 202*b*, are driven by different spine members 166, that is, are driven by the first spine member 166*a* and the second spine member 166*b*, respectively. However, near the outboard end 42 (see FIGS. 2A, 3A) and the inboard end 44 (see FIGS. 2A, 3A) of the strut 40 (see FIGS. 2A, 3A), relative deflections 290 (see FIG. 5B) are not large enough to be useful for one of the spine members 166, so near the outboard end 42 and the inboard end 44, both of the compression chains 202, including the first compression chain 202a and the second compression chain 202b, are driven by the same spine member 166. For example, as shown in FIG. 5B, near the outboard end 42, the first spine member 166a has unuseful relative deflections 290b near a restrained end 292a, and the second spine member 166b has useful relative deflections 290c near an unrestrained end 294b, so the second spine member 166b drives both compression chains 202 near the outboard end 42. Further, as shown in FIG. 5B, near the inboard end 44, the first spine member 166a has useful relative deflections 290a near an unrestrained end 294a and the second spine member 166b has unuseful relative deflections 290d near a restrained end 292b, so the first spine member 166a drives both compression chains 202 near the inboard end 44. Near the outboard end 42 and near the inboard end 44, the compression chains 202 are coupled to a reduction gear system 242 (see FIG. 5E), such as a three-gear reduction gear system 242c (see FIG. 5E), discussed below with respect to FIG. 5E, which includes a third gear 257 (see FIG. 5E), such as an intermediate gear 257a (see FIG. 5E), coupled to one of the compression chains 202, to reverse the direction of rotation of that compression chain 202.

The reason the two spine members 166 are used is that the relative deflections 290 (see FIG. 5B) between the spine members 166 and the straining strut 40 are unuseful relative deflections 290b, 290d (see FIG. 5B) near the restrained ends 292a, 292b (see FIG. 5B), where the first spine member 166a and the second spine member 166b, respectively, are attached. The compression chains 202 are attached to the spine members 166 in the portion of the strut 40 farthest away from the restrained ends 292a, 292b (see FIG. 5B), respectively, or closest to the unrestrained ends 294a, 294b (see FIG. 5B), respectively. For the compression chains 202 that are oriented such that the horizontal portion of each compression chain 202 has a reversed direction along the axis, the intermediate gear 257a (see FIG. 5E) is needed so that movement of the compression chain 202 is in the correct direction.

FIG. 3K is an illustration of an enlarged top perspective view of circle 3K of FIG. 3J, showing the compression chains 202, such as the first compression chain 202a, and the second compression chain 202b, with the first compression chain 202a attached to the reduction gear system 242, such as the first reduction gear system 242a. FIG. 3K shows the second end 234b and the body 240 of the first compression chain 202a, and further shows the first end 234a and the body 240 of the second compression chain 202b. In this version, the first compression chain 202a and the second compression chain 202b are positioned in the span-wise direction 101 (see FIG. 3K). As shown in FIG. 3K, the first compression chain 202a is configured to move in an up-and-down direction 244a, and the second compression chain 202b is configured to move in an up-and-down direction 244b.

As shown in FIG. 3K, the reduction gear system 242 comprises a first rack 246, such as a compression chain rack 246a, and a second rack 248, such as a spine member rack 248a. As shown in FIG. 3K, the first rack 246 has a flat side 250a attached to the body 240 of the first compression chain 202a, and further has a plurality of rack teeth 252a. The second rack 248 has the flat side 250b configured to be attached to the second spine member 166b (see FIG. 3I), and further has a plurality of rack teeth 252b.

As shown in FIG. 3K, the reduction gear system 242 further comprises a first gear 254, such as a compression chain gear 254a, and a second gear 256, such as a spine member gear 256a. As shown in FIG. 3K, the first gear 254 has gear teeth 258a that mesh with the rack teeth 252a of the first rack 246, and the second gear 256 has gear teeth 258b that mesh with the rack teeth 252b of the second rack 248. The first gear 254 and the second gear 256 have varying gear ratios. FIG. 3K further shows a compression chain attachment point 276.

As shown in FIG. 3K, the reduction gear system 242 further comprises a spindle 161 on which the first gear 254 and the second gear 256 are mounted in a stacked, spaced arrangement with the first gear 254 positioned above the second gear 256. The spindle 161 is designed to rotate the first gear 254 and the second gear 256. The spindle 161 is fixedly attached to the strut structure 82 (see FIGS. 3B, 3D) of the strut 40 (see FIGS. 3B, 3D). As the strut 40 strains, the strut 40 moves in the axial direction of the strut 40 a certain amount. This causes a relative deflection 290 (see FIG. 5B) with the two spine members 166 (see FIG. 5B), which do not strain, since there is very little load on them. The relative deflections 290 are unuseful relative deflections 290b, 290d (see FIG. 5B) near fixed support attachment structures 295a, 295b (see FIG. 5B), but are useful relative deflections 290a, 290c, further away from the fixed support attachment structures 295a, 295b. The relative deflections 290 cause the first gear 254 (see FIG. 3K) to rotate. This rotation drives another relative deflection 290 of the first rack 246 (see FIG. 3K) that is connected to the first compression chain 202a (see FIG. 3K). That relative movement in the axial direction causes a thickening movement of the strut 40 from the compression chain 202, such as the first compression chain 202a, as it wraps around or turns around a guide member 275 (see FIG. 4B). If the compression chain 202 needs a relative deflection 290 in the opposite direction near the fixed support attachment structures 295a, 295b (see FIG. 5B) of the spine members 166 (see FIG. 5B), a third gear 257 (see FIG. 5E), such as an intermediate gear 257a (see FIG. 5E), is used to reverse the direction of relative movement.

In the center portion of the shape transition mechanism 142 (see FIG. 3J) and the center portion of the expandable strut assembly 12 (see FIG. 3I), when the second spine member 166b actuates or drives movement of the second rack 248 along the second gear 256, the spindle 161 also rotates the first gear 254 to cause the first rack 246 to move the first compression chain 202a in an upward direction against the top end 212a (see FIG. 3J) of the expandable structure 146, to cause the expandable structure 146 to move upward and expand. Similarly, in the center portion of the shape transition mechanism 142 (see FIG. 3J) and the center portion of the expandable strut assembly 12 (see FIG. 3I), the second compression chain 202b is driven downward by the first spine member 166a (see FIG. 3I) and the reduction gear system 242, such as the second reduction gear system 242b (see FIG. 3J), attached between the first spine member 166a (see FIG. 3I) and the second compression chain 202b (see FIGS. 3J, 3K), and the second compression chain 202b is moved or actuated against the bottom end 212b (see FIG. 3J) of the expandable structure 146, to cause the expandable structure 146 to move downward and expand. The reduction gear system 242 may be used to expand the compression chains 202 at a rate different than the relative movement between the strut root 54 and the fuselage 16.

FIG. 3L is an illustration of an enlarged inboard perspective view of the shape transition mechanism 142 and the actuation mechanism 158 of FIG. 3I, in the strut 40. FIG. 3L shows the fixed length structural members 144, such as the fixed length spars 144*a*, forming the expandable structure 146 with the rhombus shape 150. FIG. 3L further shows the spine members 166, such as the first spine member 166*a* and the second spine member 166*b*, adjacent to, and parallel to, the sides 222 of the center tube 204. FIG. 3L further shows the compression chains 202 extending out of the openings 228 on the top side 230*a* of the center tube 204. As shown in FIG. 3L, the first ends 234*a* of the compression chains 202, such as the first compression chains 202*a*, are pushed upwardly against the top ends 212*a* of the expandable structures 146, to expand the expandable structures 146 upward and outward. FIG. 3L further shows the reduction gear systems 242, such as the first reduction gear systems 242*a* connected to the second spine member and the second reduction gear systems 242*b*. FIG. 3L further shows the truss members 210, or bracing members, forming the K-truss structure 211 in between the expandable structures 146.

FIG. 3M is an illustration of a top perspective view of another version of the expandable strut assembly 12 of the disclosure, having two shape transition assemblies 140 both installed in the interior 56 of the strut 40. As shown in FIG. 3M, the expandable strut assembly 12 comprises a double structure expandable strut assembly 12*d*. FIG. 3M shows the shape transition assemblies 140, including a first shape transition assembly 140*a*, or forward shape transition assembly, and a second shape transition assembly 140*b*, or aft shape transition assembly. As shown in FIG. 3M, the first shape transition assembly 140*a* is positioned forward of the second shape transition assembly 140*b*, and the second shape transition assembly 140*b* is positioned aft of the first shape transition assembly 140*a*. FIG. 3M further shows the shape transition mechanisms 142, including a first shape transition mechanism 142*a*, or forward shape transition mechanism, and a second shape transition mechanism 142*b*, or aft shape transition mechanism. FIG. 3M further shows actuation mechanisms 158, including a first actuation mechanism 158*a*, or forward actuation mechanism, and a second actuation mechanism 158*b*, or aft actuation mechanism. Each actuation mechanism 158 has the first spine member 166*a* and the second spine member 166*b*. The shape transition assemblies 140 are mechanically and structurally the same, and as described in FIG. 3I above. FIG. 3M further shows the outboard end 42 and the inboard end 44 of the strut 40, and further shows the leading edge 96 of the strut structure 82. FIG. 3M further shows the compression chains 202, including the first compression chain 202*a* and the second compression chain 202*b*.

The first shape transition assembly 140*a* and the second shape transition assembly 140*b* may be separate as shown in FIG. 3M, and individually driven by their respective actuation mechanisms 158 and activation mechanisms 178 (see FIG. 1). Alternatively, the first shape transition assembly 140*a* and the second shape transition assembly 140*b* may be connected together, via one or more connector members (not shown), for example, straight or geared linear linkages, attached between one or more hinge connectors 218 (see FIG. 3M) of aft joints of the expandable structures 146 having the rhombus shape 150 of the first shape transition mechanism 142*a*, or forward shape transition mechanism, and one or more hinge connectors 218 (see FIG. 3M) at aft joints of the expandable structures 146 having the rhombus shape 150, of the second shape transition mechanism 142*b*, or aft shape transition mechanism.

FIG. 3N is an illustration of a cross section view of a version of the expandable strut assembly 12, of FIG. 3M, having two shape transition assemblies 140 in the strut 40. As shown in FIG. 3N, the expandable strut assembly 12 comprises the double structure expandable strut assembly 12*d*. FIG. 3N shows the shape transition assemblies 140, including the first shape transition assembly 140*a*, or forward shape transition assembly, and the second shape transition assembly 140*b*, or aft shape transition assembly. FIG. 3N further shows the shape transition mechanisms 142, including the first shape transition mechanism 142*a*, or forward shape transition mechanism, and the second shape transition mechanism 142*b*, or aft shape transition mechanism. FIG. 3N further shows the actuation mechanisms 158, including the first actuation mechanism 158*a*, or forward actuation mechanism, and the second actuation mechanism 158*b*, or aft actuation mechanism. FIG. 3N further shows the leading edge 96 and the trailing edge 120 of the strut structure 82. FIG. 3N further shows for each shape transition assembly 140, the plate member 208, such as the flat plate member, connected to the center tube 204, where the plate member 208 has the plate member first opening 208*a* with bushing 209 and the plate member second opening 208*b* with bushing 209. As further shown in FIG. 3N, the spine members 166 are inserted through the bushings 209 and a portion of each spine member 166 is adjacent each bushing 209. As further shown in FIG. 3B, the spine members 166 are inserted through the plate member first opening 208*a* and the plate member second opening 208*b*, respectively. The plate member 208 positions or locates the spine members 166 relative to the center tube 204 (see FIG. 3B) and positions the spine members 166 so that they do not buckle.

FIG. 3O is an illustration of a cross section view of a version of an expandable strut assembly 12 having a shape transition assembly 140 with a shape transition mechanism 142 having the expandable structure 146 with a cross section profile 148 in the rhombus shape 150. FIG. 3O further shows the shape transition mechanism 142 with the drive mechanism 154 comprising one compression chain 202, such as the first compression chain 202*a*. FIG. 3O further shows the actuation mechanism 158 in the form of spine members 166 coupled to the center tube 204. The plate members 208 (see FIG. 3N) and bushings 209 (see FIG. 3N) have been removed for clarity. In this version of the expandable strut assembly 12, instead of two compression chains 202 for each shape transition mechanism 142, there is one compression chain 202 expanding the expandable structure 146, and in turn, expanding the thickness of the strut cross section 60 (see FIG. 3O) and the strut 40 (see FIG. 3O). FIG. 3O further shows the leading edge 96 and the trailing edge 120 of the strut 40.

Figure 3Q:
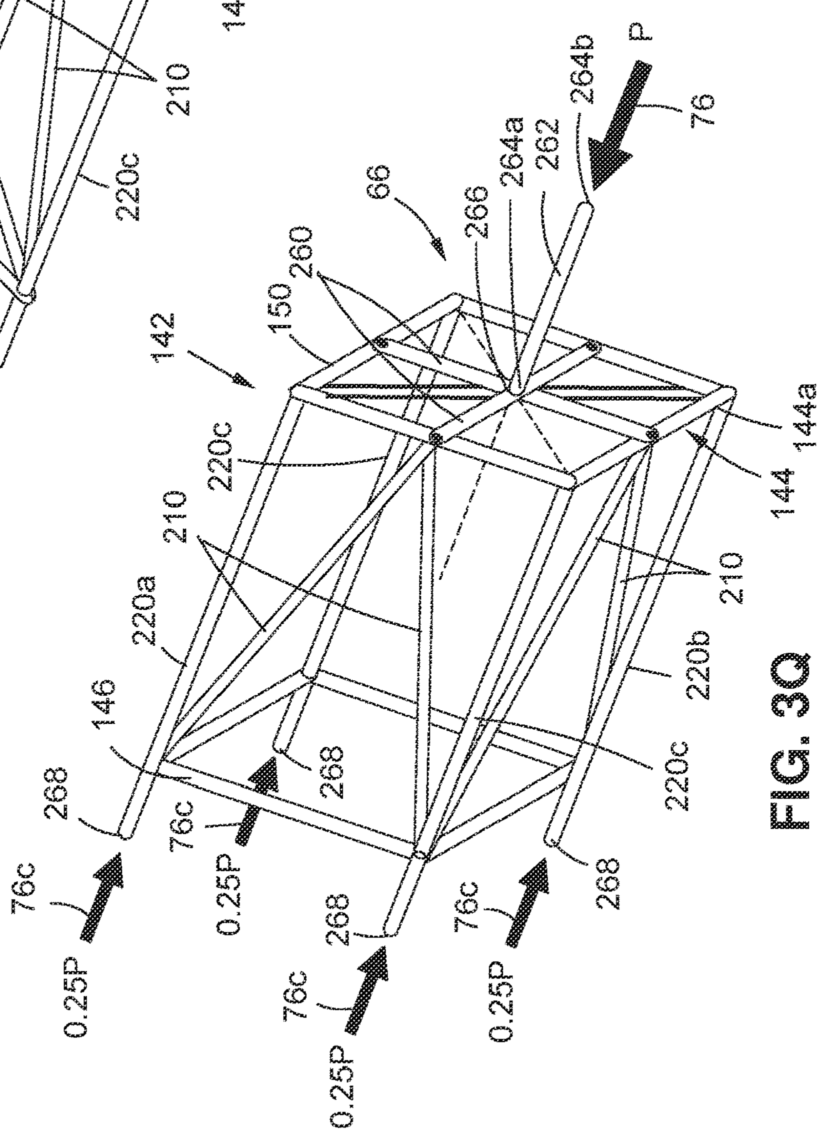
FIG. 3Q is an illustration of a top perspective view of a schematic diagram of the shape transition mechanism of FIG. 3P, in an expanded position.

FIG. 3P is an illustration of a top perspective view of a schematic diagram of the shape transition mechanism 142, in the contracted position 64. FIG. 3Q is an illustration of a top perspective view of a schematic diagram of the shape transition mechanism 142 of FIG. 3P, in the expanded position 66. As shown in FIGS. 3P-3Q, the shape transition mechanism 142 comprises the expandable structures 146 each having the rhombus shape 150 comprising fixed length structural members 144, such as fixed length spars 144*a*. As further shown in FIGS. 3P-3Q, the shape transition mechanism 142 comprises truss members 210, or bracing members, which are also fixed length. As further shown in FIGS. 3P-3Q, the top bar 220*a*, the bottom bar 220*b*, and the side bars 220*c*, which are also fixed length, connect the expandable structures 146. As shown in FIGS. 3P-3Q, the shape transition mechanism 142 may further comprise cross-beam members 260, which are fixed length, and a central loading post 262 having a first end 264*a* attached to a cross joint 266 of the cross-beam members 260 and having a second end 264*b*.

FIGS. 3P-3Q further show an axial load (P) 76 applied to the second end 264*b* of the central loading post 262. The axial load (P) 76 is transmitted or beamed over to the top bar 220*a*, the bottom bar 220*b*, and the side bars 220*c*, via the cross-beam members 260. FIGS. 3P-3Q further show axial loads (0.25 P) 76*c* applied to aft ends 268 of the top bar 220*a*, the bottom bar 220*b*, and the side bars 220*c*. The truss members 210, or bracing members, transmit the axial loads (0.25 P) 76*c* in the top bar 220*a*, the bottom bar 220*b*, and the side bars 220*c* to the cross-beam members 260.

Figure 4A:
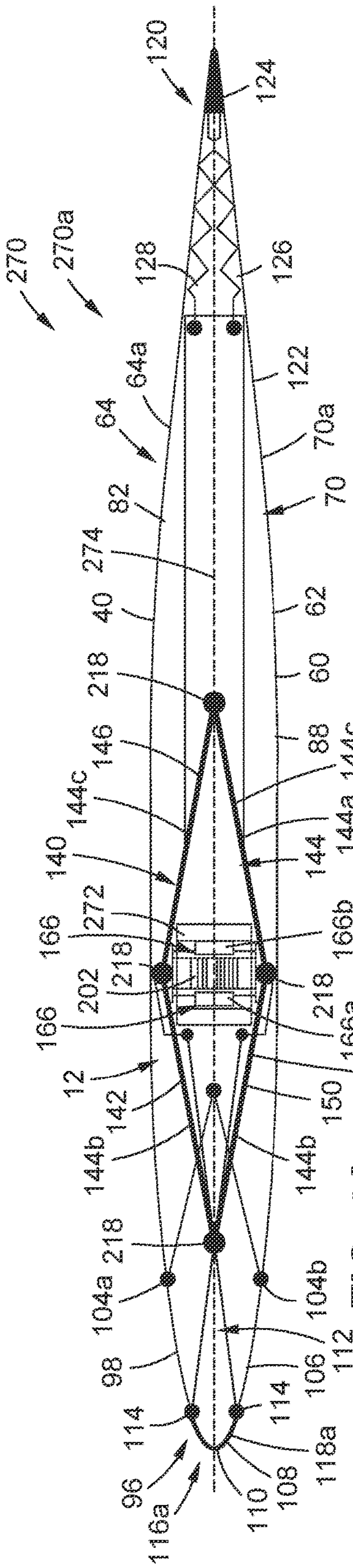
FIG. 4A is an illustration of a left outboard side view of a schematic diagram of an exemplary expandable strut assembly with two spine members in a strut, in a contracted position, and showing a leading edge shape control mechanism and an aft membrane.
Figure 4B:
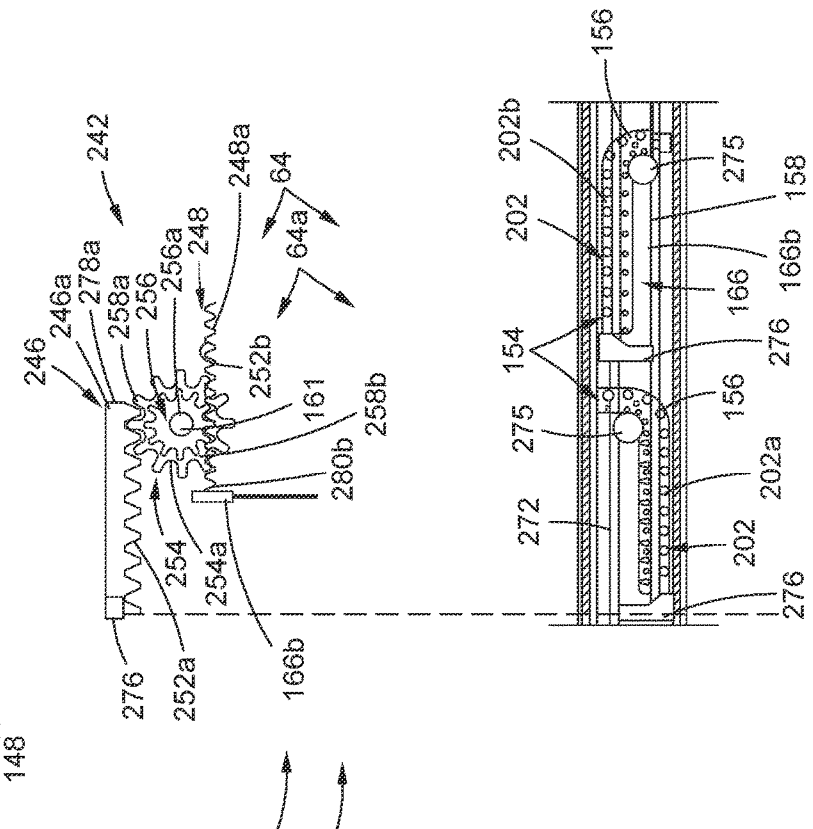
FIG. 4B is an illustration of a front view of a schematic diagram of a spine member and compression chains coupled to a reduction gear system of the expandable strut assembly of FIG. 4A, in the contracted position.
Figure 4C:
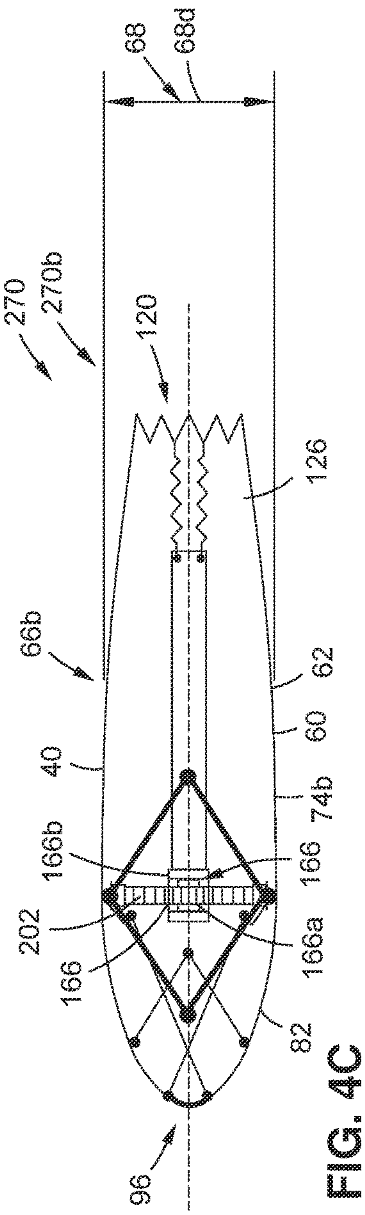
FIG. 4C is an illustration of a left outboard side view of a schematic diagram of the exemplary expandable strut assembly of FIG. 4A, in an intermediate expanded position.
Figure 4D:
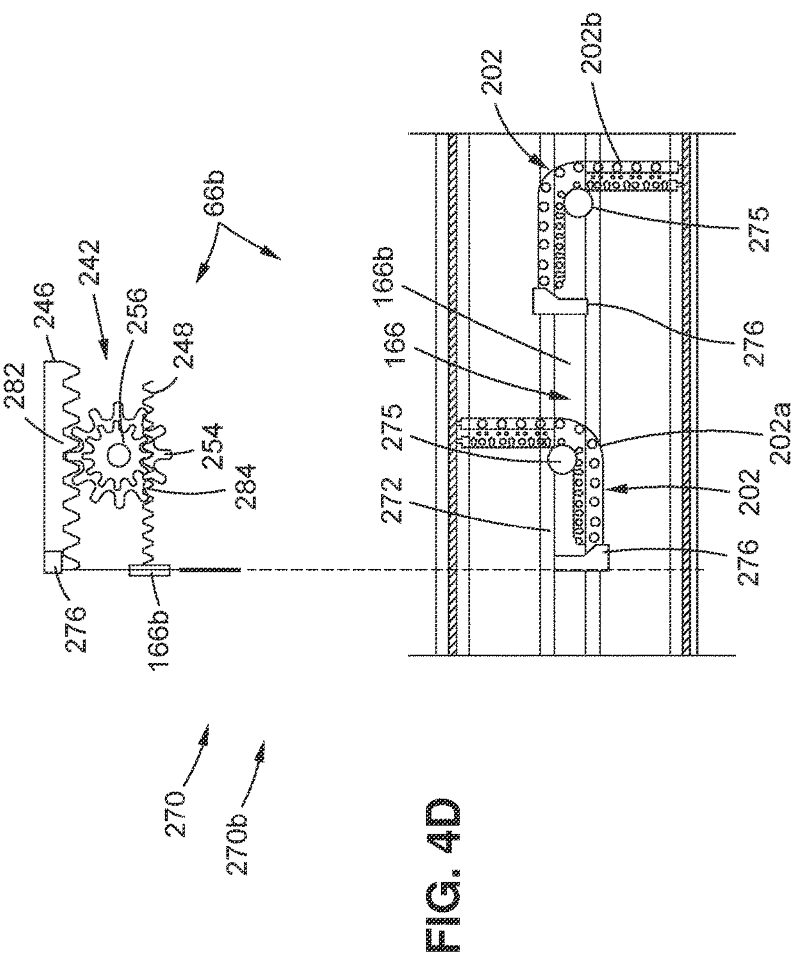
FIG. 4D is an illustration of a front view of a schematic diagram of the spine member and compression chains coupled to the reduction gear system of the expandable strut assembly of FIG. 4C, in the intermediate expanded position.
Figures 4E, 4F:
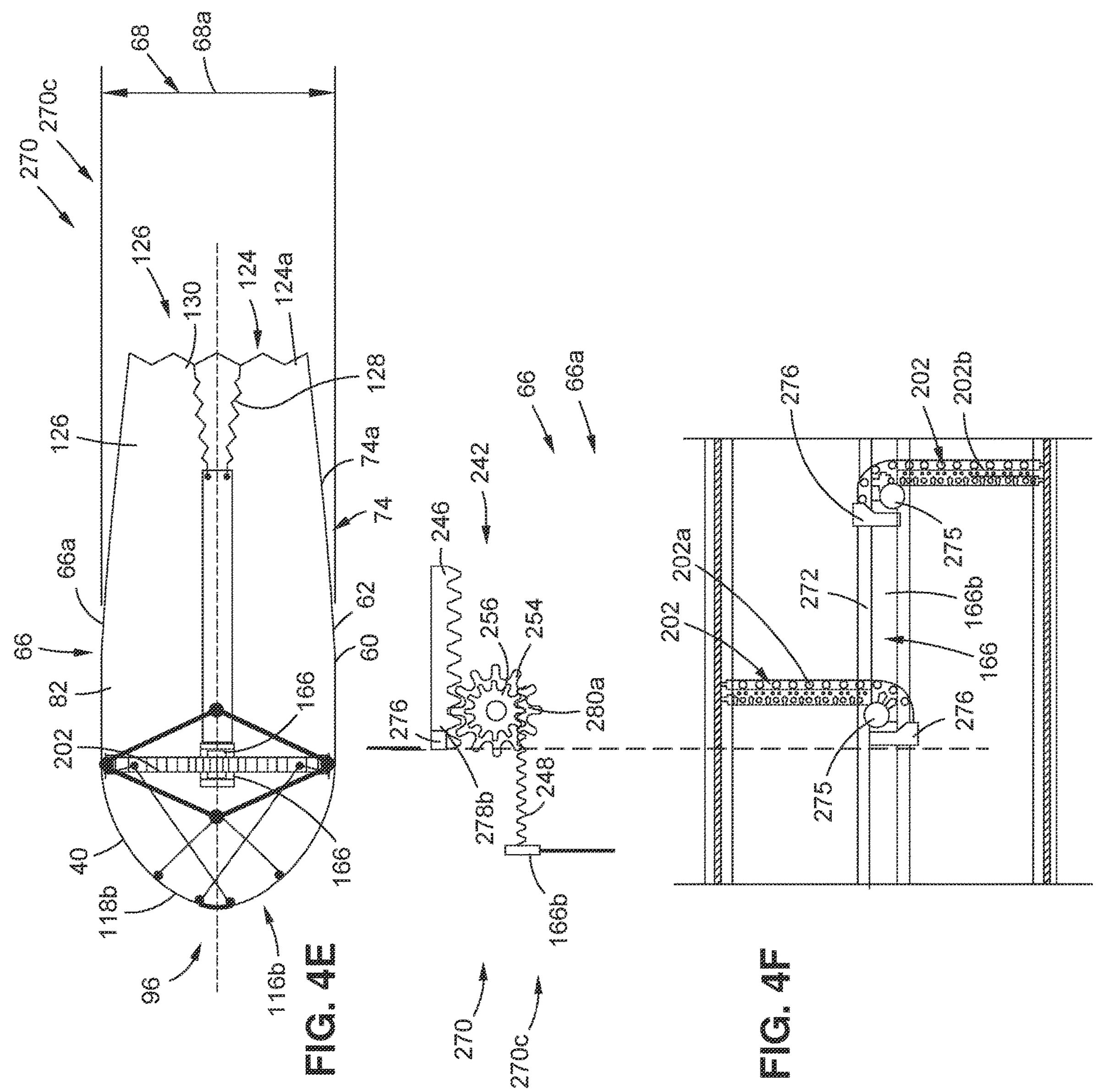
FIG. 4E is an illustration of a left outboard side view of a schematic diagram of the exemplary expandable strut assembly of FIG. 4A, in a fully expanded position.
FIG. 4F is an illustration of a front view of a schematic diagram of the spine member and compression chains coupled to the reduction gear system of the expandable strut assembly of FIG. 4E, in the fully expanded position.

Now referring to FIGS. 4A-4F, FIGS. 4A-4F show an expansion sequence 270 of an exemplary version of the expandable strut assembly 12 (see FIG. 4A) having the shape transition assembly 140 (see FIG. 4A) with the shape transition mechanism 142 (see FIG. 4A) comprising the plurality of fixed length structural members 144 (see FIG. 4A) forming the expandable structure 146 (see FIG. 4A) having the cross section profile 148 (see FIG. 4A) in the rhombus shape 150 (see FIG. 4A), and further having the drive mechanism 154 (see FIG. 4B) comprising the plurality of variable length structural members 156 (see FIG. 4B) in the form of compression chains 202 (see FIGS. 4A, 4B), and further having the actuation mechanism 158 (see FIG. 4B) comprising spine members 166 (see FIGS. 4A, 4B), such as the first spine member 166*a* (see FIG. 4A) and the second spine member 166*b* (see FIGS. 4A, 4B).

FIG. 4A is an illustration of a left outboard side view of a schematic diagram of the exemplary expandable strut assembly 12 with two spine members 166 and compression chains 202 in the strut 40, in a first position 270*a* of the expansion sequence 270, comprising the contracted position 64, such as the fully contracted position 64*a*, and showing the strut cross section 60 with the airfoil shape 62 being in the contracted airfoil shape 70, such as the fully contracted airfoil shape 70*a*.

FIG. 4A further shows the strut structure 82 with the leading edge 96 having the leading edge skin 98 that is flexible in the chord-wise direction 100 (see FIG. 3A) of the strut 40 and that has a constant length 102*a* (see FIG. 1). As shown in FIG. 4A, the leading edge skin 98 further has the first end 104*a*, the second end 104*b*, and the arc length 106 defined therebetween, and the flexible skin portion 108 at the forward-most end 110 of the leading edge 96.

As shown in FIG. 4A, the leading edge 96 further comprises the leading edge shape control mechanism 112 attached to the leading edge skin 98 at the plurality of discrete, fixed support locations 114, and configured to transition the leading edge skin 98 from the first shape 116*a* having the first curvature profile 118*a* to the second shape 116*b* (see FIG. 4E) having the second curvature profile 118*b* (see FIG. 4E) different than the first curvature profile 118*a* without a change in the arc length 106. The leading edge 96 may transform from thick to thin.

As shown in FIG. 4A, the strut structure 82 further comprises the trailing edge 120 comprising the trailing edge skin 122 having a constant length 120*b* (see FIG. 1). The trailing edge 120 further comprises the aft membrane 124 (see FIG. 4A) configured to close off the strut enclosure 126 (see FIG. 4A) of the strut 40. As shown in FIG. 4A, the trailing edge 120 comprises the aft membrane spring 128 attached to the aft membrane 124, and configured to pull the aft membrane 124 back into the strut enclosure 126, when the strut 40 contracts to the contracted position 64. In one version, the aft membrane 124 comprises the accordion aft membrane 124*a* (see FIG. 4E) having the accordion shape profile 130 (see FIG. 4E), when the strut 40 is in the expanded position 66.

As shown in FIG. 4A, in this version, the fixed length structural members 144 comprise the fixed length spars 144*a* in the form of forward spars 144*b* and aft spars 144*c* connected together with hinge connectors 218. As shown in FIG. 4A, in this version, instead of the center tube 204 (see FIG. 3J), there is a center box structure 272. FIG. 4A further shows a centerline 274 through the strut 40 in the chord-wise direction 100 (see FIG. 3A).

FIG. 4B is an illustration of a front view of a schematic diagram of the spine member 166, such as the second spine member 166*b*, and compression chains 202 coupled to the reduction gear system 242 at a compression chain attachment point 276 of the expandable strut assembly 12 of FIG. 4A, in the contracted position 64, such as the fully contracted position 64*a*, and in the first position 270*a* of the expansion sequence 270. FIG. 4B shows the drive mechanism 154 comprising the variable length structural members 156 in the form of compression chains 202, such as the first compression chain 202*a* and the second compression chain 202*b*. FIG. 4B further shows each of the compression chains 202 adjacent a guide member 275, such as a cam, guide roller, rod, or other suitable guide member, to guide the compression chain 202, when it is moved or actuated by the spine member 166. FIG. 4B further shows the spine member 166, such as the second spine member 166*b*, and the center box structure 272.

FIG. 4B further shows the reduction gear system 242 with the first rack 246, such as the compression chain rack 246*a*, attached to the compression chain attachment point 276. As shown in FIG. 4B, the reduction gear system 242 further comprises the second rack 248, such as the spine member rack 248*a*, attached to the second spine member 166*b*. As shown in FIG. 4B, the reduction gear system 242 further comprises the first gear 254, such as the compression chain gear 254*a*, and the second gear 256, such as the spine member gear 256*a*, where gear teeth 258*a* of the first gear 254 mesh with rack teeth 252*a* of the first rack 246, and gear teeth 258*b* of the second gear 256 mesh with rack teeth 252*b* of the second rack 248. As shown in FIG. 4B, when the strut 40 (see FIG. 4A) is in the contracted position 64, such as the fully contracted position 64*a*, the first gear 254 and the second gear 256 are positioned at a first end 278*a* of the first rack 246, and are positioned at a second end 280*b* of the second rack 248. FIG. 4B further shows the spindle 161 that connects the first gear 254 and the second gear 256.

In the center portion of the shape transition mechanism 142 (see FIGS. 3J, 4A) and the center portion of the expandable strut assembly 12 (see FIGS. 3I, 4A), when the second spine member 166*b* actuates or drives movement of the second rack 248 along the second gear 256, the spindle 161 also rotates the first gear 254 to cause the first rack 246 to move the first compression chain 202*a* in an upward direction against the top end 212*a* (see FIG. 3J) of the expandable structure 146, to cause the expandable structure 146 to move upward and expand. In the center portion of the shape transition mechanism 142 (see FIGS. 3J, 4A) and the center portion of the expandable strut assembly 12 (see FIGS. 3I, 4A), similarly, the second compression chain 202*b* is driven downward in a downward direction by the first spine member 166*a* (see FIG. 3I) and the reduction gear system 242, such as the second reduction gear system 242*b* (see FIG. 3J), attached between the first spine member 166*a* (see FIG. 3I) and the second compression chain 202*b* (see FIGS. 3J, 3K), and the second compression chain 202*b* is moved or actuated against the bottom end 212*b* (see FIG. 3J) of the expandable structure 146, to cause the expandable structure 146 to move downward and expand.

FIG. 4C is an illustration of a left outboard side view of a schematic diagram of the exemplary expandable strut assembly 12 of FIG. 4A, with two spine members 166 in the strut 40, in a second position 270*b* of the expansion sequence 270, comprising an intermediate expanded position 66*b*. FIG. 4C shows the strut cross section 60 with the airfoil shape 62 expanded to the intermediate expanded airfoil shape 74*b*. As the strut 40 approaches compression loading, the strut cross section 60 starts to expand. FIG. 4C shows the height 68, such as the intermediate expanded height 68*d*, of the strut cross section 60. The load may comprise various magnitudes of strut tension load 80 (see FIG. 1) that is in between predetermined strut tension load thresholds 80*a* (see FIG. 1), for example, a lower strut tension load threshold of 0.3 g and an upper strut tension load threshold of 0.7 g. FIG. 4C further shows the leading edge 96 and the trailing edge 120 of the strut structure 82. The other structural features shown in FIG. 4C are discussed with respect to FIG. 4A.

FIG. 4D is an illustration of a front view of a schematic diagram of the spine member 166, such as the second spine member 166*b*, and compression chains 202 coupled to the reduction gear system 242 of the expandable strut assembly 12 of FIG. 4C, in the intermediate expanded position 66*b*, and in the second position 270*b* of the expansion sequence 270. FIG. 4C shows the compression chains 202, such as the first compression chain 202*a* and the second compression chain 202*b*, adjacent the guide member 275, and shows the spine member 166, such as the second spine member 166*b*, and the center box structure 272. When the strut 40 (see FIG. 4C) is in the intermediate expanded position 66*b*, the first gear 254 and the second gear 256 are positioned at a middle portion 282 of the first rack 246, and are positioned at a middle portion 284 of the second rack 248. FIG. 4D further shows the first rack 246 attached to the compression chain attachment point 276.

FIG. 4E is an illustration of a left outboard side view of a schematic diagram of the exemplary expandable strut assembly 12 of FIG. 4A, with two spine members 166 and compression chains 202 in the strut 40, in a third position 270*c* of the expansion sequence 270, comprising the expanded position 66, such as the fully expanded position 66*a*, and showing the strut cross section 60 with the airfoil shape 62 being in the expanded airfoil shape 74, such as the fully expanded airfoil shape 74*a*. This is the position of the strut 40 during maximum strut compression, and a large moment of inertia prevents strut axial buckling. FIG. 4E further shows the leading edge 96 and the trailing edge 120 of the strut structure 82. FIG. 4E further shows the aft membrane 124 comprising the accordion aft membrane 124*a* having the accordion shape profile 130, when the strut 40 is in the expanded position 66. FIG. 4E further shows the aft membrane spring 128 and the height 68, such as the fully expanded height 68*a*, of the strut cross section 60. The other structural features shown in FIG. 4E are discussed with respect to FIG. 4A.

FIG. 4F is an illustration of a front view of a schematic diagram of the spine member 166, such as the second spine member 166*b*, and compression chains 202 coupled to the reduction gear system 242 of the expandable strut assembly 12 of FIG. 4E, in the expanded position 66, such as the fully expanded position 66*a*, and in the third position 270*c* of the expansion sequence 270. FIG. 4F shows the compression chains 202, such as the first compression chain 202*a* and the second compression chain 202*b*, adjacent the guide member 275, and shows the spine member 166, such as the second spine member 166*b*, and the center box structure 272. FIG. 4F further shows the first rack 246 attached to the compression chain attachment point 276. When the strut 40 (see FIG. 4E) is in the expanded position 66, such as the fully expanded position 66*a*, the first gear 254 and the second gear 256 are positioned at a second end 278*b* of the first rack 246, and are positioned at a first end 280*a* of the second rack 248.

Figure 5A:
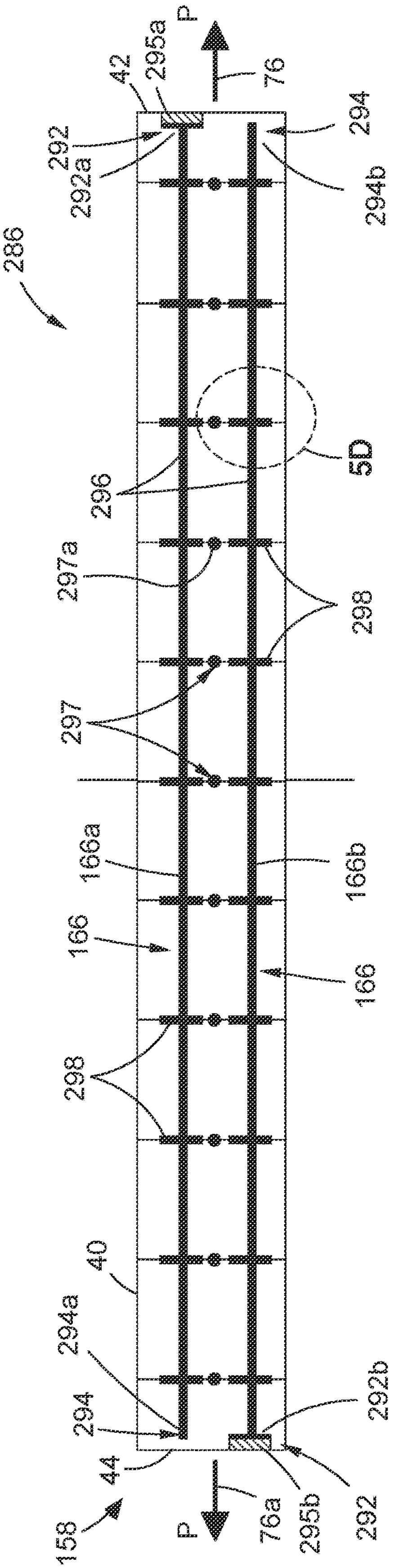
FIG. 5A is an illustration of a top view of a schematic diagram of two spine members of an exemplary expandable strut assembly, where the two spine members are in an undeflected position.
Figure 5B:
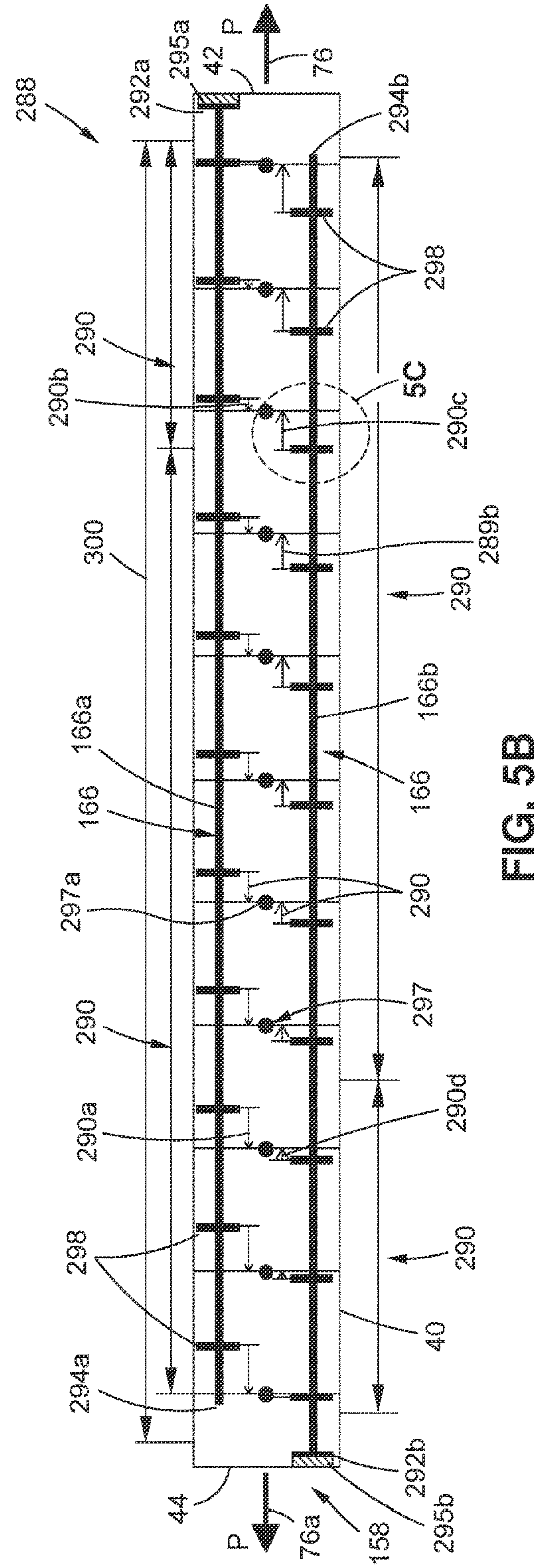
FIG. 5B is an illustration of a top view of a schematic diagram of the two spine members of FIG. 5A, in a deflected position showing relative deflections.

Now referring to FIGS. 5A-5D, FIGS. 5A-5D shown schematic diagrams of the structural arrangement of the spine members 166 (see FIG. 5A) used as the actuation mechanism 158 (see FIGS. 5A-5B) in an exemplary expandable strut assembly 12, as shown in FIGS. 3A-3M and 4A-4F. FIG. 5A is an illustration of a top view of a schematic diagram of two spine members 166, such as the first spine member 166*a* and the second spine member 166*b*, of an exemplary expandable strut assembly 12 (see FIGS. 3A-3M and 4A-4F), in undeflected positions 286, in the strut 40. FIG. 5B is an illustration of a top view of a schematic diagram of the two spine members 166, such as the first spine member 166*a* and the second spine member 166*b*, of FIG. 5A, in deflected positions 288 showing relative deflections 290, such as useful relative deflections 290*a*, 290*c*, and unuseful relative deflections 290*b*, 290*d*.

As shown in FIGS. 5A-5B, the spine member 166, such as the first spine member 166*a* has a restrained end 292, such as restrained end 292*a*, and an unrestrained end 294, such as unrestrained end 294*a*. The restrained end 292*a* is attached, via a fixed support attachment structure 295*a* (see FIGS. 5A-5B), to the outboard end 42 (see FIGS. 5A-5B), or to a strut structure, such as a strut spar 137 (see FIG. 1), rib 138 (see FIG. 1), or other strut structure, in the strut 40, for example, if there is a jury strut 136 (see FIG. 2B) present. The unrestrained end 294*a* is a free end not connected, or attached, to any structure. The first spine member 166*a* extends along the length 57 (see FIG. 3A) of the strut 40. The restrained end 292*a* of the first spine member 166*a* is axially restrained for axial load (P) 76 (see FIGS. 5A-5B), and the unrestrained end 294*a* is unrestrained or free for axial load 76.

As further shown in FIGS. 5A-5B, the spine member 166, such as the second spine member 166*b*, has a restrained end 292, such as a restrained end 292*b* and an unrestrained end 294, such as an unrestrained end 294*b*. The restrained end 292*b* is attached, via a fixed support attachment structure 295*b* (see FIGS. 5A-5B), at the inboard end 44 (see FIGS. 5A-5B), to a fuselage structure 22 (see FIGS. 1, 2C) in the interior 20*a* (see FIG. 2C) of the fuselage 16. The unrestrained end 294*b* is a free end not connected, or attached, to any structure. The second spine member 166*b* extends along the length 57 (see FIG. 3A) of the strut 40. The second spine member 166*b* is parallel to the first spine member 166*a*. As shown in FIG. 5A, the first spine member 166*a* and the second spine member 166*b* are positioned in a parallel position 296, in relation to each other, and are both parallel to a load path 38 (see FIG. 1), such as a primary load path, of the strut 40.

The restrained end 292*b* of the second spine member 166*b* is axially restrained for strut axial load 76*a* (see FIGS. 5A-5B), and the unrestrained end 294*b* is unrestrained or free for strut axial load 76*a*. The spine members 166, such as the first spine member 166*a* and the second spine member 166*b*, are designed to be very rigid in the axial direction. As shown in FIGS. 5A-5B, the first spine member 166*a* and the second spine member 166*b* each have a plurality of stations 298, and each station 298 is coupled to the reduction gear system 242 (see FIGS. 5C-5D). The gear ratio between the second gear 256 (see FIG. 5C), or spine member gear 256*a* (see FIG. 5C), and the first gear 254 (see FIG. 5C), or compression chain gear 254*a* (see FIG. 5C), is typically different for each station 298 along the length 57 (see FIG. 3A) of the strut 40 (see FIGS. 2A, 3A). With the strut 40 having a constant thickness, there is typically a different gear ratio at each station 298. The strut 40 may also comprise a tapered strut. In this case, the gear ratios can be adjusted accordingly to achieve the correct amount of strut thickness expansion.

As shown in FIGS. 5A-5B, the actuation mechanism 158 further comprises a plurality of connections 297, such as relative deflection connections 297*a* (see FIGS. 5A-5B), or connection points, connecting the first spine member 166*a* and the second spine member 166*b*, to the drive mechanism 154 (see FIGS. 1, 4B) comprising the plurality of compression chains 202 (see FIG. 4B). FIGS. 5A-5B further show the inboard end 44 and the outboard end 42 of the strut 40.

As shown in FIG. 5B, in the deflected position 288, the first spine member 166*a* and the second spine member 166*b* have relative deflections 290 between the strut 40 (see FIGS. 1, 3A, 4A) or strut structure 82 (see FIGS. 1, 3A, 4A), and the first spine member 166*a* and the second spine member 166*b*, that drive the plurality of compression chains 202 (see FIGS. 3J, 4A), to transition the strut 40 between the contracted position 64 (see FIG. 4A) and the expanded position 66 (see FIG. 4E). FIG. 5B shows a deflection length 300 over which the relative deflections 290 occur. As shown in FIG. 5B, the relative deflections 290 comprise useful relative deflections 290*a* to the first spine member 166*a* and useful relative deflections 290*c* to the second spine member 166*b*. As shown in FIG. 5B, the relative deflections 290 further comprise unuseful relative deflections 290*b* to the first spine member 166*a* and unuseful relative deflections 290*d* to the second spine member 166*b*. As shown in FIG. 5B, the first spine member 166*a* has useful relative deflection 290*a* nearer the unrestrained end 294*a* and unuseful relative deflection 290*b* nearer the restrained end 292*a*. As further shown in FIG. 5B, the second spine member 166*b* has useful relative deflection 290*c* nearer the unrestrained end 294*b* and unuseful relative deflection 290*d* nearer the restrained end 292*b*. The unuseful relative deflections 290*b* are unuseful because they are small, and they are small due to the shorter distance over which the strut 40 has strained. The relative deflections 290 between the strut structure 82 of the strut 40 and the first spine member 166*a* and the second spine member 166*b* can be used to drive the compression chains 202 (see FIGS. 3J, 4B).

Figure 5D:
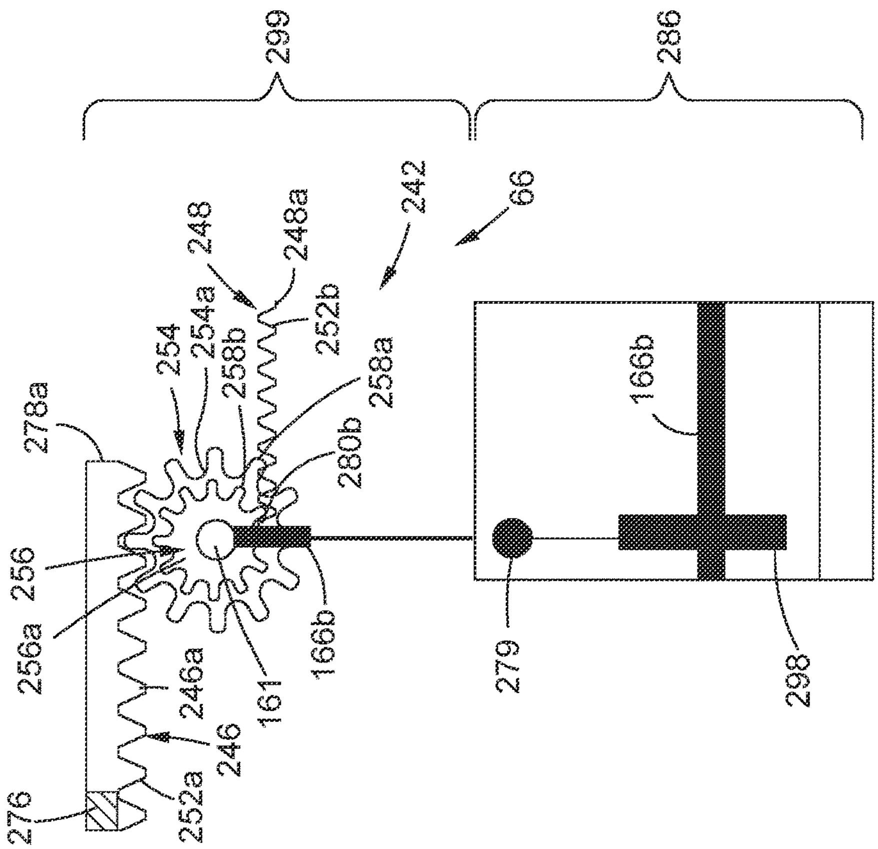
FIG. 5D is an illustration of a schematic diagram of an enlarged top view of circle 5D of FIG. 5A, showing the station and the reduction gear system of FIG. 5C, when the strut is in an expanded position.
Figure 5C:
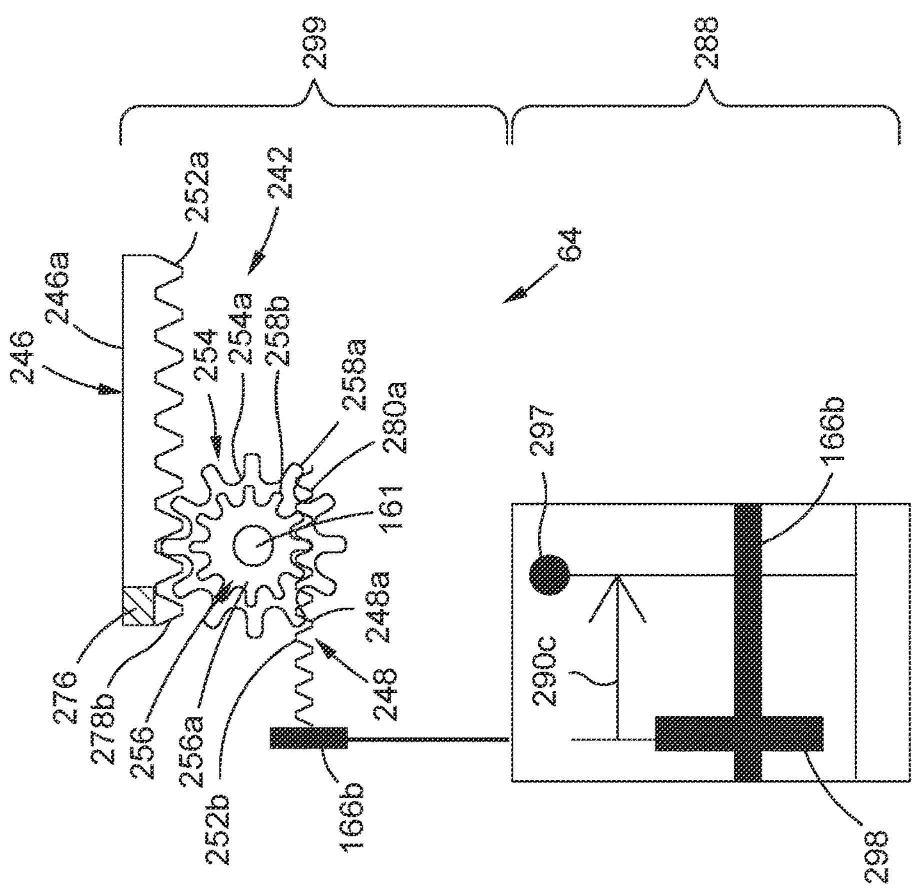
FIG. 5C is an illustration of a schematic diagram of an enlarged top view of circle 5C of FIG. 5B, showing a station of a second spine member coupled to a reduction gear system, in the deflected position, when a strut is in a contracted position.

FIG. 5C is an illustration of a schematic diagram of an enlarged top view of circle 5C of FIG. 5B, showing the station 298 of the second spine member 166*b* coupled to a reduction gear system 242, in the deflected position 288, when the strut 40 (see FIGS. 1, 3A, 4A, 5B) is in the contracted position 64 (see also FIG. 4A), or retracted position. FIG. 5C shows the useful relative deflection 290*c* to the second spine member 166*b* and the connection 297.

FIG. 5C further shows the deflected position 288 in relation to hardware 299 comprising the reduction gear system 242 with the first rack 246, such as the compression chain rack 246*a*, attached to the compression chain attachment point 276. FIG. 5C further shows the second rack 248, such as the spine member rack 248*a*, attached to the second spine member 166*b*. As shown in FIG. 5C, the reduction gear system 242 further comprises the first gear 254, such as the compression chain gear 254*a*, and the second gear 256, such as the spine member gear 256*a*, where gear teeth 258*a* of the first gear 254 mesh with rack teeth 252*a* of the first rack 246, and gear teeth 258*b* of the second gear 256 mesh with rack teeth 252*b* of the second rack 248. As shown in FIG. 5C, in the contracted position 64, the first gear 254 and the second gear 256 are positioned at the second end 278*b* of the first rack 246, and are positioned at the first end 280*a* of the second rack 248. FIG. 5C further shows the spindle 161 that connects the first gear 254 and the second gear 256.

FIG. 5D is an illustration of a schematic diagram of an enlarged top view of circle 5D of FIG. 5A, showing the station 298 of the second spine member 166*b* coupled to the reduction gear system 242, of FIG. 5C, in the undeflected position 286, when the strut 40 (see FIGS. 1, 3A, 4E, 5A) is in the expanded position 66 (see also FIG. 4E). There are no relative deflections 290 (see FIG. 5C) in FIG. 5D. FIG. 5D shows the second spine member 166*b* and the connection 297.

FIG. 5D further shows the undeflected position 286 in relation to the hardware 299 comprising the reduction gear system 242 with the first rack 246, such as the compression chain rack 246*a*, attached to the compression chain attachment point 276. FIG. 5D further shows the second rack 248, such as the spine member rack 248*a*, attached to the second spine member 166*b*. FIG. 5D further shows the first gear 254, such as the compression chain gear 254*a*, and the second gear 256, such as the spine member gear 256*a*, where gear teeth 258*a* of the first gear 254 mesh with rack teeth 252*a* of the first rack 246, and gear teeth 258*b* of the second gear 256 mesh with rack teeth 252*b* of the second rack 248. As shown in FIG. 5D, in the expanded position 66, the first gear 254 and the second gear 256 are positioned at the first end 278*a* of the first rack 246, and are positioned at the second end 280*b* of the second rack 248. FIG. 5D further shows the spindle 161 that connects the first gear 254 and the second gear 256.

Figure 5E:
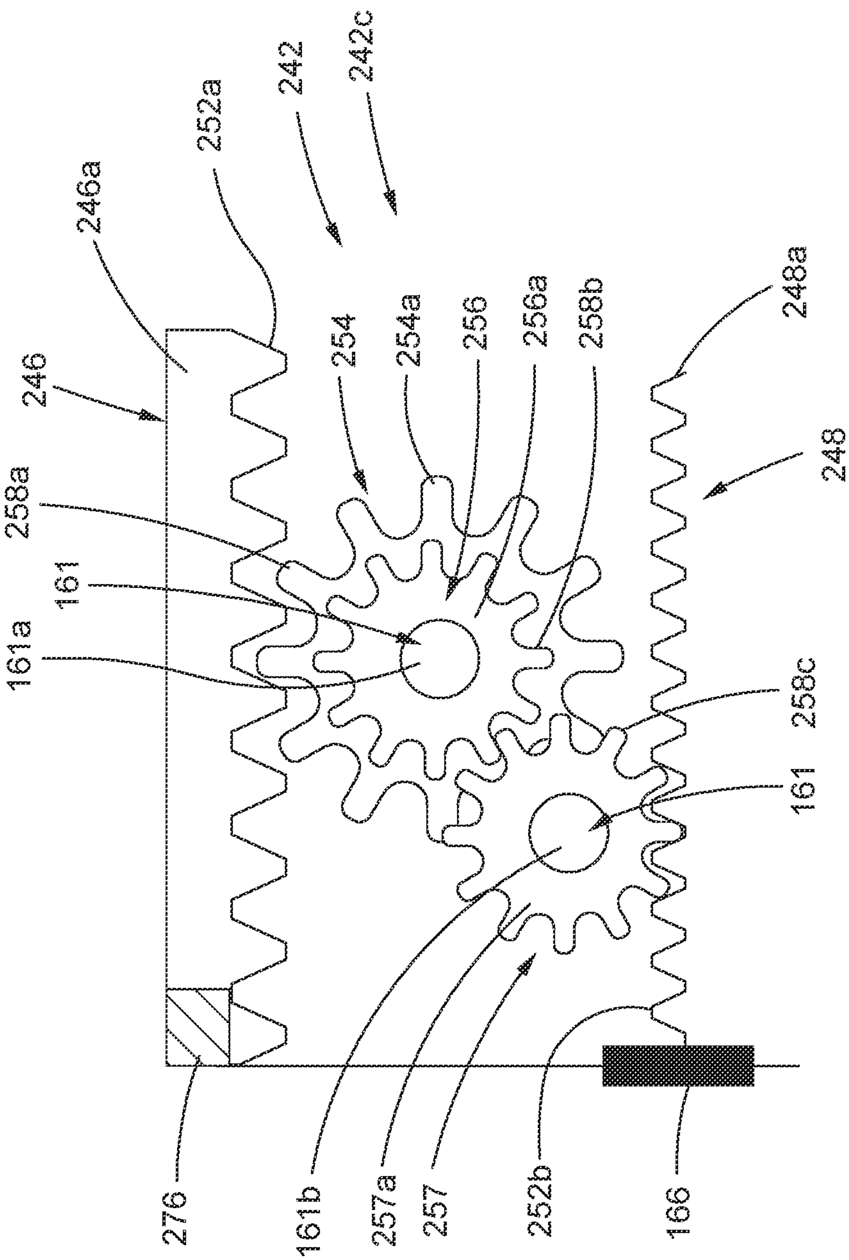
FIG. 5E is an illustration of a schematic diagram of an enlarged top view of a reduction gear system with three gears.

FIG. 5E is an illustration of an enlarged top view of a schematic diagram of a reduction gear system 242, such as a third reduction gear system 242*c*, with three gears, including the first gear 254, such as the compression chain gear 254*a*, the second gear 256, such as the spine member gear 256*a*, and a third gear 257, such as an intermediate gear 257*a*. As shown in FIG. 5E, the first gear 254 has gear teeth 258*a*, the second gear 256 has gear teeth 258*b*, and the third gear 257 has gear teeth 258*c*. As shown in FIG. 5E, the gear teeth 258*c* of the third gear 257, such as the intermediate gear 257*a*, mesh with the rack teeth 252*b* of the second rack 248, and also mesh with the gear teeth 258*b* of the second gear 256. As further shown in FIG. 5E, the gear teeth 258*a* of the first gear 254 mesh with the rack teeth 252*a* of the first rack 246, such as the compression chain rack 246*a*. The third gear 257, such as the intermediate gear 257*a*, is coupled to one of the compression chains 202 (see FIGS. 3J, 3K, 4B), to reverse the direction of rotation of the gear that drives the compression chain 202. For the compression chains 202 that are oriented such that the horizontal portion of each compression chain 202 has a reversed direction along the axis, the intermediate gear 257*a* (see FIG. 5E) is needed so that movement of the compression chain 202 is in the correct direction. FIG. 5E further shows the spindles 161, such as a first spindle 161*a* and a second spindle 161*b*. The first gear 254 and the second gear 256 are coupled to the first spindle 161*a*, and the third gear 257 is coupled to the second spindle 161*b*.

A preferred version of the expandable strut assembly 12 for an aircraft 10*a* (see FIG. 2A), as shown in FIGS. 3A-3P, 4A-4F, and 5A-5D, comprises the strut 40 (see FIGS. 1, 2A, 3A) having the strut cross section 60 (see FIGS. 1, 3C, 4A) with the airfoil shape 62 (see FIGS. 1, 3C, 4A). The strut 40 has the outboard end 42 (see FIG. 2A) coupled to the wing 14 (see FIG. 2A) of the aircraft 10*a* (see FIG. 2A), the inboard end 44 (see FIG. 2A) coupled to the fuselage 16 (see FIG. 2A) of the aircraft 10*a*, and the elongate body 46 (see FIG. 2A) defined between the outboard end 42 and the inboard end 44.

The expandable strut assembly 12 further comprises at least one shape transition assembly 140 (see FIGS. 1, 3C, 4A) connected to the interior 56 (see FIG. 3C) of the strut 40. Each shape transition assembly 140 is configured to transition the strut 40 between the contracted position 64 (see FIGS. 1, 4A) and the expanded position 66 (see FIGS. 1, 4E), and is configured to transition the strut cross section 60 (see FIGS. 1, 4A) between the contracted airfoil shape 70 (see FIGS. 1, 4A) and the expanded airfoil shape 74 (see FIGS. 1, 4E).

Each shape transition assembly 140 comprises the shape transition mechanism 142 (see FIGS. 1, 3C, 4A) attached to one or more interior portions 56*a* (see FIG. 2A) in the interior 56 (see FIG. 2A) of the strut 40. The shape transition mechanism 142 comprises a plurality of fixed length structural members 144 (see FIGS. 1, 3C, 4A) forming the expandable structure 146 (see FIGS. 1, 3A, 4A) having the cross section profile 148 (see FIG. 3A) comprising the rhombus shape 150 (see FIGS. 3C, 4A).

The shape transition mechanism 142 further comprises the drive mechanism 154 (see FIGS. 1, 3J, 4B) connected to the plurality of fixed length structural members 144. In this version, the drive mechanism 154 comprises the plurality of variable length structural members 156 (see FIGS. 1, 3J) comprising the plurality of compression chains 202 (see FIGS. 3J, 4B) coupled to the reduction gear system 242 (see FIGS. 3K, 4B).

The shape transition assembly 140 further comprises the actuation mechanism 158 (see FIGS. 1, 3I, 4B) connected to the shape transition mechanism 142. The actuation mechanism 158 is configured to actuate the drive mechanism 154 of the shape transition mechanism 142. In this version, the actuation mechanism 158 comprises the first spine member 166*a* (see FIGS. 3I, 4A, 5A) having the restrained end 292*a* (see FIG. 5A) attached to the outboard end 42 (see FIG. 5A) of the strut 40 (see FIG. 5A) and having the unrestrained end 294*a* (see FIG. 5A), and extending along the length 57 (see FIG. 3A) of the strut 40. The actuation mechanism 158 further comprises the second spine member 166*b* (see FIG. 5A) having the restrained end 292*b* (see FIG. 5A) attached to a fuselage structure 22 (see FIGS. 1, 2C) in the interior 56 (see FIGS. 2A, 2C) of the fuselage 16 (see FIGS. 1, 2A, 2C), and having the unrestrained end 294*b* (see FIG. 5A), and extending along the length 57 (see FIG. 3A) of the strut 40, parallel to the first spine member 166*a*.

The shape transition assembly 140 further comprises the activation mechanism 178 (see FIG. 1) coupled to the actuation mechanism 158. The activation mechanism 178 comprises the strut axial load driven activation mechanism 182 (see FIG. 1), and is configured to activate the actuation mechanism 158, to initiate the position transition 63 (see FIG. 1) of the strut 40 between the contracted position 64 (see FIGS. 1, 4A), such as the fully contracted position 64*a* (see FIG. 4A), and the expanded position 66 (see FIGS. 1, 4A), such as the fully expanded position 66*a* (see FIG. 4A), and to initiate the shape transition 69 (see FIG. 1) of the strut cross section 60 between the contracted airfoil shape 70 (see FIGS. 1, 4A), such as the fully contracted airfoil shape 70*a* (see FIG. 4A), and the expanded airfoil shape 74 (see FIGS. 1, 4A), such as the fully expanded airfoil shape 74*a* (see FIG. 4A).

The expandable strut assembly 12 may further comprise the jury strut 136 (see FIGS. 1, 2B) attached between the top portion 198 (see FIG. 2B) of the strut 40 (see FIG. 2B) and the underside portion 18*b* (see FIG. 2B) of the wing 14 (see FIG. 2B), and forms the jury strut joint location 200 (see FIG. 2B), where the first end 196*a* (see FIG. 2B) of the jury strut 136 joins to the top portion 198 of the strut 40, and further where each of the at least one shape transition assemblies 140 has the outboard end 141*a* (see FIG. 2B) attached to the interior 56 (see FIG. 2B) of the strut 40 at the jury strut joint location 200.

Figure 6A:
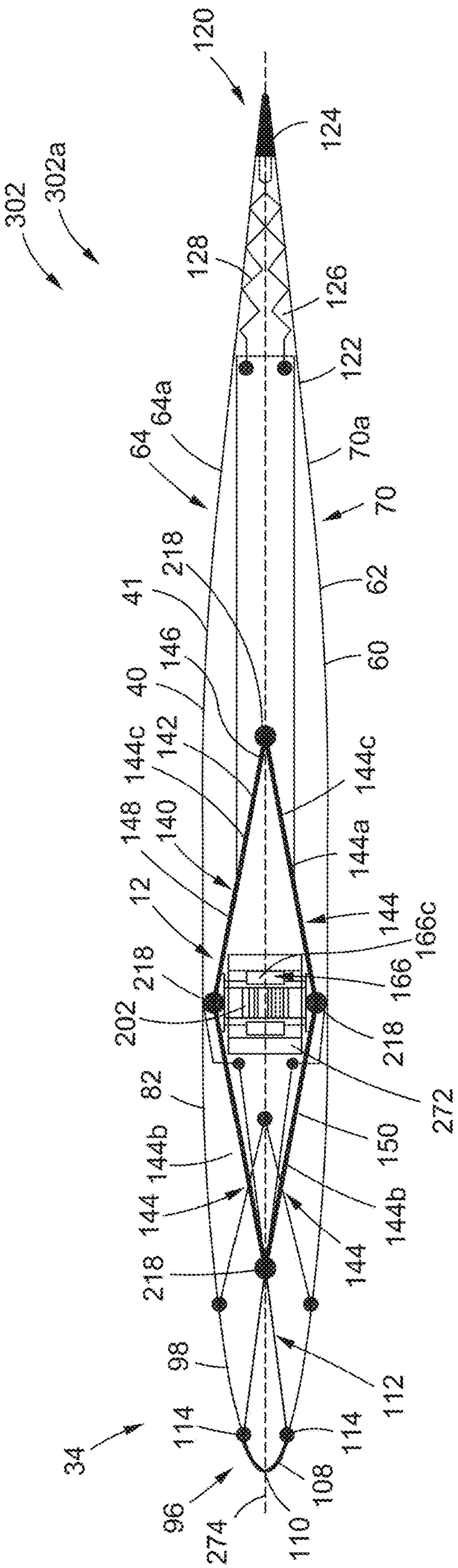
FIG. 6A is an illustration of a left outboard side view of a schematic diagram of another exemplary expandable strut assembly with one spine member in a strut, in a contracted position.
Figure 6B:
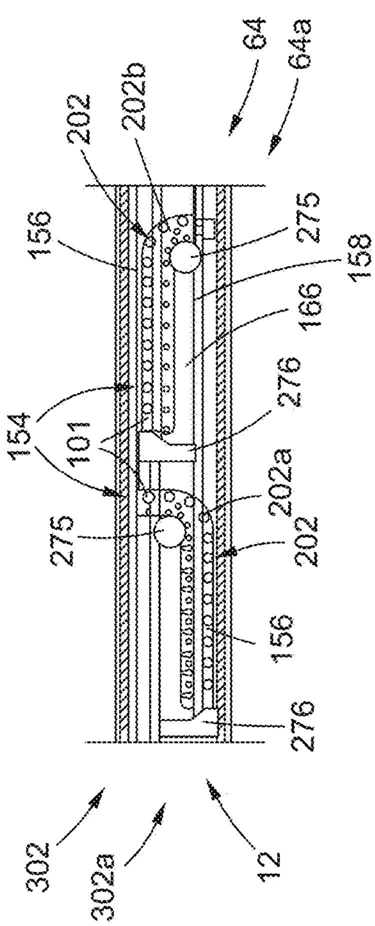
FIG. 6B is an illustration of a front view of a schematic diagram of the spine member attached to compression chains of the expandable strut assembly of FIG. 6A, in the contracted position.

Now referring to FIGS. 6A-6E, 7A-7F, and 8A-8E, FIGS. 6A-6E, 7A-7F, and 8A-8E show an expansion sequence 302 of an exemplary version of the expandable strut assembly 12 (see FIG. 6A) having the shape transition assembly 140 (see FIG. 6A) with the shape transition mechanism 142 (see FIG. 6A) comprising the plurality of fixed length structural members 144 (see FIG. 6A) forming the expandable structure 146 (see FIG. 6A) having the cross section profile 148 (see FIG. 6A) in the rhombus shape 150 (see FIG. 6A), and further having the drive mechanism 154 (see FIG. 6B) comprising the plurality of variable length structural members 156 (see FIG. 6B) in the form of compression chains 202 (see FIGS. 6A, 6B). In this version, the compression chains 202 are oriented in the span-wise direction 101 (see FIG. 6B). Further, in this version, the actuation mechanism 158 (see FIG. 6B) comprises one spine member 166 (see FIGS. 6A, 6B). Further, in this version, the actuation mechanism 158 is actuated with a rack-and-pinion system 26 (see FIG. 6C) positioned in the fuselage 16 (see FIG. 6C) of the aircraft 10*c* (see FIG. 2C), and the activation mechanism 178 (see FIG. 1) comprises the strut axial load driven activation mechanism 182 (see FIG. 1).

Figures 6C, 6D, 6E:
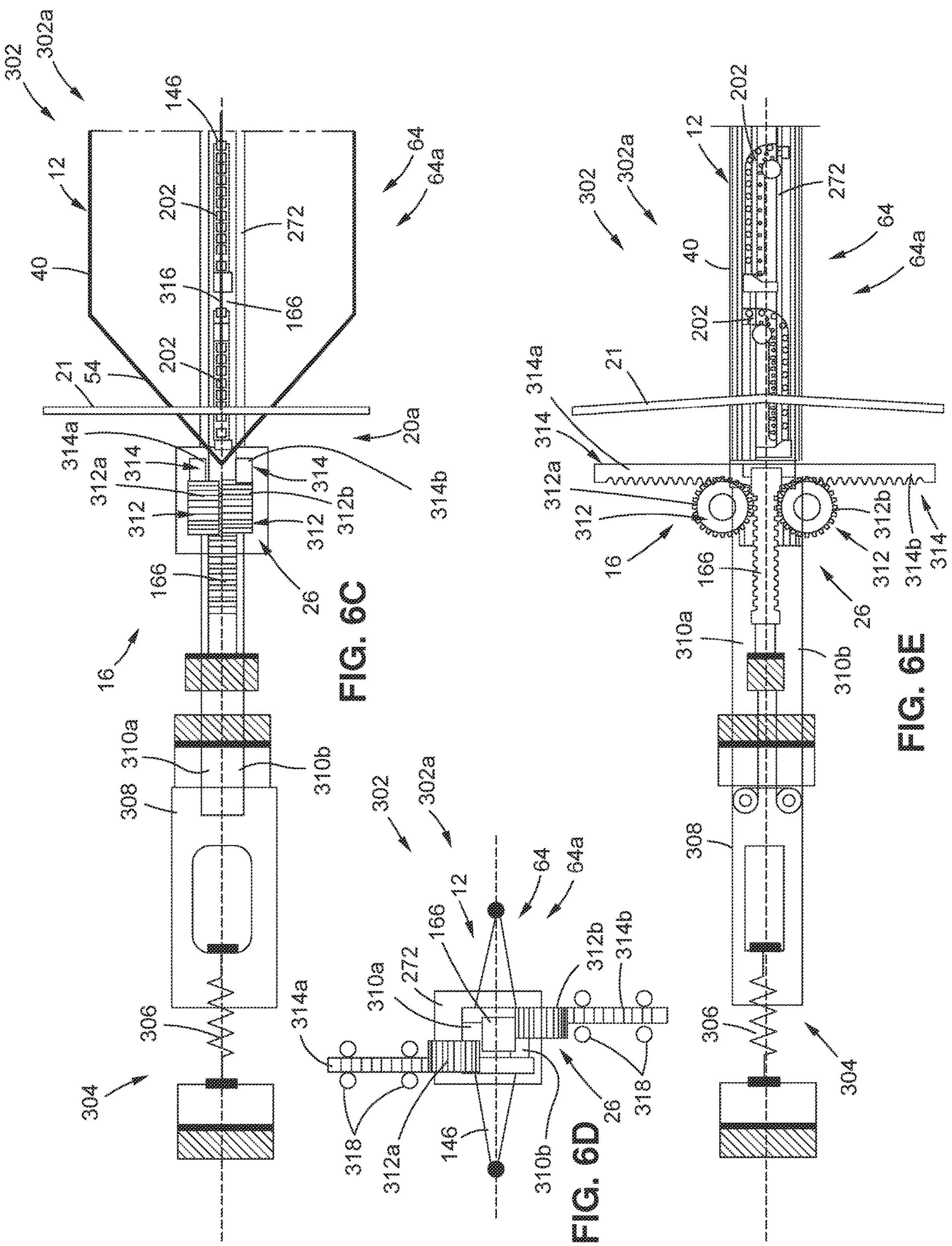
FIG. 6C is an illustration of a top view of a schematic drawing of the expandable strut assembly of FIG. 6A, in the contracted position, at a strut root, and showing a spring system in a fuselage.
FIG. 6D is an illustration of a right inboard side view of a schematic diagram of the expandable strut assembly of FIG. 6A, in the contracted position, at the strut root.
FIG. 6E is an illustration of a front view of a schematic diagram of the expandable strut assembly of FIG. 6C, in the contracted position.

In this version, there is a spring system 304 (see FIG. 6C) with the one or more springs 306 (see FIG. 6C) in the interior 20*a* of the fuselage 16 and coupled to a rack-and-pinion system 26 (see FIG. 6C) in the fuselage 16, which is coupled to the strut 40 (see FIG. 6C). In this version, the one or more springs 372 of the spring system 370 are in series with the load path 38 (see FIG. 1), such as the primary load path.

In this version, the strut 40 (see FIG. 6A), such as the wing strut 41 (see FIG. 6A), has the strut cross section 60 that is thin or small during the cruise flight condition 34 (see FIG. 6A), and the strut cross section 60 expands so that it is thicker or larger in compression 72 (see FIG. 1). The expansion of the strut cross section 60 is driven by axial loads 76 (see FIG. 1) in tension 78 (see FIG. 1) and compression 72 in the strut 40 by means of the actuation mechanism 158 in the form of the one spine member 166 fixed at the side 21 (see FIG. 6C) of the fuselage 16 (see FIG. 6C). This allows for a strut 40 that is light to carry the compressive loads 73 (see FIG. 1) that are needed for the wing down-bending flight condition 35 (see FIG. 1), but enables a more efficient strut cross section 60 that is thin or small for the cruise flight condition 34 of the aircraft 10*a* (see FIGS. 1, 2A).

Now referring to FIGS. 6A-6E, FIGS. 6A-6E show a first position 302*a* of the expansion sequence 302. FIG. 6A is an illustration of a left outboard side view of a schematic diagram of another exemplary expandable strut assembly 12 with one spine member 166 and compression chains 202 in the strut 40, in the first position 302*a* of the expansion sequence 302 comprising the contracted position 64, such as the fully contracted position 64*a*, when the aircraft 10*c* (see FIGS. 1, 2C) with the expandable strut assembly 12 is in the cruise flight condition 34. FIG. 6A further shows the strut cross section 60 with the airfoil shape 62 being in the contracted airfoil shape 70, such as the fully contracted airfoil shape 70*a*.

FIG. 6A further shows the strut structure 82 with the leading edge 96 having the leading edge skin 98 and the flexible skin portion 108 at the forward-most end 110 of the leading edge 96. FIG. 6A further shows the leading edge shape control mechanism 112 attached to the leading edge skin 98 at the plurality of discrete, fixed support locations 114. FIG. 6A further shows the trailing edge 120 comprising the trailing edge skin 122, the aft membrane 124 configured to close off the strut enclosure 126 of the strut 40, and the aft membrane spring 128 attached to the aft membrane 124, and configured to pull the aft membrane 124 back into the strut enclosure 126, when the strut 40 contracts to the contracted position 64.

As shown in FIG. 6A, in this version, the fixed length structural members 144 comprise the fixed length spars 144*a* in the form of forward spars 144*b* and aft spars 144*c* connected together with hinge connectors 218. FIG. 6A further shows the center box structure 272 and the centerline 274 through the strut 40.

FIG. 6B is an illustration of a front view of a schematic diagram of the spine member 166 attached to the compression chains 202, such as the first compression chain 202*a* and the second compression chain 202*b*, of the expandable strut assembly 12 of FIG. 6A, in the first position 302*a* of the expansion sequence 302 comprising the contracted position 64, such as the fully contracted position 64*a*. FIG. 6B shows the drive mechanism 154 comprising the variable length structural members 156 in the form of compression chains 202, such as the first compression chain 202*a* and the second compression chain 202*b*, each adjacent the guide member 275. FIG. 6B further shows the spine member 166, the center box structure 272, and the compression chain attachment point 276. In this version, the compression chains 202 are oriented in the span-wise direction 101 (see FIG. 3A).

FIG. 6C is an illustration of a top view of a schematic drawing of the expandable strut assembly 12 of FIG. 6A, in the first position 302*a* of the expansion sequence 302 comprising the contracted position 64, such as the fully contracted position 64*a*, at the strut root 54 of the strut 40, and showing a spring system 304 in the fuselage 16 attached to the spine member 166 at the side 21 of the fuselage 16. As shown in FIG. 6C, the spring system 304 comprises one or more springs 306 attached to a block member 308, which, in turn, is attached to an upper slanted bar 310*a* and a lower slanted bar 310*b*. Each of the one of more springs 306 may comprise one of, a coil spring, a tension spring, a compression spring, a beam spring, a cantilever spring, a torsion spring, a leaf spring, or another suitable type of spring. One skilled in the art may use one or more of these springs 306, or may choose to use another suitable type of spring.

The spring system 304 with the one or more springs 306 in the interior 20*a* of the fuselage 16 allows the strut root 54 to move a small distance over a certain load range, when an axial force is in a predetermined range. This movement drives the expansion and contraction of the strut 40 by means of the rack-and-pinion system 26 (see FIG. 6C). The rack-and-pinion system 26 includes one or more gears 312 (see FIGS. 6C, 6E), such as a first gear 312*a* (see FIGS. 6C, 6E) and a second gear 312*b* (see FIGS. 6C, 6E). The rack-and-pinion system 26 further includes one or more vertical racks 314 (see FIGS. 6C, 6E), such as a first vertical rack 314*a* (see FIGS. 6C, 6E) and a second vertical rack 314*b* (see FIGS. 6C, 6E). As the strut 40 deflects axially, it moves past the gear 312 or gears 312. The gears 312 drive the vertical racks 314 up and down. FIG. 6C further shows an upper bar 316 of the expandable structure 146, the compression chains 202, the spine member 166, and the center box structure 272 in the strut 40.

FIG. 6D is an illustration of a right inboard side view of a schematic diagram of the expandable strut assembly 12 of FIG. 6A, in the first position 302*a* of the expansion sequence 302 comprising the contracted position 64, such as the fully contracted position 64*a*, at the strut root 54 (see FIG. 6C). FIG. 6D shows the expandable structure 146, the spine member 166, the center box structure 272, the upper slanted bar 310*a*, the lower slanted bar 310*b*, and the rack-and-pinion system 26. As shown in FIG. 6D, the rack-and-pinion system 26 includes the first gear 312*a* coupled to the first vertical rack 314*a* and the second gear 312*b* coupled to the second vertical rack 314*b*. FIG. 6D further shows the first vertical rack 314*a* and the second vertical rack 314*b* coupled to rollers 318.

FIG. 6E is an illustration of a front view of a schematic diagram of the expandable strut assembly 12 of FIG. 6C, in the first position 302*a* of the expansion sequence 302 comprising the contracted position 64, such as the fully contracted position 64*a*. FIG. 6E shows the spring system 304 with the spring 306 attached to the block member 308, which, in turn, is attached to the upper slanted bar 310*a* and the lower slanted bar 310*b*. As shown in FIG. 6E, in the contracted position 64, such as the fully contracted position 64*a*, the upper slanted bar 310*a* and the lower slanted bar 310*b* are adjacent each other. FIG. 6E further shows the rack-and-pinion system 26 with gears 312, such as the first gear 312*a* and the second gear 312*b*, coupled to vertical racks 314, such as the first vertical rack 314*a* and the second vertical rack 314*b*. FIG. 6E further shows the compression chains 202, the spine member 166, the side 21 of the fuselage 16, and the center box structure 272 in the strut 40.

Figure 7A:
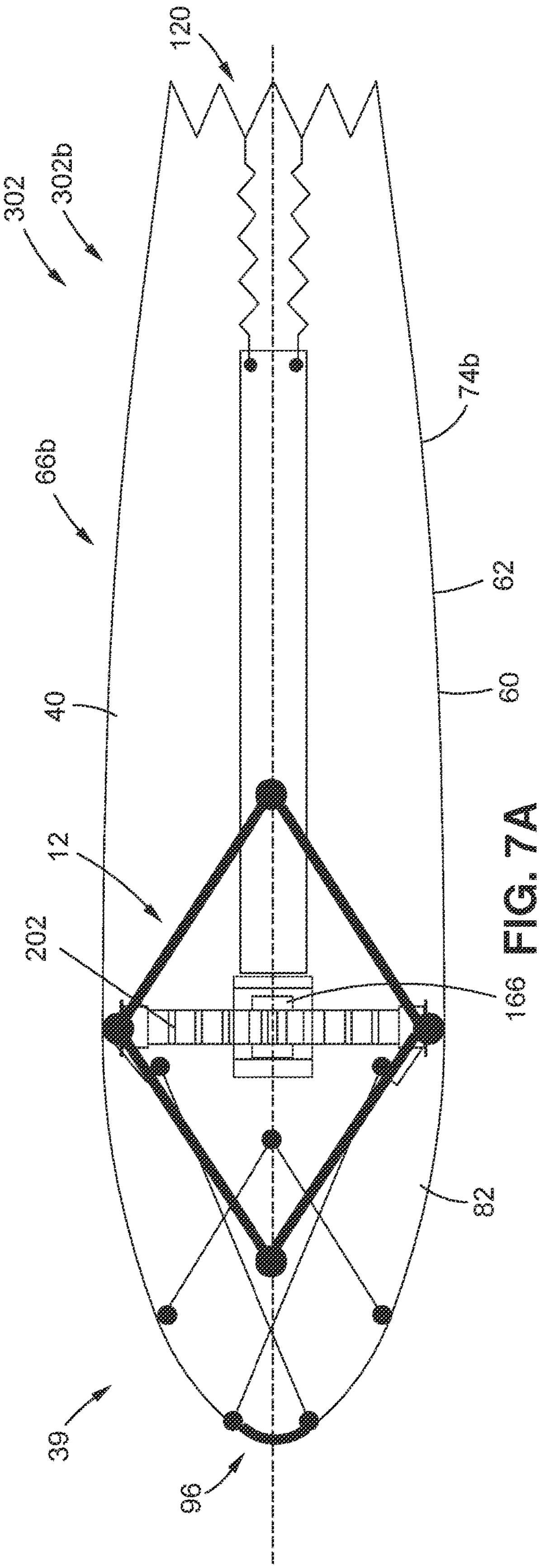
FIG. 7A is an illustration of a left outboard side view of a schematic diagram of the exemplary expandable strut assembly with one spine member in the strut, of FIG. 6A, in an intermediate expanded position.

Now referring to FIGS. 7A-7F, FIGS. 7A-7F show a second position 302*b* of the expansion sequence 302. FIG. 7A is an illustration of a left outboard side view of a schematic diagram of the exemplary expandable strut assembly 12 with one spine member 166 in the strut 40, of FIG. 6A, in the second position 302*b* of the expansion sequence 302 comprising the intermediate expanded position 66*b*, when the aircraft 10*b* (see FIG. 2C) with the expandable strut assembly 12 is in the intermediate flight condition 39. FIG. 7A further shows the strut cross section 60 with the airfoil shape 62 being in the intermediate expanded airfoil shape 74*b*. FIG. 7A further shows the leading edge 96 and the trailing edge 120 of the strut structure 82, the compression chain 202, and the spine member 166. The other structural features shown in FIG. 7A are discussed with respect to FIG. 6A.

Figure 7B:
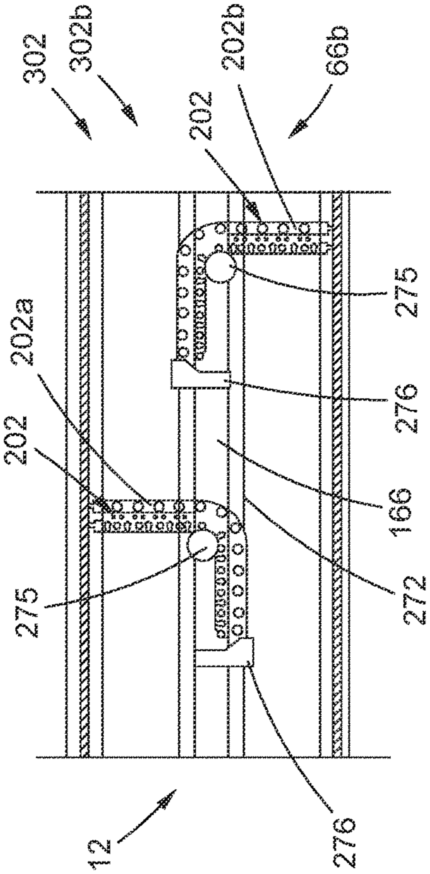
FIG. 7B is an illustration of a front view of a schematic diagram of the spine member attached to compression chains of the expandable strut assembly of FIG. 7A, in the intermediate expanded position.

FIG. 7B is an illustration of a front view of a schematic diagram of the spine member 166 attached to the compression chains 202, such as the first compression chain 202*a* and the second compression chain 202*b*, each adjacent the guide member 275, of the expandable strut assembly 12 of FIG. 7A, in the second position 302*b* of the expansion sequence 302 comprising the intermediate expanded position 66*b*. FIG. 7B further shows the center box structure 272 and the compression chain attachment point 276.

Figures 7C, 7D, 7E:
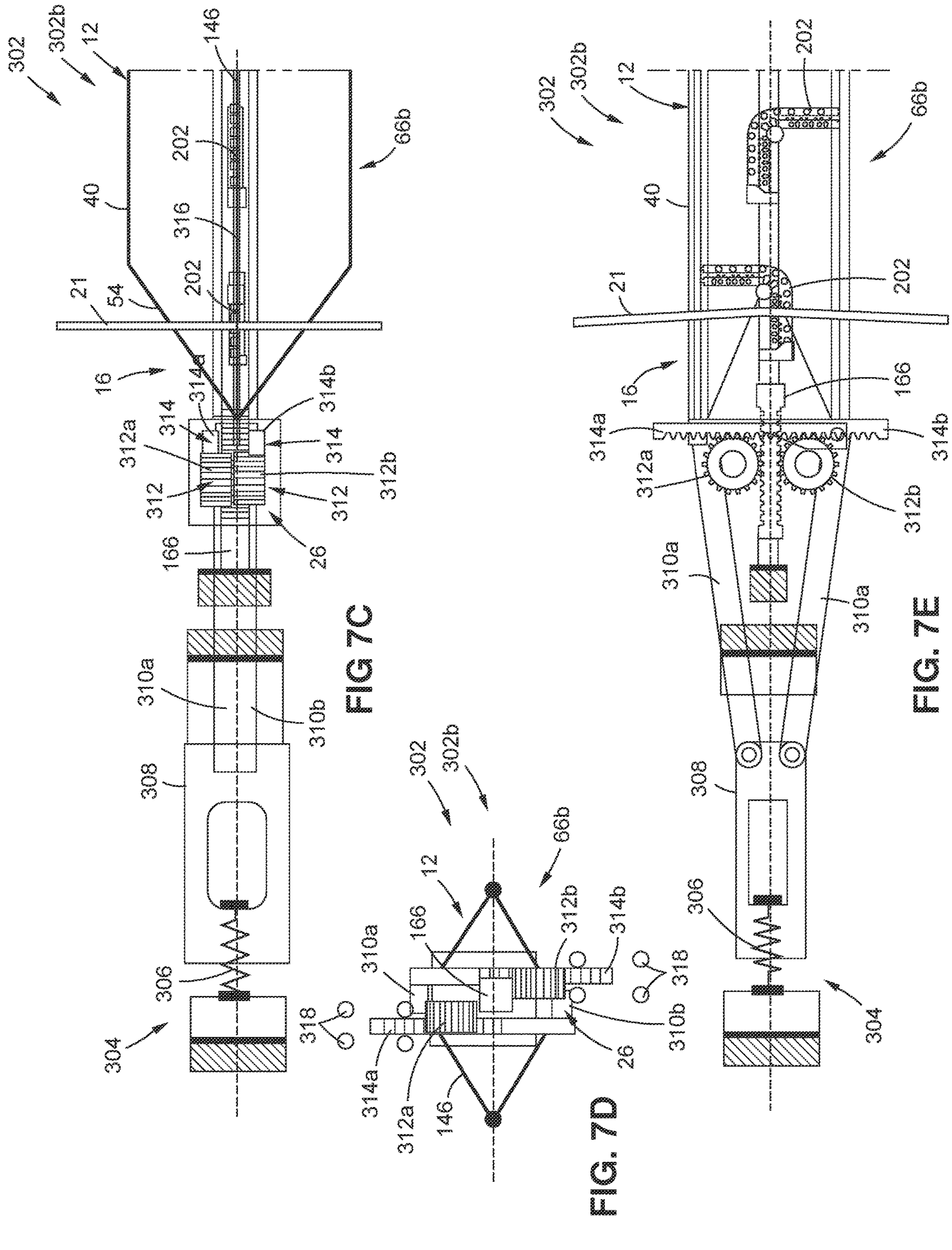
FIG. 7C is an illustration of a top view of a schematic diagram of the expandable strut assembly of FIG. 7A, in the intermediate expanded position, at the strut root, and showing the spring system in the fuselage.
FIG. 7D is an illustration of a right inboard side view of a schematic diagram of the expandable strut assembly of FIG. 7A, in the intermediate expanded position, at the strut root.
FIG. 7E is an illustration of a front view of a schematic diagram of the expandable strut assembly of FIG. 7C, in the intermediate expanded position.

FIG. 7C is an illustration of a top view of a schematic diagram of the expandable strut assembly 12 of FIG. 7A, in the second position 302*b* of the expansion sequence 302 comprising the intermediate expanded position 66*b*, at the strut root 54 of the strut 40, and showing the spring system 304 in the fuselage 16 attached to the spine member 166 at the second position 302*b* of the expansion sequence 302. FIG. 7C shows the spring system 304 with the spring 306 attached to the block member 308, which, in turn, is attached to the upper slanted bar 310*a* and the lower slanted bar 310*b*. FIG. 7C further shows the rack-and-pinion system 26 with the gears 312 comprising the first gear 312*a* and the second gear 312*b*, coupled to the vertical racks 314 comprising the first vertical rack 314*a* and the second vertical rack 314*b*. FIG. 7C further shows the upper bar 316 of the expandable structure 146, the compression chains 202, the spine member 166, and the center box structure 272 in the strut 40.

FIG. 7D is an illustration of a right inboard side view of a schematic diagram of the expandable strut assembly 12 of FIG. 7A, in the second position 302*b* of the expansion sequence 302 comprising the intermediate expanded position 66*b*, at the strut root 54 (see FIG. 7C).). FIG. 7D shows the expandable structure 146, the spine member 166, the upper slanted bar 310*a*, the lower slanted bar 310*b*, and the rack-and-pinion system 26. FIG. 7D further shows the first gear 312*a* coupled to the first vertical rack 314*a* and the second gear 312*b* coupled to the second vertical rack 314*b*, and shows the first vertical rack 314*a* and the second vertical rack 314*b* coupled to rollers 318.

FIG. 7E is an illustration of a front view of a schematic diagram of the expandable strut assembly 12 of FIG. 7C, in the second position 302*b* of the expansion sequence 302 comprising the intermediate expanded position 66*b*. FIG. 7E shows the spring system 304 with the spring 306 attached to the block member 308, which, in turn, is attached to the upper slanted bar 310*a* and the lower slanted bar 310*b*. As shown in FIG. 7E, in the intermediate expanded position 66*b*, the upper slanted bar 310*a* and the lower slanted bar 310*b* are moved apart from each other, and the upper slanted bar 310*a* slants upward and the lower slanted bar 310*b* slants downward. FIG. 7E further shows the rack-and-pinion system 26 with the first gear 312*a*, the second gear 312*b*, the first vertical rack 314*a*, and the second vertical rack 314*b*. FIG. 7E further shows the compression chains 202 and the spine member 166 in the strut 40.

Figure 7F:
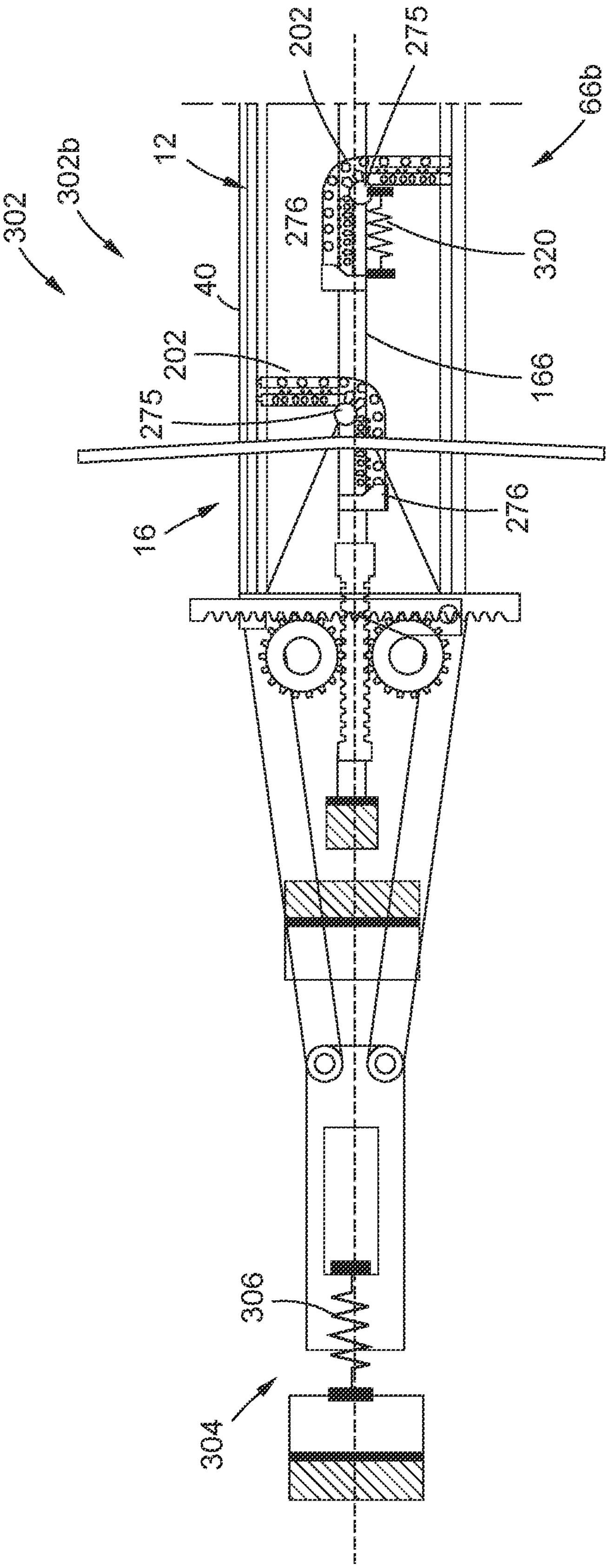
FIG. 7F is an illustration of a front view of a schematic diagram of the expandable strut assembly of FIG. 7E, in the intermediate expanded position, and further showing a compression chain in the strut preloaded by a spring member.

FIG. 7F is an illustration of a front view of a schematic diagram of the expandable strut assembly 12 of FIG. 7E, in the second position 302*b* of the expansion sequence 302 comprising the intermediate expanded position 66*b*, and further showing the compression chain 202 in the strut 40 preloaded by a spring member 320. In this version, one or more of the compression chains 202 are pre-loaded by spring members 320 inside the strut 40. In this version, the spine member 166 may be in the form of a cable or another suitable structure. FIG. 7F shows the spring system 304 with the spring 306 in the fuselage 16, and shows the spring member 320 attached to the compression chain 202 in the strut 40. A first end of the spring member 320 is attached at the compression chain attachment point 276, and a second end of the spring member 320 is attached at the guide member 275. In another version, the spring member 320 is attached to one or more of the compression chains 202 and there is no spring 306 in the fuselage 16.

Figure 8A:
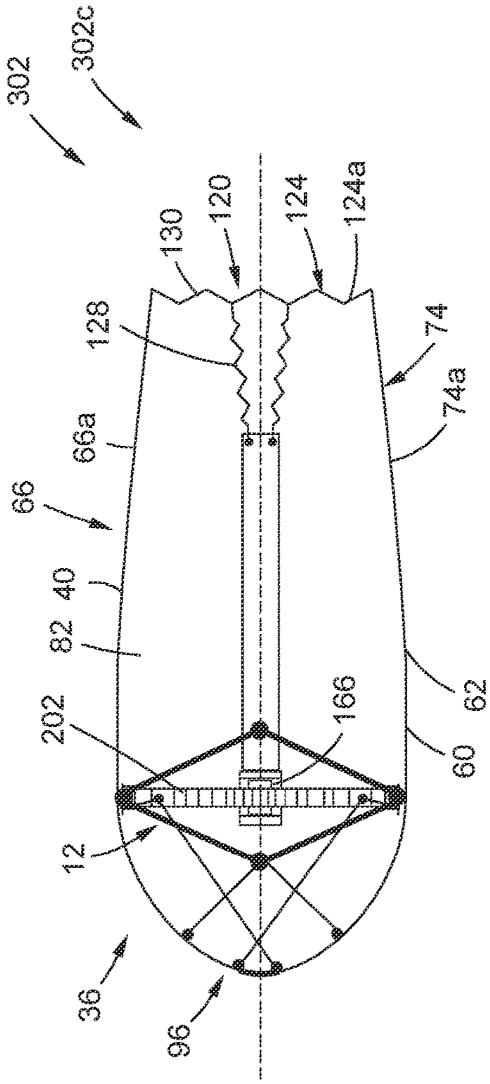
FIG. 8A is an illustration of a left outboard side view of a schematic diagram of the exemplary expandable strut assembly with one spine member in the strut, of FIG. 6A, in an expanded position.

Now referring to FIGS. 8A-8F, FIGS. 8A-8E show a third position 302*c* of the expansion sequence 302. FIG. 8A is an illustration of a left outboard side view of a schematic diagram of the exemplary expandable strut assembly 12 with one spine member 166 in the strut 40, of FIG. 6A, in the third position 302*c* of the expansion sequence 302 comprising the expanded position 66, such as the fully expanded position 66*a*, and showing the strut cross section 60 with the airfoil shape 62 being in the expanded airfoil shape 74, such as the fully expanded airfoil shape 74*a*, for example, when the aircraft 10*c* (see FIG. 2C) is in a minus 1 g pushover flight condition 36 (see FIG. 8A), or any other load condition 28 (see FIG. 1) that results in compression load in the strut 40.

This is the position of the strut 40 during maximum strut compression, and a large moment of inertia prevents strut axial buckling. FIG. 8A further shows the leading edge 96 and the trailing edge 120 of the strut structure 82 and the compression chain 202. FIG. 8A further shows the aft membrane 124 comprising the accordion aft membrane 124*a* having the accordion shape profile 130, when the strut 40 is in the expanded position 66, such as the fully expanded position 66*a*. FIG. 8A further shows the aft membrane spring 128. The other structural features shown in FIG. 4E are discussed with respect to FIG. 6A.

Figure 8B:
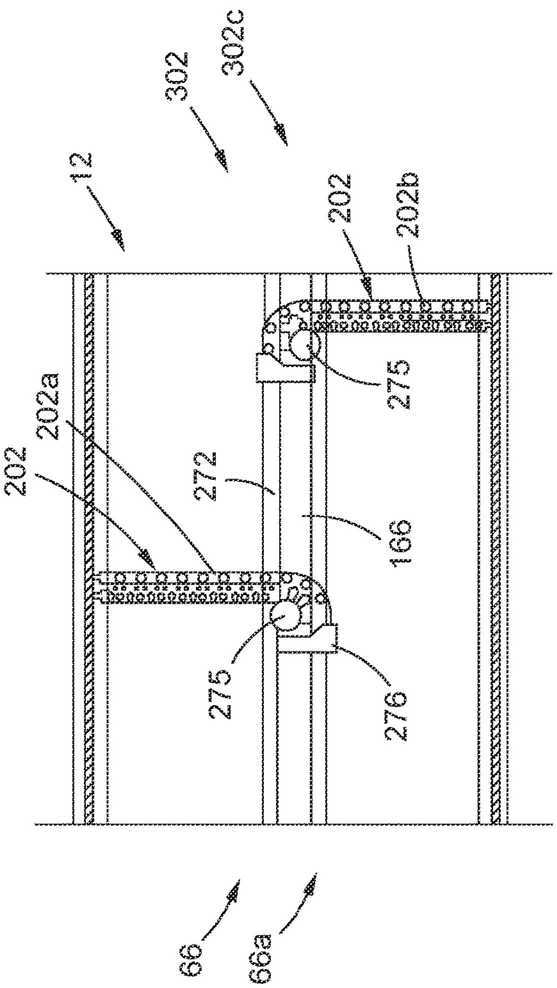
FIG. 8B is an illustration of a front view of a schematic diagram of the spine member attached to compression chains of the expandable strut assembly of FIG. 8A, in the expanded position.

FIG. 8B is an illustration of a front view of a schematic diagram of the spine member 166 attached to the compression chains 202, such as the first compression chain 202*a* and the second compression chain 202*b*, each adjacent the guide member 275, of the expandable strut assembly 12 of FIG. 8A, in the third position 302*c* of the expansion sequence 302 comprising the expanded position 66, such as the fully expanded position 66*a*. FIG. 7B further shows the center box structure 272 and the compression chain attachment point 276.

Figures 8C, 8D, 8E:
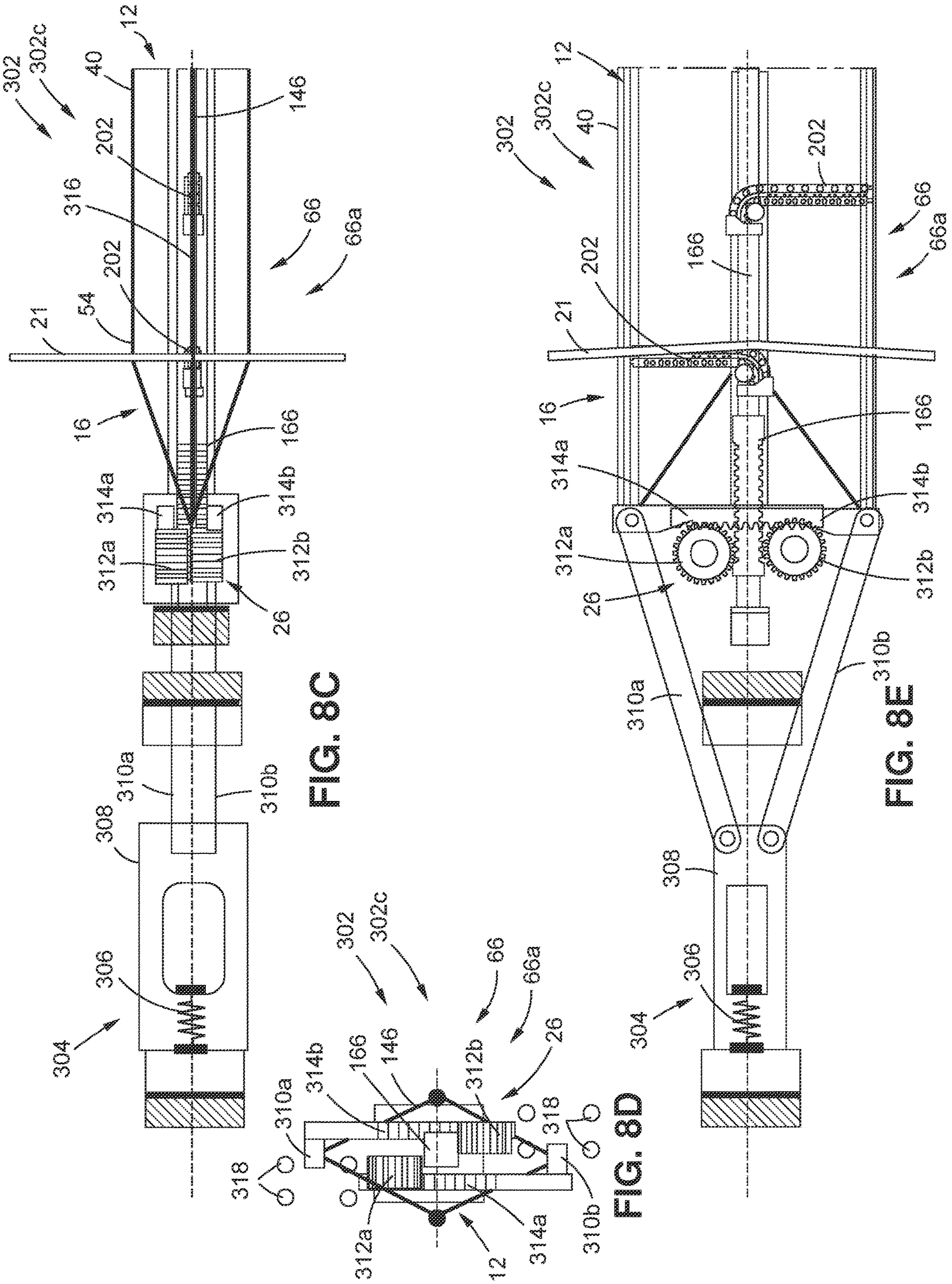
FIG. 8C is an illustration of a top view of a schematic diagram of the expandable strut assembly of FIG. 8A, in the expanded position, at the strut root, and showing the spring system in the fuselage attached.
FIG. 8D is an illustration of a right inboard side view of a schematic diagram of the expandable strut assembly of FIG. 8A, in the expanded position, at the strut root.
FIG. 8E is an illustration of a front view of a schematic diagram of the expandable strut assembly of FIG. 8C, in the expanded position.

FIG. 8C is an illustration of a top view of a schematic diagram of the expandable strut assembly 12 of FIG. 8A, in the third position 302*c* of the expansion sequence 302 comprising the expanded position 66, such as the fully expanded position 66*a*, at the strut root 54, and showing the spring system 304 with the spring 306 attached to the block member 308, which, in turn, is attached to the upper slanted bar 310*a* and the lower slanted bar 310*b*. FIG. 8C further shows the rack-and-pinion system 26 with the first gear 312*a*, the second gear 312*b*, the first vertical rack 314*a*, and the second vertical rack 314*b*. FIG. 8C further shows the upper bar 316 of the expandable structure 146, the compression chains 202, and the spine member 166 in the strut 40.

FIG. 8D is an illustration of a right inboard side view of a schematic diagram of the expandable strut assembly 12 of FIG. 8A, in the third position 302*c* of the expansion sequence 302 comprising the expanded position 66, such as the fully expanded position 66*a*, at the strut root 54 (see FIG. 8C). FIG. 8D shows the expandable structure 146, the spine member 166, the upper slanted bar 310*a*, the lower slanted bar 310*b*, and the rack-and-pinion system 26. FIG. 8D further shows the first gear 312*a* coupled to the first vertical rack 314*a* and the second gear 312*b* coupled to the second vertical rack 314*b*, and shows the first vertical rack 314*a* and the second vertical rack 314*b* coupled to rollers 318.

FIG. 8E is an illustration of a front view of a schematic diagram of the expandable strut assembly 12 of FIG. 8C, in the third position 302*c* of the expansion sequence 302 comprising the expanded position 66, such as the fully expanded position 66*a*. FIG. 8E shows the spring system 304 with the spring 306 attached to the block member 308, which, in turn, is attached to the upper slanted bar 310*a* and the lower slanted bar 310*b*. As shown in FIG. 8E, in the expanded position 66, such as the fully expanded position 66*a*, the upper slanted bar 310*a* and the lower slanted bar 310*b* are moved even further apart from each other, as compared to the intermediate expanded position 66*b*, and the upper slanted bar 310*a* slants upward and the lower slanted bar slants downward. FIG. 8E further shows the rack-and-pinion system 26 with the first gear 312*a*, the second gear 312*b*, the first vertical rack 314*a*, and the second vertical rack 314*b*. FIG. 8E further shows the compression chains 202 and the spine member 166 in the strut 40.

Figure 9A:
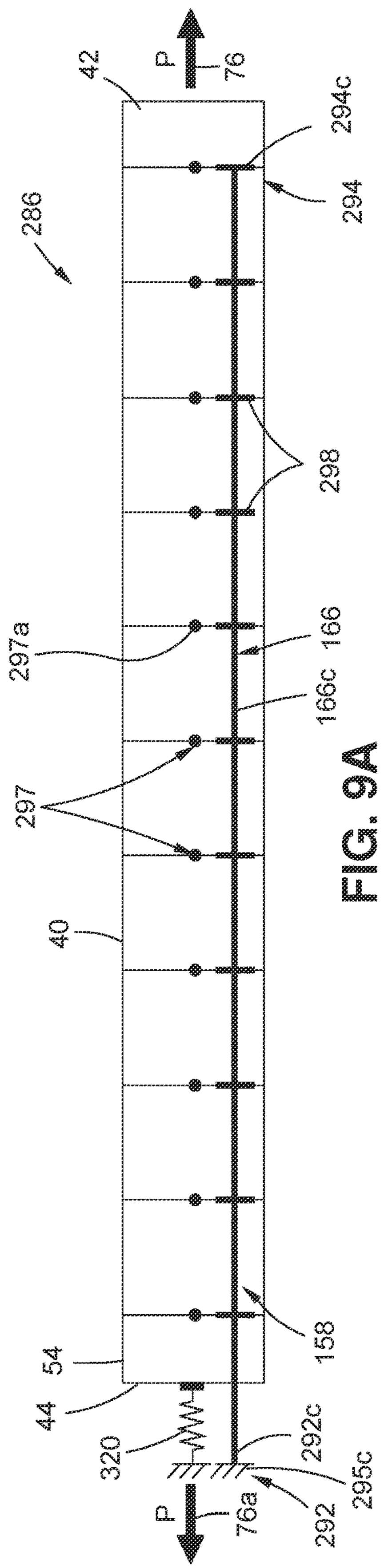
FIG. 9A is an illustration of a top view of a schematic diagram of one spine member of an exemplary expandable strut assembly, in an undeflected position.
Figure 9B:
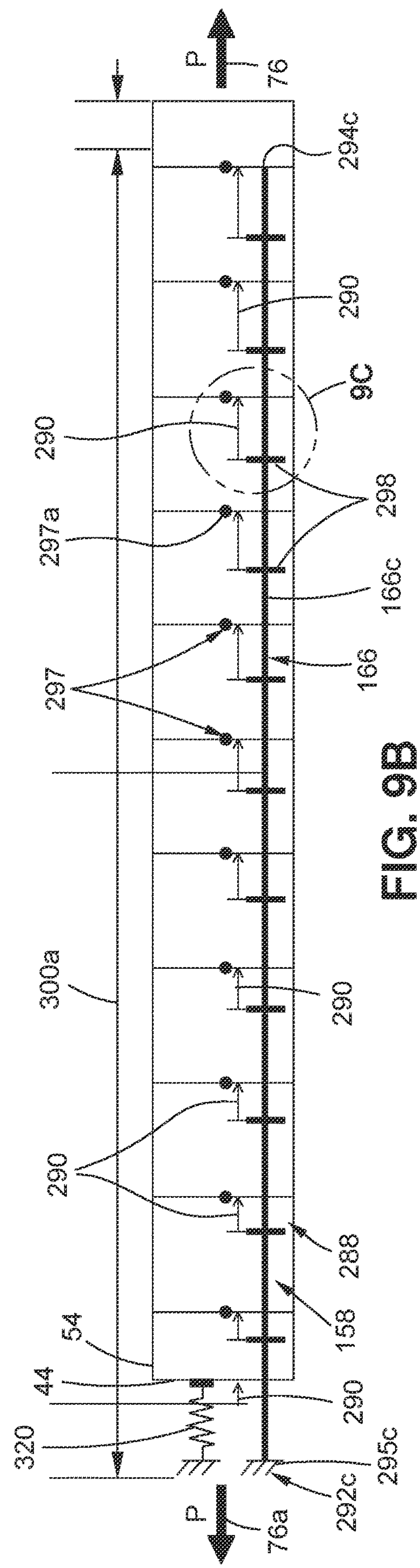
FIG. 9B is an illustration of a top view of a schematic diagram of the one spine member of FIG. 9A, in a deflected position.
Figure 9C:
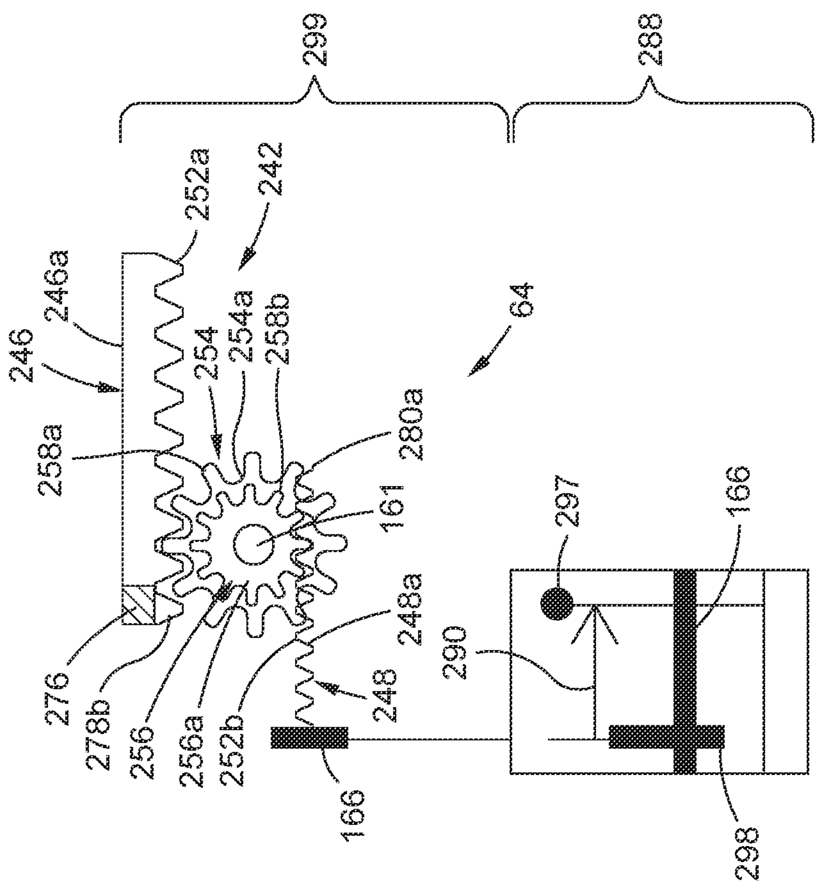
FIG. 9C is an illustration of a schematic diagram of an enlarged top view of circle 9C of FIG. 9B, showing a station of the one spine member coupled to a reduction gear system, in the deflected position.

Now referring to FIGS. 9A-9C, FIGS. 9A-9C show schematic diagrams of the strut 40 with one spine member 166 (see FIG. 9A) used as the actuation mechanism 158 (see FIG. 5A) in an exemplary expandable strut assembly 12, as shown in FIGS. 6A-6E. FIG. 9A is an illustration of a top view of a schematic diagram of one spine member 166 of an exemplary expandable strut assembly 12 (see FIGS. 1, 6A-6E), in the undeflected position 286 in the strut 40. FIG. 9B is an illustration of a top view of a schematic diagram of the one spine member 166 of FIG. 9A, in a deflected position 288 showing relative deflections 290 and a deflection length 300*a* over which the relative deflections 290 occur.

As shown in FIGS. 9A-9B, the spine member 166 has the restrained end 292, such as a restrained end 292*c*, and the unrestrained end 294, such as an unrestrained end 294*c*. The spine member 166 may comprise an immovable spine member 166*c* (see FIGS. 9A-9B) having the restrained end 292*c* attached, via a fixed support attachment structure 295*c* (see FIGS. 9A-9B), to a fuselage structure 22 (see FIGS. 1, 2C) in the interior 20*a* (see FIG. 2C) of the fuselage 16 (see FIG. 2C), and having the unrestrained end 294*c* a free end not connected or attached to any structure. The spine member 166, such as the immovable spine member 166*c*, extends along the length 57 (see FIG. 3A) of the strut 40 (see FIG. 9A). The restrained end 292*c* of the spine member 166 is restrained for the strut axial load 76*a* (see FIGS. 9A-9B), and the unrestrained end 294*c* is unrestrained or free for the axial load (P) 76 (see FIGS. 9A-9B). The spine member 166 is designed to be very rigid in the axial direction.

As shown in FIGS. 9A-9B, the spine member 166 has a plurality of stations 298, or stations, and each station 298, or station, is coupled to the gear reduction system 242 (see FIG. 9C). The gear ratio between the second gear 256 (see FIG. 9C), or spine member gear 256*a* (see FIG. 9C), and the first gear 254 (see FIG. 9C), or compression chain gear 254*a* (see FIG. 9C), is typically different for each station 298, or station, along the length 57 (see FIG. 3A) of the strut 40.

As shown in FIGS. 9A-9B, the actuation mechanism 158 further comprises the plurality of connections 297, such as relative deflection connections 297*a*, or connection points, connecting the spine member 166, such as the immovable spine member 166*c*, to the drive mechanism 154 (see FIGS. 1, 4B) comprising one or more compression chains 202 (see FIGS. 1, 9C).

As further shown in FIGS. 9A-9B, a spring member 320 is added at the inboard end 44 of the strut 40. FIGS. 9A-9B further show the outboard end 42 of the strut 40. The spring member 320 provides a useful relative deflection for the stations 298 near the fuselage 16, and is used to increase the magnitude of relative deflections 290 at the strut root 54 (see FIGS. 9A-9B) from the strut axial load (P) 76*a*.

As shown in FIG. 9B, in the deflected position 288, the spine member 166 has relative deflections 290 between the strut 40 or strut structure 82 (see FIGS. 1, 3A) and the spine member 166 which are used to drive the plurality of compression chains 202 (see FIGS. 6A, 6B, 9C), to transition the strut 40 between the contracted position 64 (see FIGS. 6A, 9C) and the expanded position 66 (see FIG. 8A).

FIG. 9C is an illustration of an enlarged top view of circle 9C of FIG. 9B, of a schematic diagram showing the station 298 of the one spine member 166 coupled to the reduction gear system 242, in the deflected position 288, when the strut 40 (see FIG. 9A) is in the contracted position 64. FIG. 9C shows the relative deflection 290 of the spine member 166 and shows the connection 297.

FIG. 9C further shows the deflected position 288 in relation to the hardware 299 comprising the reduction gear system 242 with the first rack 246, such as the compression chain rack 246*a*, attached to the compression chain attachment point 276. FIG. 9C further shows the second rack 248, such as the spine member rack 248*a*, attached to the spine member 166. As shown in FIG. 9C, the reduction gear system 242 further comprises the first gear 254, such as the compression chain gear 254*a*, and the second gear 256, such as the spine member gear 256*a*, where gear teeth 258*a* of the first gear 254 mesh with rack teeth 252*a* of the first rack 246, and gear teeth 258*b* of the second gear 256 mesh with rack teeth 252*b* of the second rack 248. As shown in FIG. 9C, in the contracted position 64, the first gear 254 and the second gear 256 are positioned at the second end 278*b* of the first rack 246, and are positioned at the first end 280*a* of the second rack 248. FIG. 9C further shows the spindle 161 with the first gear 254 and the second gear 256 coupled to the spindle 161.

In this version of the expandable strut assembly 12, as shown in FIGS. 6A-9C, the position transition 63 (see FIG. 1) of the strut 40 (see FIG. 6A), and the shape transition 69 (see FIG. 1) of the strut cross section 60 (see FIG. 6A), are driven by axial load 76 (see FIG. 1) in the strut 40 by one spine member 166 (see FIGS. 6A, 6C, 9A). Expansion of the strut 40 and the strut cross section 60 is driven by the spine member 166 and compression chains 202 (see FIGS. 8A-8B) which are oriented in the span-wise direction 101 (see FIGS. 3A, 6B). The expandable strut assembly 12 further comprises the rack-and-pinion system 26 (see FIGS. 6C, 6E) in the fuselage 16 that drives expansion of the strut 40 directly, via the spine member 166 and compression chains 202. The spring system 304 (see FIGS. 6C, 6E) allows the strut 40 to move when the axial force is in a certain range. In this version, the expandable structure 146 (see FIG. 6A) has the rhombus shape 150 (see FIG. 6A).

Now referring to FIGS. 10A-10E, FIGS. 10A-10E show a contraction and expansion sequence 322 of an exemplary version of the expandable strut assembly 12 (see FIG. 10A) having the shape transition assembly 140 (see FIG. 10A) with the shape transition mechanism 142 (see FIG. 10A) comprising the plurality of fixed length structural members 144 (see FIG. 10A) forming the expandable structure 146 (see FIG. 10A) having the cross section profile 148 (see FIG. 10A) in the hexagon shape 152 (see FIG. 10A). Further, in this version, the shape transition mechanism 142 comprises the drive mechanism 154 (see FIG. 10A) comprising the plurality of variable length structural members 156 (see FIG. 10A) in the form of a spring assembly 324 attached to one or more of the plurality of fixed length structural members 144. As shown in FIG. 10B, the spring assembly 324 comprises one or more vertical springs 326, such as two vertical springs 326, and one or more horizontal springs 328, such as four horizontal springs 328. The drive mechanism 154 further comprises variable length structural members 156 in the form of one or more cables 172 (see FIGS. 10A, 10B), such as one or more vertical cables 172*a* (see FIGS. 10A, 10B) attached to the actuation mechanism 158 and to one or more of the plurality of fixed length structural members 144.

In this version, the actuation mechanism 158 (see FIGS. 10A, 10B) comprises one or more torque tubes 162 (see FIGS. 10A, 10B), such as two torque tubes 162, connected to the cables 172 of the drive mechanism 154. The one or more torque tubes 162 are rotated by a fuselage structure 22 in the fuselage 16, such as a motor 24 (see FIG. 1), a rack-and-pinion system 26 (see FIGS. 1, 2C), or another suitable fuselage structure. In this version, the activation mechanism 178 (see FIG. 1) comprises the sensor activation mechanism 180 (see FIG. 1) having one or more sensors 330 (see FIG. 2C) on the aircraft 10*b* (see FIG. 2C), to indicate a decrease in the strut tension load 80 (see FIG. 1). When the strut tension load 80 falls below a predetermined strut tension load threshold 80*a* (see FIG. 1), the sensor activation mechanism 180 activates the actuation mechanism 158.

In this version of the expandable strut assembly 12, as shown in FIGS. 10A-10E, the strut 40 is able to carry compression 72 (see FIG. 1), and the strut 40 that is thin has the capability to become thick to withstand compressive load 73 (see FIG. 1). In this version, as shown in FIGS. 10A-10E, the strut 40 for the wing 14 has the strut cross section 60 (see FIG. 10A), where the strut 40 and the strut cross section 60 are thin during the cruise flight condition 34 (see FIG. 1) portion of the flight of the aircraft 10*b* (see FIG. 2C), and expand or extend to the strut 40 and the strut cross section 60 that are larger or thick, when the strut 40 is in compression 72. This allows for the strut 40 that is light in weight to carry the required compressive loads 73 for the wing down-bending flight condition 35 (see FIG. 1) of the wings 14, and enables a more efficient small or thin strut cross section 60 for the cruise flight condition 34 of the flight.

FIG. 10A is an illustration of a left outboard side view of a schematic diagram of another exemplary expandable strut assembly 12 with the spring assembly 324 and cables 172, in a first position 322*a* of the contraction and expansion sequence 322 comprising the expanded position 66, such as the fully expanded position 66*a*, when the aircraft 10*b* (see FIG. 2C) with the expandable strut assembly 12 is in the 1 g on ground condition 30 (see FIG. 1). FIG. 10B is an illustration of a left outboard side view of a schematic diagram of the expandable strut assembly 12 of FIG. 10A, in a second position 322*b* of the contraction and expansion sequence 322 comprising the intermediate contracted position 64*b*, when the aircraft 10*b* with the expandable strut assembly 12 is in the intermediate flight condition 39.

As shown in FIG. 10A, the shape transition mechanism 142 comprises the plurality of fixed length structural members 144 comprising fixed length spars 144*a*, such as forward spars 144*b* and aft spars 144*c*. The forward spars 144*b* and the aft spars 144*c* carry shear in the strut 40. The fixed length spars 144*a* are connected at hinge connectors 218 (see FIG. 10A). The forward spars 144*b* and the aft spars 144*c* each have a first end 332 (see FIG. 10B) attached to a plate 334 (see FIGS. 10A-10B), such as an upper plate 334*a* (see FIGS. 10A-10B), of the strut 40. The forward spars 144*b* and the aft spars 144*c* each further have a second end 336 (see FIG. 10B) attached to a plate 334, such as a lower plate 334*b* (see FIGS. 10A-10B), of the strut 40. The upper plate 334*a* and the lower plate 334*b* preferably comprise a bending material of the strut 40. The bending material may comprise a composite material, or a metal material, or another suitable material. The upper plate 334*a* and the lower plate 334*b* provide a required moment of inertia of the strut 40 to resist buckling. When the upper plate 334*a* and the lower plate 334*b* are far apart from each other, the buckling capacity is increased.

As shown in FIGS. 10A-10B, the shape transition assembly 140 further comprises a center block 338 having a slot 340 through the center block 338. The center block 338 positions the torque tubes 162 within the strut structure 82 of the strut 40. The slot 340 enables the forward spars 144*b* and the aft spars 144*c* to carry shear in the plane of the chord of the strut 40.

As shown in FIGS. 10A-10B, the actuation mechanism 158 of the shape transition assembly 140, which actuates the drive mechanism 154, comprises the torque tubes 162. The torque tubes 162 are driven by a fuselage structure 22 (see FIG. 1), such as a motor 24, a rack-and-pinion system 26, an actuator, or another suitable fuselage structure, located in the interior 20*a* (see FIG. 2C) of the fuselage 16 (see FIG. 2C). The torque tubes 162 actuate or drive the drive mechanism 154 of the shape transition mechanism 142. The torque tubes 162 preferably comprise variable radius spindles 160 (see FIG. 1) that enable a non-linear rate 168 (see FIG. 1) of length change 170 (see FIG. 1), of the plurality of variable length structural members 156 comprising the one or more cables 172 (see FIGS. 1, 10A), for a constant rotation 174 (see FIG. 1) of each of the variable radius spindles 160. The variable radius spindle 160 allows the cables 172 to contract or retract by an appropriate amount.

One or more of the torque tubes 162 may contain compressed air 164 (see FIG. 1) inside the torque tube 162, which may be used to deploy the aft membrane 124 (see FIG. 10A) at the trailing edge 120 (see FIG. 10A) of the strut structure 82 (see FIG. 10A), when the strut 40 expands or extends from the contracted position 64 (see FIG. 10C) to the expanded position 66 (see FIG. 10A), and the strut cross section 60 expands or extends from the contracted airfoil shape 70 (see FIG. 10C) to the expanded airfoil shape 74 (see FIG. 10A). The aft membrane 124 is configured to close off the strut enclosure 126 (see FIG. 10A) of the strut 40.

As shown in FIGS. 10A-10B, the drive mechanism 154 comprises the spring assembly 324. As shown in FIG. 10B, the spring assembly 324 comprises the vertical springs 326, such as a first vertical spring 326*a* and a second vertical spring 326*b* positioned opposite the first vertical spring 326*a*. FIG. 10B shows two vertical springs 326. However, the number of vertical springs 326 may be one vertical spring 326 or more than two vertical springs 326. As shown in FIG. 10B, the first vertical spring 326*a* has a first end 342*a* connected to the upper plate 334*a* and a second end 342*b* connected to the center block 338, and the second vertical spring 326*b* has a first end 344*a* connected to the lower plate 334*b* and a second end 344*b* connected to the center block 338.

When the torque tubes 162 actuate the spring assembly 324, the vertical springs 326 are released and extend or expand upwardly and downwardly from a retracted state 345 (see FIG. 10C), or contracted state, to an extended state 346 (see FIGS. 10A, 10E), or expanded state, and cause the upper plate 334*a* to move upwardly away from the lower plate 334*b*, and cause the lower plate 334*b* to move downwardly away from the upper plate 334*a*, and cause the upper half of the strut 40 to separate away from the lower half of the strut 40. The vertical springs 326 have a large mechanical advantage because they are always in line with the load required to push the upper plate 334*a* and the lower plate 334*b* apart.

As shown in FIG. 10B, the spring assembly 324 further comprises the horizontal springs 328, such as a first pair 328*a* of horizontal springs 328, and a second pair 328*b* of horizontal springs 328, opposite the first pair 328*a*. FIG. 10B shows four horizontal springs 328. However, the number of horizontal springs 328 may be two horizontal springs 328, or more than four horizontal springs 328.

When the torque tubes 162 actuate the spring assembly 324, the horizontal springs 328 are contracted inwardly from an extended state 346*b* (see FIG. 10C) to a retracted state 345*a* (see FIGS. 10A, 10E) and assist in separating the upper half of the strut 40 from the lower half of the strut 40. In the latter stages of separation, the horizontal springs 328 have a mechanical advantage due to a steep angle of the fixed length spars 144*a* of the expandable structure 146. In an initial stage of separation, the horizontal springs 328 do not have the mechanical advantage due to a shallow angle of the fixed length spars 144*a*, and the vertical springs 326 provide the mechanical advantage. The horizontal springs 328 are also compression springs that tend to push the forward and aft vertices together, thus pushing the upper plate 334*a* and the lower plate 334*b* apart.

As shown in FIGS. 10A-10B, the drive mechanism 154 further comprises the variable length structural members 156 in the form of cables 172 attached to the torque tubes 162 and attached to the fixed length structural members 144 at one or more of the hinge connectors 218. When the strut 40 and the strut cross section 60 contract or retract, the cables 172 contract or retract the expandable structure 146, by pulling in the upper plate 334*a* and the lower plate 334*b* toward each other. The cables 172 wind around the circumference of the torque tubes 162, to pull down the upper plate 334*a* downwardly and to pull up the lower plate 334*b* upwardly, to cause the strut 40 and the strut cross section 60 to contract or retract. The cables 172 are resisted by one or more of the vertical springs 326 and the horizontal springs 328 of the spring assembly 324.

FIG. 10A further shows the strut structure 82 with the leading edge 96 having the leading edge skin 98, which has a constant length 102*a* (see FIG. 1), and which is flexible in the chord-wise direction 100 (see FIG. 3A), so that it may easily bend as the strut 40 becomes thinner or thicker. It may be stiff in the span-wise direction 101 (see FIG. 3A). The leading edge skin 98 may have stringers or other structural members. The leading edge 96 further comprises the flexible skin portion 108 (see FIG. 10A) that spans a short distance at the forward-most end 110 (see FIG. 10A) of the leading edge 96. The flexible skin portion 108 is made of a flexible material that may endure a large change in curvature.

FIG. 10A further shows the strut structure 82 with the trailing edge 120 having the trailing edge skin 122, which has a constant length 102*b* (see FIG. 1), and which may be shape changing or morphing, or non-shape changing or non-morphing. FIG. 10A shows the aft membrane 124 in the form of the curved aft membrane 124*b* having the curved shape profile 132 with curves 134, such as two curves 134. The function of the aft membrane 124 is to close off the strut enclosure 126 (see FIG. 10A), to prevent possible buffeting. If there is not adequate air pressure to pull out the aft membrane 124 against the aft membrane spring 128 (see FIG. 10A), optionally, compressed air 164 (see FIG. 1) in one or more of the torque tubes 162 may be used. The aft membrane 124 may be extended as a result of the compressed air 164 being released from an interior of one or more of the torque tubes 162. The aft membrane 124 is made of a flexible material, such as rubber, fabric, or another suitable flexible material. FIG. 10A further shows the aft membrane spring 128 attached to the aft membrane 124. The aft membrane spring 128 pulls the aft membrane 124 back into the strut enclosure 126, as the strut 40 is contracting or retracting. The aft membrane spring 128 is capable of a large range of displacement, with a minimal amount of force. The aft membrane spring 128 may not be needed, if a stretchable aft membrane is used.

As discussed above, in this version, shown in FIG. 10A, the activation mechanism 178 (see FIG. 1) comprises the sensor activation mechanism 180 (see FIG. 1) having one or more sensors 330 (see FIG. 2C) on the aircraft 10*b* (see FIG. 2C), to detect a decrease in the strut tension load 80 (see FIG. 1). When the strut tension load 80 falls below the predetermined strut tension load threshold 80*a* (see FIG. 1), for example, the minus 1 g pushover flight condition 36, which may be a turbulence condition with turbulent air, the sensor activation mechanism 180 activates the actuation mechanism 158. The sensor activation mechanism 180 is coupled to the actuation mechanism 158, such as the torque tubes 162, and the sensor activation mechanism 180 is configured to activate or rotate the torque tubes 162, to initiate the position transition 63 (see FIG. 1) of the strut 40 (see FIG. 10A) between the contracted position 64 (see FIG. 10C), such as the fully contracted position 64*a* (see FIG. 10C), and the expanded position 66 (see FIGS. 10A, 10E), such as the fully expanded position 66*a* (see FIGS. 10A, 10E), and to initiate the shape transition 69 (see FIG. 1) of the strut cross section 60 (see FIG. 10A) between the contracted airfoil shape 70 (see FIG. 10C) such as the fully contracted airfoil shape 70*a* (see FIG. 10C), and the expanded airfoil shape 74 (see FIGS. 10A, 10E), such as the fully expanded airfoil shape 74*a* (see FIGS. 10A, 10E).

FIG. 10A shows the first position 322*a* of the contraction and expansion sequence 322, where the strut 40 is in the expanded position 66, such as the fully expanded position 66*a*, and the strut cross section 60 is in the expanded airfoil shape 74, such as the fully expanded airfoil shape 74*a*, where the aircraft 10*b* (see FIGS. 1, 2C) is in the 1 g on ground condition 30. FIG. 10A shows the horizontal springs 328 holding the upper plate 334*a* apart from the lower plate 334*b*. In the expanded position 66, the horizontal springs 328 (see FIG. 10A) have mechanical advantage and are able to hold the plates 334 (see FIG. 10A) apart and maintain the bending integrity of the strut cross section 60 and strut section. A span-wise moment from beam-column effects, as the strut 40 is in compression 72 (see FIG. 1) are taken primarily by the upper plate 334*a* and the lower plate 334*b*. However, the leading edge skin 98 (see FIG. 10A), and the trailing edge skin 122 (see FIG. 10A), as well as the fixed length spars 144*a*, may also be designed to carry moment. FIG. 10A further shows the height 68, such as a fully expanded height 68*a*, of the strut cross section 60 of the strut 40.

FIG. 10B shows the second position 322*b* of the contraction and expansion sequence 322, where the strut 40 is in the intermediate contracted position 64*b*, and the strut cross section 60 with the airfoil shape 62 is in the intermediate contracted airfoil shape 70*b*, where the aircraft 10*b* (see FIG. 1) is in the intermediate flight condition 39. The fuselage structure 22 (see FIGS. 1, 2C) in the fuselage 16, such as the motor 24 (see FIG. 1), the rack-and-pinion system 26 (see FIGS. 1, 2C), or another suitable fuselage structure, rotates each torque tube 162 about its axis.

As shown in FIG. 10B, the torque tubes 162 comprise a forward torque tube 162*a* and an aft torque tube 162*b*. In this version, the torque tube 162, such as the forward torque tube 162*a*, rotates in a clockwise direction, and the other torque tube 162, such as the aft torque tube 162*b*, rotates in a counter-clockwise direction. The rotating torque tubes 162 cause the lengths of the cables 172 (see FIG. 10B) to shorten as they are wound around each torque tube 162, which pulls the upper plate 334*a* (see FIG. 10B) and the lower plate 334*b* (see FIG. 10B) toward each other. This movement is resisted by the horizontal springs 328 (see FIG. 10B), which compress because the cables 172 are much stiffer. The aft membrane spring 128 (see FIG. 10B) starts to pull the aft membrane 124 (see FIG. 10B) into the strut enclosure 126 (see FIG. 10B). The components in the load path 38 (see FIG. 1) include the torque tubes 162, the cables 172, the horizontal springs 328, and the vertical springs 326. The vertical springs 326 resist the cables 172 and compress because the cables 172 are stiffer. As the strut 40 and strut cross section 60 continue to contract, or retract, the leading edge shape control mechanism 112 (see FIG. 10B) enforces a desired shape of the leading edge 96 (see FIG. 10B) at fixed support locations 114 (see FIG. 10B). The slope of the leading edge skin 98 (see FIG. 10B) at the location where it meets the flexible skin portion 108 (see FIG. 10B), can also be enforced. The flexible skin portion 108 bends as it is rotated by the leading edge shape control mechanism 112. It is flexible, and strong enough to carry the air loads over the small vertical span. In the intermediate contracted position 64*b*, the horizontal springs 328 are not providing much resistance because the mechanical advantage has greatly reduced due to the shallow angle. FIG. 10B further shows the height 68, such as an intermediate contracted height 68*b*, of the strut cross section 60 of the strut 40. The intermediate contracted height 68*b* in FIG. 10B is less than the fully expanded height 68*a* in FIG. 10A.

FIG. 10C is an illustration of a left outboard side view of a schematic diagram of the expandable strut assembly 12 of FIG. 10A, in a third position 322*c* of the contraction and expansion sequence 322 comprising the strut 40 in the contracted position 64, such as the fully contracted position 64*a*, and comprising the strut cross section 60 having the airfoil shape 62 in the contracted airfoil shape 70, such as the fully contracted airfoil shape 70*a*, when the aircraft 10*b* (see FIGS. 1, 2C) with the expandable strut assembly 12 is in the cruise flight condition 34. With the thin position for the cruise flight condition 34 (see FIG. 10C), the torque tubes 162 pull on the cables 172, which contract or retract the upper plate 334*a* (see FIG. 10C) and the lower plate 334*b* (see FIG. 10C) of the strut structure 82 toward each other.

Since the strut 40 is in tension 78 (see FIG. 1) for the third position 322*c*, the load path 38 (see FIG. 1) is not relevant, since there is no moment from the beam-column behavior that would be present if the strut 40 were in compression 72. However, the leading edge skin 98 (see FIG. 10A) and the trailing edge skin 122 (see FIG. 10A), as well as the fixed length spars 144*a* (see FIG. 10A), can also be designed to carry tension 78. FIG. 10C further shows the height 68, such as a fully contracted height 68*c*, of the strut cross section 60 of the strut 40. The fully contracted height 68*c* in FIG. 10C is less than the fully expanded height 68*a* in FIG. 10A, and is less than the intermediate contracted height 68*b* in FIG. 10B.

Figure 10D:
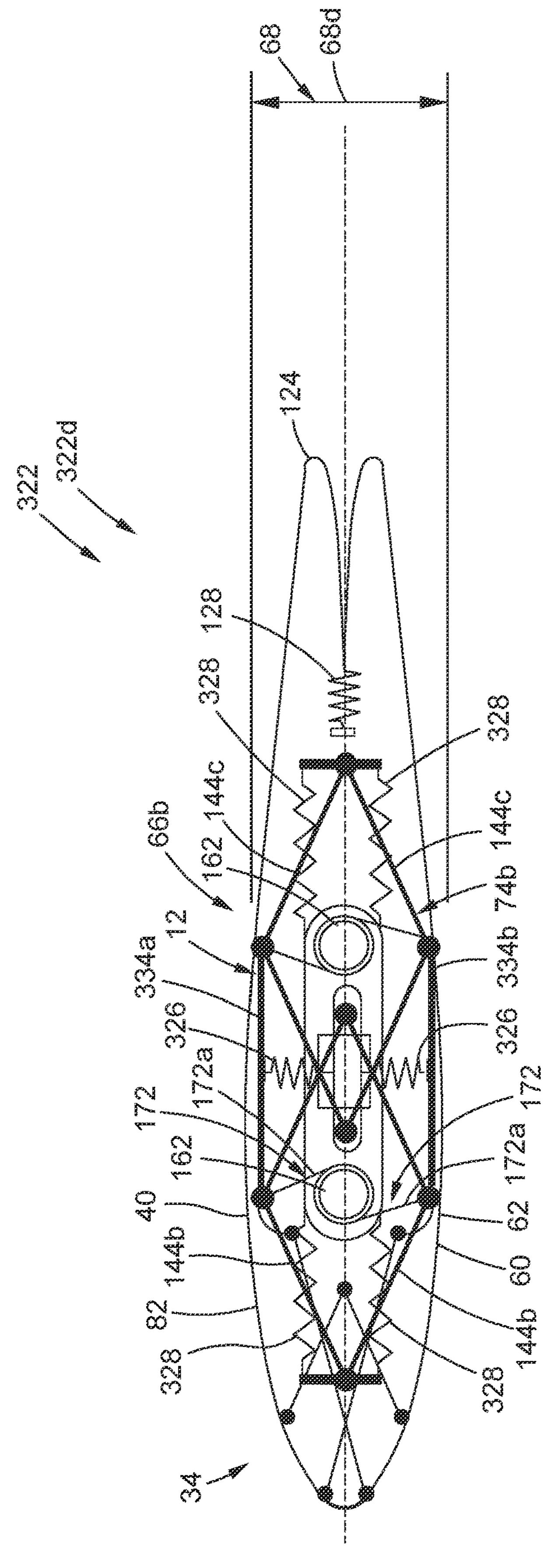
FIG. 10D is an illustration of a left outboard side view of a schematic diagram of the expandable strut assembly of FIG. 10A, in an intermediate expanded position.

FIG. 10D is an illustration of a left outboard side view of a schematic diagram of the expandable strut assembly 12 of FIG. 10A, in a fourth position 322*d* of the contraction and expansion sequence 322 comprising the strut 40 in the intermediate expanded position 66*b*, and comprising the strut cross section 60 having the airfoil shape 62 in the intermediate expanded airfoil shape 74*b*, when the aircraft 10*b* (see FIGS. 1, 2C) with the expandable strut assembly 12 is in the cruise flight condition 34.

During the cruise flight condition 34 (see FIG. 10D), such as level flight, the strut 40 carries a significant amount of tension 78 (see FIG. 1). When the one or more sensors 330 in the aircraft 10*b* (see FIGS. 1, 2C) detect or detects a decrease in the strut tension load 80 (see FIG. 1), such as below the predetermined strut tension load threshold 80*a* (see FIG. 1), the vertical springs 326 and the horizontal springs 328 of the spring assembly 324, release and cause the strut 40 to begin to expand or extend. If the tension 78 in the strut 40 reduces quickly, it may be an indication that the aircraft 10*b* will soon experience acceleration in the downward direction, which would put compression 72 (see FIG. 1) in the strut 40. Before this happens, the aircraft 10*b* responds by releasing the mechanism that retracted the strut 40, allowing the vertical springs 326 (see FIG. 10D) and the horizontal springs 328 (see FIG. 10D) to quickly snap the strut 40 into the expanded position 66 before the strut 40 goes into compression 72. The torque tubes 162 (see FIG. 10D) are allowed to quickly unwind the cables 172 (see FIG. 10D). With no cables 172 restraining the upper and lower halves of the strut structure 82, the vertical springs 326 quickly accelerate the upper plate 334*a* (see FIG. 10D) and the lower plate 334*b* (see FIG. 10D) away from each other. Both the vertical springs 326 and the horizontal springs 328 are engaged. While the horizontal springs 328 are active, they are not effective because they do not have mechanical advantage due to the shallow angle. They will become effective as the angle gets less shallow. That is why the vertical springs 326 are used in the initial phase of the expansion or extension. As the angle of the forward spars 144*b* (see FIG. 10D) and the aft spars 144*c* (see FIG. 10D) increases, the horizontal springs 328 gain mechanical advantage. Compressed air 164 (see FIG. 1) may be released from one or more of the torque tubes 162 (see FIG. 10D), causing the aft membrane 124 (see FIG. 10D) to extend in the aft direction. The pressure from the compressed air 164 is sufficient to overcome the resistance of the aft membrane spring 128 (see FIG. 10D). As the angle formed by the forward spars 144*b* and the aft spars 144*c* increases, the horizontal springs 328 have significant mechanical advantage, and the vertical springs 326 are no longer required. FIG. 10D further shows the height 68, such as an intermediate expanded height 68*d*, of the strut cross section 60 of the strut 40. The intermediate expanded height 68*d* in FIG. 10D is greater than the fully contracted height 68*c* in FIG. 10C, and is less than the fully expanded height 68*a* in FIG. 10A.

Figure 10E:
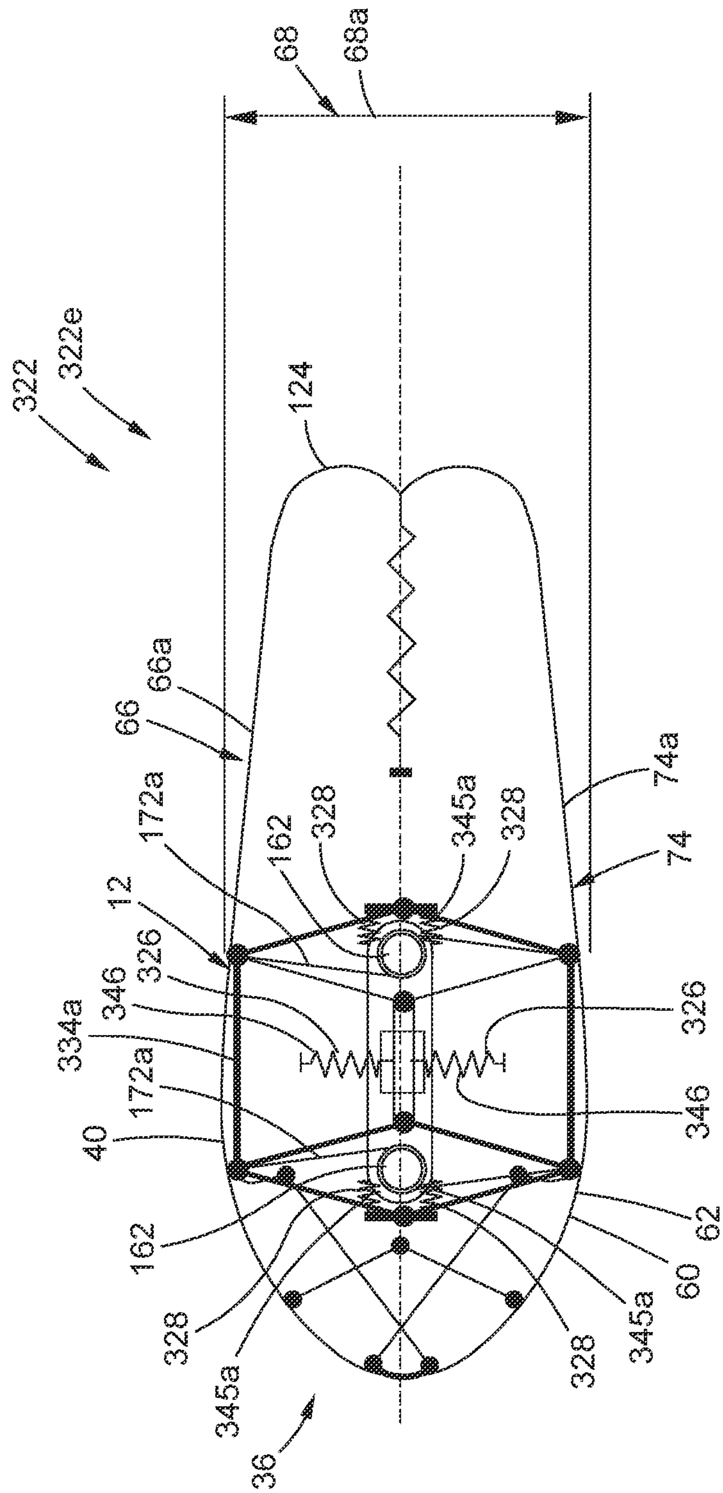
FIG. 10E is an illustration of a left outboard side view of a schematic diagram of the expandable strut assembly of FIG. 10A, in a fully expanded position.

FIG. 10E is an illustration of a left outboard side view of a schematic diagram of the expandable strut assembly of FIG. 10A, in a fifth position 322*e* of the contraction and expansion sequence 322 comprising the strut 40 in the expanded position 66, such as the fully expanded position 66*a*, and comprising the strut cross section 60 having the airfoil shape 62 in the expanded airfoil shape 74, such as the fully expanded airfoil shape 74*a*, when the aircraft 10*b* (see FIGS. 1, 2C) with the expandable strut assembly 12 is in a minus 1 g pushover flight condition 36. In the fifth position 322*e*, the strut 40 expands into the expanded position 66 (see FIG. 10E), such as the fully expanded position 66*a* (see FIG. 10E), to passively lock the strut 40 into a safe condition for the minus 1 g pushover flight condition 36 (see FIG. 10E).

With the strut halves fully extended, and the upper plate 334*a* (see FIG. 10E) far apart, the strut 40 is capable of resisting the compressive load 73 (see FIG. 1) and the axial load 76 (see FIG. 1) from the minus 1 g pushover flight condition 36. The horizontal springs 328 (see FIG. 10E) hold the upper plate 334*a* (see FIG. 10E) and the lower plate 334*b* (see FIG. 10E) apart. In the expanded position 66, such as the fully expanded position 66*a*, the vertical springs 326 (see FIG. 10E) keep the upper plate 334*a* and the lower plate 334*b* apart, and the horizontal springs 328 have mechanical advantage and are able to hold the upper plate 334*a* and the lower plate 334*b* apart and maintain the bending integrity of the strut 40 and the strut section. Compressed air 164 (see FIG. 1) in the one or more torque tubes 162 (see FIG. 10E) act upon the aft membrane 124 (see FIG. 10E), and pressure from the compressed air 164 acting upon the aft membrane 124 is sufficient for it to hold its shape in the turbulent air flow aft of the strut cross section 60. When turbulence, such as the turbulent air flow, has passed, the aircraft 10*b* (see FIGS. 1, 2C) may re-enter the cruise flight condition 34.

The vertical springs 326 may be designed to extend such that they contact the upper plate 334*a* and the lower plate 334*b* to the fully expanded position 66*a*. However, as shown in FIG. 10E, the vertical springs 326 are designed to not extend, such that they do not contact the upper plate 334*a* and the lower plate 334*b* to the full extent of the strut 40 in the fully expanded position 66*a*. This has the advantage of enabling each the vertical springs 326 to be more compact, such that it occupies less vertical distance, thus allowing the thin position to be as thin as possible.

FIG. 10E further shows the height 68, such as the fully expanded height 68*a*, of the strut cross section 60 of the strut 40. The fully expanded height 68*a* in FIG. 10E is greater than the fully contracted height 68*c* in FIG. 10C, is greater than the intermediate expanded height 68*d* in FIG. 10D, and is the same as the fully expanded height 68*a* in FIG. 10A.

Now referring to FIGS. 11A-11E, FIGS. 11A-11E show an expansion and contraction sequence 348 of an exemplary version of the expandable strut assembly 12 (see FIG. 11A) having the shape transition assembly 140 (see FIG. 11A) with the shape transition mechanism 142 (see FIG. 11A) comprising the plurality of fixed length structural members 144 (see FIG. 11A) forming the expandable structure 146 (see FIG. 11A) having the cross section profile 148 (see FIG. 11A) in the hexagon shape 152 (see FIG. 11A). Further in this version, the fixed length structural members 144 include inner brace members 145 (see FIGS. 11A-11E) attached between the upper plate 334*a* (see FIG. 11C) and the slot 340 (see FIG. 11C) of the center block 338 (see FIG. 11C), and attached between the lower plate 334*b* (see FIG. 11C) and the slot 340 of the center block 338. The inner brace members 145 are attached to the slot 340, via hinge connectors 218*a* (see FIG. 11C). The inner brace members 145 are designed to provide additional support or bracing to the shape transition mechanism 142 (see FIGS. 11A, 11C) and are designed to carry chord-wise shear.

Further, in this version, the shape transition mechanism 142 comprises the drive mechanism 154 (see FIG. 11A) comprising the plurality of variable length structural members 156 (see FIG. 11A) in the form of a cam assembly 350 (see FIGS. 11A-11B) comprised of cam elements 352 (see FIGS. 11A-11E) attached to the slot 340 (see FIG. 11C) of the center block 338 (see FIG. 11C) of the shape transition assembly 140 (see FIG. 11C). The cam assembly 350 is designed to move, and to expand or extend the strut 40 and the strut cross section 60. As shown in FIG. 11B, the cam assembly 350 comprises one or more cam elements 352 to expand or extend the strut 40 and the strut cross section 60 having the airfoil shape 62. When the shape transition mechanism 142 is actuated by the actuation mechanism 158 comprising the torque tubes 162 (see FIGS. 11A-11B), the one or more cam elements 352 separate the upper half and lower half of the strut 40 and the strut cross section 60 in an initial stage of expansion or separation. The one or more cam elements 352 provide a mechanical advantage for the initial stage of expansion. As shown in FIG. 11B, in this version, the drive mechanism 154 comprises four (4) cam elements 352, including two upper cam elements 352*a* and two lower cam elements 352*b*. However, in other versions, there can be two cam elements 352 with one upper cam element 352*a* and one lower cam element 352*b*, or there can be more than four cam elements 352, each with an upper cam element 352*a* and a lower cam element 352*b*. Each upper cam element 352*a* is coupled to each lower cam element 352*b* by a pivot pin 354 (see FIGS. 11A-11E), or pivot rod, or another suitable axle, or spindle, that the upper cam element 352*a* and the lower cam element 352*b* are coupled to and pivot with respect to each other. The one or more cam elements 352 may be made of a stiff, strong, and lightweight material, such as a stiff, strong, and lightweight metal material, composite material, or another suitable material. As shown in FIG. 11C, the length of each cam element 352, such as the upper cam element 352*a* and the lower cam element 352*b*, is a sufficient length that does not extend to, or contact, the plates 334, such as the upper plate 334*a* and the lower plate 334*b*. For example, each upper cam element 352*a* (see FIG. 11C) has a length that when fully extended vertically does not extend to or contact the upper plate 334*a*, and the lower cam element 352*b* has a length that when fully extended vertically does not extend to or contact the lower plate 334*b*. The one or more cam elements 352 replace the vertical springs 326 of the shape transition mechanism 142 shown in FIG. 10A, and function similarly to the vertical springs 326.

In this version, the drive mechanism 154 further comprises the plurality of variable length structural members 156 comprising one or more cables 172 (see FIGS. 11A, 11C). As shown in FIG. 11C, the cables 172, such as a plurality of cables 172, comprise one or more vertical cables 172*a*, one or more horizontal cables 172*b* (see also FIGS. 11A-11E) that also assist in expanding or extending the strut 40 and the strut cross section 60, and one or more shear cables 172*c* (see FIGS. 11B-11D). In this version, the horizontal cables 172*b* replace the horizontal springs 328 of the shape transition mechanism 142 shown in FIG. 10A. This eliminates any drooping cable issues and eliminates designing the wing 14 as a cantilever for the minus 1 g pushover flight condition 36 (see FIG. 1). The shear cables 172*c* provide shear stiffness in the chord-wise direction 100 (see FIG. 3A) for the strut 40 and the strut cross section 60.

In this version, the plurality of cables 172 are attached to one of, the actuation mechanism 158 (see FIGS. 11A-11B), such as the torque tubes 162 (see FIGS. 11A-11B), and/or to one or more of the plurality of fixed length structural members 144. For example, as shown in FIG. 11A, the vertical cables 172*a* are attached vertically between the torque tubes 162 and the fixed length structural members 144, via the hinge connectors 218. As further shown in FIG. 11A, the horizontal cables 172*b* are attached horizontally between the torque tubes 162 and the fixed length structural members 144, via the hinge connectors 218. As further shown in FIG. 11C, the shear cables 172*c* are attached between the torque tubes 162 and the fixed length structural members 144, via the hinge connectors 218.

In this version, the actuation mechanism 158 (see FIGS. 11A, 11B) comprises the one or more torque tubes 162 (see FIGS. 11A, 11B), such as two torque tubes 162, connected to the vertical cables 172*a* (see FIG. 11B), the horizontal cables 172*b* (see FIG. 11B), and the shear cables 172*c* (see FIG. 11B), of the drive mechanism 154. The one or more torque tubes 162 are rotated by the fuselage structure 22 (see FIGS. 1, 2C) in the fuselage 16, such as the motor 24 (see FIG. 1), the rack-and-pinion system 26 (see FIGS. 1, 2C), or another suitable fuselage structure. The torque tubes 162 preferably comprise variable radius spindles 160 (see FIG. 1) that enable a non-linear rate 168 (see FIG. 1) of length change 170 (see FIG. 1), of the plurality of variable length structural members 156 comprising the plurality of cables 172 (see FIGS. 1, 11A), for a constant rotation 174 (see FIG. 1) of each of the variable radius spindles 160. The variable radius spindle 160 allows the cables 172 to contract or retract by an appropriate amount.

In this version, the activation mechanism 178 (see FIG. 1) comprises the sensor activation mechanism 180 (see FIG. 1) having one or more sensors 330 (see FIG. 2C) on the aircraft 10*b* (see FIG. 2C), to indicate a decrease in the strut tension load 80 (see FIG. 1). When the strut tension load 80 falls below the predetermined strut tension load threshold 80*a* (see FIG. 1), the sensor activation mechanism 180 activates the actuation mechanism 158.

In this version, as shown in FIGS. 11A-11E, the strut 40 is able to carry compression 72 (see FIG. 1), and the strut 40 that is thin has the capability to become thick to withstand compressive loads 73 (see FIG. 1). In this version, as shown in FIGS. 11A-11E, the strut 40 for the wing 14 (see FIGS. 1, 2B) has the strut cross section 60, where the strut 40 and the strut cross section 60 are thin during the cruise flight condition 34 (see FIG. 11A) of the aircraft 10*b* (see FIG. 1), and expand or extend to the strut 40 and the strut cross section 60 that are larger or thick, when the strut 40 is in compression 72. This allows for the strut 40 that is light in weight to carry the required compressive loads 73 (see FIG. 1) for wing down-bending flight conditions 35 (see FIG. 1) of the wings 14, but enables a more efficient small or thin strut cross section 60 for the cruise portions, such as the cruise flight condition 34, of the flight.

FIG. 11A is an illustration of a left outboard side view of a schematic diagram of another exemplary expandable strut assembly 12 with the cam assembly 350 and horizontal cables 172*b*, and shows the first position 348*a* of the expansion and contraction sequence 348, where the strut 40 is in the contracted position 64, such as the fully contracted position 64*a*, and the strut cross section 60 with the airfoil shape 62 is in the contracted airfoil shape 70, such as the fully contracted airfoil shape 70*a*, when the aircraft 10*b* (see FIG. 1) with the expandable strut assembly 12 is in the cruise flight condition 34.

Similar to the strut structure 82 shown in FIG. 10A, the strut structure 82 shown in FIG. 11A, comprises the fixed length structural members 144 comprising the fixed length spars 144*a*, such as forward spars 144*b* and aft spars 144*c*, connected at hinge connectors 218, and attached to plates 334, such as the upper plate 334*a* (see FIG. 11C) and the lower plate 334*b* (see FIG. 11C), of the strut 40.

The shape transition assembly 140 (see FIG. 11A) further comprises the center block 338 (see FIG. 11C) having the slot 340 (see FIG. 11C) through the center block 338. The center block 338 positions the torque tubes 162 (see FIGS. 11A, 11C) within the strut structure 82 of the strut 40, and also positions the cam elements 352 (see FIG. 11A) of the cam assembly 350 (see FIG. 11A), and positions the inner brace members 145 (see FIG. 11A). The actuation mechanism 158 comprising the torque tubes 162 actuates or moves the drive mechanism 154 (see FIG. 11A) comprising the cam assembly 350 and the horizontal cables 172*b*. One or more of the torque tubes 162 may contain compressed air 164 (see FIG. 1) inside the torque tube 162, which may be used to deploy the aft membrane 124 (see FIG. 11A) at the trailing edge 120 (see FIG. 11A) of the strut structure 82 (see FIG. 10A), when the strut 40 expands or extends from the contracted position 64 (see FIG. 11A) to the expanded position 66 (see FIG. 11C), and the strut cross section 60 expands or extends from the contracted airfoil shape 70 (see FIG. 11A) to the expanded airfoil shape 74 (see FIG. 11C). The aft membrane 124 is configured to close off the strut enclosure 126 (see FIG. 11A) of the strut 40.

When the torque tubes 162 actuate the cam assembly 350, the cam elements 352 are released and extend or expand upwardly and downwardly from a retracted state 356 (see FIGS. 11A, 11E) to an extended state 358 (see FIG. 11C), and cause the plates 334 to separate away from each other. When the torque tubes 162 actuate the cam assembly 350, the horizontal cables 172*b* are contracted inwardly from an extended state 358*a* (see FIGS. 11A, 11E) to a retracted state 356*a* (see FIG. 11C) and assist in separating the upper half of the strut 40 from the lower half of the strut 40.

Similar to FIG. 10A, the strut structure 82 in FIG. 11A shows the leading edge 96 having the leading edge skin 98 and the flexible skin portion 108 at the forward-most end 110, and the leading edge shape control mechanism 112 that enforces a desired shape of the leading edge 96 at fixed support locations 114. Similar to FIG. 10A, the strut structure 82 in FIG. 11A further shows the trailing edge 120 having the trailing edge skin 122, the aft membrane 124 closing off the strut enclosure 126, and the aft membrane spring 128 attached to the aft membrane 124. FIG. 11A further shows the height 68, such as the fully contracted height 68*c*, of the strut cross section 60 of the strut 40.

As shown in FIG. 11A, the expandable strut assembly 12 is in the aircraft 10*b* (see FIGS. 1, 2C) in the cruise flight condition 34, and during level flight, the strut 40 carries a significant amount of tension 78 (see FIG. 1). The one or more sensors 330 (see FIGS. 1, 2C) of the sensor activation mechanism 180 (see FIG. 1) detect a decrease in the strut tension load 80 (see FIG. 1). When the strut tension load 80 falls below the predetermined strut tension load threshold 80*a* (see FIG. 1), the sensor activation mechanism 180 activates the actuation mechanism 158. If the tension 78 in the strut 40 reduces quickly, it may be an indication that the aircraft 10*b* may soon experience acceleration in the downward direction, which puts compression 72 (see FIG. 1) in the strut 40. Before this happens, the aircraft 10*b* responds by releasing the shape transition mechanism 142 that retracted the strut 40, allowing the strut cross section 60 to quickly expand into the expanded position 66 (see FIG. 11C) before the strut 40 goes into compression 72. Thus, the torque tubes 162 are allowed to quickly unwind the cables 172.

FIG. 11B is an illustration of a left outboard side view of a schematic diagram of the expandable strut assembly 12 of FIG. 11A, and shows a second position 348*b* of the expansion and contraction sequence 348, where the strut 40 in in the intermediate expanded position 66*b*, and the strut cross section 60 with the airfoil shape 62 is in the intermediate expanded airfoil shape 74*b*, when the aircraft 10*b* (see FIG. 1) with the expandable strut assembly 12 is in the intermediate flight condition 39.

As shown in FIG. 11B, the cam elements 352 push the two halves of the strut structure 82 apart and push the plates 334 away from each other. The torque tubes 162, such as in the form of variable radius spindles 160 (see FIG. 11B), allow the vertical cables 172*a*, the horizontal cables 172*b*, and the shear cables 172*c* to extend or retract by the appropriate amount. While the horizontal cables 172*b* are active, they are not effective because they do not have mechanical advantage due to the shallow angle. They will become effective as the angle gets less shallow. That is why the cam elements 352 are used in the initial phase of the extension or expansion. As the strut 40 and the strut cross section 60 continue to expand, both the cam elements 352 and the horizontal cables 172*b* are participating in the extension of the strut 40 and the strut cross section 60. As the angle of the forward spars 144*b* and the aft spars 144*c* continues to increase, the horizontal cables 172*b* gain mechanical advantage. Once the horizontal cables 172*b* have significant mechanical advantage, the cam assembly 350 is no longer required to apply force to separate the upper plate 334*a* and the lower plate 334*b*.

FIG. 11B further shows the height 68, such as the intermediate expanded height 68*d*, of the strut cross section 60 of the strut 40. The intermediate expanded height 68*d* in FIG. 11B is greater than the fully contracted height 68*c* in FIG. 11A.

FIG. 11C is an illustration of a left outboard side view of a schematic diagram of the expandable strut assembly 12 of FIG. 11A, and shows a third position 348*c* of the expansion and contraction sequence 348, where the strut 40 is in the expanded position 66, such as the fully expanded position 66*a*, and the strut cross section 60 with the airfoil shape 62 is in the expanded airfoil shape 74, such as the fully expanded airfoil shape 74*a*, when the aircraft 10*b* (see FIGS. 1, 2C) with the expandable strut assembly 12 is in the minus 1 g pushover flight condition 36.

As discussed above, in this version, shown in FIG. 11C, the activation mechanism 178 (see FIG. 1) comprises the sensor activation mechanism 180 (see FIG. 1) having one or more sensors 330 (see FIG. 2C) on the aircraft 10*b* (see FIG. 2C), to detect a decrease in the strut tension load 80 (see FIG. 1). When the strut tension load 80 falls below the predetermined strut tension load threshold 80*a* (see FIG. 1), for example, the minus 1 g pushover flight condition 36, which may be a turbulence condition with turbulent air, the sensor activation mechanism 180 activates the actuation mechanism 158, such as the torque tubes 162, to activate or rotate the torque tubes 162, to initiate the position transition 63 (see FIG. 1) of the strut 40 (see FIG. 11C) between the contracted position 64 (see FIG. 11A), such as the fully contracted position 64*a* (see FIG. 11A), and the expanded position 66 (see FIGS. 11C), such as the fully expanded position 66*a* (see FIG. 11C), and to initiate the shape transition 69 (see FIG. 1) of the strut cross section 60 (see FIG. 10A) between the contracted airfoil shape 70 (see FIG. 11A) such as the fully contracted airfoil shape 70*a* (see FIG. 11A), and the expanded airfoil shape 74 (see FIG. 11C), such as the fully expanded airfoil shape 74*a* (see FIG. 11C).

As shown in FIG. 11C, in this version, the cam elements 352 are designed to not extend such that they contact the upper plate 334*a* and the lower plate 334*b*, to the full extent of the strut 40 in the expanded position 66, such as the fully expanded position 66*a*, and to the full extent of the strut cross section 60 in the expanded airfoil shape 74, such as the fully expanded airfoil shape 74*a*. This has the advantage of enabling the cam elements 352 to be more compact, such that they occupy less vertical distance, thus allowing the thin position of the strut 40 and the strut cross section 60 to be as thin as possible.

With both halves of the strut structure 82 fully expanded or extended, the strut 40 is capable of resisting the compressive load 73 (see FIG. 1), such as compressive axial load, from the minus 1 g pushover flight condition 36. As shown in FIG. 11C, the horizontal cables 172*b* hold the upper plate 334*a* and the lower plate 334*b* apart. In the expanded position 66, such as the fully expanded position 66*a*, the horizontal cables 172*b* have mechanical advantage and are able to hold the plates 334 apart and maintain the bending integrity of the strut 40 and the strut cross section 60. Compressed air 164 (see FIG. 1) in the one or more torque tubes 162 act upon the aft membrane 124 (see FIG. 11C). The pressure acting upon the aft membrane 124 is sufficient for it to hold its shape in the turbulent air flow aft of the strut cross section 60. FIG. 11C shows the aft membrane 124 in the form of the curved aft membrane 124*b* having the curved shape profile 132 with curves 134, such as two curves 134.'

FIG. 11C further shows the height 68, such as the fully expanded height 68*a*, of the strut cross section 60 of the strut 40. The fully expanded height 68*a* in FIG. 11C is greater than the intermediate expanded height 68*d* in FIG. 11B and is greater than the fully contracted height 68*c* in FIG. 11A.

The strut 40 in the fully expanded position 66*a*, and the strut cross section 60 in the fully expanded airfoil shape 74*a*, when the aircraft 10*b* (see FIG. 1) is in the minus 1 g pushover flight condition 36, as shown in FIG. 11C, is the same position as when the aircraft 10*b* is in the 1 g on ground condition 30 (see FIG. 1) on the ground. There are other load conditions 28 (see FIG. 1) that result in compressive loads 73 (see FIG. 1) in the strut 40 (see FIG. 1). When the aircraft 10*b* is on the ground in the 1 g on the ground condition 30, the strut is in the expanded position 66, such as the fully expanded position 66*a*, and the horizontal cables 172*b* hold the plates 334 apart. The span-wise moment from beam-column effects as the strut 40 is in compression 72 are taken primarily by the plates 334. However, the leading edge skin 98 (see FIG. 11A) and the trailing edge skin 122 (see FIG. 11A), as well as the forward spars 144*b* and the aft spars 144*c* (see FIG. 11A), can also be designed to carry moment. The span-wise shear that results from the moment is carried by the forward spars 144*b* and the aft spars 144*c*. Any chord-wise shear is carried by the shear cables 172*c* or the inner brace members 145. The slot 340 (see FIG. 11C) prevents the forward spars 144*b* and the aft spars from rotating as a mechanism.

Figure 11D:
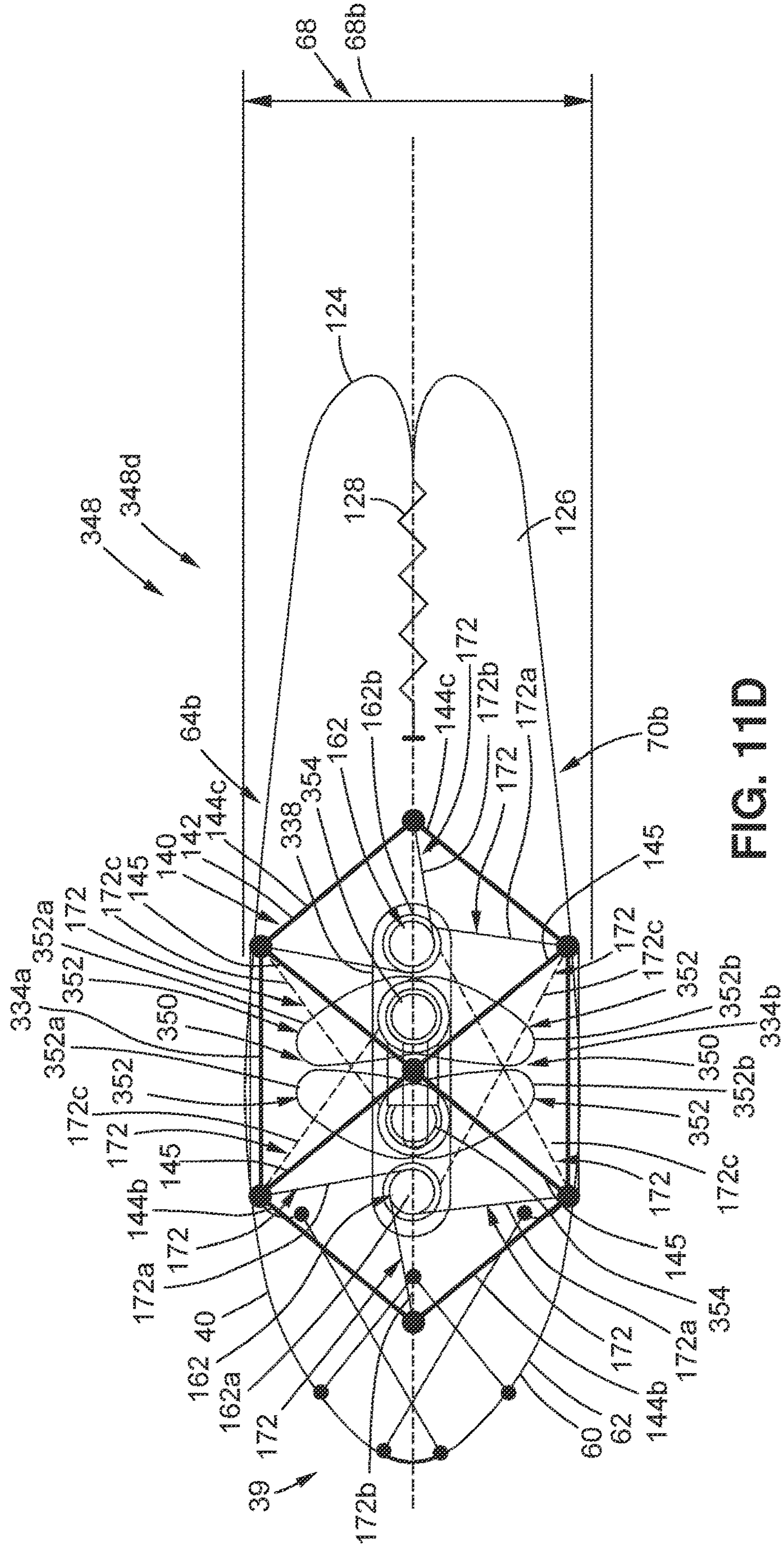
FIG. 11D is an illustration of a left outboard side view of a schematic diagram of the expandable strut assembly of FIG. 11A, in an intermediate contracted position.

FIG. 11D is an illustration of a left outboard side view of a schematic diagram of the expandable strut assembly 12 of FIG. 11A, and shows a fourth position 348*d* of the expansion and contraction sequence 348, where the strut 40 is in the intermediate contracted position 64*b*, and the strut cross section 60 with the airfoil shape 62 is in the intermediate contracted airfoil shape 70*b*, when the aircraft 10*b* (see FIGS. 1, 2C) with the expandable strut assembly 12 is in the intermediate flight condition 39. When turbulence has passed, the aircraft 10*b* can re-enter the cruise flight condition 34. This situation is the same as when the aircraft 10*b* first entered the cruise flight condition 34. When the aircraft 10*b* has reached the cruise flight condition 34, the shape transition mechanism 142 can be commanded to contract or retract. The fuselage structure 22 (see FIGS. 1, 2C) in the fuselage 16 (see FIGS. 1, 2C), such as the motor 24 (see FIG. 1), the rack-and-pinion system 26 (see FIGS. 1, 2C), or another suitable fuselage structure, rotates each of the torque tubes 162 about its axis. In this version, the forward torque tube 162*a* (see FIG. 11D) rotates in the clockwise direction, and the aft torque tube 162*b* (see FIG. 11D) rotates in the counter-clockwise direction. The rotating torque tubes 162 cause the lengths of the vertical cables 172*a* (see FIG. 11D) to shorten as they are wound around the torque tubes 162, which pulls the upper plate 334*a* and the lower plate 334*b* towards each other. The vertical cables 172*a* are allowed to lengthen by the appropriate amount, thus providing stiffness in both the expanding, or extending, and contracting, or retracting, directions. As shown in FIG. 11D, the aft membrane spring 128 starts to pull the aft membrane 124 into the strut enclosure 126.

As the strut 40 and the strut cross section 60 continue to contract or retract, the torque tubes 162, the vertical cables 172*a*, the horizontal cables 172*b*, and the cam elements 352 are in the load path 38 (see FIG. 1). The horizontal cables 172*b* are not providing much resistance at this point because the mechanical advantage has greatly reduced because of the shallow angle.

FIG. 11D further shows the height 68, such as the intermediate contracted height 68*b*, of the strut cross section 60 of the strut 40. The intermediate contracted height 68*b* in FIG. 11D is less that the fully expanded height 68*a* in FIG. 11C, and is greater than the fully contracted height 68*c* in FIG. 11A.

Figure 11E:
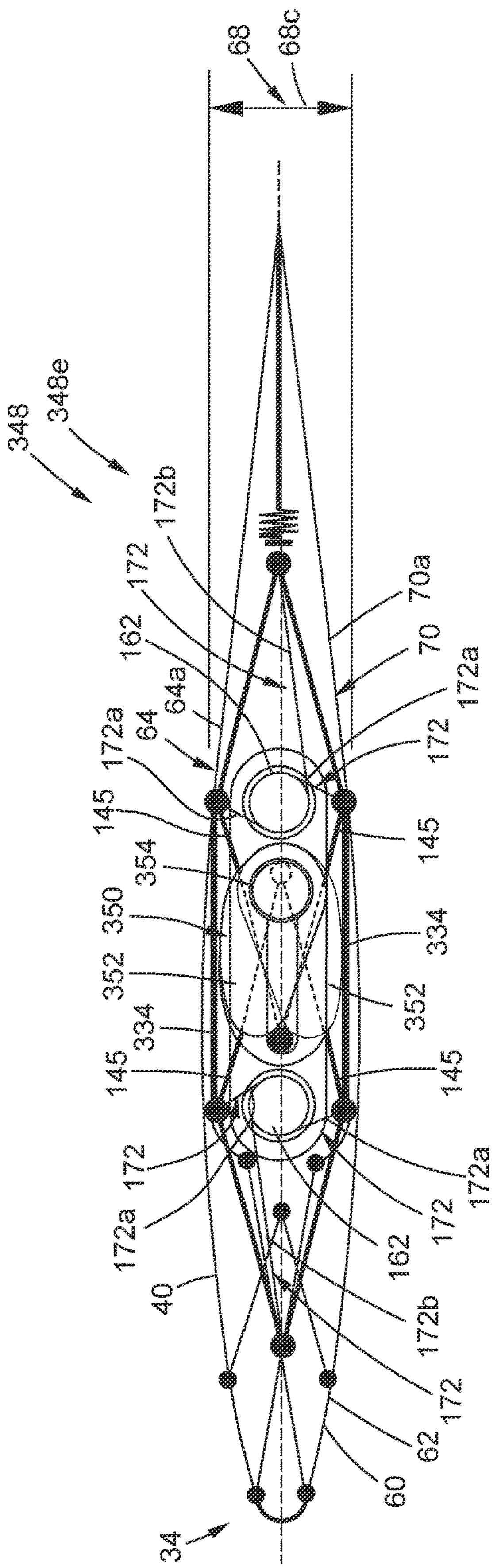
FIG. 11E is an illustration of a left outboard side view of a schematic diagram of the expandable strut assembly of FIG. 11A, in a fully contracted position.

FIG. 11E is an illustration of a left outboard side view of a schematic diagram of the expandable strut assembly 12 of FIG. 11A, and shows a fifth position 348*e* of the expansion and contraction sequence 348, where the strut 40 is in the contracted position 64, such as the fully contracted position 64*a*, and the strut cross section 60 with the airfoil shape 62 is in the contracted airfoil shape 70, such as the fully contracted airfoil shape 70*a*, when the aircraft 10*a* with the expandable strut assembly 12 is in the cruise flight condition 34. The strut 40 is in tension 78 for this position, and there is no moment from the beam-column behavior. FIG. 11E further shows the height 68, such as the fully contracted height 68*c*, of the strut cross section 60 of the strut 40. The fully contracted height 68*c* in FIG. 11E is less than the intermediate contracted height 68*b* in FIG. 11D, is less that the fully expanded height 68*a* in FIG. 11C, and is the same as the fully contracted height 68*c* in FIG. 11A.

Figure 12B:
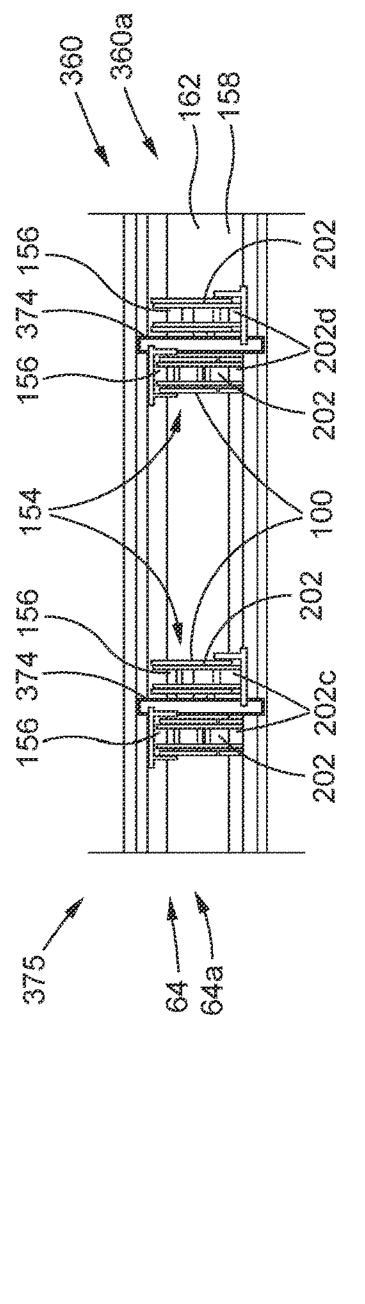
FIG. 12B is an illustration of a front view of a schematic diagram of a portion of the expandable strut assembly of FIG. 12A, in the fully contracted position.
Figure 12C:
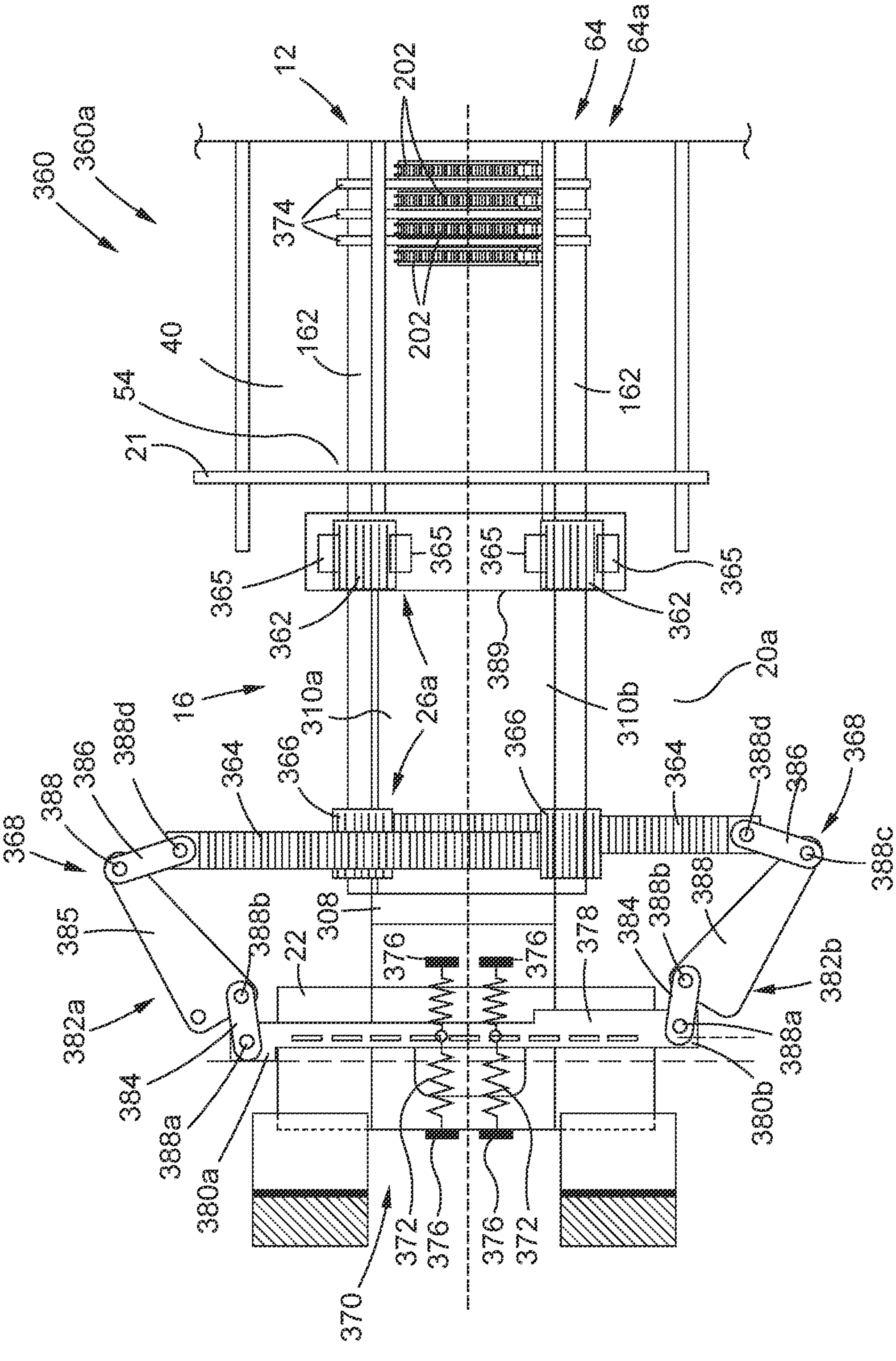
FIG. 12C is an illustration of a top view of a schematic diagram of the expandable strut assembly of FIG. 12A, in the fully contracted position, at a strut root, and showing a rack-and-pinion system in a fuselage.
Figure 12D:
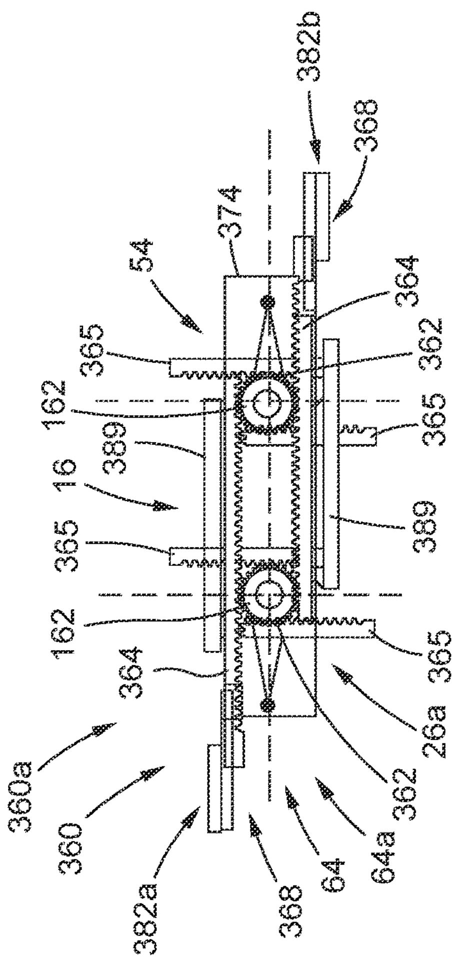
FIG. 12D is an illustration of a right inboard side view of a schematic diagram of the expandable strut assembly of FIG. 12A, in the fully contracted position, at the strut root.
Figure 12E:
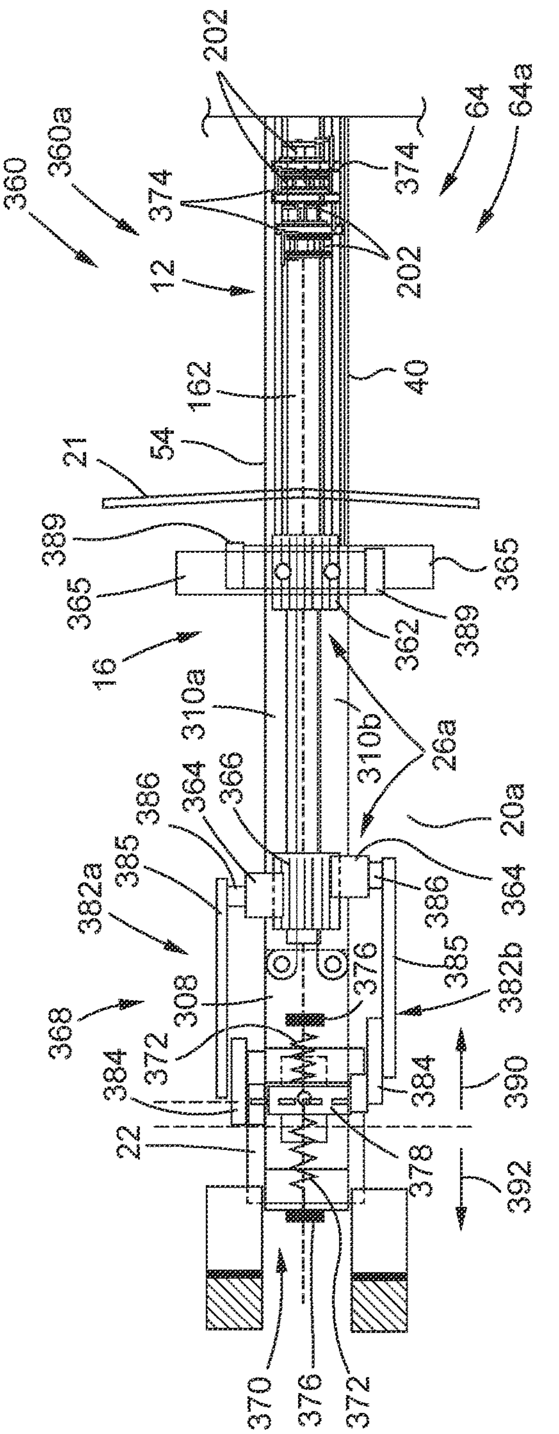
FIG. 12E is an illustration of a front view of a schematic diagram of the expandable strut assembly of FIG. 12C, in the fully contracted position.
Figure 13A:
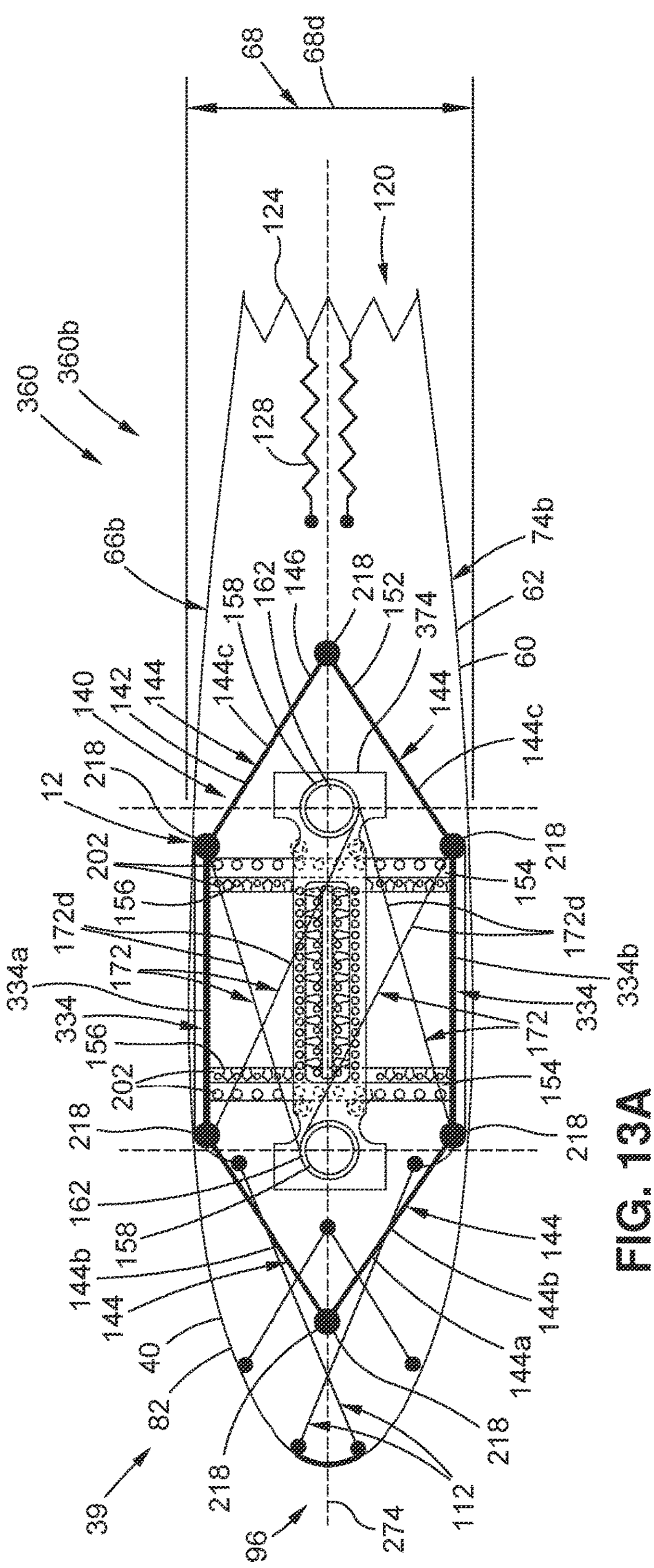
FIG. 13A is an illustration of a left outboard side view of a schematic diagram of the expandable strut assembly of FIG. 12A, in an intermediate expanded position.

Now referring to FIGS. 12A-12E, 13A-13F, and 14A-14E, FIGS. 12A-12E, 13A-13F, and 14A-14E show an expansion sequence 360 of an exemplary version of the expandable strut assembly 12 (see FIG. 12A) having the shape transition assembly 140 (see FIG. 12A) with the shape transition mechanism 142 (see FIG. 12A) comprising the plurality of fixed length structural members 144 (see FIG. 12A) forming the expandable structure 146 (see FIG. 12A) having the cross section profile 148 (see FIG. 12A) in the hexagon shape 152 (see FIG. 12A), and further having the drive mechanism 154 (see FIG. 13B) comprising the plurality of variable length structural members 156 (see FIG. 13B) in the form of compression chains 202 (see FIGS. 12A, 13A, 14A). The benefit of the compression chains 202 is that they can lie flat within the interior of the strut 40 that is thin, and then extend outward to make the strut 40 and the strut cross section 60 thick.

Figure 13B:
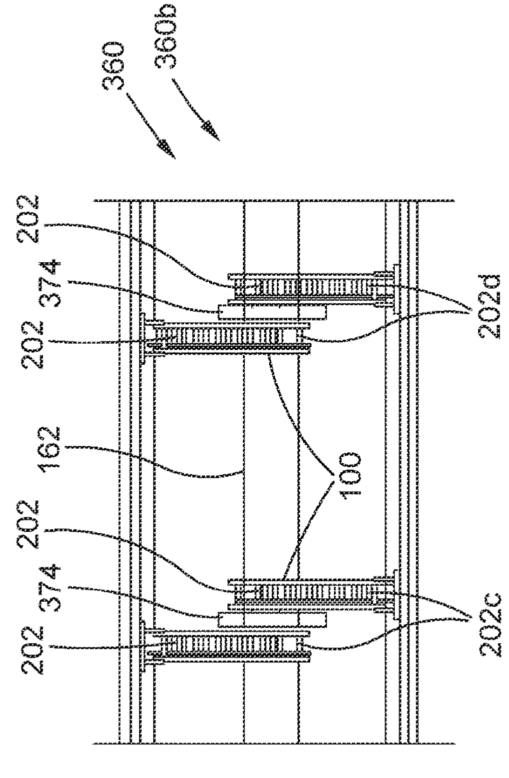
FIG. 13B is an illustration of a front view of a schematic diagram of a portion of the expandable strut assembly of FIG. 13A, in the intermediate expanded position.

In this version, the compression chains 202 are oriented in the chord-wise direction 100 (see FIGS. 12B, 13B). The plurality of variable length structural members 156 further comprise cables 172 (see FIGS. 12A, 13A, 14A) such as cross-bracing cables 172*d* (see FIGS. 12A, 13A, 14A). The cross-bracing cables 172*d* carry chord-wise shear.

In this version, the actuation mechanism 158 (see FIG. 12A) comprises torque tubes 162 (see FIGS. 12A, 13A, 14A) with torque tube gears 362 (see FIG. 12D) on the circumference of each torque tube 162. Further, in this version, the actuation mechanism 158 is actuated with a rack-and-pinion system 26*a* (see FIG. 12C) positioned in the fuselage 16 (see FIG. 12C) of the aircraft 10*b* (see FIG. 1). The rack-and-pinion system 26*a* comprises a horizontal rack 364 (see FIGS. 12C, 12D), a vertical rack 365 (see FIGS. 12D, 12E), gears 366 (see FIGS. 12C, 12E), and a load transfer assembly 368 (see FIGS. 12C-12E) attached to the horizontal rack 364 and the vertical rack 365. The torque tubes 162 rotate, and the torque tube gears 362 on the circumference of each torque tube 162 drive movement of the horizontal rack 364 and the vertical rack 365. As the torque tubes 162 rotate, the compression chains 202 are driven up and down. The compression chains 202 are used to expand the strut 40 (see FIG. 12A) and the strut cross section 60 (see FIG. 12A).

This version further comprises a spring system 370 (see FIGS. 12C, 12E) with springs 372 (see FIGS. 12C, 12E) positioned in the interior 20*a* (see FIGS. 12C, 12E) of the fuselage 16, and the springs 372 are connected to the strut 40. The springs 372 allow the strut 40 to move when axial load 76 (see FIG. 1), such as strut axial load 76*a* (see FIG. 1), is in a predetermined (PREDETER.) strut axial load (SAL) range 76*b* (see FIG. 1). Further, in this version, the activation mechanism 178 (see FIG. 1) comprises the strut axial load driven activation mechanism (MECH.) 182 (see FIG. 1). In this version, the springs 372 of the spring system 370 are in series with the load path 38 (see FIG. 1), such as the primary load path.

When the strut axial load 76*a* (see FIG. 1) falls within a predetermined strut axial load range 76*b* (see FIG. 1), the load is carried by the springs 372, which allow the strut 40 to move. This moment drives the torque tube 162, which causes the strut cross section 60 to expand or become thicker, or contract or become thinner. In this version, the strut 40, such as the wing strut 41 (see FIG. 12A), has the strut cross section 60 (see FIG. 12A) that is thin or small during the cruise flight condition 34 (see FIG. 12A), and the strut cross section 60 expands, so that it is thicker or larger in compression 72 (see FIG. 1). The strut cross section 60 that is thin or small enables lower drag. The expansion of the strut cross section 60 is driven by axial loads 76 (see FIG. 1) in tension 78 (see FIG. 1) and compression 72 in the strut 40, by means of the actuation mechanism 158 in the form of torque tubes 162 and the shape transition mechanism 142 comprising variable length structural members 156 in the form of compression chains 202, which are used to expand and retract the strut cross section 60. This allows for a strut 40 that is light to carry the compressive loads 73 (see FIG. 1) that are needed for the wing down-bending flight condition 35 (see FIG. 1), but enables a more efficient strut cross section 60 that is thin or small for the cruise flight condition 34 of the aircraft 10*a* (see FIGS. 1, 2A).

Now referring to FIGS. 12A-12E, FIGS. 12A-12E show a first position 360*a* of the expansion sequence 360. FIG. 12A is an illustration of a left outboard side view of a schematic diagram of another exemplary expandable strut assembly 12 with variable length structural members 156 comprising the compression chains 202, such as two compression chains 202, although more than two compression chains 202 can be used, and the plurality of cables 172, such as cross-bracing cables 172*d*. As shown in FIG. 12A, the first position 360*a* of the expansion sequence 360 comprises the strut 40 in the contracted position 64, such as the fully contracted position 64*a*, and the strut cross section 60 having the airfoil shape 62 in the contracted airfoil shape 70, such as the fully contracted airfoil shape 70*a*, when the aircraft 10*b* (see FIGS. 1, 2C) with the expandable strut assembly 12 is in the cruise flight condition 34.

As further shown in FIG. 12A, the actuation mechanism 158 comprises the torque tubes 162 with torque tube gears 362 (see FIG. 12D). The torque tubes 162 comprise the forward torque tube 162*a* (see FIG. 12A) and the aft torque tube 162*b* (see FIG. 12B). The one or more torque tubes 162 preferably comprise variable radius spindles 160 (see FIGS. 1, 12A) enabling the non-linear rate 168 (see FIG. 1) of length change 170 (see FIG. 1), of the plurality of variable length structural members 156 comprising the plurality of cables 172, such as the cross-bracing cables 172*d*, for the constant rotation 174 (see FIG. 1) of each of the variable radius spindles 160. In this version, the compression chains 202 wrap around the torque tubes 162, or variable radius spindles 160, and carry compression 72 when they are straight or linear.

FIG. 12A shows the strut structure 82 with the leading edge 96 having the leading edge skin 98 and the flexible skin portion 108 at the forward-most end 110 of the leading edge 96. FIG. 12A further shows the leading edge shape control mechanism 112 attached to the leading edge skin 98 at the plurality of discrete, fixed support locations 114. FIG. 12A further shows the trailing edge 120 comprising the trailing edge skin 122, the aft membrane 124 configured to close off the strut enclosure 126 of the strut 40, and the aft membrane spring 128 attached to the aft membrane 124, and configured to pull the aft membrane 124 back into the strut enclosure 126, when the strut 40 contracts to the contracted position 64.

FIG. 12A further shows the expandable structure 146 with the fixed length structural members 144 comprising the fixed length spars 144*a* in the form of forward spars 144*b* and aft spars 144*c* connected together with hinge connectors 218. FIG. 12A further shows the plates 334, such as the upper plate 334*a* and the lower plate 334*b*. FIG. 12A further shows a center fitting 374 for positioning the torque tubes 162. There can be one center fitting 374, two center fittings 374, three center fittings 374, or more than three center fittings 374. FIG. 12A further shows the centerline 274 through the strut 40 and shows the height 68, such as the fully contracted height 68*c*, of the strut cross section 60.

FIG. 12B is an illustration of a front view of a schematic diagram of a portion 375 of the expandable strut assembly 12 of FIG. 12A, in the first position 360*a* of the expansion sequence 360, with the strut 40 (see FIG. 12A) in the contracted position 64, such as the fully contracted position 64*a*. FIG. 12B shows the variable length structural members 156, such as the compression chains 202, for example, a first set 202*c* of compression chains 202 and a second set 202*d* of compression chains 202, each coupled to the center fitting 374. The compression chains 202 are oriented in the chord-wise direction 100 (see FIG. 12B). FIG. 12B further shows the actuation mechanism 158 comprising the torque tube 162.

FIG. 12C is an illustration of a top view of a schematic diagram of the expandable strut assembly 12 of FIG. 12A, in the first position 360*a* of the expansion sequence 360 comprising the strut 40 in the contracted position 64, such as the fully contracted position 64*a*, at the strut root 54, and showing the rack-and-pinion system 26*a* in the fuselage 16 coupled to the torque tubes 162 at the side 21 of the fuselage 16.

As shown in FIG. 12C, the spring system 370 comprises one or more springs 372 attached to a fuselage structure 22 and attached to the load transfer assembly 368 of the rack-and-pinion system 26*a*, and in particular, attached to a linkage bar 378 of the load transfer assembly 368. Each spring 372 is attached to spring pads 376. FIG. 12C shows two springs 372 attached inboard of the linkage bar 378 on one side of the linkage bar 378, and shows two springs 372 attached outboard of the linkage bar 378 on the other side of the linkage bar 378. The number of springs 372 shown in FIG. 12C is four springs 372. As shown in FIG. 12C, the load transfer assembly 368 comprises a linkage bar 378 having a first end 380*a* and a second end 380*b*. As shown in FIG. 12C, the load transfer assembly 368 further comprises a first linkage assembly 382*a* and a second linkage assembly 382*b*. As further shown in FIG. 12C, each of the first linkage assembly 382*a* and the second linkage assembly 382*b* comprise a first link 384, a second link 385, and a third link 386. As shown in FIG. 12C, the first end 380*a* of the linkage bar 378 is attached to the first link 384 of the first linkage assembly 382*a*, via a pivot pin 388*a*, and the second end 380*b* of the linkage bar 378 is attached to the first link 384 of the second linkage assembly 382*b*, via a pivot pin 388*a*. For each of the first linkage assembly 382*a* and the second linkage assembly 382*b*, the first link 384 is attached to the second link 385, via a pivot pin 388*b*, the second link 385 is attached to the third link 386, via a pivot pin 388*c*, and each third link 386 is attached to a horizontal rack 364, via a pivot pin 388*d*. FIG. 12C further shows the horizontal racks 364, each coupled to a gear 366.

As shown in FIG. 12C, each torque tube 162 is coupled to the gear 366, and each torque tube 162 is further coupled to a torque tube gear 362. FIG. 12C further shows the upper slanted bar 310*a* and the lower slanted bar 310*b* attached to the block member 308. FIG. 12C further shows a mounting structure 389 for mounting, or coupling, to the vertical racks 365, which are in contact with the torque tube gears 362. Each torque tube gear 362 is coupled around the circumference of each respective torque tube 162. FIG. 12C further shows the compression chains 202 positioned in the strut 40 and coupled to the center fittings 374 through which the torque tubes 162 are inserted. Multiple center fittings 374 may be used to allow the compression chains 202 to be positioned in a side-by-side arrangement to save space.

Strut axial load 76*a* (see FIG. 1) drives expansion and contraction of the strut 40 and the strut cross section 60. The set of springs 372 allows the strut root 54 (see FIG. 12C) to move a small distance over a certain load range. This movement drives the expansion and contraction of the strut 40 by means of the load transfer assembly 368 (see FIG. 12C) comprising the linkage bar 378, the first link 384, the second link 385, and the third link 386, and with the rack-and-pinion system 26*a*, and the torque tubes 162. The load transfer assembly 368 is designed to move over a predetermined strut axial load range 76*b* (see FIG. 1). Movement of the load transfer assembly 368, and in particular, the linkage bar 378 by the springs 372, drives the horizontal racks 364. The horizontal racks 364 drive rotation of the torque tubes 162. As the torque tubes rotate 162, the torque tube gears 362 on the circumference of each torque tube 162 drive the vertical racks 365 (see FIGS. 12C, 12D) up and down. The rotating torque tubes 162 drive the first set 202*c* and the second set 202*d* of compression chains 202 (see FIG. 12C) up and down. The rack-and-pinion system 26*a* expands or extends the strut cross section 60 at the strut root 54 (see FIG. 12C). The compression chains 202 in the length of the strut cross section 60 (see FIG. 12A) enable expansion of the strut 40 in a constrained space. The torque tubes 162 are driven by the horizontal racks 364 that are oriented perpendicular to the vertical racks 365, in the forward and aft directions. As the strut 40 moves in and out in response to tension 78 (see FIG. 1) or compression 72 (see FIG. 1) loads, by the load transfer assembly 368 with the first link 384, the second link 385, and the third link 386, the horizontal racks 364 are driven in the forward and aft direction. Depending on how much movement one allows the strut 40 to move in and out will determine the ratios of the various links or lever arms of the load transfer assembly 368.

The torque tubes 162 may also be activated by the activation mechanism 178, such as the sensor activation mechanism 180 (see FIG. 1), the strut axial load driven activation mechanism 182 (see FIG. 1), or another suitable mechanism.

FIG. 12D is an illustration of a right inboard side view of a schematic diagram of the rack-and-pinion system 26*a* coupled to the torque tubes 162 at the strut root 54 using the expandable strut assembly 12 of FIG. 12A, in the first position 360*a* of the expansion sequence 360, comprising the strut 40 (see FIG. 12C) in the contracted position 64, such as the fully contracted position 64*a*. FIG. 12D shows the center fitting 374, the mounting structure 389, the horizontal racks 364 and the vertical racks 365 of the rack-and-pinion system 26*a*, and the load transfer assembly 368 with the first linkage assembly 382*a* and the second linkage assembly 382*b* coupled to the horizontal racks 364. FIG. 12D shows two horizontal racks 364 and four vertical racks 365 in the fuselage 16. Each torque tube gear 362 meshes with two vertical racks 365 that are positioned opposite each other. FIG. 12D further shows the torque tubes 162 with the torque tube gears 362.

FIG. 12E is an illustration of a front view of a schematic diagram of the expandable strut assembly 12 of FIG. 12C, in the first position 360*a* of the expansion sequence 360, comprising the strut 40 in the contracted position 64, such as the fully contracted position 64*a*, at the strut root 54. FIG. 12E shows the spring system 370 with the springs 372 having spring pads 376, attached to the fuselage structure 22, and attached to the linkage bar 378 of the load transfer assembly 368. FIG. 12E further shows the first linkage assembly 382*a* and the second linkage assembly 382*b* of the load transfer assembly 368 in the interior 20*a* of the fuselage 16. 12E further shows the first link 384, the second link 385, and the third link 386 of each of the first linkage assembly 382*a* and the second linkage assembly 382*b*. FIG. 12E further shows the upper slanted bar 310*a* and the lower slanted bar 310*b* coupled to the block member 308 and the strut 40. When the strut 40 is in the contracted position 64, such as the fully contracted position 64*a*, the upper slanted bar 310*a* and the lower slanted bar 310*b* are adjacent each other.

FIG. 12E further shows the rack-and-pinion system 26*a* with the horizontal racks 364 coupled to the gears 366, and the vertical racks 365 coupled to the mounting structure 389 and in contact with the torque tube gear 362. FIG. 12E further shows the torque tube 162 spanning the fuselage 16 and the strut 40 at the side 21 of the fuselage 16, and coupled to the two sets of compression chains 202 in the strut 40. FIG. 12E further shows the center fittings 374 coupled to the torque tube 162 and between the compression chains 202. FIG. 12E further shows a strut compression portion 390 and a strut tension portion 392.

Now referring to FIGS. 13A-13E, FIGS. 13A-13E show a second position 360*b* of the expansion sequence 360. FIG. 13A is an illustration of a left outboard side view of a schematic diagram of the expandable strut assembly 12 of FIG. 12A, with the actuation mechanism 158 comprising the torque tubes 162 having the torque tube gears 362 (see FIG. 13D), and the drive mechanism 154 comprising the cables 172, such as the cross-bracing cables 172*d*, where the strut 40 is in an intermediate expanded position 66*b*, when the aircraft 10*b* (see FIGS. 1, 2C) with the expandable strut assembly 12 is in the intermediate flight condition 39. FIG. 13A further shows the strut cross section 60 with the airfoil shape 62 being in the intermediate expanded airfoil shape 74*b*. When the strut 40 approaches compression loading, the strut cross section 60 starts to expand. The load may be compression load, or the load may be tension load that drops below a predetermined value.

FIG. 13A further shows the leading edge 96 with the leading edge shape control mechanism 112, and the trailing edge 120 with the aft membrane 124 and aft membrane spring 128, of the strut structure 82. FIG. 13A shows the drive mechanism 154, such as the variable length structural members 156, in the form of the compression chains 202, oriented in the chord-wise direction 100 (see FIG. 13B), and the cross-bracing cables 172*d*. FIG. 13A further shows the expandable structure 146 having the hexagon shape 152 of the shape transition mechanism 142 of the shape transition assembly 140 comprising the fixed length structural members 144, such as the fixed length spars 144*a*, for example, the forward spars 144*b* and the aft spars 144*c*, attached together via hinge connectors 218. FIG. 13A further shows the plates 334, such as the upper plate 334*a* and the lower plate 334*b*. FIG. 13A further shows the torque tubes 162 positioned in the center fitting 374. FIG. 13A further shows the centerline 274 through the strut 40 and shows the height 68, such as the intermediate expanded height 68*d*, of the strut cross section 60. The other structural features shown in FIG. 13A are discussed with respect to FIG. 12A.

FIG. 13B is an illustration of a front view of a schematic diagram of a portion 375*a* of the expandable strut assembly 12 of FIG. 13A, in the second position 360*b* of the expansion sequence 360, comprising the strut 40 (see FIG. 13A) in the intermediate expanded position 66*b*. FIG. 13B shows the compression chains 202, for example, the first set 202*c* of compression chains 202 and the second set 202*d* of compression chains 202, each coupled to the center fitting 374. The first set 202*c* of compression chains 202 and the second set 202*d* of compression chains 202 are oriented in the chord-wise direction 100 (see FIG. 11B). FIG. 13B further shows the torque tube 162.

Figure 13C:
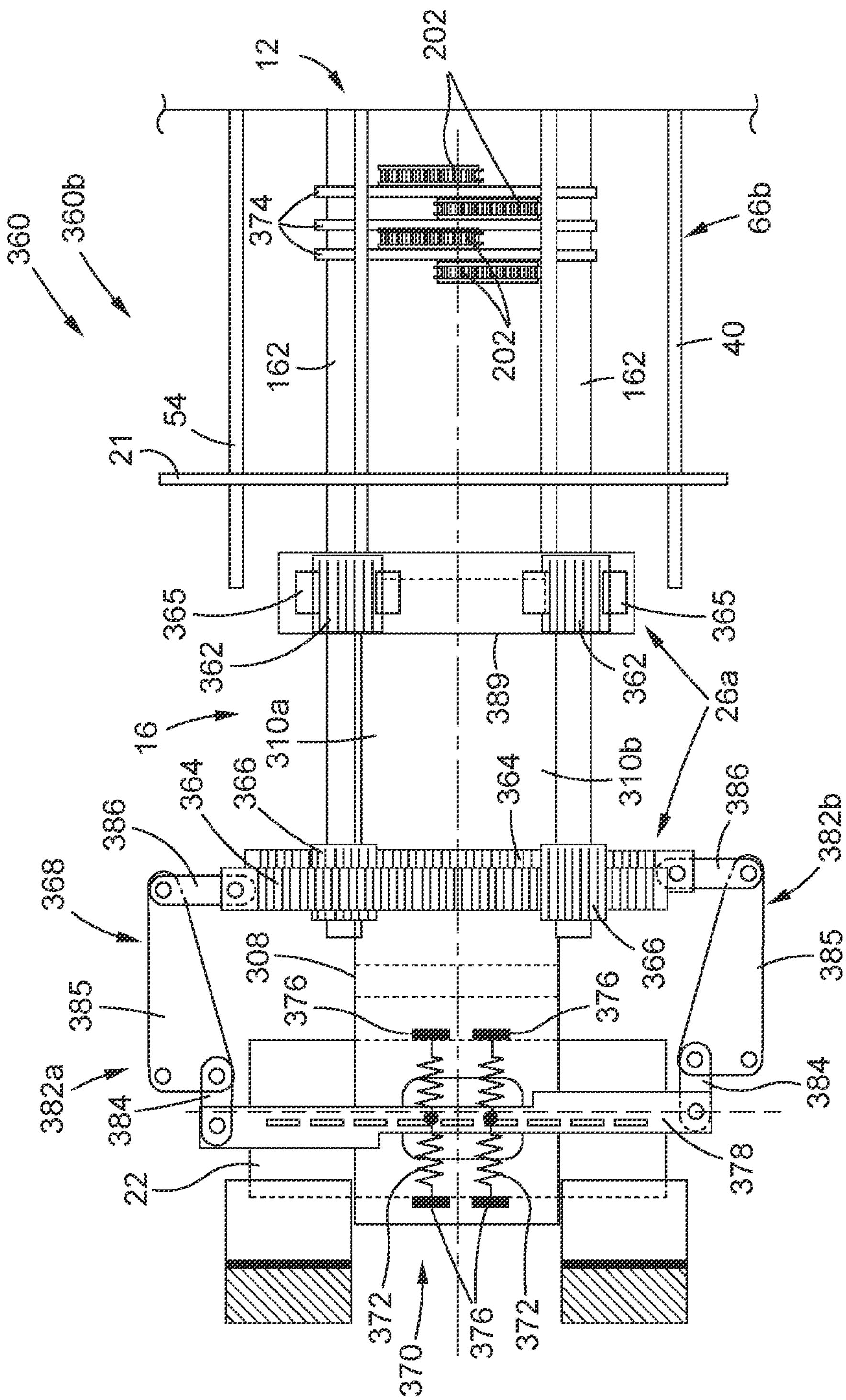
FIG. 13C is an illustration of a top view of a schematic diagram of the expandable strut assembly of FIG. 13A, in the intermediate expanded position, at a strut root, and showing the rack-and-pinion system in the fuselage.

FIG. 13C is an illustration of a top view of a schematic diagram of the expandable strut assembly 12 of FIG. 13A, in the second position 360*b* of the expansion sequence 360 comprising the strut 40 in the intermediate expanded position 66*b*, at the strut root 54, and showing the rack-and-pinion system 26*a* in the fuselage 16 coupled to the torque tubes 162 at the side 21 of the fuselage 16.

FIG. 13C shows the spring system 370 with the springs 372 having the spring pads 376 and attached to the fuselage structure 22 and attached to the linkage bar 378 of the load transfer assembly 368 of the rack-and-pinion system 26*a*. As shown in FIG. 13C, release of the springs 372 cause the linkage bar 378 to move in an outboard to inboard direction, to actuate the first linkage assembly 382*a* and the second linkage assembly 382*b* of the load transfer assembly 368. Movement of the linkage bar 378 is against the resistance of the springs 372. The springs 372 work to resist the movement of the linkage bar 378. FIG. 13C shows the first link 384, the second link 385, and the third link 386 of the first linkage assembly 382*a* and the second linkage assembly 382*b*. Actuation of the first linkage assembly 382*a* and the second linkage assembly 382*b* by the linkage bar 378 movement and the spring system 370 drive the horizontal racks 364 (see FIG. 13C) along the gears 366 (see FIG. 13C) to drive rotation of the torque tubes 162. FIG. 13C further shows the upper slanted bar 310*a* and the lower slanted bar 310*b* attached to the block member 308. FIG. 13C further shows the mounting structure 389 for mounting, or coupling, to the vertical racks 365, which are in contact with the torque tube gears 362. As the torque tubes 162 rotate, the torque tube gears 362 drive the vertical racks 365 up and down. The rotating torque tubes 162 further drive the compression chains 202. FIG. 13C further shows the compression chains 202 positioned in the strut 40 and coupled to the center fittings 374 through which the torque tubes 162 are inserted.

Figure 13D:
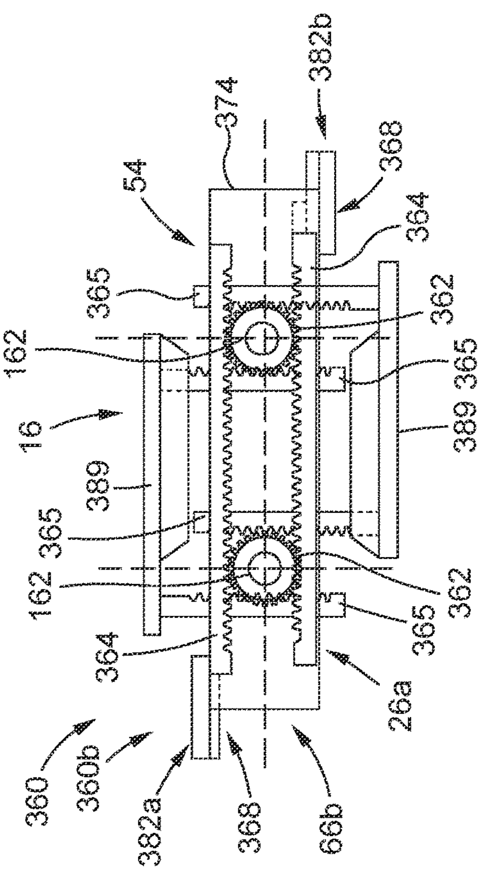
FIG. 13D is an illustration of a right inboard side view of a schematic diagram of the expandable strut assembly of FIG. 13A, in the intermediate expanded position, at the strut root.

FIG. 13D is an illustration of a right inboard side view of a schematic diagram of the rack-and-pinion system 26*a* coupled to the torque tubes 162 at the strut root 54 using the expandable strut assembly 12 of FIG. 13A, in the second position 360*b* of the expansion sequence 360, comprising the strut 40 (see FIG. 13C) in the intermediate expanded position 66*b*. FIG. 13D shows the center fitting 374, the mounting structure 389, the horizontal racks 364 and the vertical racks 365 of the rack-and-pinion system 26*a*, and the load transfer assembly 368 with the first linkage assembly 382*a* and the second linkage assembly 382*b* coupled to the horizontal racks 364. FIG. 13D shows two horizontal racks 364 and four vertical racks 365 in the fuselage 16. Each torque tube gear 362 meshes with two vertical racks 365 that are positioned opposite each other. FIG. 13D further shows the torque tubes 162 with the torque tube gears 362.

Figure 13E:
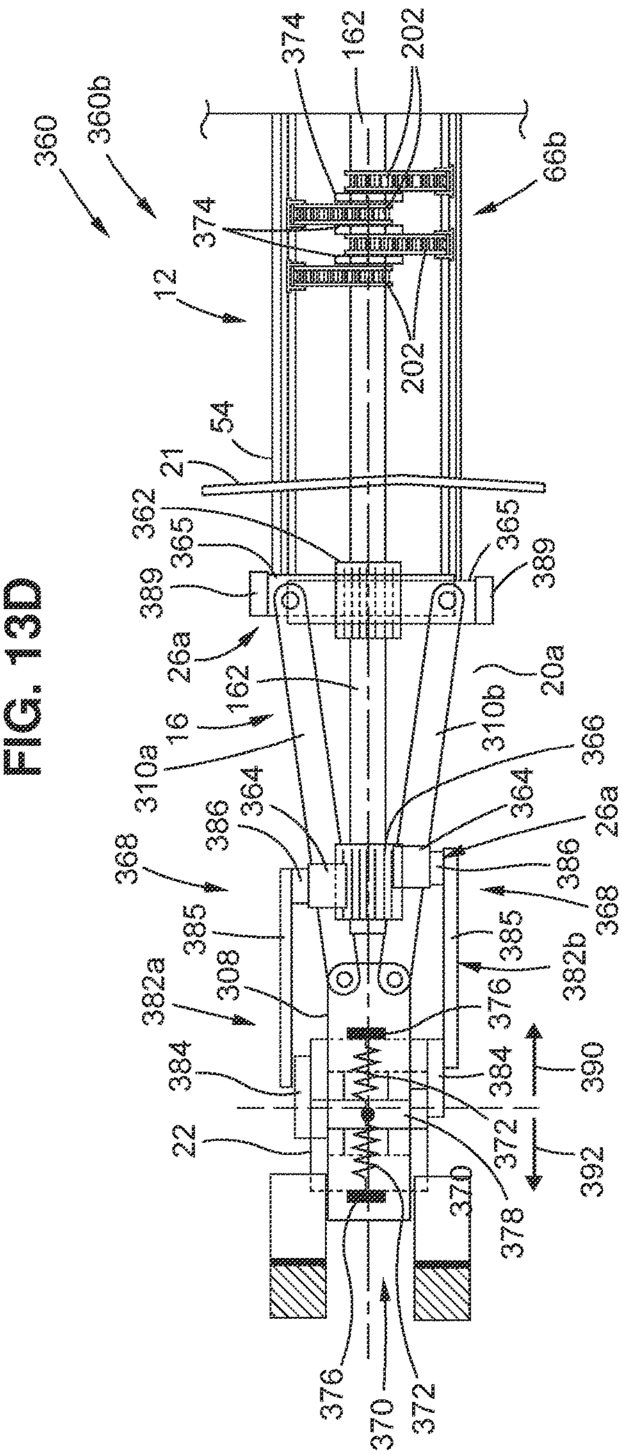
FIG. 13E is an illustration of a front view of a schematic diagram of the expandable strut assembly of FIG. 13C, in the intermediate expanded position.

FIG. 13E is an illustration of a front view of a schematic diagram of the expandable strut assembly 12 of FIG. 13C, in the second position 360*b* of the expansion sequence 360, comprising the strut 40 in the intermediate expanded position 66*b*, at the strut root 54. FIG. 13E shows the spring system 370 with the springs 372 having spring pads 376, attached to the fuselage structure 22, and attached to the linkage bar 378 of the load transfer assembly 368. FIG. 13E further shows the first linkage assembly 382*a* and the second linkage assembly 382*b* of the load transfer assembly 368 in the interior 20*a* of the fuselage 16. FIG. 13E further shows the first link 384, the second link 385, and the third link 386 of each of the first linkage assembly 382*a* and the second linkage assembly 382*b*. FIG. 13E further shows the upper slanted bar 310*a* and the lower slanted bar 310*b* coupled to the block member 308 and the strut 40.

FIG. 13E further shows the rack-and-pinion system 26*a* with the horizontal racks 364 coupled to the gear 366, and the vertical racks 365 coupled to the mounting structure 389 and in contact with the torque tube gear 362. FIG. 13E further shows the torque tube 162 spanning the fuselage 16 and the strut 40 at the side 21 of the fuselage 16, and coupled to the two sets of compression chains 202 in the strut 40. FIG. 13E further shows the center fittings 374 coupled to the torque tube 162 and between the compression chains 202. FIG. 13E further shows the strut compression portion 390 and the strut tension portion 392.

Now referring to FIGS. 14A-14E, FIGS. 14A-14E show a third position 360*c* of the expansion sequence 360. FIG. 14A is an illustration of a left outboard side view of a schematic diagram of the expandable strut assembly 12 of FIG. 12A, with the actuation mechanism 158 comprising the torque tubes 162 having the torque tube gears 362 (see FIG. 14D), and the drive mechanism 154 comprising the cables 172, such as the cross-bracing cables 172*d*, where the strut 40 is in the expanded position 66, such as the fully expanded position 66*a*, when the aircraft 10*b* (see FIG. 1) with the expandable strut assembly 12 is in the minus 1 g pushover flight condition 36. FIG. 14A further shows the strut cross section 60 with the airfoil shape 62 being in the expanded airfoil shape 74, such as the fully expanded airfoil shape 74*a*. A large moment of inertia prevents strut axial buckling.

FIG. 14A further shows the leading edge 96 with the leading edge shape control mechanism 112, and the trailing edge 120 with the aft membrane 124 and aft membrane spring 128, of the strut structure 82. As shown in FIG. 14A, the aft membrane 124 comprises the accordion aft membrane 124*a* with the accordion shape profile 130. FIG. 14A shows the drive mechanism 154, such as the variable length structural members 156, in the form of the compression chains 202, and the cross-bracing cables 172*d*. FIG. 14A further shows the expandable structure 146 having the hexagon shape 152 of the shape transition mechanism 142 of the shape transition assembly 140. FIG. 14A further shows the fixed length structural members 144, such as the fixed length spars 144*a*, for example, the forward spars 144*b* and the aft spars 144*c*, attached together via hinge connectors 218. FIG. 14A further shows the plates 334, such as the upper plate 334*a* and the lower plate 334*b*.

FIG. 14A further shows the torque tubes 162 positioned in the center fitting 374. FIG. 14A further shows the centerline 274 through the strut 40 and shows the height 68, such as the fully expanded height 68*a*, of the strut cross section 60. The other structural features shown in FIG. 14A are discussed with respect to FIG. 12A.

Figure 14B:
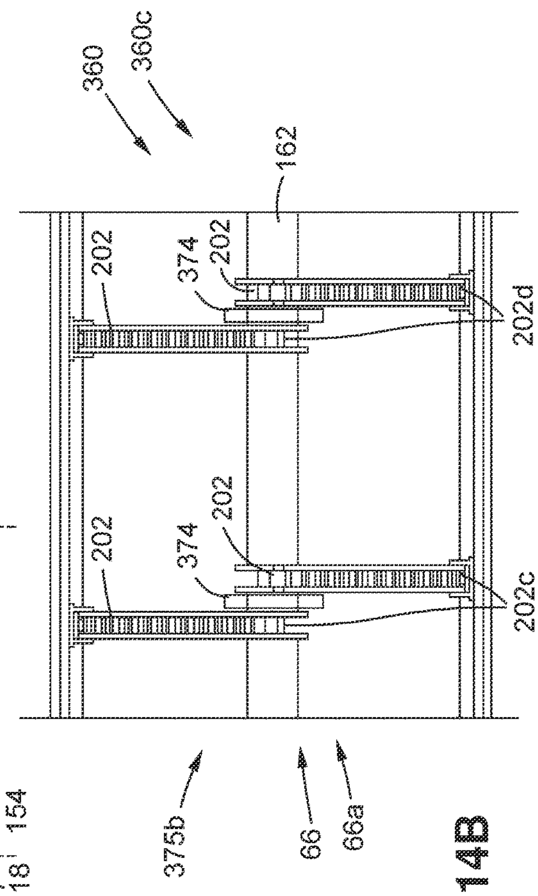
FIG. 14B is an illustration of a front view of a schematic diagram of a portion of the expandable strut assembly of FIG. 14A, in the fully expanded position.

FIG. 14B is an illustration of a front view of a schematic diagram of a portion 375*b* of the expandable strut assembly 12 of FIG. 14A, in the third position 360*c* of the expansion sequence 360, comprising the strut 40 (see FIG. 14A) in the expanded position 66, such as the fully expanded position 66*a*. FIG. 14B shows the compression chains 202, for example, the first set 202*c* of compression chains 202 and the second set 202*d* of compression chains 202, each coupled to the center fitting 374. FIG. 14B further shows the torque tube 162.

Figure 14C:
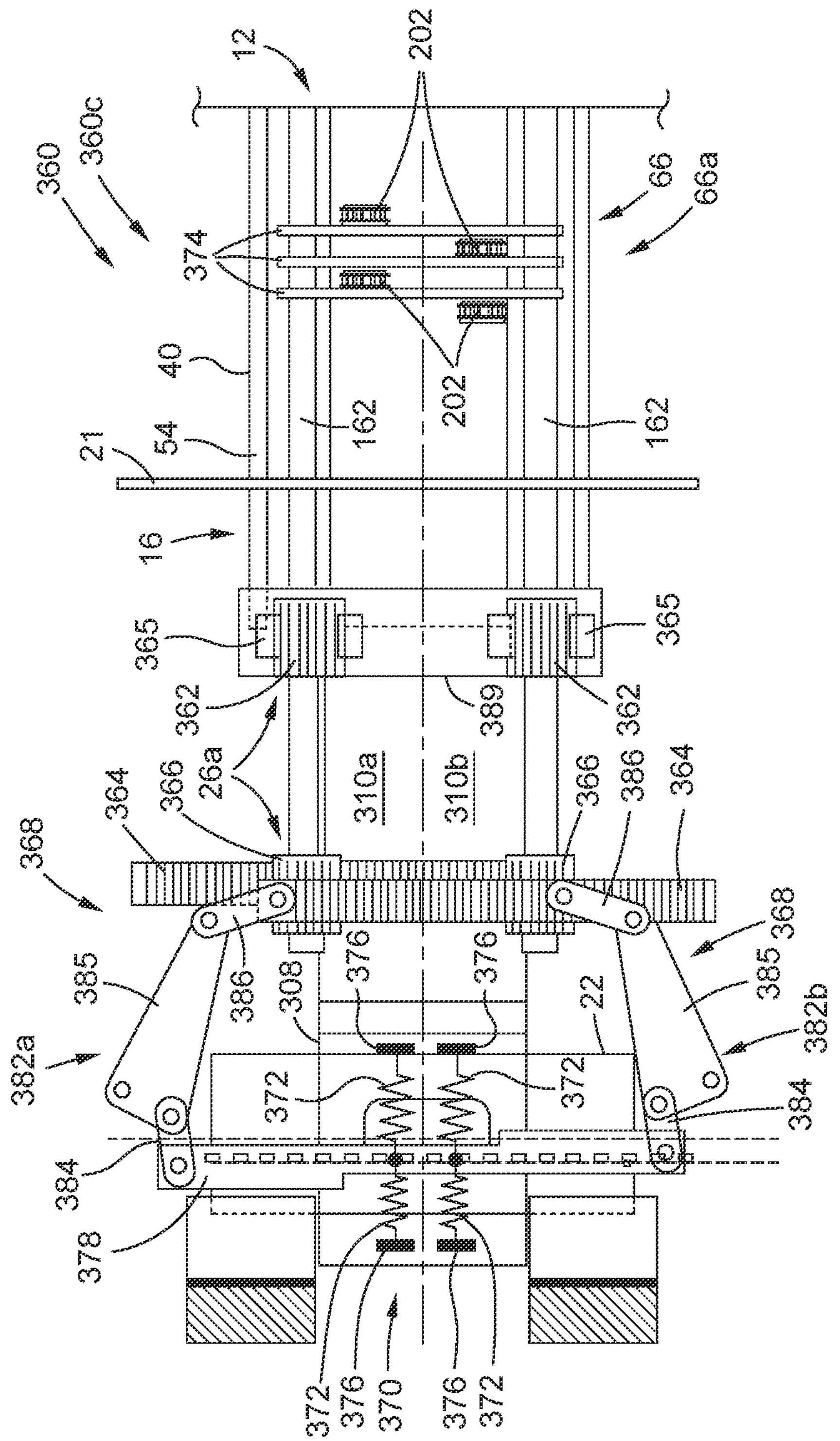
FIG. 14C is an illustration of a top view of a schematic diagram of the expandable strut assembly of FIG. 14A, in the fully expanded position, at a strut root, and showing the rack-and-pinion system in the fuselage.

FIG. 14C is an illustration of a top view of a schematic diagram of the expandable strut assembly 12 of FIG. 14A, in the third position 360*c* of the expansion sequence 360 comprising the strut 40 in the expanded position 66, such as the fully expanded position 66*a*, at the strut root 54, and showing the rack-and-pinion system 26*a* in the fuselage 16 coupled to the torque tubes 162 at the side 21 of the fuselage 16.

FIG. 14C shows the spring system 370 with the springs 372 having the spring pads 376 and attached to the fuselage structure 22 and attached to the linkage bar 378 of the load transfer assembly 368 of the rack-and-pinion system 26*a*. As shown in FIG. 14C, the linkage bar 378 actuates the first linkage assembly 382*a* and the second linkage assembly 382*b* of the load transfer assembly 368 further to further drive, or move, the horizontal racks 364 along the gears 366, to drive rotation of the torque tubes 162. FIG. 14C shows the first link 384, the second link 385, and the third link 386 of the first linkage assembly 382*a* and the second linkage assembly 382*b*. FIG. 14C further shows the upper slanted bar 310*a* and the lower slanted bar 310*b* attached to the block member 308. FIG. 14C further shows the mounting structure 389 for mounting, or coupling, to the vertical racks 365, which are in contact with the torque tube gears 362. As the torque tubes 162 rotate, the torque tube gears 362 drive the vertical racks 365 up and down. The rotating torque tubes 162 further drive the compression chains 202. FIG. 14C further shows the compression chains 202 positioned in the strut 40 and coupled to the center fittings 374 through which the torque tubes 162 are inserted.

Figure 14D:
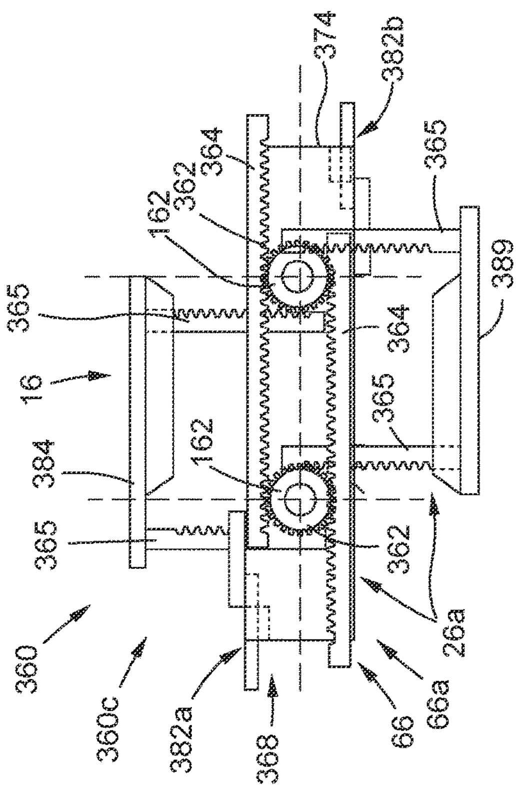
FIG. 14D is an illustration of a right inboard side view of a schematic diagram of the expandable strut assembly of FIG. 14A, in the fully expanded position, at the strut root.

FIG. 14D is an illustration of a right inboard side view of a schematic diagram of the rack-and-pinion system 26*a* coupled to the torque tubes 162 at the strut root 54 using the expandable strut assembly 12 of FIG. 14A, in the third position 360*c* of the expansion sequence 360, with the strut 40 (see FIG. 14C) in the expanded position 66, such as the fully expanded position 66*a*. FIG. 14D shows the center fitting 374, the mounting structure 389, the horizontal racks 364 and the vertical racks 365 of the rack-and-pinion system 26*a*, and the load transfer assembly 368 with the first linkage assembly 382*a* and the second linkage assembly 382*b* coupled to the horizontal racks 364 in the fuselage 16. FIG. 14D further shows the torque tubes 162 with the torque tube gears 362.

Figure 14E:
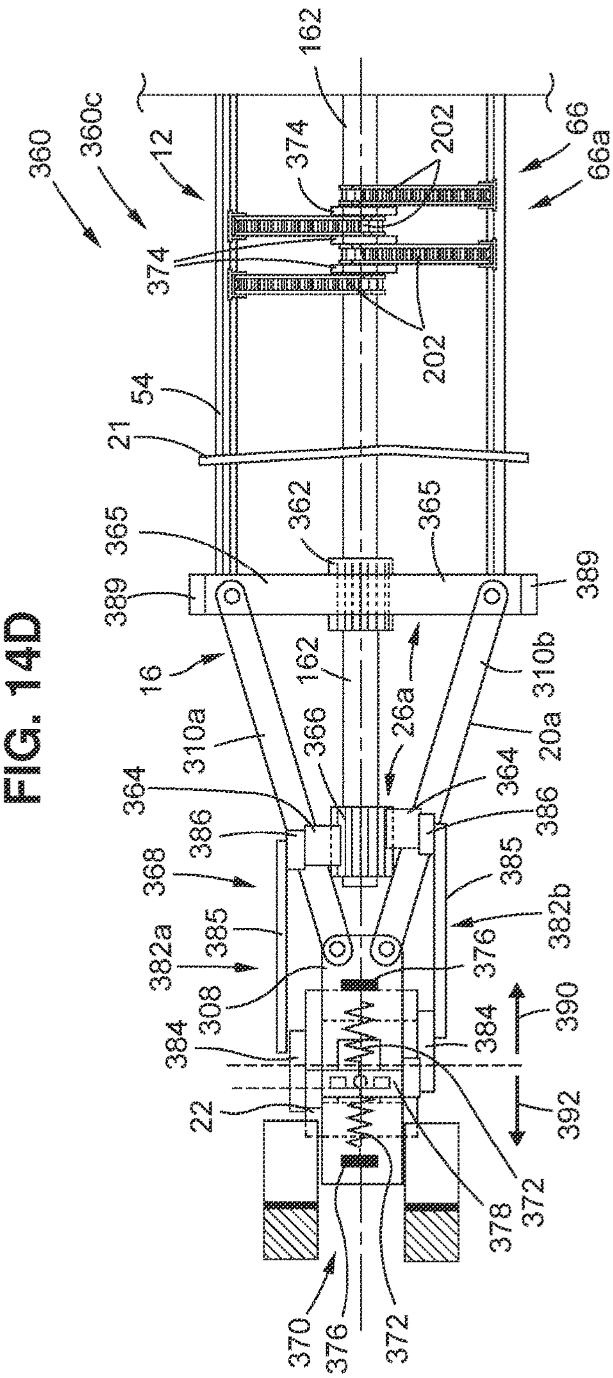
FIG. 14E is an illustration of a front view of a schematic diagram of the expandable strut assembly of FIG. 14C, in the fully expanded position.

FIG. 14E is an illustration of a front view of a schematic diagram of the expandable strut assembly 12 of FIG. 14C, in the third position 360*c* of the expansion sequence 360, where the strut 40 is in the expanded position 66, such as the fully expanded position 66*a*, at the strut root 54. FIG. 14E shows the spring system 370 with the springs 372 having spring pads 376, attached to the fuselage structure 22, and attached to the linkage bar 378 of the load transfer assembly 368. FIG. 14E further shows the first linkage assembly 382*a* and the second linkage assembly 382*b* of the load transfer assembly 368 in the interior 20*a* of the fuselage 16. FIG. 14E further shows the first link 384, the second link 385, and the third link 386 of each of the first linkage assembly 382*a* and the second linkage assembly 382*b*. FIG. 14E further shows the upper slanted bar 310*a* and the lower slanted bar 310*b* coupled to the block member 308 and the strut 40. When the strut 40 is in the expanded position 66, such as the fully expanded position 66*a*, the upper slanted bar 310*a* and the lower slanted bar 310*b* are moved apart from each other.

FIG. 14E further shows the rack-and-pinion system 26*a* with the horizontal racks 364 coupled to the gear 366, and the vertical racks 365 coupled to the mounting structure 389 and in contact with the torque tube gears 362. FIG. 14E further shows the torque tube 162 spanning the fuselage 16 and the strut 40 at the side 21 of the fuselage 16, and coupled to the two sets of compression chains 202 in the strut 40. FIG. 14E further shows the center fittings 374 coupled to the torque tube 162 and between the compression chains 202. FIG. 14E further shows the strut compression portion 390 and the strut tension portion 392.

Figure 15:
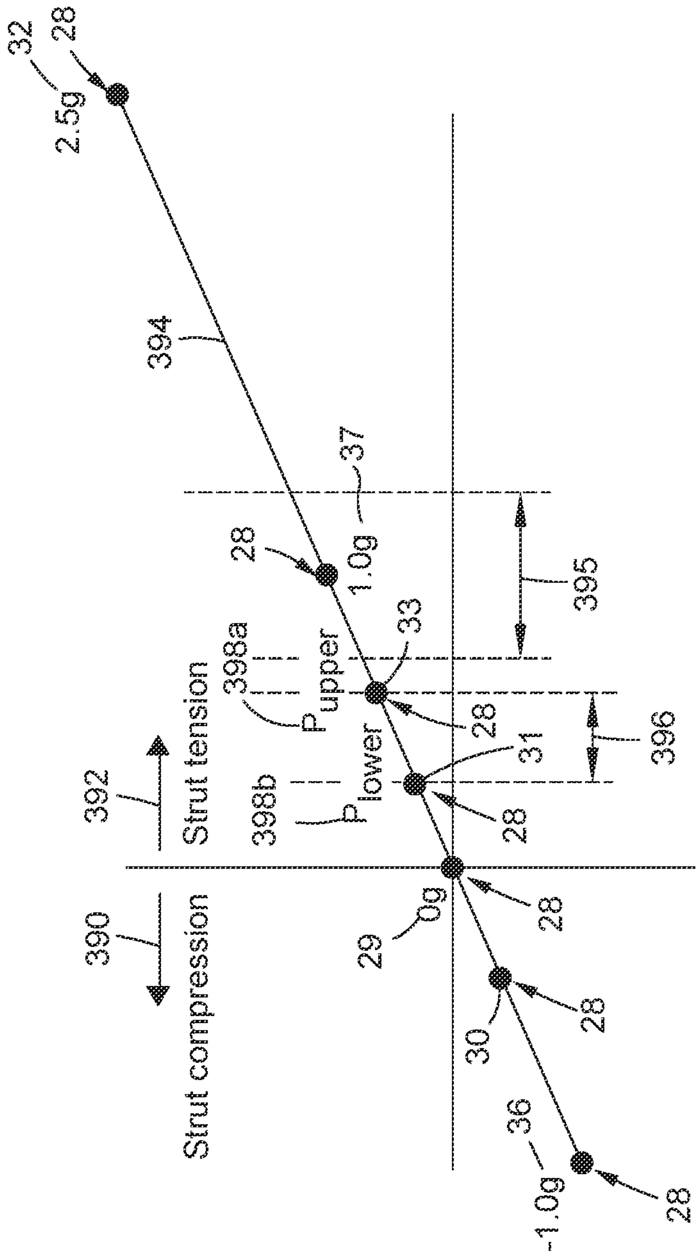
FIG. 15 is an illustration of a plot of various load conditions during strut compression and strut tension.

Now referring to FIG. 15, FIG. 15 is an illustration of a plot 394 of various load conditions 28 in the strut compression portion 390 and the strut tension portion 392. As shown in FIG. 15, the load conditions 28 on the plot 394 in the strut compression portion 390 include −1.0 g (minus 1 g) push-over flight condition 36, 1 g on ground condition 30. As shown in FIG. 15, plot 394 further includes the load condition 28 of 0 (zero) g condition 29. As shown in FIG. 15, the load conditions 28 on the plot 394 in the strut tension portion 392 include 0.3 g condition 31, 0.7 g condition 33, 1.0 g condition 37, and 2.5 g up-bending of wing flight condition 32. FIG. 15 further shows a typical flight range 395 slightly above and slightly below the 1.0 g condition 37. FIG. 15 further shows a strut expansion range 396 having a P upper 398*a* at the load condition 28 of 0.7 g condition 33. P upper 398*a* indicates a strut position tension stop limit, for example, 3.0 inches of strut travel. FIG. 15 further shows a P lower 398*b* at the load condition 28 of 0.3 g condition 31. P lower 398*b* indicates a strut position compression stop limit, for example, minus 3.0 inches of strut travel. Expansion and contraction of the thickness of the strut 40 (see FIGS. 1, 2A-2C) occurs in the strut expansion range 396 between the 0.3 g condition 31 and the 0.7 g condition 33. Preferably, expansion of the strut 40 (see FIG. 1) and the strut cross section 60 (see FIG. 1) occur over a large range of strut load from the tension associated with 0.3 g flight to 0.7 g flight, but far enough from the load conditions 28 of compression 72 in the strut 40 or the lower load limit (0.7 g) of cruise flight.

Figure 16A:
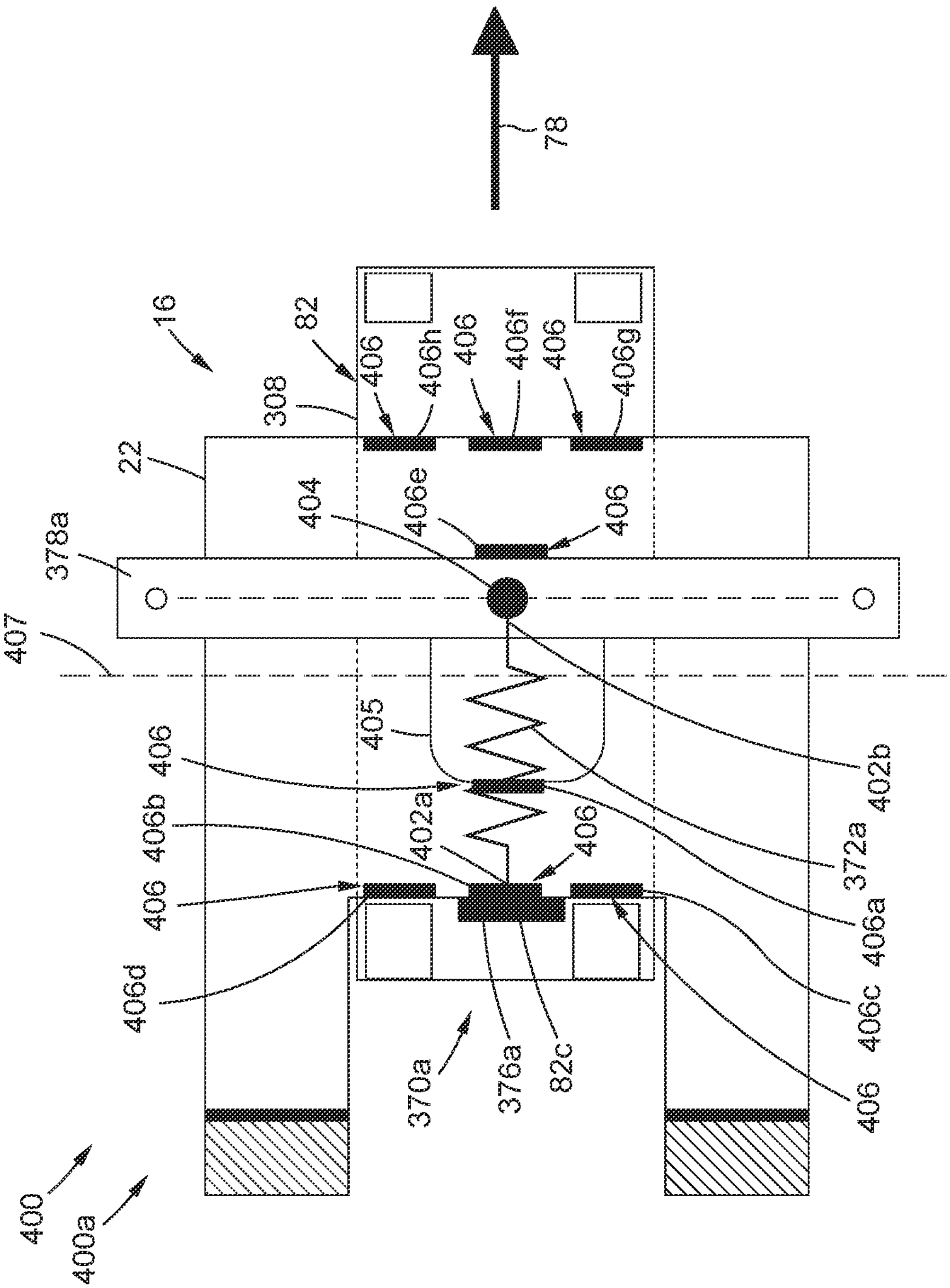
FIG. 16A is an illustration of a top view of a schematic diagram of a spring system in a first position of a spring sequence.
Figure 16B:
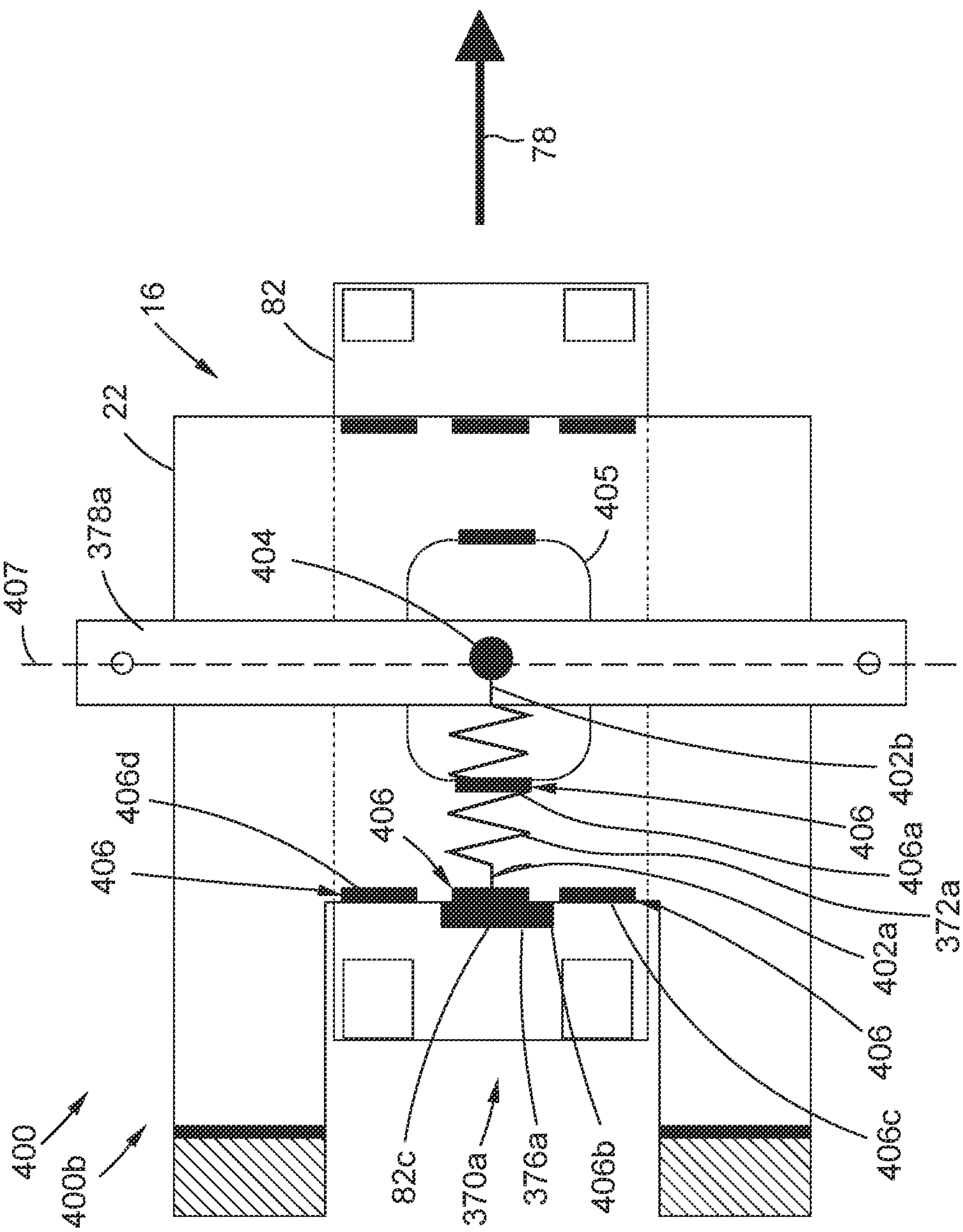
FIG. 16B is an illustration of a top view of a schematic diagram of the spring system of FIG. 16A, showing the spring system in a second position of the spring sequence.
Figure 16C:
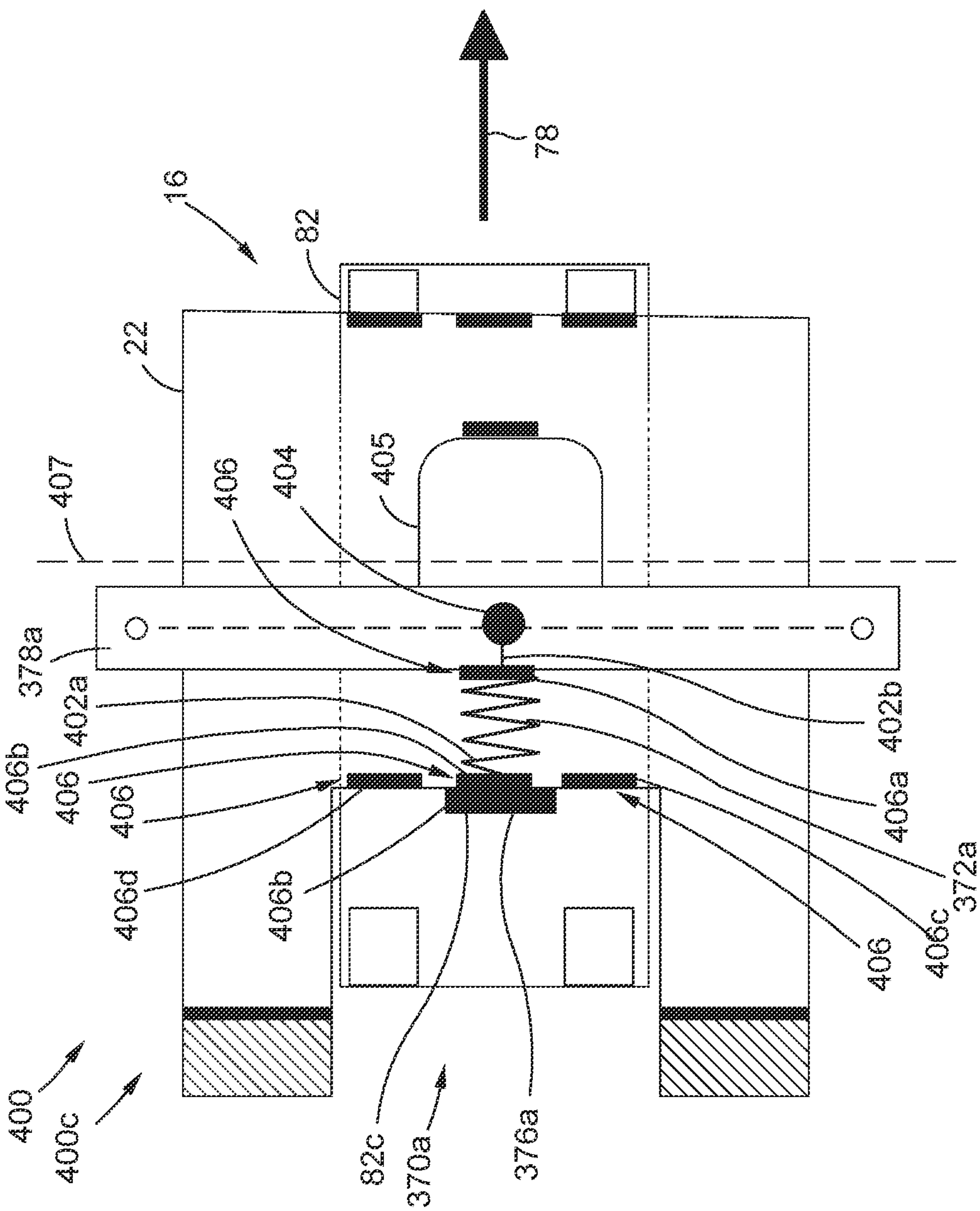
FIG. 16C is an illustration of a top view of a schematic diagram of the spring system of FIG. 16A, showing the spring system in a third position of the spring sequence.

Now referring to FIGS. 16A-16C, FIGS. 16A-16C show a spring system 370*a* in a spring sequence 400, where the spring system 370*a* may be used in the fuselage 16 of the aircraft 10*b* (see FIG. 1) having the strut 40 and shape transition assembly 140 shown in FIGS. 12A, 13A, and 14A, as discussed above. FIG. 16A is an illustration of a top view of a schematic diagram of the spring system 370*a* in a first position 400*a* of the spring sequence 400. FIG. 16B is an illustration of a top view of a schematic diagram of the spring system of FIG. 16A, showing the spring system 370*a* in a second position 400*b* of the spring sequence 400. FIG. 16C is an illustration of a top view of a schematic diagram of the spring system 370*a* of FIG. 16A, showing the spring system 370*a* in a third position 400*c* of the spring sequence 400.

As shown in FIGS. 16A-16C, the spring system 370*a* comprises a spring 372*a* having a first end 402*a* attached to a spring pad 376*a*, which is attached to a portion 82*c* of a strut structure 82, for example, a block member 308, of the strut 40 (see FIGS. 1, 12A, 13A, 14A). As shown in FIGS. 16A-16C, the spring 372*a* has a second end 402*b* attached to a linkage bar 378*a* at attachment point 404. The linkage bar 378*a* is configured to move back-and-forth across an opening 405 (see FIGS. 16A-16C) in the fuselage structure 22. As shown in FIGS. 16A-16C, the spring system 370*a* further comprises a plurality of stops 406, including a first stop 406*a*, a second stop 406*b*, a third stop 406*c*, and a fourth stop 406*d*. Additional stops 406, such as a fifth stop 406*e* (see FIG. 16A), a sixth stop 406*f* (see FIG. 16A), a seventh stop 406*g* (see FIG. 16A), and an eighth stop 406*h* (see FIG. 16A) may also be included. The stops 406 are configured to provide a stopping mechanism for the spring 372*a*, the linkage bar 378*a*, and the strut structure 82. FIGS. 16A-16C further show a neutral line 407 to show movement of the linkage bar 378*a* toward the second stop 406*b*, the third stop 406*c*, and the fourth stop 406*d*.

For FIGS. 16A-16C, in an example, the strut load is associated with a 1.0 g condition 35 (see FIG. 15) equal to 100 kips, and the upper limit is the 0.7 g condition 33 (see FIG. 15).

FIG. 16A shows the spring system 370*a* in the first position 400*a* of the spring sequence 400, with the linkage bar 378*a* positioned outboard from, or to the right of, the neutral line 407, and a tension 78 is equal to 70 kips or greater than 70 kips of tension 78 in the strut 40. In the first position 400*a*, the tension 78 decreases to a tension limit stop value. The load path 38 (see FIG. 1) is from the strut structure 82, to the linkage bar 378*a*, to the spring 372*a*, to the spring pad 376*a*, to the fuselage structure 22. The first position 400*a*, shown in FIG. 16A, corresponds to a strut load in the 0.7 g condition 33 (see FIG. 15) of 70 kips or greater than 70 kips of tension 78 in the strut 40.

FIG. 16B shows the spring system 370*a* in the second position 400*b* of the spring sequence 400, with the linkage bar 378*a* centered on the neutral line 407, and a tension 78 equal to 50 kips of tension 78 in the strut 40. The load path 38 is through the spring 372*a*. The second position 400*b*, shown in FIG. 16B, corresponds to a strut load in a 0.5 g condition of 50 kips of tension 78 in the strut 40.

FIG. 16C shows the spring system 370*a* in the third position 400*c* of the spring sequence 400, with the linkage bar 378*a* positioned inboard from, or to the left of, the neutral line 407, and a tension 78 is equal to 30 kips or less than 30 kips of tension 78 in the strut 40. In the third position 400*c*, the strut load decreases to a lower load limit stop value. The load path 38 (see FIG. 1) is from the strut structure 82, to the linkage bar 378*a*, to the spring 372*a*, to the spring pad 376*a*, to the fuselage structure 22. The third position 400*c*, as shown in FIG. 16C, corresponds to a strut load in a 0.3 g condition 31 (see FIG. 15) of 30 kips of tension 78 or less in the strut 40.

Now referring to FIGS. 17A-23C, FIGS. 17A-23C show a wing rotation driven system 184 having a lever assembly 408, to convert wing rotations 186 (see FIG. 1) of the wing 14 (see FIG. 18A) to horizontal movement 188 (see FIG. 1) at the strut root 54 (see FIG. 18A) of the strut 40 (see FIG. 18A), to activate the actuation mechanism 158 (see FIG. 17A) comprising one spine member 166 (see FIG. 17A), such as a movable spine member 166*d* (see FIG. 17A), to actuate the drive mechanism 154 (see FIGS. 1, 6A, 7A, 8A) comprising a plurality of compression chains 202 (see FIGS. 1, 6A, 7A, 8A). In this version, the wing rotation driven system 184 harvests the wing rotations 186, or wing deflections, to actuate the one spine member 166, to drive the compression chains 202 oriented in the span-wise direction 101 (see FIG. 3A). Further, in this version, the wing rotation driven system 184 is a passive activation mechanism.

In this version, the strut 40 (see FIG. 18A), such as the wing strut 41 (see FIG. 18A), has the strut cross section 60 (see FIG. 1) that is thin or small during the cruise flight condition 34 (see FIG. 22A), and the strut cross section 60 expands so that it is thicker or larger in compression 72 (see FIG. 1). The expansion of the strut cross section 60 is driven by axial loads 76 (see FIG. 1) in tension 78 (see FIG. 1) and compression 72 (see FIG. 1) in the strut 40, by means of the actuation mechanism 158 (see FIG. 18B) in the form of the one spine member 166 (see FIG. 18B), such as the movable spine member 166*d* (see FIG. 18B), attached at the side 21 (see FIG. 18A) of the fuselage 16 (see FIGS. 18A, 18B). This allows for the strut 40 that is thin to be efficient in the cruise flight condition 34, and to be able to carry the buckling load when under the compressive load 73 (see FIG. 1). The expansion of the strut 40 and the strut cross section 60 is driven by wing rotations 186 at a wing-to-fuselage intersection 410 (see FIG. 18A).

In this version, the movable spine member 166*d* (see FIG. 17A) is parallel to a load path 38 (see FIG. 1), such as a primary load path, of the strut 40. Because the movable spine member 166*d* is parallel to the load path 38, the movable spine member 166*d* harvests strains in the wing structure and transfers the forces to moments to the strut 40.

Figure 17B:
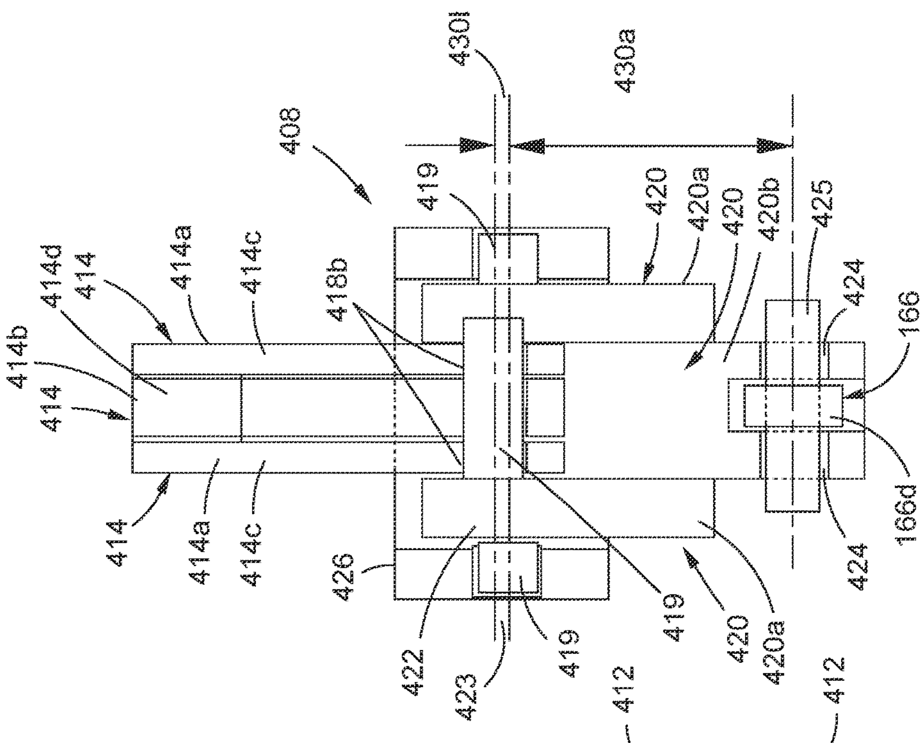
FIG. 17B is an illustration of a cross-sectional view of the lever assembly of FIG. 17A, taken along lines 17B-17B, of FIG. 17A.
Figure 17A:
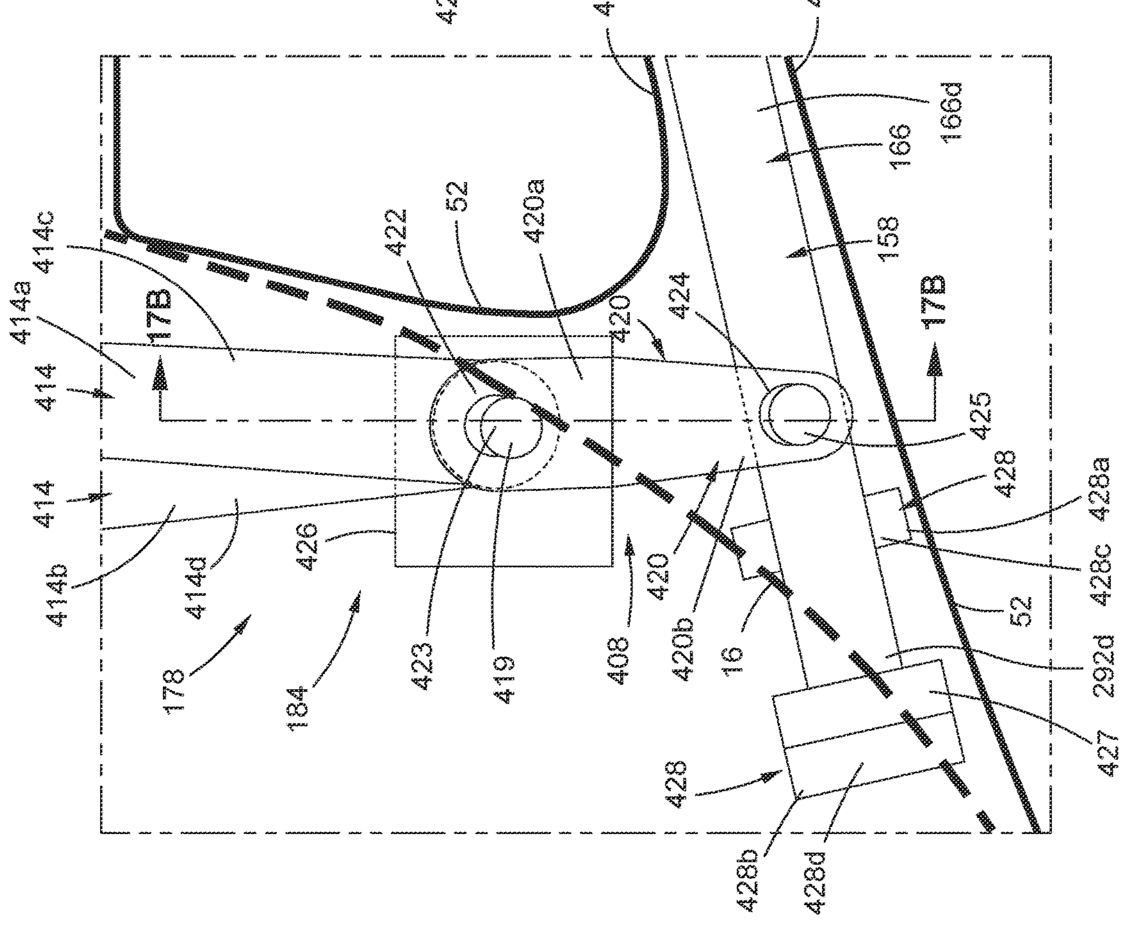
FIG. 17A is an illustration of a front view of a lever assembly of a wing rotation driven system in a version of an expandable strut assembly of the disclosure.

Now referring to FIGS. 17A-17B, FIG. 17A is an illustration of a front view of a version of the lever assembly 408 of the activation mechanism 178 comprising the wing rotation driven system 184 of a version of the expandable strut assembly 12 (see FIG. 18A) of the disclosure, and FIG. 17B is an illustration of a cross-sectional view of the lever assembly 408 of FIG. 17A, taken along lines 17B-17B of FIG. 17A. As shown in FIG. 17A, the lever assembly 408 is located in the fuselage 16 along the fuselage strut fairing 52 and a strut loft 412 of the strut 40 (see FIG. 18A). As shown in FIGS. 17A-17B, the lever assembly 408 comprises a plurality of vertical linkage members 414, including first linkage members 414*a* and a second linkage member 414*b* coupled between the first linkage members 414*a*. Each of the first linkage members 414*a* comprises a 0.3 g link 414*c* (see FIGS. 17A-17B), and the second linkage member 414*b* comprises a 0.7 g link 414*d*. Each of the vertical linkage members 414 has a first end 415*a* (see FIG. 18B), a second end 415*b* (see FIGS. 17A-17B, 18B), and a hinged body 416 (see FIG. 18B) formed between the first end 415*a* and the second end 415*b*. The hinged body 416 comprises a first body portion 416*a* (see FIG. 18B) connected to a second body portion 416*b* (see FIG. 18B) via a hinge connector 417. Each hinged body 416 further comprises openings 418 (see FIG. 18B), including a first opening 418*a* (see FIG. 18B), or top opening, and a second opening 418*b* (see FIGS. 17B, 18B), or bottom opening. The first end 415*a* (see FIG. 18B) of each vertical linkage member 414 is attached to the wing 14 (see FIG. 18B), and the second end 415*b* is attached to a link pin 419 (see FIGS. 17A-17B) at the second opening 418*b*. The second opening 418*b* is configured to receive, and receives, the link pin 419.

As shown in FIGS. 17A-17B, the lever assembly 408 further comprises a lever 420 having first lever portions 420*a* coupled to a second lever portion 420*b*. As shown in FIGS. 17A-17B, each of the first lever portions 420*a* has a through hole 422 configured to receive the link pin 419. The link pin 419 acts or functions as a pivot axis 423 (see FIGS. 17A-17B) for the first lever portions 420*a* to pivot with respect to the vertical linkage members 414. The vertical linkage members 414 buckle or bend at a specified load to avoid overloading of the lever 420.

As shown in FIGS. 17A-17B, the second lever portion 420*b* has a pair of slotted through holes 424 configured to receive a spine pin 425. As further shown in FIGS. 17A-17B, the vertical linkage members 414, the link pin 419, and the first lever portions 420*a* are coupled to a block element 426.

FIGS. 17A-17B further show the spine member 166, such as the movable spine member 166*d*, for example, a strut spine, attached to the second lever portion 420*b* of the lever 420, via the spine pin 425. As shown in FIG. 17A, the movable spine member 166*d* has the restrained end 292*d* attached to a bearing pad 427. The restrained end 292*d* of the movable spine member 166*d* and the bearing pad 427 are designed to move between stop elements 428 (see FIG. 17A). As shown in FIG. 17A, the stop elements 428 include a first stop element 428*a* and a second stop element 428*b*. The first stop element 428*a* comprises a 0.3 g stop 428*c* (see FIG. 17A), and the second stop element 428*b* comprises a 0.7 g stop 428*d* (see FIG. 17A). The stop elements 428 prevent overloading of the movable spine member 166*d*, or strut spine.

Figure 18A:
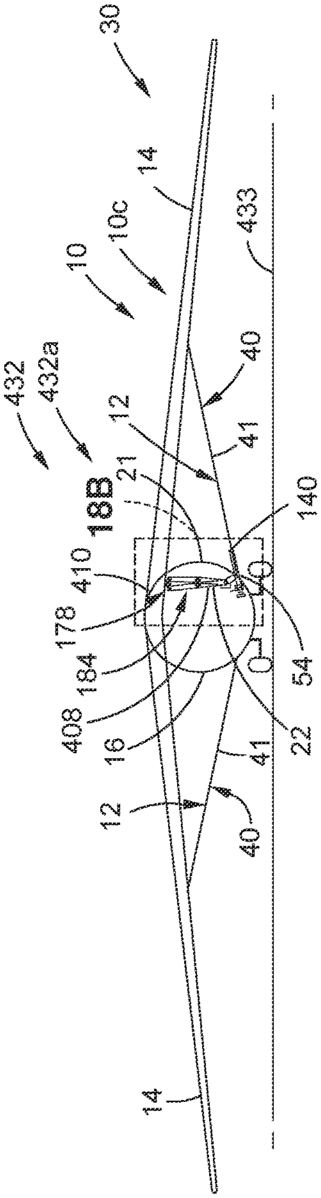
FIG. 18A is an illustration of a front view of a schematic diagram of an aircraft on the ground in a 1 g on ground condition, where the aircraft has a lever assembly in a fuselage.

With the wing rotation driven system 184 using the lever assembly 408, wing rotations 186 (see FIG. 1) of the wing 14 (see FIG. 18A) are converted to horizontal movement 188 (see FIG. 1) near the strut root 54 (see FIG. 18A). The lever assembly magnifies the horizontal movement 188 for the movable spine member 166*d*, or strut spine. The multiplication of the horizontal movement 188 from the 0.3 g link 414*c* (see FIG. 17A) and the 0.7 g link 414*d* (see FIG. 17A) is proportional to a ratio of a first length 430*a* (see FIG. 17B) to a second length 430*b* (see FIG. 17B). This desired ratio is also related to a range of vehicle loading over which the strut cross section 60 actuates. The 0.3 g link 414*c* and the 0.7 g link 414*d* have equal and opposite axial forces. The horizontal component of these forces creates a horizontal force at the link pin 419. This horizontal force is reacted at the pivot axis 423 and the spine pin 425. The axial component of the reaction at the spine pin 425 drives the spine mechanism (not shown) inside the strut 40 (see FIG. 18A). The lever assembly 408 may preferably be used with the version of the expandable strut assembly 12 with the one spine member 166, compression chains 202, and shape transition mechanism 142 having a rhombus shape 150, as discussed above, and shown in FIG. 6A. However, with this version, the lever assembly 408 replaces the spring system 304 in the fuselage 16, shown in FIG. 6C. Moreover, with this version shown in FIG. 17A, the strut 40 does not move but the movable spine member 166*d* moves back and forth to drive the compression chains 202, whereas with the version shown in FIG. 6A, the spine member 166 is an immovable spine member 166*c*, where the strut 40 moves past the immovable spine member 166*c*. With this version, as the wing 14 rotates at the wing-to-fuselage intersection 410 (see FIG. 18A), the wing rotations 186 cause the lever assembly 408 to move back and forth, causing the movable spine member 166*d* to move back and forth and in and out of the strut 40.

Figure 22A:
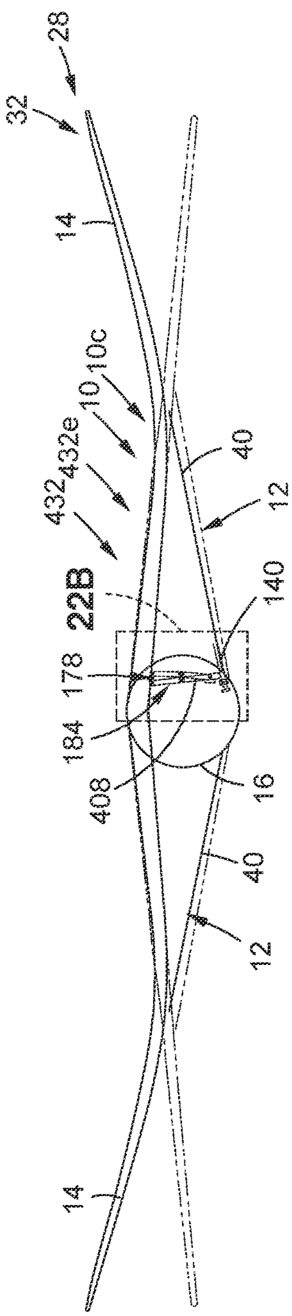
FIG. 22A is an illustration of a front view of a schematic diagram of the aircraft of FIG. 18A, in a 2.5 g up-bending of wing flight condition.
Figure 22C:
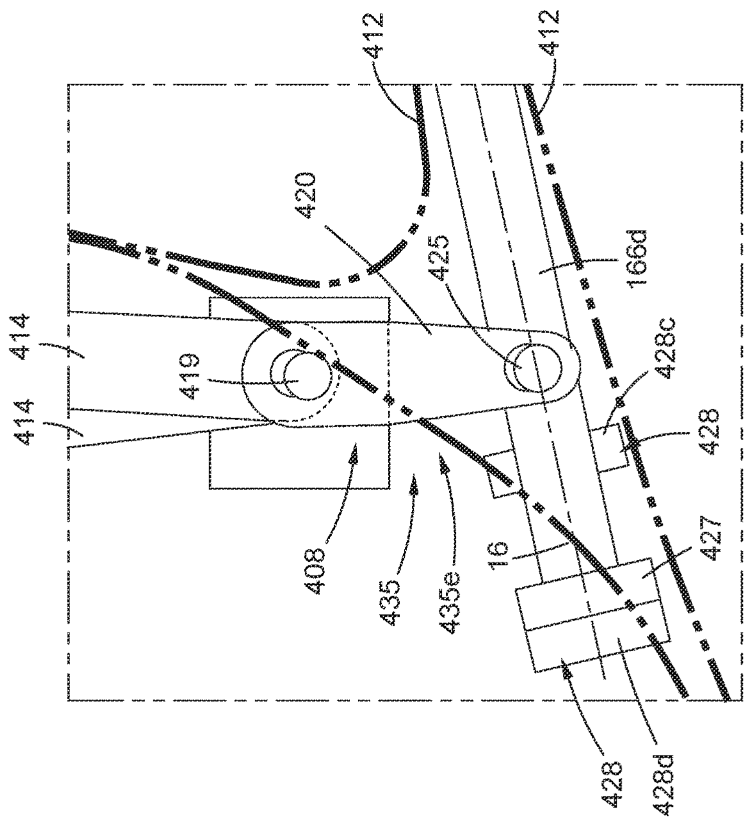
FIG. 22C is an illustration of a front enlarged view of a portion 22C from FIG. 22B, showing a fifth lever position of the lever of the lever assembly.
Figure 22B:
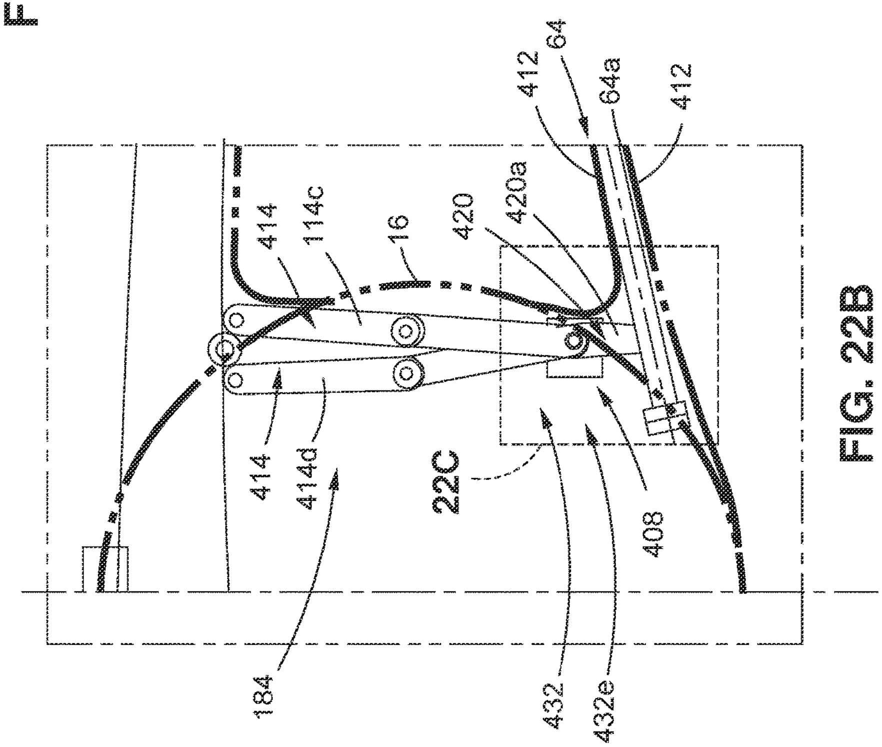
FIG. 22B is an illustration of a front view of a portion 22B from FIG. 22A, showing a fifth position of the sequence of the wing rotation driven system.
Figure 23A:
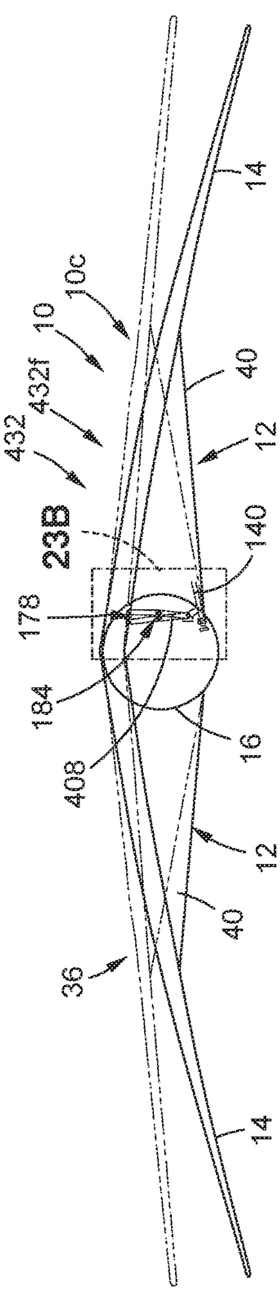
FIG. 23A is an illustration of a front view of a schematic diagram of the aircraft of FIG. 18A, in a minus 1 g pushover flight condition.

Now referring to FIGS. 18A-23C, FIGS. 18A-23C show a sequence 432 of various positions of the wing rotation driven system 184, when the vehicle 10 (see FIG. 18A), such as the aircraft 10*c* (see FIG. 18A), goes from the 1 g on ground condition 30 (see FIG. 18A) to the minus 1 g pushover flight condition 36 (see FIG. 23A).

Figure 18C:
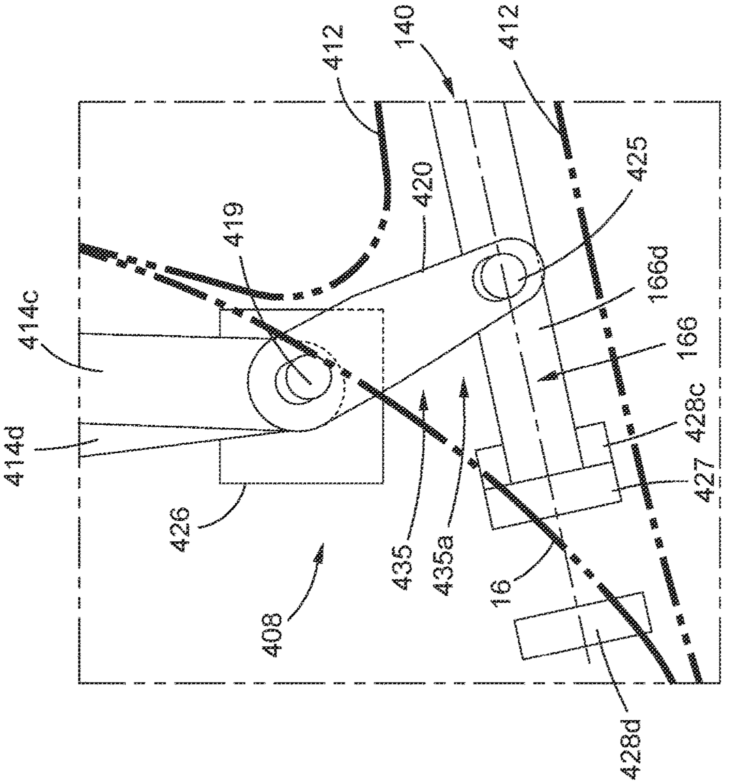
FIG. 18C is an illustration of a front enlarged view of a portion 18C from FIG. 18B, showing a first lever position of a lever of the lever assembly.
Figure 18B:
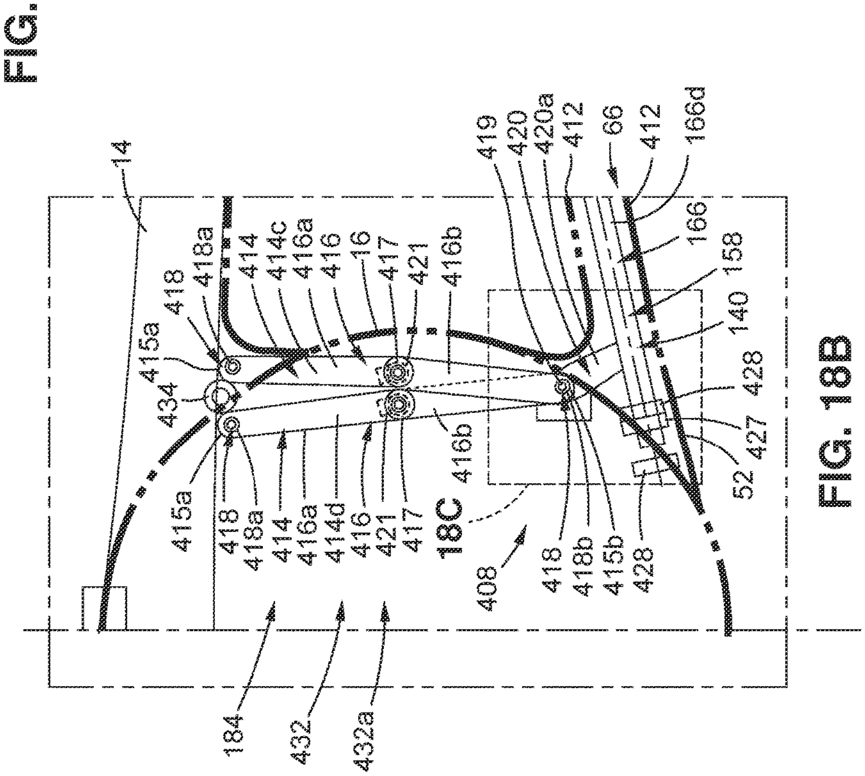
FIG. 18B is an illustration of a front view of a portion 18B from FIG. 18A, showing a first position of a sequence of a wing rotation driven system.

Now referring to FIGS. 18A-18C, FIG. 18A is an illustration of a front view of a schematic diagram of the vehicle 10, such as the aircraft 10*c* on the ground 433 in a 1 g on ground condition 30, where the aircraft 10*c* has the wing rotation driven system 184 with the lever assembly 408 in the fuselage 16, in a first position 432*a* of the sequence 432. FIG. 18A shows the aircraft 10*c* with wings 14 and expandable strut assemblies 12 comprising struts 40, such as wing struts 41, and shape transition assemblies 140 with the actuation mechanism 158 (see FIG. 18B) comprising the movable spine member 166*d* (see FIG. 18B), and the activation mechanism 178 comprising the wing rotation driven system 184. FIG. 18A further shows the wing-to-fuselage intersection 410 and the strut root 54 at the side 21 of the fuselage 16 where the strut 40 attaches.

FIG. 18B is an illustration of a front view of a portion 18B from FIG. 18A, showing the first position 432*a* of the sequence 432 of the wing rotation driven system 184 with the lever assembly 408. FIG. 18B shows the first end 415*a* of the vertical linkage members 414 attached to the wing 14, via a wing support hinge 434, and shows the second end 415*b* attached to the link pin 419 coupling the first lever portion 420*a* of the lever 420 to the vertical linkage members 414. FIG. 18B further shows the 0.3 g link 414*c* and the 0.7 g link 414*d*, the fuselage 16, the strut loft 412, the fuselage strut fairing 52, the actuation mechanism 158 comprising the spine member 166, such as the movable spine member 166*d*, or strut spine, of the shape transition assembly 140, the bearing pad 427 and the stop elements 428. As shown in FIG. 18B, the strut loft 412 is in the expanded position 66, and the vertical linkage member 414 with the 0.3 g link 414*c* is slightly buckled, thus limiting the force transmitted to the lever assembly 408. The individual first body portions 416*a* and the individual second body portions 416*b* do not buckle, and the buckling occurs at the hinge connector 417. FIG. 18A further shows a torsional spring 421 at each hinge connector 417, or joint, within the hinged body 416 of each vertical linkage member 414. The torsional spring 421 in each vertical linkage member 414, in combination with an over center mechanical stop (not shown), assists in keeping the vertical linkage member 414 in a substantially straight position. However, when the load reaches the 0.7 g condition 33 (see FIG. 15), the vertical linkage member 414 may buckle. The hinged body 416 comprises the first body portion 416*a* (see FIG. 18B) connected to the second body portion 416*b* (see FIG. 18B) via the hinge connector 417. As further shown in FIG. 18B, each hinged body 416 further comprises openings 418, including the first opening 418*a*, or top opening, and the second opening 418*b*, or bottom opening.

FIG. 18C is an illustration of a front enlarged view of a portion 18C from FIG. 18B, showing a lever position 435, such as a first lever position 435*a*, of the lever 420 of the lever assembly 408. FIG. 18C further shows the bearing pad 427 of the movable spine member 166*d*, or strut spine, of the shape transition assembly 140, bearing against the 0.3 g stop 428*c*. FIG. 18C further shows the 0.7 g stop 428*d*, the block element 426, the fuselage 16, the spine pin 425, the link pin 419, the 0.3 g link 414*c*, the 0.7 g link 414*d*, and the strut loft 412.

Figure 19A:
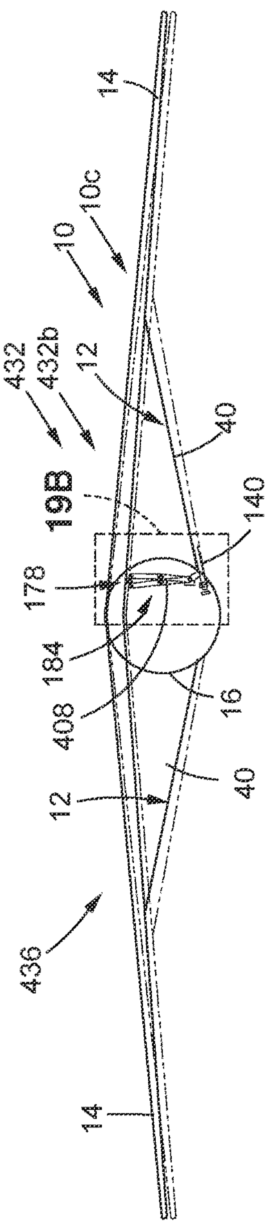
FIG. 19A is an illustration of a front view of a schematic diagram of the aircraft of FIG. 18A, in a take-off 0.3 g upload on wing condition.
Figure 19C:
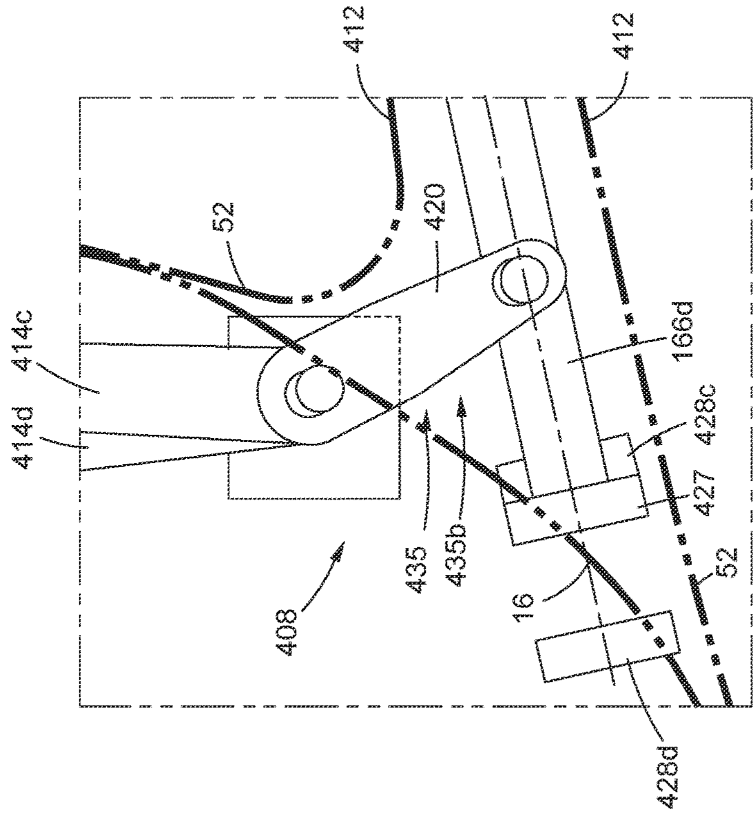
FIG. 19C is an illustration of a front enlarged view of a portion 19C from FIG. 19B, showing a second lever position of the lever of the lever assembly.
Figure 19B:
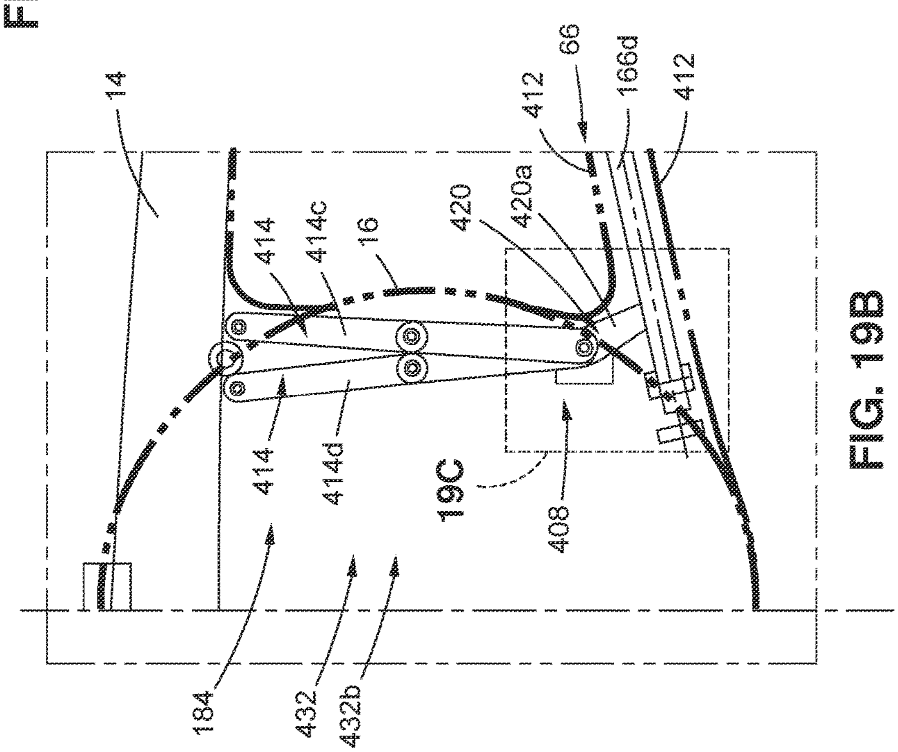
FIG. 19B is an illustration of a front view of a portion 19B from FIG. 19A, showing a second position of the sequence of the wing rotation driven system.

Now referring to FIGS. 19A-19C, FIG. 19A is an illustration of a front view of a schematic diagram of the vehicle 10, such as the aircraft 10*c*, of FIG. 18A, in a take-off 0.3 g upload on wing condition 436. As shown in FIG. 19A, the aircraft 10*c* has the wing rotation driven system 184 with the lever assembly 408 in the fuselage 16, in a second position 432*b* of the sequence 432. FIG. 19A shows the aircraft 10*c* with wings 14 and expandable strut assemblies 12 comprising struts 40 and shape transition assemblies 140, and the activation mechanism 178 comprising the wing rotation driven system 184.

FIG. 19B is an illustration of a front view of a portion 19B from FIG. 19A, showing the second position 432*b* of the sequence 432 of the wing rotation driven system 184 with the lever assembly 408. FIG. 19B shows the vertical linkage members 414, comprising the 0.3 g link 414*c* and the 0.7 g link 414*d*, attached between the wing 14 and the first lever portion 420*a* of the lever 420. FIG. 19B further shows the fuselage 16, the strut loft 412, and the movable spine member 166*d*, or strut spine. As the vehicle 10 (see FIG. 19A), such as the aircraft 10*c* (see FIG. 19A), travels down a runway, the wings 14 start to generate lift. At a lift equal to 30% of a weight of the vehicle 10, such as the aircraft 10*c*, the strut cross section 60 (see FIGS. 1, 6A), starts to contract or retract. The wing 14 rotates, such that the centerline elevation is decreased. The strut loft 412 and the strut 40 (see FIG. 19A) are in the expanded position 66 (see FIG. 19B). All of the spine axial load 76 (see FIG. 1) of the movable spine member 166*d* passes through the lever 420. The 0.3 g link 414*c* is no longer buckled.

FIG. 19C is an illustration of a front enlarged view of a portion 19C from FIG. 19B, showing the lever position 435 in a second lever position 435*b* of the lever 420 of the lever assembly 408. FIG. 19C further shows the bearing pad 427 of the movable spine member 166*d*, or strut spine, and the 0.3 g stop 428*c*. The bearing load against the 0.3 g stop 428*c* is zero. FIG. 19C further shows the 0.7 g stop 428*d*, the fuselage 16, the fuselage strut fairing 52, the strut loft 412, the 0.3 g link 414*c*, and the 0.7 g link 414*d*.

Figure 20A:
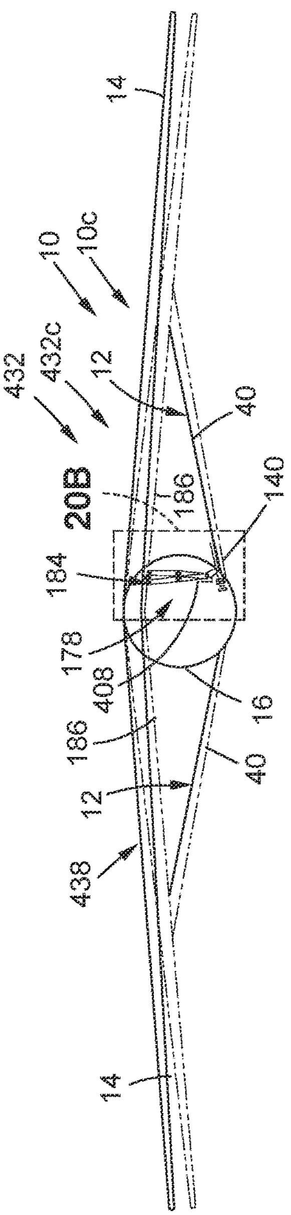
FIG. 20A is an illustration of a front view of a schematic diagram of the aircraft of FIG. 18A, in a take-off 0.5 g upload on wing condition.
Figure 20C:
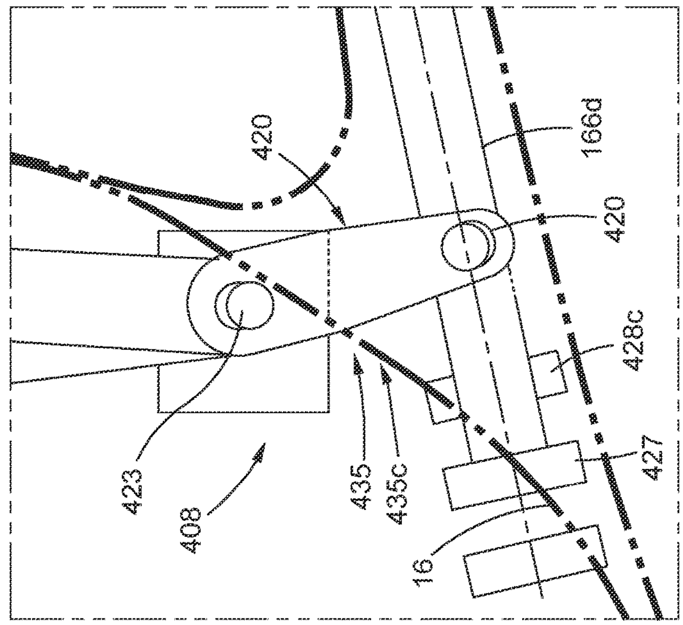
FIG. 20C is an illustration of a front enlarged view of a portion 20C from FIG. 20B, showing a third lever position of the lever of the lever assembly.
Figure 20B:
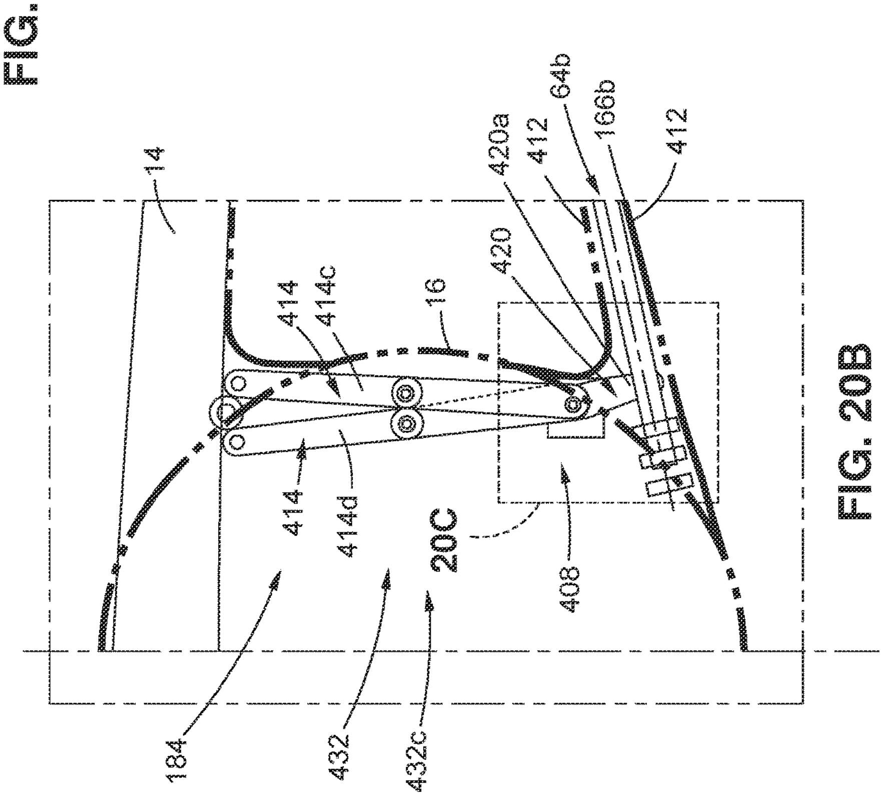
FIG. 20B is an illustration of a front view of a portion 20B from FIG. 20A, showing a third position of the sequence of the wing rotation driven system.

Now referring to FIGS. 20A-20C, FIG. 20A is an illustration of a front view of a schematic diagram of the vehicle 10, such as the aircraft 10*c*, of FIG. 18A, in a take-off 0.5 g upload on wing condition 438. As shown in FIG. 20A, the aircraft 10*c* has the wing rotation driven system 184 with the lever assembly 408 in the fuselage 16, in a third position 432*c* of the sequence 432. FIG. 20A shows the aircraft 10*c* with wings 14 and expandable strut assemblies 12 comprising struts 40 and shape transition assemblies 140, and the activation mechanism 178 comprising the wing rotation driven system 184. FIG. 20A further shows wing rotations 186, or deflections, of the wings 14.

FIG. 20B is an illustration of a front view of a portion 20B from FIG. 20A, showing the third position 432*c* of the sequence 432 of the wing rotation driven system 184 with the lever assembly 408. FIG. 20B shows the vertical linkage members 414, comprising the 0.3 g link 414*c* and the 0.7 g link 414*d*, attached between the wing 14 and the first lever portion 420*a* of the lever 420. The lift on the wing 14 is about 50% of the weight of the vehicle 10 (see FIG. 20A), such as the aircraft 10*c* (see FIG. 20A). By virtue of the movable spine member 166*d* (see FIG. 20B) being activated by the lever assembly 408, the strut loft 412 and the strut 40

(see FIG. 20A) are about 50% contracted, or at the intermediate contracted position 64*b* (see FIG. 20B).

FIG. 20C is an illustration of a front enlarged view of a portion 20C from FIG. 20B, showing the lever position 435, such as a third lever position 435*c*, of the lever 420 of the lever assembly 408. As shown in FIG. 20C, the slotted through hole 424 accommodates the radius of the lever 420, as it rotates around the pivot axis 423. As the load increases, the lever 420 unbuckles. As the aircraft 10*c* (see FIG. 20A) goes from the take-off 0.3 g upload on wing condition 436 (see FIG. 19A) to the take-off 0.5 g upload on wing condition 438 (see FIG. 20A), the wing rotations 186 (see FIG. 20A), or deflections, of the wings 14, are harvested. As shown in FIG. 20C, the movable spine member 166*d* with the bearing pad 427 pulls away from the 0.3 g stop 428*c*, and the movable spine member 166*d* drives the compression chains 202 (see FIGS. 1, 6A).

Figure 21A:
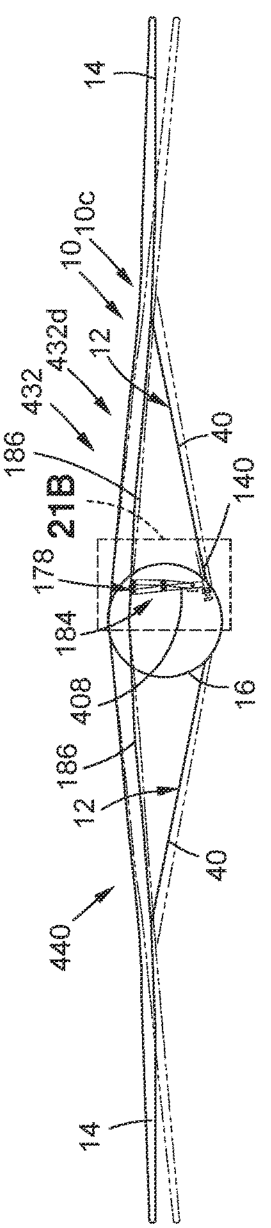
FIG. 21A is an illustration of a front view of a schematic diagram of the aircraft of FIG. 18A, in a take-off 0.7 g upload on wing condition.
Figure 21B:
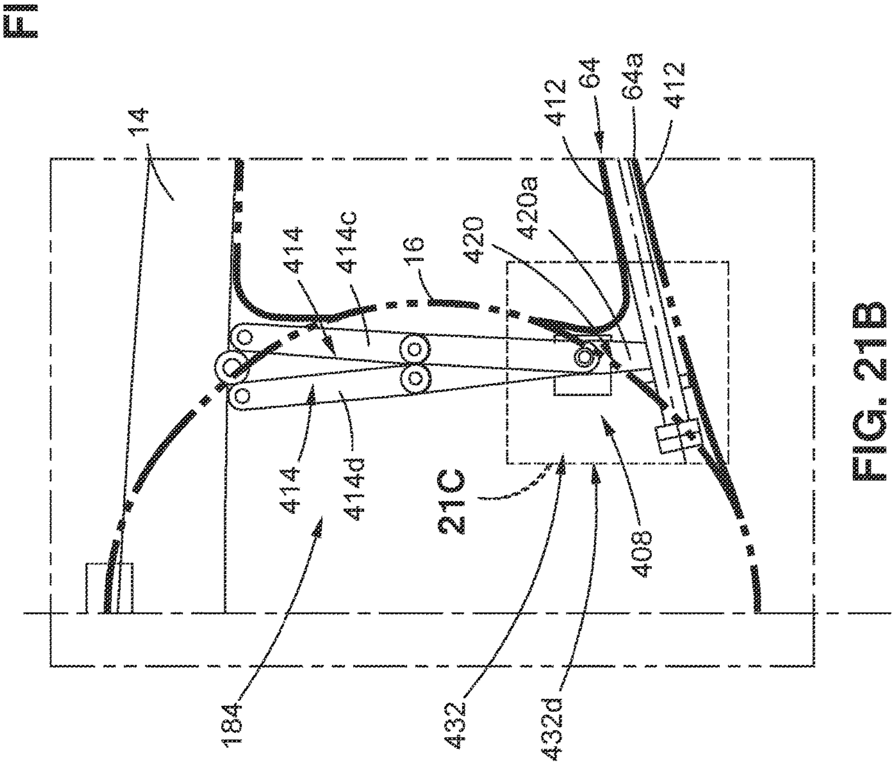
FIG. 21B is an illustration of a front view of a portion 21B from FIG. 21A, showing a fourth position of the sequence of the wing rotation driven system.
Figure 21C:
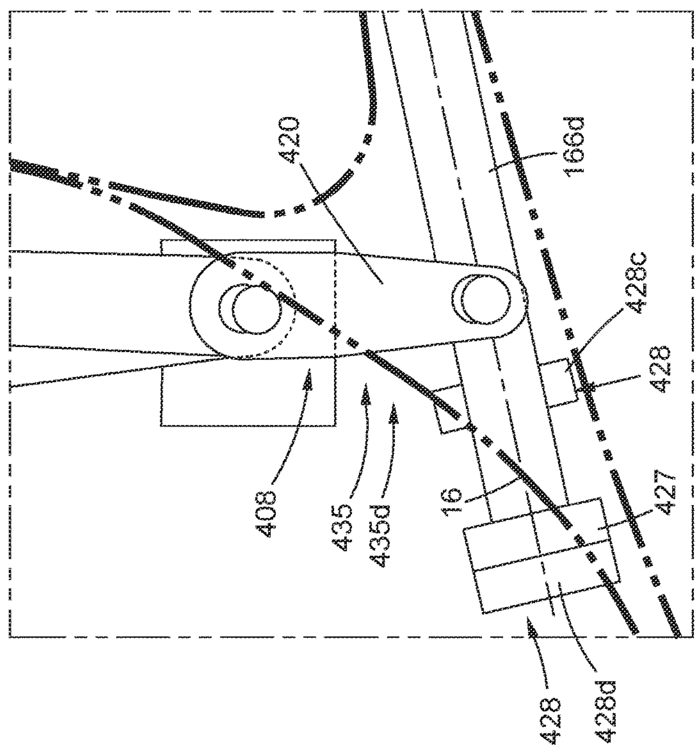
FIG. 21C is an illustration of a front enlarged view of a portion 21C from FIG. 21B, showing a fourth lever position of the lever of the lever assembly.

Now referring to FIGS. 21A-21C, FIG. 21A is an illustration of a front view of a schematic diagram of the vehicle 10, such as the aircraft 10*c*, of FIG. 18A, in a take-off 0.7 g upload on wing condition 440. As shown in FIG. 21A, the aircraft 10*c* has the wing rotation driven system 184 with the lever assembly 408 in the fuselage 16, in a fourth position 432*d* of the sequence 432. FIG. 21A shows the aircraft 10*c* with wings 14 and expandable strut assemblies 12 comprising struts 40 and shape transition assemblies 140, and the activation mechanism 178 comprising the wing rotation driven system 184. FIG. 21A further shows wing rotations 186, or deflections, of the wings 14.

FIG. 21B is an illustration of a front view of a portion 21B from FIG. 21A, showing the fourth position 432*d* of the sequence 432 of the wing rotation driven system 184 with the lever assembly 408. FIG. 21B shows the vertical linkage members 414, comprising the 0.3 g link 414*c* and the 0.7 g link 414*d*, attached between the wing 14 and the first lever portion 420*a* of the lever 420. When the lift on the wing 14 approaches about 70% of the weight of the vehicle 10, such as the aircraft 10*c*, the strut loft 412 (see FIG. 21B), the strut 40 (see FIGS. 1, 6A, 21A), and the strut cross section 60 (see FIGS. 1, 6A) are 100% contracted, in the contracted position 64 (see FIG. 21B), such as the fully contracted position 64*a* (see FIG. 21B).

FIG. 21C is an illustration of a front enlarged view of a portion 21C from FIG. 21B, showing the lever position 435 in a fourth lever position 435*d* of the lever 420 of the lever assembly 408. As shown in FIG. 21C, the movable spine member 166*d*, or strut spine, and the bearing pad 427 bear against the stop element 428, such as the 0.7 g stop 428*d*. FIG. 21C further shows the stop element 428, such as the 0.3 g stop 428*c*. With the movable spine member 166*d*, and the bearing pad 427, bearing upon the 0.7 g stop 428*d*, any increased load upon the aircraft 10*c* (see FIG. 21A) does not result in increased load to the movable spine member 166*d* and the strut spine mechanism.

Now referring to FIGS. 22A-22C, FIG. 22A is an illustration of a front view of a schematic diagram of the vehicle 10, such as the aircraft 10*c*, of FIG. 18A, in the 2.5 g up-bending of wing flight condition 32. Although the 2.5 g up-bending of wing flight condition 32 is shown in FIG. 22A, this behavior occurs for any load above 0.7 g. As shown in FIG. 22A, the aircraft 10*c* has the wing rotation driven system 184 with the lever assembly 408 in the fuselage 16, in a fifth position 432*e* of the sequence 432. FIG. 22A shows the aircraft 10*c* with wings 14 and expandable strut assemblies 12 comprising struts 40 and shape transition assemblies 140, and the activation mechanism 178 comprising the wing rotation driven system 184.

FIG. 22B is an illustration of a front view of a portion 22B from FIG. 22A, showing the fifth position 432*e* of the sequence 432 of the wing rotation driven system 184 with the lever assembly 408. FIG. 22B shows the vertical linkage members 414, comprising the 0.3 g link 414*c* and the 0.7 g link 414*d*, attached between the wing 14 and the first lever portion 420*a* of the lever 420. In the cruise flight condition 34, the strut loft 412 (see FIG. 22B), the strut cross section 60 (see FIGS. 1, 6A), and the strut 40 (see FIG. 22B) are fully contracted or retracted, in the contracted position 64 (see FIG. 22B), such as the fully contracted position 64*a* (see FIG. 22B), thus enabling fuel efficiency, resulting from a reduced drag on a thinner cross section. For any loads above 0.7 g, the 0.7 g link 414*d* is designed to buckle at the 0.7 g load level. Thus, a cantilever created by the 0.3 g link 414*c* and the 0.7 g link 414*d* do not introduce loads above the 0.7 g level.

FIG. 22C is an illustration of a front enlarged view of a portion 22C from FIG. 22B, showing the lever position 435 in a fifth lever position 435*e* of the lever 420 of the lever assembly 408. As shown in FIG. 22C, the movable spine member 166*d*, or strut spine, and the bearing pad 427 bear against the stop element 428, such as the 0.7 g stop 428*d*. FIG. 22C further shows the stop element 428, such as the 0.3 g stop 428*c*. FIG. 22C further shows the strut loft 412, the fuselage 16, the spine pin 425, the link pin 419, and the vertical linkage members 414.

Figure 23C:
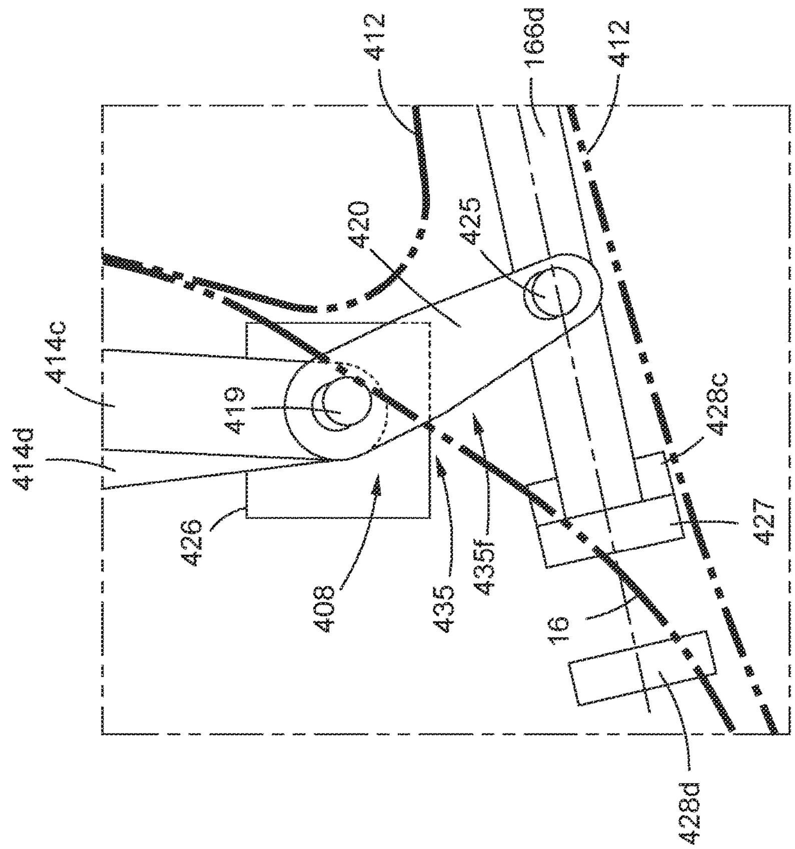
FIG. 23C is an illustration of a front enlarged view of a portion 23C from FIG. 23B, showing a sixth lever position of the lever of the lever assembly.
Figure 23B:
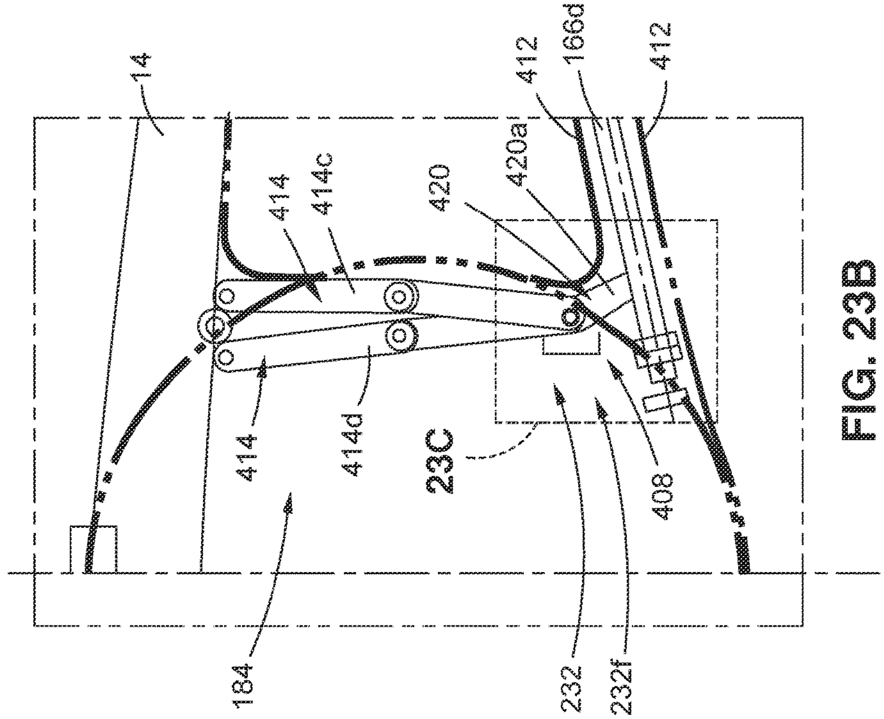
FIG. 23B is an illustration of a front view of a portion 23B from FIG. 23A, showing a sixth position of the sequence of the wing rotation driven system.

Now referring to FIGS. 23A-23C, FIG. 23A is an illustration of a front view of a schematic diagram of the vehicle 10, such as the aircraft 10*c*, of FIG. 18A, in the minus 1 g pushover flight condition 36 and download on the wings 14. As shown in FIG. 23A, the aircraft 10*c* has the wing rotation driven system 184 with the lever assembly 408 in the fuselage 16, in a sixth position 432*f* of the sequence 432. FIG. 22A shows the aircraft 10*c* with wings 14 and expandable strut assemblies 12 comprising struts 40 and shape transition assemblies 140, and the activation mechanism 178 comprising the wing rotation driven system 184.

FIG. 23B is an illustration of a front view of a portion 23B from FIG. 23A, showing the sixth position 432*f* of the sequence 432 of the wing rotation driven system 184 with the lever assembly 408. FIG. 22B shows the vertical linkage members 414, comprising the 0.3 g link 414*c* and the 0.7 g link 414*d*, attached between the wing 14 and the first lever portion 420*a* of the lever 420. In the wing down bending position, the wing load has decreased to a point where it passes through the zero (0) g point (weightless) and the wing loading is in the minus 1 g pushover flight condition 36. Any load decrease past the 0.3 g point has gone into the movable spine member 166*d*, or strut spine, and has not put any extra load into the lever 420. However, the wing 14 continues to rotate. The 0.3 g is designed to buckle at the 0.3 g load point, so the wing 14 is free to continue to rotate without putting excessive load into the lever 420.

FIG. 23C is an illustration of a front enlarged view of a portion 23C from FIG. 23B, showing the lever position 435 in a sixth lever position 435*f* of the lever 420 of the lever assembly 408. FIG. 23C further shows the bearing pad 427 of the movable spine member 166*d*, or strut spine, bearing against the 0.3 g stop 428*c*. FIG. 23C further shows the 0.7 g stop 428*d*, the block element 426, the fuselage 16, the strut loft 412, the spine pin 425, the link pin 419, the 0.3 g link 414*c*, and the 0.7 g link 414*d*.

Figure 24:
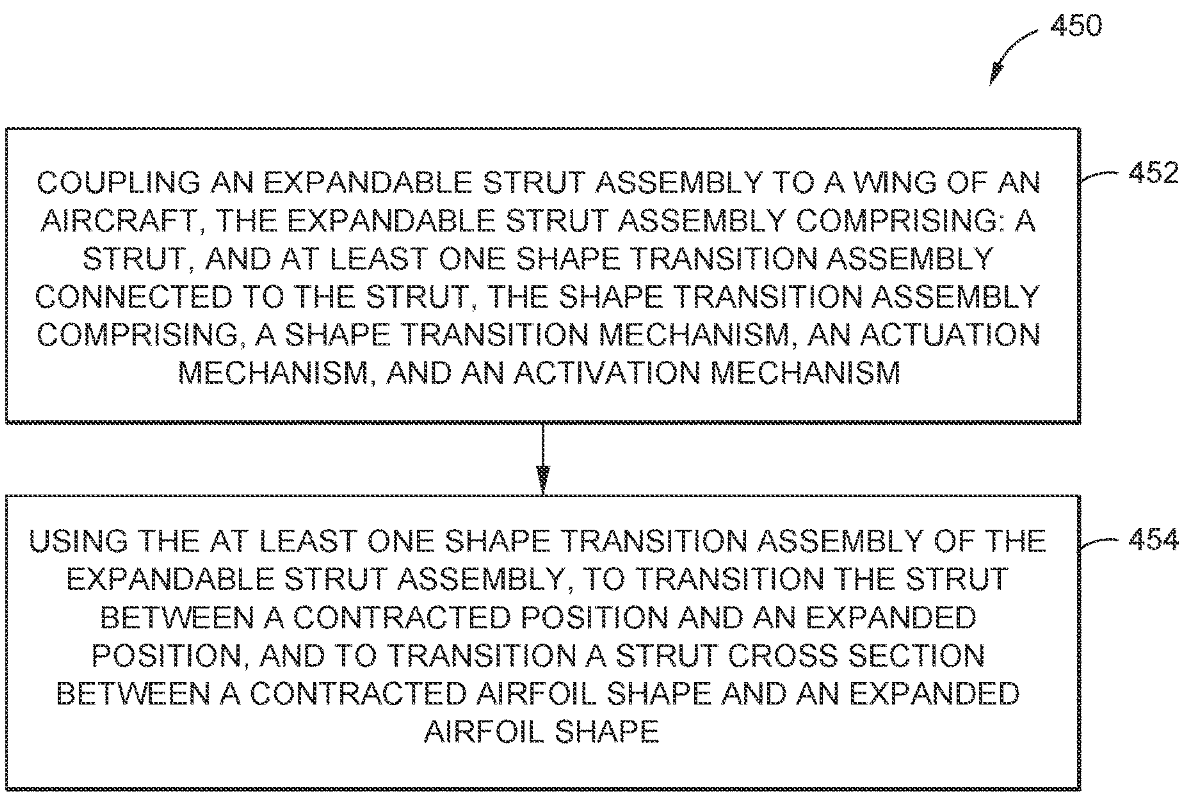
FIG. 24 is an illustration of a flow diagram of an exemplary version of a method of the disclosure.

Now referring to FIG. 24, FIG. 24 is an illustration of a flow diagram of an exemplary version of a method 450 of the disclosure. In another version of the disclosure, there is provided the method 450 of using an expandable strut assembly 12 to expand a strut 40 (see FIGS. 1, 2A-2C) of a wing 14 (see FIGS. 1, 2A-2C, 18A) of a vehicle 10 (see FIGS. 1, 2A-2C), such as aircraft 10*a* (see FIGS. 1, 2A-2B), aircraft 10*b* (see FIGS. 1, 2C), aircraft 10*c* (see FIGS. 1, 18A), or another suitable aircraft.

The blocks in FIG. 24 represent operations and/or portions thereof, or elements, and lines connecting the various blocks do not imply any particular order or dependency of the operations or portions thereof, or elements. FIG. 24 and the disclosure of the steps of the method 450 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 24, the method 450 comprises the step 452 of coupling an expandable strut assembly 12 (see FIGS. 1, 2A-2C) to the wing 14 (see FIGS. 1, 2A-2C) of the vehicle 10 (see FIGS. 1, 2A-2C), such as aircraft 10*a* (see FIGS. 1, 2A-2B), aircraft 10*b* (see FIG. 1, 2C), and aircraft 10*c* (see FIGS. 1, 18A). The expandable strut assembly 12 comprises the strut 40 (see FIGS. 1, 2A-2C) having an outboard end 42 (see FIGS. 2A-2C), an inboard end 44 (see FIGS. 2A-2C) opposite the outboard end 42, and an elongate body 46 (see FIGS. 2A-2C) defined between and formed between the outboard end 42 and the inboard end 44. The outboard end 42 is coupled to the wing 14 of the aircraft 10*a*, 10*b*, or 10*c*, and the inboard end 44 is coupled to the fuselage 16 (see FIGS. 1, 2A-2C) of the aircraft 10*a*, 10*b*, or 10*c*.

The strut 40 has the strut cross section 60 (see FIGS. 1, 3C) with the airfoil shape 62 (see FIGS. 1, 3C). The expandable strut assembly 12 further comprises at least one shape transition assembly 140 (see FIGS. 1, 3I) connected to the interior 56 (see FIGS. 2A, 3I) of the strut 40. Each shape transition assembly 140 comprises a shape transition mechanism 142 (see FIGS. 1, 3I) attached to one or more interior portions 56*a* (see FIG. 2A) in the interior 56 (see FIG. 2A) of the strut 40. The shape transition mechanism 142 comprises a plurality of fixed length structural members 144 (see FIGS. 1, 3I), and a drive mechanism 154 (see FIGS. 1, 3I) connected to the plurality of fixed length structural members 144. The drive mechanism 154 comprises one or more variable length structural members 156 (see FIGS. 1, 3I).

Each shape transition assembly 140 further comprises an actuation mechanism 158 (see FIGS. 1, 3I) connected to the shape transition mechanism 142. Each shape transition assembly 140 further comprises an activation mechanism 178 (see FIGS. 1, 2A) coupled to the actuation mechanism 158.

The step 452 of coupling the expandable strut assembly 12 to the wing 14 of the aircraft 10*a*, 10*b*, further comprises, coupling the expandable strut assembly 12 having the plurality of fixed length structural members 144 forming an expandable structure 146 having a cross section profile 148 (see FIGS. 3C, 10A) comprising one of, a rhombus shape 150 (see FIG. 3C), or a hexagon shape 152 (see FIG. 10A).

The step 452 of coupling the expandable strut assembly 12 to the wing 14 of the aircraft 10*a*, 10*b*, further comprises, coupling the expandable strut assembly 12 having the shape transition assembly 140 comprising each shape transition mechanism 142 comprising, the plurality of fixed length structural members 144 forming an expandable structure 146 having a cross section profile 148 comprising a rhombus shape 150, and the drive mechanism 154 comprising a plurality of compression chains 202 (see FIG. 3J) coupled to a reduction gear system 242 (see FIGS. 3J, 3K), and the shape transition assembly 140 further comprising the actuation mechanism 158 comprising a first spine member 166*a* (see FIG. 5A) and a second spine member 166*b* (see FIG. 5A) coupled to a reduction gear system 242 (see FIG. 3K) in the strut 40, and the activation mechanism 178 comprising a strut axial load driven activation mechanism 182 (see FIG. 1) having a strut axial load 76*a* (see FIG. 1) in the strut 40.

The step 452 of coupling the expandable strut assembly 12 to the wing 14 of the aircraft 10*a*, 10*b*, further comprises, coupling the expandable strut assembly 12 further comprising, a jury strut 136 (see FIG. 2B) attached between a top portion 198 (see FIG. 2B) of the strut 40 (see FIG. 2B) and an underside portion 18*b* (see FIG. 2B) of the wing 14 (see FIG. 2B), and forms a jury strut joint location 200 (see FIG. 2B), wherein a first end 196*a* (see FIG. 2B) of the jury strut 136 joins to the top portion 198 of the strut 40, and further wherein each of the at least one shape transition assemblies 140 has an outboard end 141*a* attached to the interior 56 of the strut 40 at the jury strut joint location 200.

The step 452 of coupling the expandable strut assembly 12 to the wing 14 of the aircraft 10*a*, 10*b*, further comprises, coupling to the wing 14 of the aircraft 10*a*, 10*b*, a double structure expandable strut assembly 12*d* (see FIG. 3M) with two shape transition assemblies 140 (see FIG. 3M) comprising a first shape transition assembly 140*a* (see FIG. 3M), and a second shape transition assembly 140*b* (see FIG. 3M) positioned aft of the first shape transition assembly 140*a*.

As shown in FIG. 24, the method 450 further comprises the step 454 of using the at least one shape transition assembly 140 of the expandable strut assembly 12, to transition the strut 40 between a contracted position 64 (see FIGS. 1, 4A), such as a fully contracted position 64*a* (see FIG. 4A), and an expanded position 66 (see FIGS. 1, 4E), such as a fully expanded position 66*a* (see FIG. 4E), and to transition the strut cross section 60 (see FIGS. 1, 4A, 4E) between a contracted airfoil shape 70 (see FIG. 1, 4A), such as a fully contracted airfoil shape 70*a* (see FIG. 4A), and an expanded airfoil shape 74 (see FIGS. 1, 4E), such as a fully expanded airfoil shape 74*a* (see FIG. 4E).

The step 454 of using the shape transition assembly 140 further comprises, activating the actuation mechanism 158 with the activation mechanism 178 comprising one of, (a) a sensor activation mechanism 180 (see FIG. 1); (b) a strut axial load driven activation mechanism 182 (see FIG. 1); or (c) a wing rotation driven system 184 (see FIG. 1), to convert wing rotations 186 (see FIG. 1) of the wing 14 to horizontal movement 188 (see FIG. 1) at a strut root 54 (see FIG. 2A) of the strut 40.

The step 454 of using the shape transition assembly 140 further comprises, actuating the drive mechanism 154 with the actuation mechanism 158 comprising one of, (a) one or more torque tubes 162 (see FIG. 10A) connected to the shape transition mechanism 142, the one or more torque tubes 162 rotated by a fuselage structure 22 in the fuselage 16 (see FIG. 2C), such as a motor 24 or rack-and-pinion system 26 (see FIG. 2C); (b) a first spine member 166*a* (see FIG. 5A) and a second spine member 166*b* (see FIG. 5A) coupled to the reduction gear system 242 (see FIG. 3K) in the strut 40; (c) an immovable spine member 166*c* (see FIG. 9A) connected to a spring system 304 (see FIG. 6C) in an interior 20*a* (see FIG. 2C) of the fuselage 16; or (d) a movable spine member 166*d* (see FIG. 17A) attached to a lever assembly 408 (see FIG. 17A) in the interior 20*a* of the fuselage 16. Actuating the drive mechanism 154 with the actuation mechanism 158 further comprises the fuselage structure 22 in the fuselage 16 rotating the one or more torque tubes 162 comprising one of, the motor 24 (see FIG. 1), the rack-and-pinion system 26 (see FIGS. 1, 2C), or another suitable structure.

The step 454 of using the shape transition assembly 140 further comprises, expanding and contracting the strut 40 with the drive mechanism 154 comprising one of, (a) one or more compression chains 202 (see FIG. 3J); (b) a spring assembly 324 (see FIG. 10A) and a plurality of cables 172 (see FIG. 10A); or (c) a cam assembly 350 (see FIG. 11B) and the plurality of cables 172 (see FIG. 11B).

The step 454 of using the shape transition assembly 140 further comprises, the strut 40 is in the contracted position 64 and the strut cross section 60 is in the contracted airfoil shape 70 during a cruise flight condition 34 (see FIG. 1) of the aircraft 10*a*, 10*b*, and the strut 40 is in the expanded position 66 and the strut cross section 60 is in the expanded airfoil shape 74, when the strut 40 is under compression 72 (see FIG. 1) during a wing down-bending flight condition 35 (see FIG. 1) of the aircraft 10*a*, 10*b*, or 10*c*.

Figure 25:
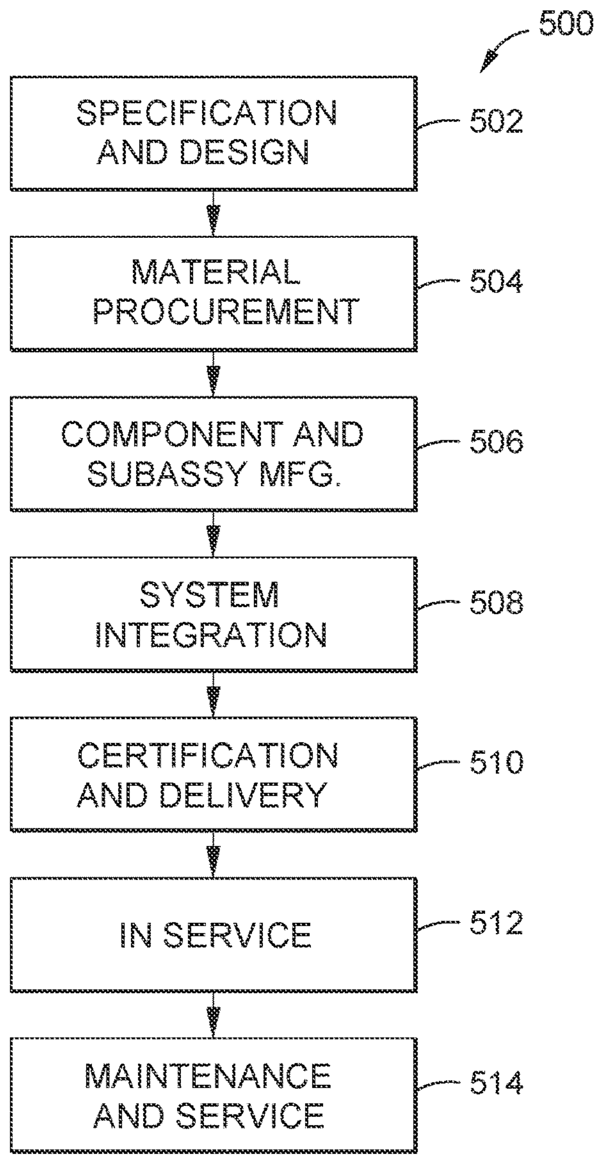
FIG. 25 is an illustration of a flow diagram of an exemplary aircraft manufacturing and service method.
Figure 26:
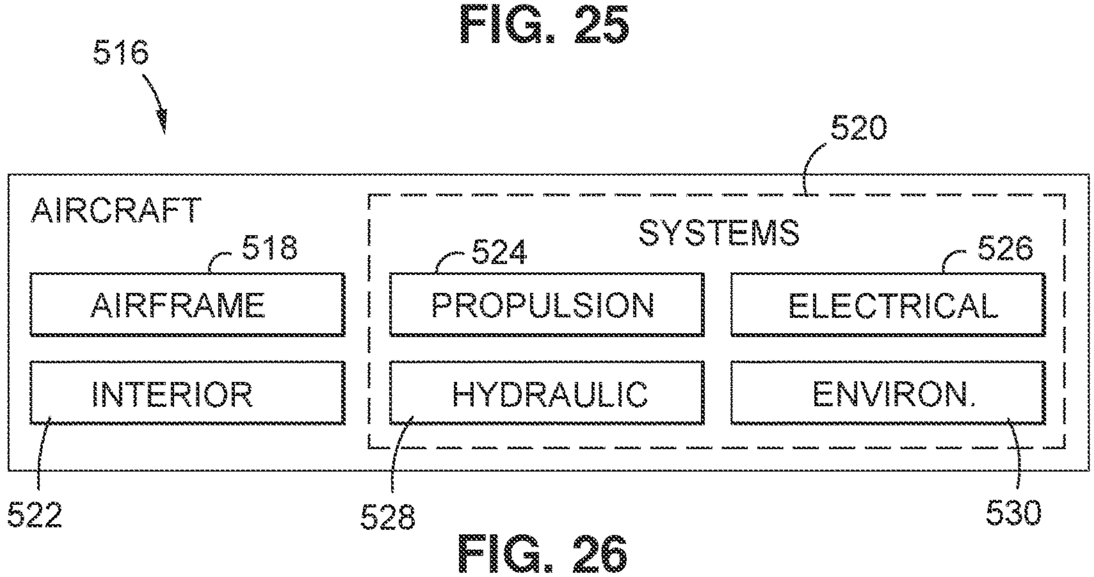
FIG. 26 is an illustration of an exemplary block diagram of an aircraft.

Now referring to FIGS. 25 and 26, FIG. 25 is an illustration of a flow diagram of an exemplary aircraft manufacturing and service method 500, and FIG. 26 is an illustration of an exemplary block diagram of an aircraft 516. Referring to FIGS. 25 and 26, versions of the disclosure may be described in the context of the aircraft manufacturing and service method 500 as shown in FIG. 25, and the aircraft 516 as shown in FIG. 26.

During pre-production, exemplary aircraft manufacturing and service method 500 may include specification and design 502 of the aircraft 516 and material procurement 504. During manufacturing, component and subassembly manufacturing 506 and system integration 508 of the aircraft 516 takes place. Thereafter, the aircraft 516 may go through certification and delivery 510 in order to be placed in service 512. While in service 512 by a customer, the aircraft 516 may be scheduled for routine maintenance and service 514 (which may also include modification, reconfiguration, refurbishment, and other suitable services).

Each of the processes of the aircraft manufacturing and service method 500 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 26, the aircraft 516 produced by the exemplary aircraft manufacturing and service method 500 may include an airframe 518 with a plurality of systems 520 and an interior 522. Examples of the plurality of systems 520 may include one or more of a propulsion system 524, an electrical system 526, a hydraulic system 528, and an environmental system 530. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 500. For example, components or subassemblies corresponding to component and subassembly manufacturing 506 may be fabricated or manufactured in a manner similar to components or subassemblies produced while the aircraft 516 is in service 512. Also, one or more apparatus embodiments, method embodiments, or a combination thereof, may be utilized during component and subassembly manufacturing 506 and system integration 508, for example, by substantially expediting assembly of or reducing the cost of the aircraft 516. Similarly, one or more of apparatus embodiments, method embodiments, or a combination thereof, may be utilized while the aircraft 516 is in service 512, for example and without limitation, to maintenance and service 514.

Disclosed versions of the expandable strut assembly 12 (see FIGS. 1, 2A-2B, 3A-3N, 4A, 6A), the aircraft 10*a* (see FIGS. 1, 2A-2B), aircraft 10*b* (see FIGS. 1, 2C-2D), and aircraft 10*c* (see FIG. 18A) with the expandable strut assembly 12 (see FIGS. 1, 2A-2B, 3A-3N, 4A, 6A), and the method 450 (see FIG. 24) provide for an improved expandable strut assembly 12 for a wing 14 of a vehicle 10 (see FIG. 1), such as an aircraft 10*a* (see FIGS. 1, 2A-2B), aircraft 10*b* (see FIGS. 1, 2C), aircraft 10*c* (see FIGS. 1, 18A), or another suitable aircraft that enables a more efficient thin or small strut cross section 60 for cruise portions of a flight, such as cruise flight condition 34 (see FIG. 1), that allows for a light strut to carry compressive loads 73 (see FIG. 1) for wing down bending conditions 35 (see FIG. 1) and a minus 1 g pushover flight condition 36 (see FIG. 1), while preserving a weight-savings aspect for the wing 14, that uses certain versions with compression chains 202, which has the advantage of avoiding the "scissor jack phenomenon", that eliminates cable drooping without adding unwanted weight, that avoids excessive tension 78 to the wing 14 to prevent bending stresses, that has a low aerodynamic drag, and that provides advantages over known strut members and strut assemblies.

In addition, disclosed versions of the expandable strut assembly 12 (see FIGS. 1, 2A-2B, 3A-3N, 4A, 6A), the aircraft 10*a* (see FIGS. 1, 2A-2B), aircraft 10*b* (see FIGS. 1, 2C-2D), and aircraft 10*c* (see FIG. 18A) with the expandable strut assembly 12 (see FIGS. 1, 2A-2B, 3A-3N, 4A, 6A), and the method 450 (see FIG. 24) allow the strut 40 and the strut cross section 60 to quickly expand or extend into the expanded position 66 (see FIG. 1), such as the fully expanded position 66*a* (see FIGS. 4E, 10E), before the strut 40 goes into compression 72 (see FIG. 1). While the strut 40 needs to expand when it is in compression 72, the strut 40 may be designed to expand while the strut 40 is still in tension 78, e.g., 0.3 g to 0.7 g loading levels. The expandable strut assembly 12 disclosed herein provides an assembly and method that avoid a thick or large strut 40 for the portion of the flight that is between 1 g on ground condition 30 and the cruise flight condition 34 (see FIG. 1). The expandable strut assembly 12 can lock into a thick or large configuration and contracts or retracts when certain strut tension load 80 (see FIG. 1) is applied. Further, the expandable strut assembly 12 can passively lock into a safe condition for the minus 1 g pushover flight condition 36 (see FIG. 1) when tension 78 drops below a predetermined strut tension load threshold 80*a* (see FIG. 1). The locking mechanism may be an automatic locking mechanism, and the locking mechanism may be released or unlocked with a control on the aircraft 10*a*, 10*b*, 10*c*.

In a preferred version of the expandable strut assembly 12, the expandable strut assembly 12 comprises the drive mechanism 154 (see FIG. 4B) of the shape transition assembly 140 (see FIG. 4A) comprising one or more compression chains 202 (see FIGS. 4A-4B) oriented in the strut 40 (see FIG. 4A) in a span-wise direction 101 (see FIG. 4B), and a reduction gear system 242 (see FIG. 4B) coupled to the one or more compression chains 202. In this version, the actuation mechanism 158 (see FIG. 4B) comprises a first spine member 166*a* (see FIG. 4A) and a second spine member

166*b* (see FIGS. 4A-4B) parallel to the first spine member 166*a*, and the activation mechanism 178 (see FIG. 1) comprises a strut axial load driven activation mechanism 182 (see FIG. 1).

In another version of the expandable strut assembly 12, the expandable strut assembly 12 comprises the drive mechanism 154 (see FIG. 6B) of the shape transition assembly 140 (see FIG. 6A) comprising one or more compression chains 202 (see FIG. 6B). In this version, the actuation mechanism 158 comprises an immovable spine member 166*c* (see FIG. 9A) having a restrained end 292*c* (see FIG. 9A) attached to a fuselage structure 22 (see FIG. 1) in an interior 20*a* of the fuselage 16, and having an unrestrained end 294*c* (see FIG. 9A), further comprises a spring system 304 (see FIG. 6C) in the interior 20*a* of the fuselage 16 and connected to the strut 40, to allow the strut 40 to move, when a strut axial load 76*a* (see FIG. 1) is in a predetermined strut axial load range 76*b* (see FIG. 1). Further, the activation mechanism 178 comprises a strut axial load driven activation mechanism 182 (see FIG. 1).

In another version of the expandable strut assembly 12, the expandable strut assembly 12 comprises the drive mechanism 154 (see FIG. 1) comprising one or more compression chains 202. In this version, the actuation mechanism 158 comprises a movable spine member 166*d* (see FIG. 18B) attached to a lever assembly 408 (see FIG. 18B) in an interior 20*a* of the fuselage 16 (see FIG. 18B). In this version, the activation mechanism 178 comprises a wing rotation driven system 184 (see FIG. 18B), to convert wing rotations 186 (see FIG. 1) of each wing 14 (see FIG. 18A) to horizontal movement 188 (see FIG. 1) at a strut root 54 (see FIG. 18A) of the strut 40 (see FIG. 18A).

In another version of the expandable strut assembly 12, the expandable strut assembly 12 comprises the drive mechanism 154 (see FIG. 13A) comprising one or more compression chains 202 (see FIG. 13A) oriented in the strut 40 in a chord-wise direction 100 (see FIG. 13B), and a plurality of cross-bracing cables 172*d* (see FIG. 13A) attached to the actuation mechanism 158. In this version, the actuation mechanism 158 comprises one or more torque tubes 162, such as two torque tubes 162 (see FIG. 13A) connected to the drive mechanism 154, where the two torque tubes 162 are rotated by a fuselage structure 22 (see FIG. 1) in the fuselage 16, and each torque tube 162 is coupled to a torque tube gear 362 (see FIG. 13C). In this version, the activation mechanism 178 (see FIG. 1) comprises a strut axial load driven activation mechanism 182 (see FIG. 1).

In another version of the expandable strut assembly 12, the expandable strut assembly 12 comprises the drive mechanism 154 (see FIG. 10A) comprising a spring assembly 324 (see FIG. 10A) attached to one or more of the plurality of fixed length structural members 144 (see FIG. 10A), the spring assembly 324 comprising one or more vertical springs 326 (see FIG. 10B) and one or more horizontal springs 328 (see FIG. 10B), and one or more cables 172 (see FIG. 10A) attached to the actuation mechanism 158 and to one or more of the plurality of fixed length structural members 144. In this version, the actuation mechanism 158 (see FIG. 10A) comprises torque tubes 162 (see FIG. 10A) connected to the drive mechanism 154, where the torque tubes 162 are rotated by a fuselage structure 22 (see FIG. 1) in the fuselage 16. In this version, the activation mechanism 178 comprises a sensor activation mechanism 180 (see FIG. 1) having one or more sensors 330 (see FIG. 2C) on an aircraft 10*b* (see FIG. 2C), to indicate a decrease in a strut tension load 80 (see FIG. 1).

In another version of the expandable strut assembly 12, the expandable strut assembly 12 comprises the drive mechanism 154 (see FIG. 11A) comprising the plurality of fixed length structural members 144 (see FIG. 11A) including one or more inner brace members 145 (see FIG. 11A), and the drive mechanism 154 further comprising a cam assembly 350 (see FIG. 11A) comprising one or more cams elements 352 (see FIG. 11B), and a plurality of cables 172 (see FIG. 11B) comprising one or more vertical cables 172*a* (see FIG. 11B), one or more horizontal cables 172*b* (see FIG. 11B), and one or more shear cables 172*c* (see FIG. 11B). In this version, the actuation mechanism 158 (see FIG. 11A) comprises torque tubes 162 (see FIG. 11A) connected to the drive mechanism 154, the torque tubes 162 rotated by a fuselage structure 22 (see FIG. 1) in the fuselage 16. In this version, the activation mechanism 178 (see FIG. 1) comprises a sensor activation mechanism 180 (see FIG. 1) having one or more sensors 330 (see FIG. 2C) on the aircraft 10*b* (see FIG. 2C), to indicate a decrease in the strut tension load 80 (see FIG. 1).

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. An expandable strut assembly for a wing of an aircraft, the expandable strut assembly comprising:

a strut having a strut cross section with an airfoil shape, and the strut having an outboard end coupled to the wing of the aircraft, an inboard end coupled to a fuselage of the aircraft, and an elongate body defined between the outboard end and the inboard end; and at least one shape transition assembly connected to an interior of the strut, each shape transition assembly configured to transition the strut between a contracted position and an expanded position, and configured to transition the strut cross section between a contracted airfoil shape and an expanded airfoil shape, each shape transition assembly comprising:

a shape transition mechanism attached to one or more interior portions in the interior of the strut, the shape transition mechanism comprising:

a plurality of fixed length structural members;

a drive mechanism connected to the plurality of fixed length structural members, the drive mechanism comprising one or more variable length structural members;

an actuation mechanism connected to the shape transition mechanism, the actuation mechanism configured to actuate the drive mechanism of the shape transition mechanism; and an activation mechanism coupled to the actuation mechanism, the activation mechanism configured to activate the actuation mechanism, to initiate a position transition of the strut between the contracted position and the expanded position, and to initiate a shape transition of the strut cross section between the contracted airfoil shape and the expanded airfoil shape.

2. The expandable strut assembly of claim 1, wherein the expandable strut assembly further comprises:

a jury strut attached between a top portion of the strut and an underside portion of the wing, and forms a jury strut joint location, wherein a first end of the jury strut joins to the top portion of the strut, and further wherein each of the at least one shape transition assemblies has an outboard end attached to the interior of the strut at the jury strut joint location.

3. The expandable strut assembly of claim 1, wherein:

the strut is in the contracted position and the strut cross section is in the contracted airfoil shape during a cruise flight condition of the aircraft; and the strut is in the expanded position and the strut cross section is in the expanded airfoil shape, when the strut is under compression during a wing down-bending flight condition of the aircraft.

4. The expandable strut assembly of claim 1, wherein the strut further comprises a leading edge comprising:

a leading edge skin that is flexible in a chord-wise direction of the strut, the leading edge skin having a constant length, and having a first end, a second end, and an arc length defined therebetween;

a flexible skin portion at a forward-most end of the leading edge; and a leading edge shape control mechanism attached to the leading edge skin at a plurality of discrete, fixed support locations, and configured to transition the leading edge skin from a first shape having a first curvature profile to a second shape having a second curvature profile different than the first curvature profile without a change in the arc length.

5. The expandable strut assembly of claim 1, wherein the strut further comprises a trailing edge comprising:

a trailing edge skin having a constant length; and an aft membrane configured to close off a strut enclosure of the strut.

6. The expandable strut assembly of claim 5, wherein the aft membrane comprises an accordion aft membrane having an accordion shape profile when the strut is in the expanded position.

7. The expandable strut assembly of claim 1, wherein the plurality of fixed length structural members comprise one or more of fixed length spars, inner brace members, truss members, bars, and cross-beam members.

8. The expandable strut assembly of claim 1, wherein the plurality of fixed length structural members form an expandable structure having a cross section profile comprising a rhombus shape.

9. The expandable strut assembly of claim 1, wherein the plurality of fixed length structural members form an expandable structure having a cross section profile comprising a hexagon shape.

10. The expandable strut assembly of claim 1, wherein the one or more variable length structural members of the drive mechanism comprise:

one or more compression chains attached to the actuation mechanism, the one or more compression chains oriented in the strut in one of a chord-wise direction or a span-wise direction.

11. The expandable strut assembly of claim 10, wherein the one or more compression chains are pre-loaded with one or more springs members in the interior of the strut.

12. The expandable strut assembly of claim 10, wherein the one or more compression chains are connected to a reduction gear system having a plurality of gears.

13. The expandable strut assembly of claim 1, wherein the one or more variable length structural members of the drive mechanism comprise a plurality of variable length structural members comprising:

a spring assembly attached to one or more of the plurality of fixed length structural members, the spring assembly comprising one or more vertical springs and one or more horizontal springs; and a plurality of cables attached to the actuation mechanism and to one or more of the plurality of fixed length structural members.

14. The expandable strut assembly of claim 1, wherein the one or more variable length structural members of the drive mechanism comprise a plurality of variable length structural members comprising:

a cam assembly comprising one or more cam elements; and a plurality of cables comprising one or more vertical cables, one or more horizontal cables, and one or more shear cables, the plurality of cables attached to one or more of the actuation mechanism and the plurality of fixed length structural members.

15. The expandable strut assembly of claim 1, wherein the actuation mechanism comprises:

a first spine member having a restrained end attached to the outboard end of the strut and having an unrestrained end, and extending along a length of the strut;

a second spine member having a restrained end attached to a fuselage structure in an interior of the fuselage, and having an unrestrained end, and extending along the length of the strut parallel to the first spine member; and one or more compression chain attachment points connecting the first spine member and connecting the second spine member to the drive mechanism.

16. The expandable strut assembly of claim 15, wherein the first spine member and the second spine member are positioned in a parallel position to a load path of the strut.

17. The expandable strut assembly of claim 1, wherein the actuation mechanism comprises:

an immovable spine member having a restrained end attached to a fuselage structure in an interior of the fuselage, and having an unrestrained end, and extending along a length of the strut; and one or more compression chain attachment points connecting the immovable spine member to the drive mechanism.

18. The expandable strut assembly of claim 17, wherein the actuation mechanism further comprises:

a rack-and-pinion system in the interior of the fuselage, the rack-and-pinion system connected to a spring system and connected to the immovable spine member.

19. The expandable strut assembly of claim 1, wherein the actuation mechanism comprises:

a movable spine member attached to a lever assembly in an interior of the fuselage, and extending along a length of the strut; and one or more compression chain attachment points connecting the movable spine member to the drive mechanism.

20. The expandable strut assembly of claim 19, wherein the lever assembly comprises:

a lever attached to the movable spine member via a spine pin; and a plurality of vertical linkage members, each having a first end attached to the wing, and each having a second end attached to a link pin coupling the plurality of vertical linkage members to the lever.

21. The expandable strut assembly of claim 1, wherein the actuation mechanism comprises:

one or more torque tubes connected to the shape transition mechanism, the one or more torque tubes rotated by a fuselage structure in the fuselage.

22. The expandable strut assembly of claim 21, wherein the fuselage structure in the fuselage comprises one of:

a motor; or a rack-and-pinion system.

23. The expandable strut assembly of claim 21, wherein at least one of the one or more torque tubes contains compressed air, to deploy an aft membrane at a trailing edge of the strut, when the strut expands from the contracted position to the expanded position.

24. The expandable strut assembly of claim 21, wherein the one or more torque tubes comprise:

variable radius spindles enabling a non-linear rate of a length change, of a plurality of variable length structural members comprising a plurality of cables, for a constant rotation of each of the variable radius spindles.

25. The expandable strut assembly of claim 1, wherein the activation mechanism comprises:

a sensor activation mechanism having one or more sensors on the aircraft to indicate a decrease in a strut tension load, and when the strut tension load falls below a predetermined strut tension load threshold, the sensor activation mechanism activates the actuation mechanism.

26. The expandable strut assembly of claim 1, wherein the activation mechanism comprises:

a strut axial load driven activation mechanism having a strut axial load in the strut, and when the strut axial load is within a predetermined strut axial load range, the strut axial load driven activation mechanism activates the actuation mechanism.

27. The expandable strut assembly of claim 1, wherein the activation mechanism comprises:

a wing rotation driven system, to convert wing rotations of the wing to horizontal movement at a strut root of the strut, to activate the actuation mechanism, to actuate the drive mechanism.

28. The expandable strut assembly of claim 1, wherein the expandable strut assembly is a double structure expandable strut assembly with two shape transition assemblies comprising a first shape transition assembly and a second shape transition assembly positioned aft of the first shape transition assembly.

29. An aircraft, comprising:

a fuselage;

two wings coupled to the fuselage, and extending from the fuselage opposite each other;

an expandable strut assembly attached to each wing, the expandable strut assembly comprising:

a strut having a strut cross section with an airfoil shape, and the strut having an outboard end coupled to each wing, an inboard end coupled to the fuselage, and an elongate body defined between the outboard end and the inboard end; and at least one shape transition assembly connected to an interior of the strut, each shape transition assembly configured to transition the strut between a contracted position and an expanded position, and configured to transition the strut cross section between a contracted airfoil shape and an expanded airfoil shape, each shape transition assembly comprising:

a shape transition mechanism attached to one or more interior portions in the interior of the strut, the shape transition mechanism comprising:

a plurality of fixed length structural members;

a drive mechanism connected to the plurality of fixed length structural members, the drive mechanism comprising one or more variable length structural members;

an actuation mechanism connected to the shape transition mechanism, the actuation mechanism configured to actuate the drive mechanism of the shape transition mechanism; and an activation mechanism coupled to the actuation mechanism, the activation mechanism configured to activate the actuation mechanism, and to initiate a position transition of the strut between the contracted position and the expanded position, and to initiate a shape transition of the strut cross section between the contracted airfoil shape and the expanded airfoil shape.

30. The aircraft of claim 29, wherein the expandable strut assembly further comprises:

a jury strut attached between a top portion of the strut and an underside portion of each wing, and forms a jury strut joint location where a first end of the jury strut joins to the top portion of the strut, and further wherein each of the at least one shape transition assemblies has an outboard end attached to the interior of the strut at the jury strut joint location.

31. The aircraft of claim 29, wherein the shape transition assembly further comprises:

the plurality of fixed length structural members of the shape transition mechanism forming an expandable structure having a cross section profile comprising a rhombus shape.

32. The aircraft of claim 31, wherein the shape transition assembly further comprises:

the drive mechanism comprising:

one or more compression chains oriented in the strut in a span-wise direction; and a reduction gear system coupled to the one or more compression chains;

the actuation mechanism comprising:

a first spine member having a restrained end attached to the outboard end of the strut and having an unrestrained end, and extending along a length of the strut;

a second spine member having a restrained end attached to a fuselage structure in an interior of the fuselage, and having an unrestrained end, and extending along the length of the strut parallel to the first spine member; and one or more compression chain attachment points connecting the first spine member and connecting the second spine member to the drive mechanism; and the activation mechanism comprising a strut axial load driven activation mechanism.

33. The aircraft of claim 31, wherein the shape transition assembly further comprises:

the drive mechanism comprising one or more compression chains;

the actuation mechanism comprising:

an immovable spine member having a restrained end attached to a fuselage structure in an interior of the fuselage, and having an unrestrained end, and extending along a length of the strut;

one or more compression chain attachment points connecting the immovable spine member to the drive mechanism; and a spring system in the interior of the fuselage, the spring system having springs connected to the strut, and the springs allowing the strut to move when a strut axial load is in a predetermined strut axial load range; and the activation mechanism comprising a strut axial load driven activation mechanism.

34. The aircraft of claim 31, wherein the shape transition assembly further comprises:

the drive mechanism comprising one or more compression chains;

the actuation mechanism comprising:

a movable spine member attached to a lever assembly in an interior of the fuselage, and extending along a length of the strut; and one or more compression chain attachment points connecting the movable spine member to the drive mechanism; and the activation mechanism comprising a wing rotation driven system to convert wing rotations of each wing to horizontal movement at a strut root of the strut.

35. The aircraft of claim 29, wherein the shape transition assembly further comprises:

the plurality of fixed length structural members of the shape transition mechanism forming an expandable structure having a cross section profile comprising a hexagon shape.

36. The aircraft of claim 35, wherein the shape transition assembly further comprises:

the drive mechanism comprising:

one or more compression chains oriented in the strut in a chord-wise direction; and a plurality of cross-bracing cables attached to the actuation mechanism;

the actuation mechanism comprising:

one or more torque tubes connected to the drive mechanism, the one or more torque tubes rotated by a fuselage structure in the fuselage, and each torque tube coupled to a torque tube gear; and the activation mechanism comprising a strut axial load driven activation mechanism.

37. The aircraft of claim 35, wherein the shape transition assembly further comprises:

the drive mechanism comprising:

a spring assembly attached to one or more of the plurality of fixed length structural members, the spring assembly comprising one or more vertical springs and one or more horizontal springs; and one or more cables attached to the actuation mechanism and to one or more of the plurality of fixed length structural members;

the actuation mechanism comprising one or more torque tubes connected to the drive mechanism, the one or more torque tubes rotated by a fuselage structure in the fuselage; and the activation mechanism comprising a sensor activation mechanism having one or more sensors on the aircraft to indicate a decrease in a strut tension load.

38. The aircraft of claim 35, wherein the shape transition assembly further comprises:

the plurality of fixed length structural members including one or more inner brace members;

the drive mechanism comprising:

a cam assembly comprising one or more cam elements; and a plurality of cables comprising one or more vertical cables, one or more horizontal cables, and one or more shear cables, the plurality of cables attached to one or more of the actuation mechanism and the plurality of fixed length structural members;

the actuation mechanism comprising one or more torque tubes connected to the drive mechanism, the one or more torque tubes rotated by a fuselage structure in the fuselage; and the activation mechanism comprising a sensor activation mechanism having one or more sensors on the aircraft to indicate a decrease in a strut tension load.

39. An expandable strut assembly for an aircraft, the expandable strut assembly comprising:

a strut having a strut cross section with an airfoil shape, and the strut having an outboard end coupled to a wing of the aircraft, an inboard end coupled to a fuselage of the aircraft, and an elongate body defined between the outboard end and the inboard end; and at least one shape transition assembly connected to an interior of the strut, each shape transition assembly configured to transition the strut between a contracted position and an expanded position, and configured to transition the strut cross section between a contracted airfoil shape and an expanded airfoil shape, each shape transition assembly comprising:

a shape transition mechanism attached to one or more interior portions in the interior of the strut, the shape transition mechanism comprising:

a plurality of fixed length structural members forming an expandable structure having a cross section profile comprising a rhombus shape;

a drive mechanism connected to the plurality of fixed length structural members, the drive mechanism comprising one or more variable length structural members comprising one or more compression chains coupled to a reduction gear system;

an actuation mechanism connected to the shape transition mechanism, the actuation mechanism configured to actuate the drive mechanism of the shape transition mechanism, the actuation mechanism comprising:

a first spine member having a restrained end attached to the outboard end of the strut and having an unrestrained end, and extending along a length of the strut;

a second spine member having a restrained end attached to a fuselage structure in an interior of the fuselage, and having an unrestrained end, and extending along the length of the strut parallel to the first spine member; and one or more compression chain attachment points connecting the first spine member and connecting the second spine member to the drive mechanism; and an activation mechanism coupled to the actuation mechanism, the activation mechanism comprising a strut axial load driven activation mechanism, and configured to activate the actuation mechanism to initiate a position transition of the strut between the contracted position and the expanded position, and to initiate a shape transition of the strut cross section between the contracted airfoil shape and the expanded airfoil shape.

40. The expandable strut assembly of claim 39, wherein the expandable strut assembly further comprises:

a jury strut attached between a top portion of the strut and an underside portion of the wing, and forms a jury strut joint location, wherein a first end of the jury strut joins to the top portion of the strut, and further wherein each of the at least one shape transition assemblies has an outboard end attached to the interior of the strut at the jury strut joint location.

41. A method of using an expandable strut assembly to expand a strut of a wing of an aircraft, the method comprising the steps of:

coupling the expandable strut assembly to the wing of the aircraft, the expandable strut assembly comprising:

the strut having a strut cross section with an airfoil shape, and the strut having an outboard end coupled to the wing of the aircraft, an inboard end coupled to a fuselage of the aircraft, and an elongate body defined between the outboard end and the inboard end; and at least one shape transition assembly connected to an interior of the strut, each shape transition assembly comprising:

a shape transition mechanism attached to one or more interior portions in the interior of the strut, the shape transition mechanism comprising:

a plurality of fixed length structural members;

a drive mechanism connected to the plurality of fixed length structural members, the drive mechanism comprising one or more variable length structural members;

an actuation mechanism connected to the shape transition mechanism; and an activation mechanism coupled to the actuation mechanism; and using the at least one shape transition assembly of the expandable strut assembly to transition the strut between a contracted position and an expanded position, and to transition the strut cross section between a contracted airfoil shape and an expanded airfoil shape.

42. The method of claim 41, wherein using the shape transition assembly further comprises:

activating the actuation mechanism with the activation mechanism comprising one of:

(a) a sensor activation mechanism;

(b) a strut axial load driven activation mechanism; or (c) a wing rotation driven system to convert wing rotations of the wing to horizontal movement at a strut root of the strut.

43. The method of claim 41, wherein using the shape transition assembly further comprises:

actuating the drive mechanism with the actuation mechanism comprising one of:

(a) one or more torque tubes connected to the shape transition mechanism, the one or more torque tubes rotated by a fuselage structure in the fuselage;

(b) a first spine member and a second spine member coupled to one or more reduction gear systems in the strut;

(c) an immovable spine member connected to a spring system in an interior of the fuselage; or (d) a movable spine member attached to a lever assembly in the interior of the fuselage.

44. The method of claim 43, wherein actuating the drive mechanism with the actuation mechanism further comprises the fuselage structure in the fuselage rotating the one or more torque tubes comprising one of:

a motor; or a rack-and-pinion system.

45. The method of claim 41, wherein using the shape transition assembly further comprises:

expanding and contracting the strut with the drive mechanism comprising one of:

(a) one or more compression chains;

(b) a spring assembly and a plurality of vertical cables; or (c) a cam assembly and a plurality of horizontal cables.

46. The method of claim 41, wherein coupling the expandable strut assembly to the wing of the aircraft further comprises coupling the expandable strut assembly having the plurality of fixed length structural members forming an expandable structure having a cross section profile comprising one of a rhombus shape or a hexagon shape.

47. The method of claim 41, wherein using the shape transition assembly further comprises:

the strut is in the contracted position and the strut cross section is in the contracted airfoil shape during a cruise flight condition of the aircraft; and the strut is in the expanded position and the strut cross section is in the expanded airfoil shape when the strut is under compression during a wing down-bending flight condition of the aircraft.

48. The method of claim 41, wherein coupling the expandable strut assembly to the wing of the aircraft further comprises coupling the expandable strut assembly having the shape transition assembly comprising:

each shape transition mechanism comprising:

the plurality of fixed length structural members forming an expandable structure having a cross section profile comprising a rhombus shape; and the drive mechanism comprising one or more compression chains coupled to a reduction gear system;

the actuation mechanism comprising a first spine member and a second spine member coupled to one or more reduction gear systems in the strut; and the activation mechanism comprising a strut axial load driven activation mechanism having a strut axial load in the strut.

49. The method of claim 41, wherein coupling the expandable strut assembly to the wing of the aircraft further comprises coupling the expandable strut assembly further comprising:

a jury strut attached between a top portion of the strut and an underside portion of the wing, and forms a jury strut joint location, wherein a first end of the jury strut joins to the top portion of the strut, and further wherein each of the at least one shape transition assemblies has an outboard end attached to the interior of the strut at the jury strut joint location.

50. The method of claim 41, wherein coupling the expandable strut assembly to the wing of the aircraft further comprises coupling to the wing of the aircraft a double structure expandable strut assembly with two shape transition assemblies comprising a first shape transition assembly and a second shape transition assembly positioned aft of the first shape transition assembly.

* * * * *